(12) United States Patent
Valla

(10) Patent No.: US 9,860,203 B2
(45) Date of Patent: Jan. 2, 2018

(54) METHODS, SYSTEMS, AND DEVICES FOR GENERATING A UNIQUE ELECTRONIC COMMUNICATIONS ACCOUNT BASED ON A PHYSICAL ADDRESS AND APPLICATIONS THEREOF

(71) Applicant: ALPHABET COMMUNICATIONS, INC., Toronto (CA)

(72) Inventor: Shafin Valla, Toronto (CA)

(73) Assignee: Alphabet Communications, Inc., Toronto (CA)

( * ) Notice: Subject to any disclaimer, the term of this patent is extended or adjusted under 35 U.S.C. 154(b) by 0 days.

(21) Appl. No.: 15/604,444

(22) Filed: May 24, 2017

(65) Prior Publication Data

US 2017/0346776 A1 Nov. 30, 2017

Related U.S. Application Data

(63) Continuation of application No. 15/603,204, filed on May 23, 2017.
(Continued)

(51) Int. Cl.
*G06F 15/16* (2006.01)
*H04L 12/58* (2006.01)
(Continued)

(52) U.S. Cl.
CPC ............ *H04L 51/20* (2013.01); *G01S 13/46* (2013.01); *H04L 67/18* (2013.01); *H04L 67/30* (2013.01); *G01S 2013/468* (2013.01)

(58) Field of Classification Search
CPC ......... H04L 51/20; H04L 67/18; H04L 67/30; G01S 13/46; G01S 2013/468
(Continued)

(56) References Cited

U.S. PATENT DOCUMENTS

| 6,285,777 B2 | 9/2001 | Kanevsky |
| 8,060,555 B2 | 11/2011 | Grayson |

(Continued)

OTHER PUBLICATIONS

International Search Report and Written Opinion dated Oct. 5, 2017 for International Application No. PCT/US2017/034274, 11 pages.

*Primary Examiner* — Phuoc Nguyen
(74) *Attorney, Agent, or Firm* — Knobbe Martens Olson & Bear LLP

(57) ABSTRACT

A unique electronic communications account is generated and linked to a physical address of a user. A network of electronic mail addresses linked to physical addresses can be used for the transmission of information in electronic or physical form. Users can send information to a single recipient or multiple recipients by selecting the recipient or an area of recipients on a map generated by the system. A plurality of users can use a single e-mail address linked to a physical address through creation and storage of user profiles. Users can deactivate and transfer their unique electronic mail address upon relocation to a new physical address. The communication platform can overcome technical problems and limitations of electronic mail existing today. The communication platform can create a transparent global communication that can be achieved via an electronic communications account that can be created for every physical address in the world.

20 Claims, 96 Drawing Sheets

Related U.S. Application Data

(60) Provisional application No. 62/341,551, filed on May 25, 2016, provisional application No. 62/361,291, filed on Jul. 12, 2016.

(51) Int. Cl.
  *H04L 29/08* (2006.01)
  *G01S 13/46* (2006.01)

(58) Field of Classification Search
  USPC .......................................................... 709/217
  See application file for complete search history.

(56) References Cited

U.S. PATENT DOCUMENTS

| | | |
|---|---|---|
| 8,209,191 B2 | 6/2012 | Cook |
| 8,542,117 B1 | 9/2013 | Miasnik |
| 8,731,953 B2 | 5/2014 | Miasnik |
| 8,736,443 B1 | 5/2014 | Miasnik |
| 8,836,479 B2 | 9/2014 | Miasnik |
| 8,844,050 B1 | 9/2014 | Miasnik |
| 9,147,339 B1 | 9/2015 | Miasnik |
| 9,218,432 B2 | 12/2015 | Miasnik |
| 9,564,044 B2 | 2/2017 | Miasnik |
| 2001/0012378 A1 | 8/2001 | Kanevsky |
| 2002/0002590 A1 | 1/2002 | King |
| 2002/0059381 A1 | 5/2002 | Cook |
| 2004/0044734 A1 | 3/2004 | Beck |
| 2004/0181462 A1 | 9/2004 | Bauer |
| 2005/0132016 A1 | 6/2005 | Boone |
| 2006/0242247 A1 | 10/2006 | Richardson |
| 2006/0253597 A1 | 11/2006 | Mujica |
| 2008/0158615 A1 | 7/2008 | Parkos |
| 2011/0043327 A1* | 2/2011 | Baarman ................ H02J 5/005 340/5.8 |
| 2011/0087571 A1 | 4/2011 | Sagi |
| 2011/0087746 A1 | 4/2011 | Sagi |
| 2011/0289158 A1 | 11/2011 | Terranova |
| 2013/0226929 A1 | 8/2013 | Yeerelly |
| 2014/0066044 A1 | 3/2014 | Ramnani et al. |
| 2014/0203908 A1 | 7/2014 | Miasnik |
| 2014/0282934 A1 | 9/2014 | Miasnik |
| 2015/0154370 A1 | 6/2015 | Skaaksrud |
| 2015/0154538 A1 | 6/2015 | Skaaksrud |
| 2015/0269700 A1 | 9/2015 | Miasnik |
| 2015/0347734 A1 | 12/2015 | Beigi |
| 2016/0055493 A1 | 2/2016 | Chau et al. |
| 2017/0093875 A1* | 3/2017 | de Freitas ............ H04L 63/102 |
| 2017/0103388 A1* | 4/2017 | Pillai .................. G06Q 20/3829 |

\* cited by examiner

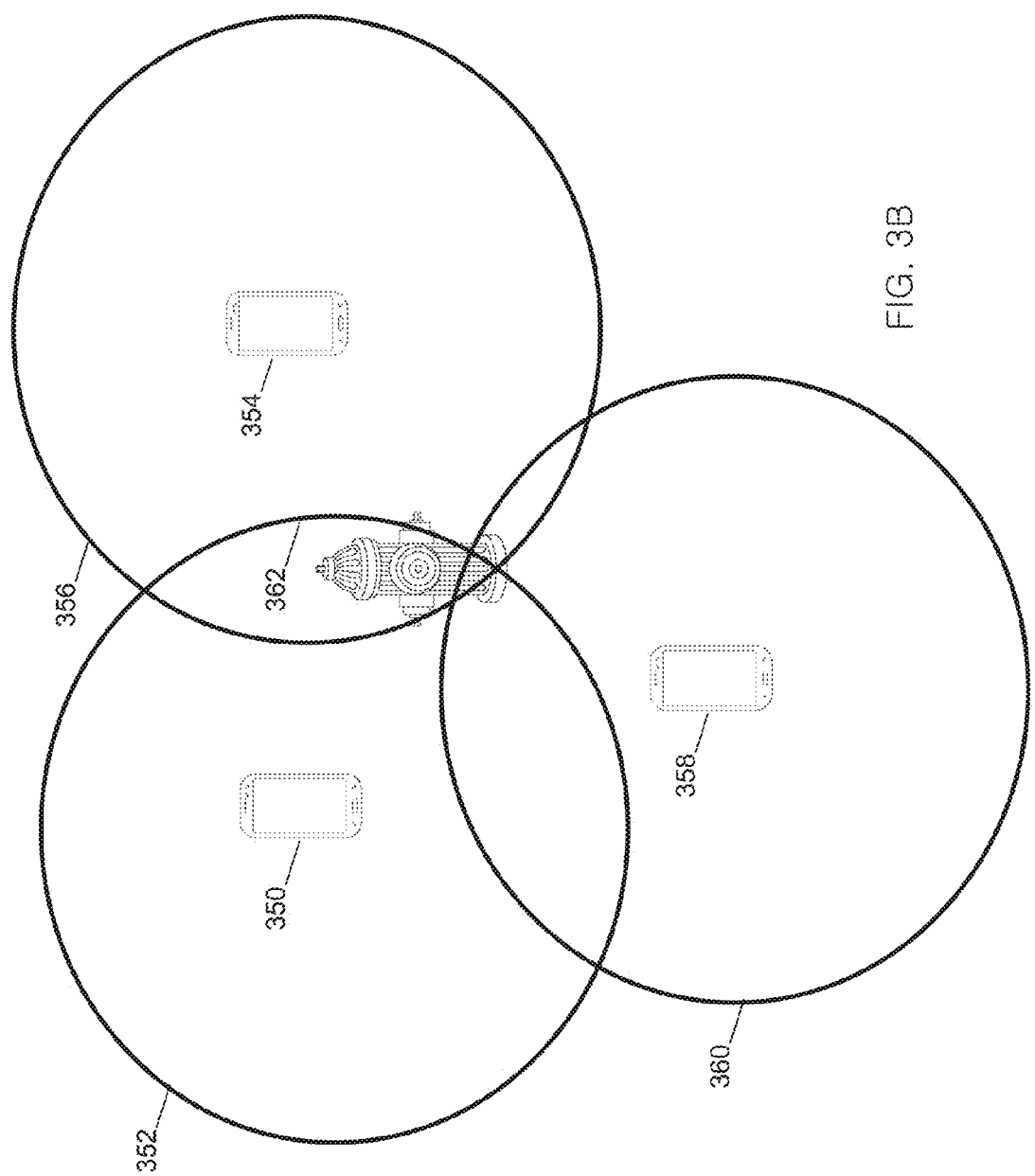

For Example, Lati43.7901_Long-79.3606@alphc.com

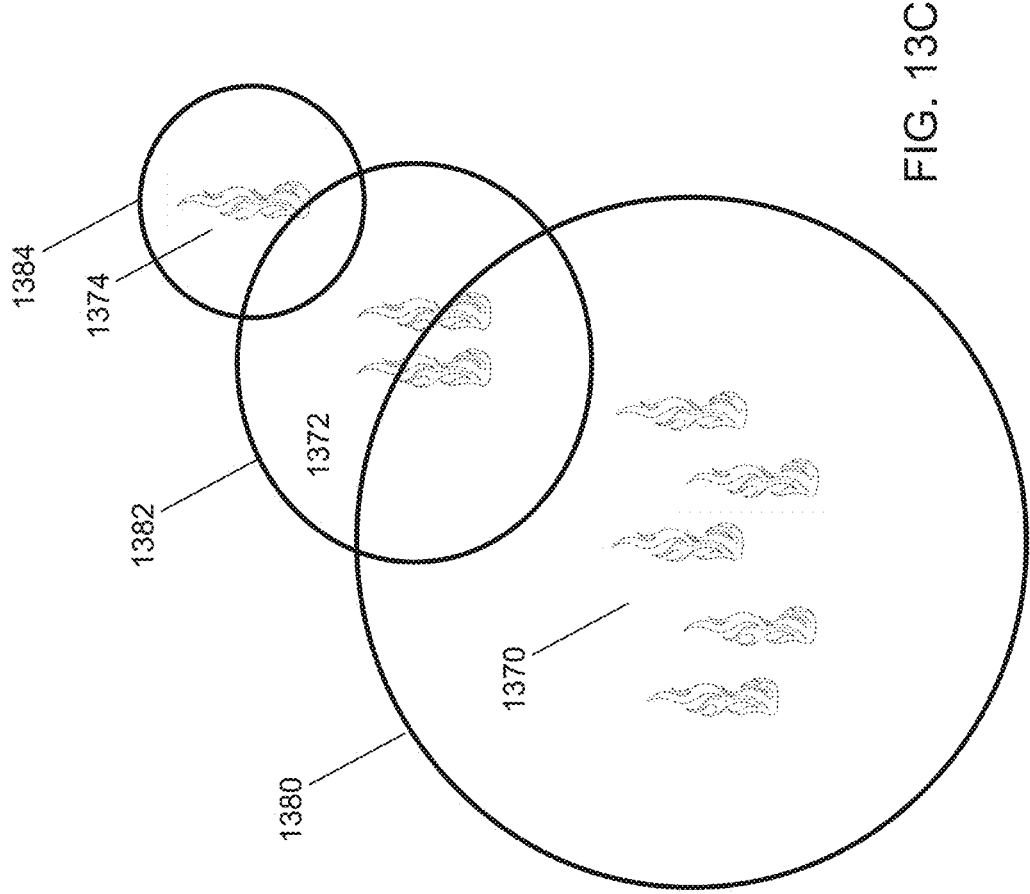

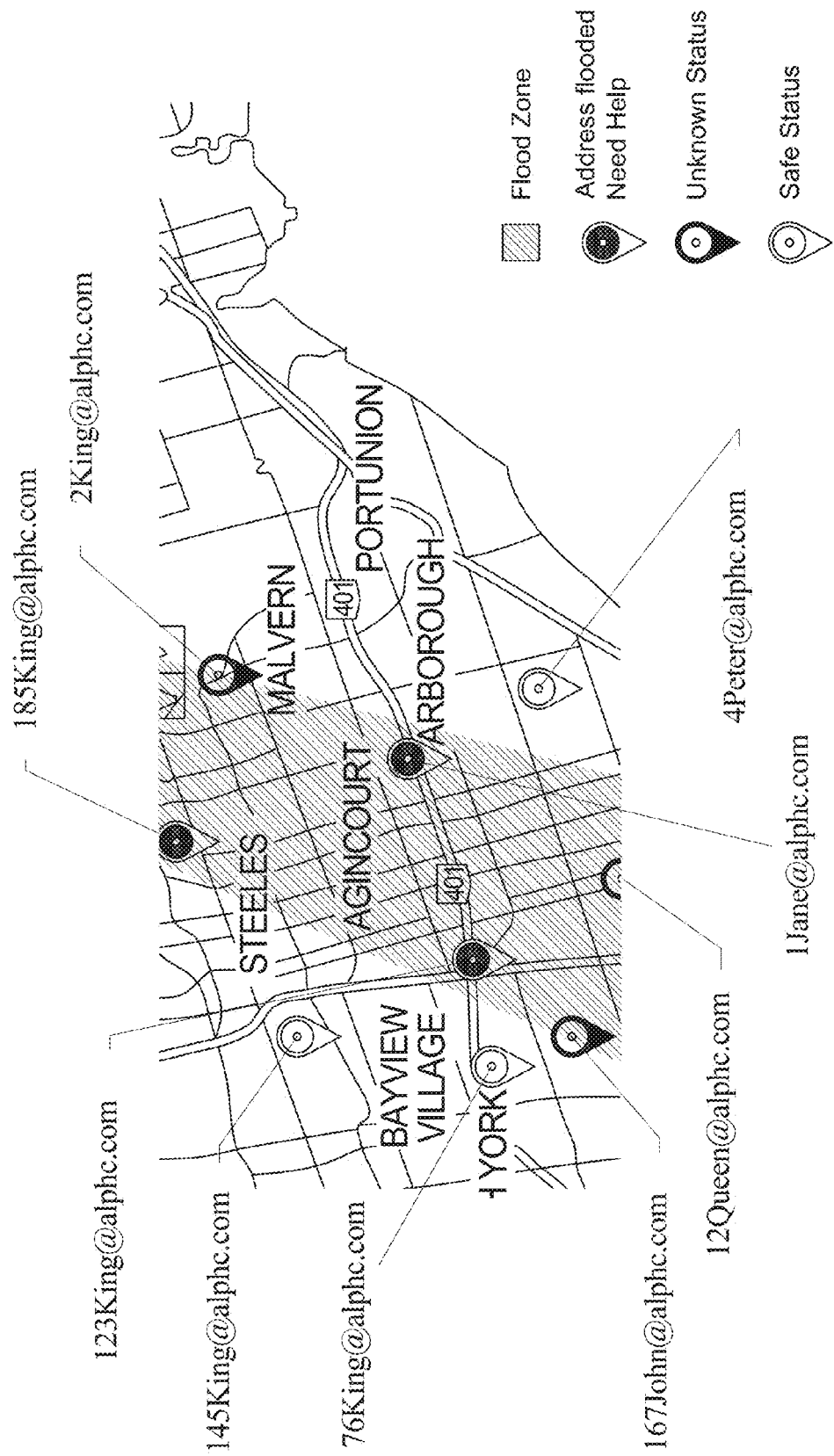
FIG. 15B  Mapping by First Responders using AlphC

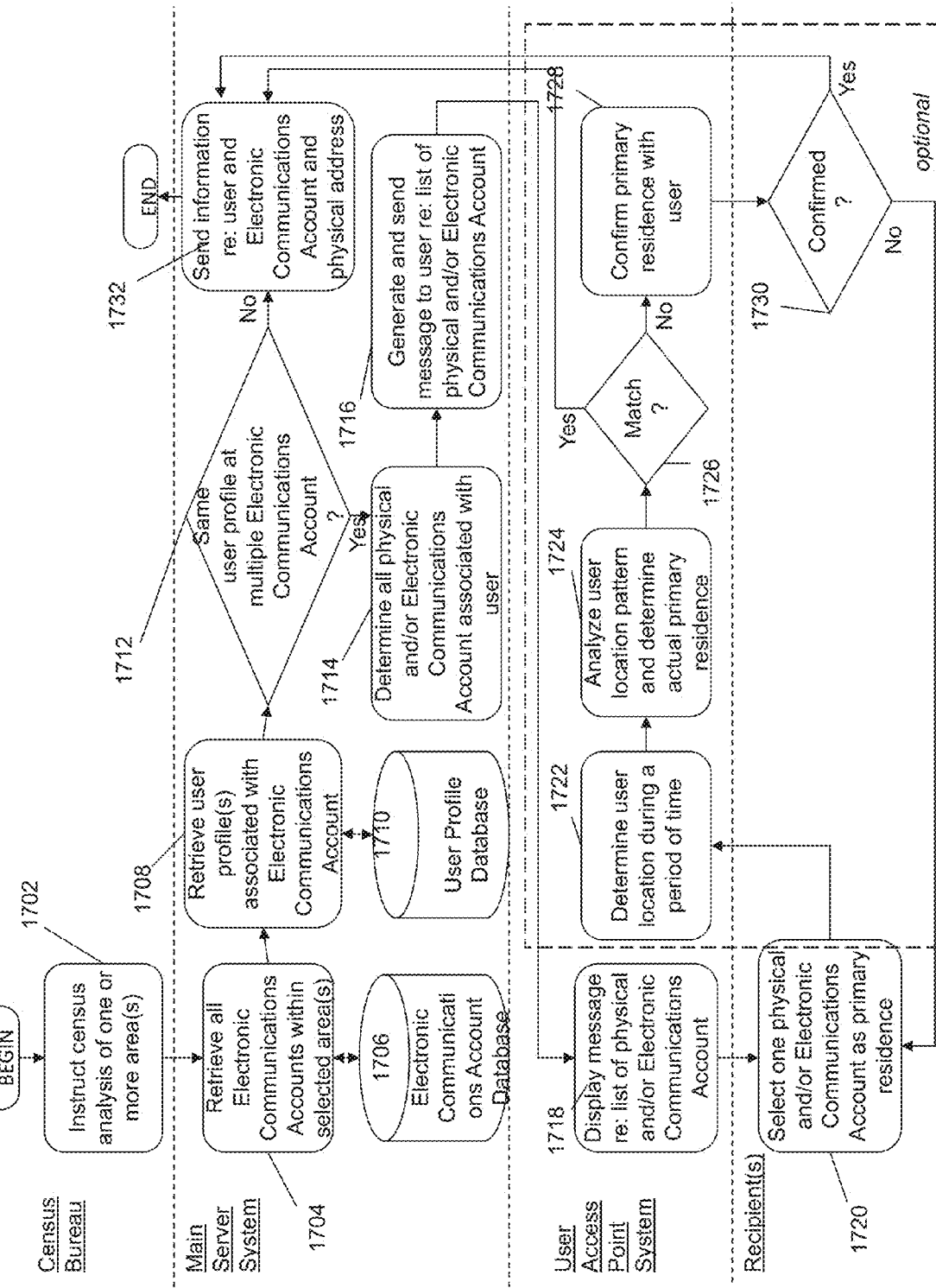

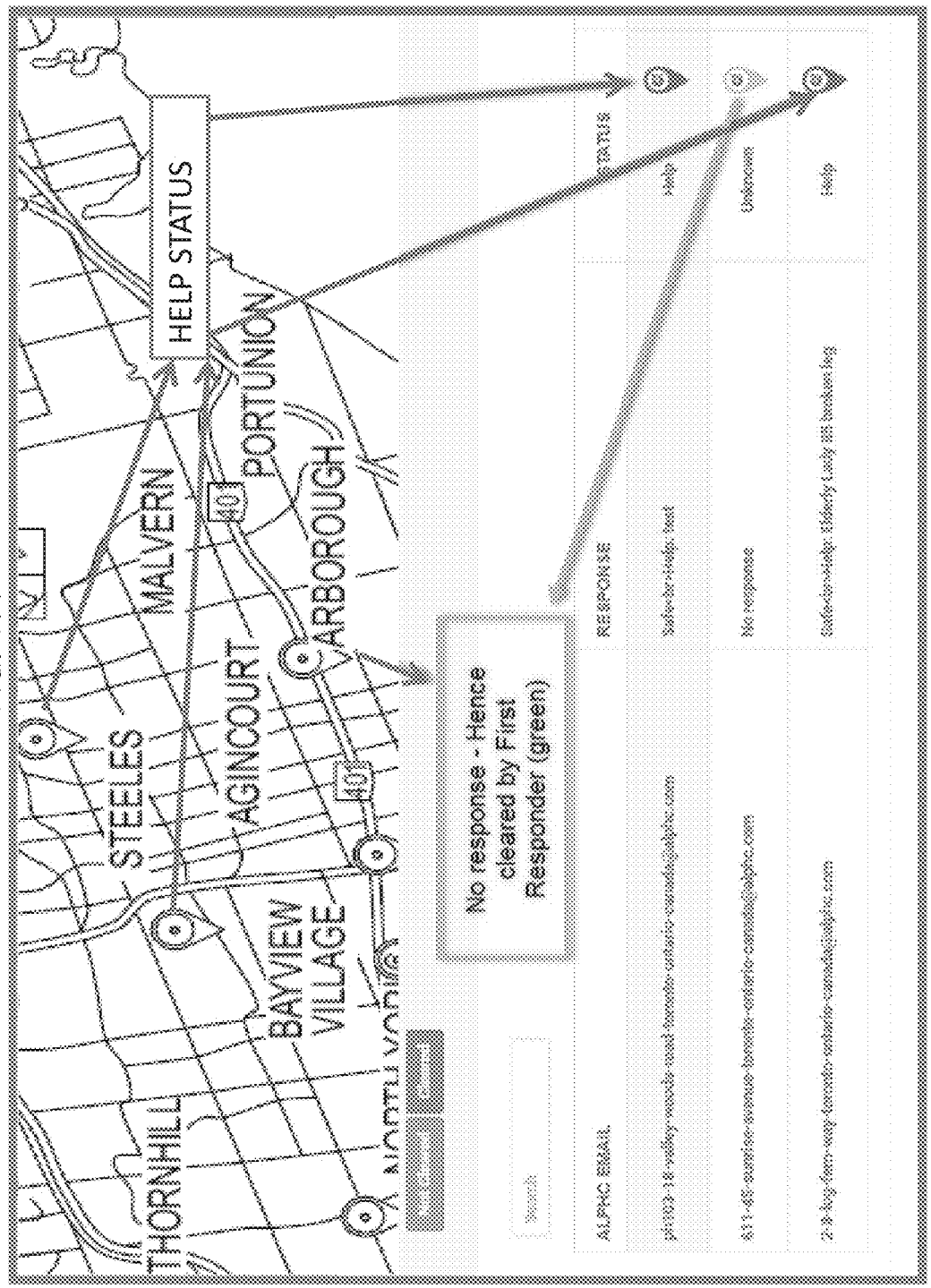

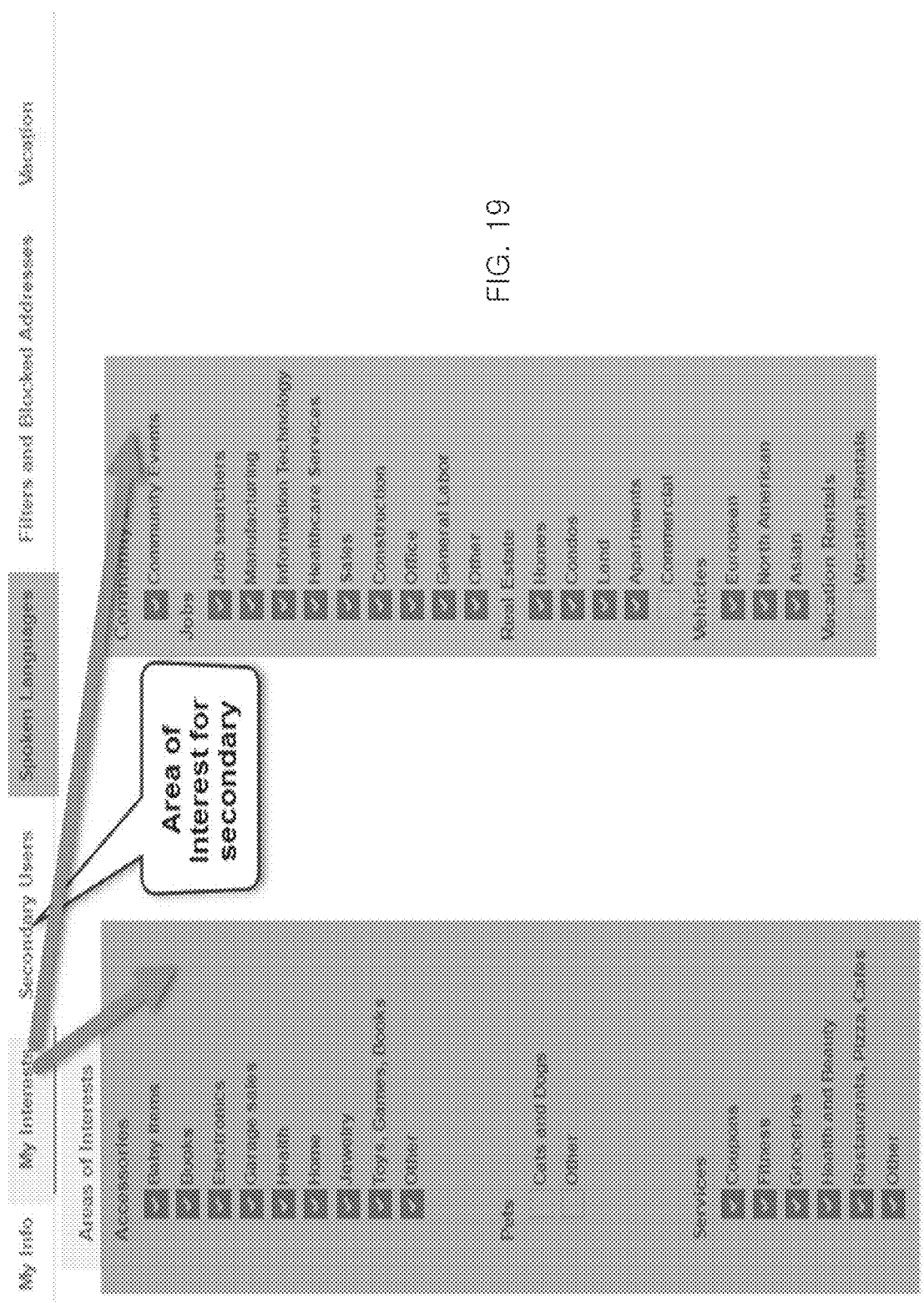

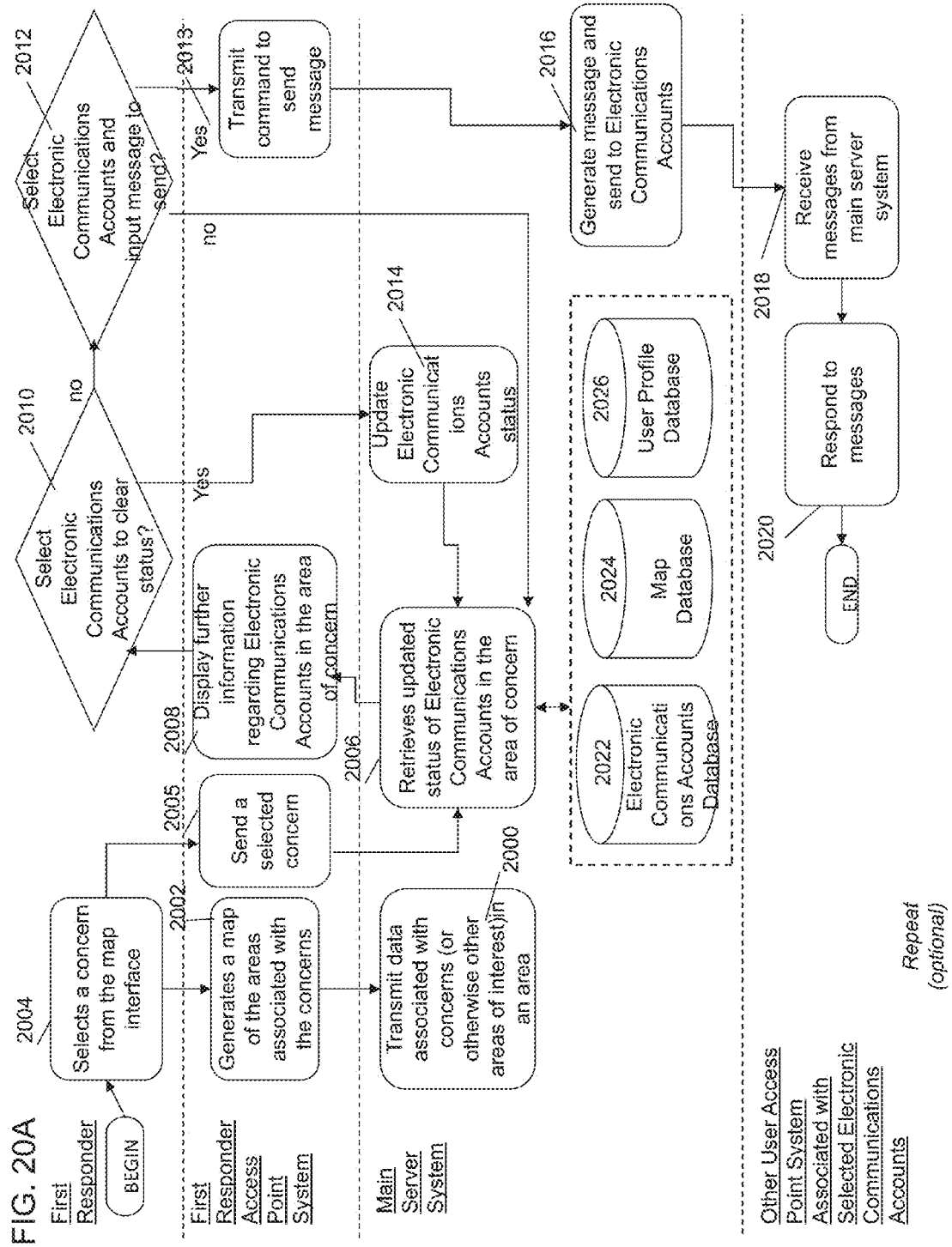

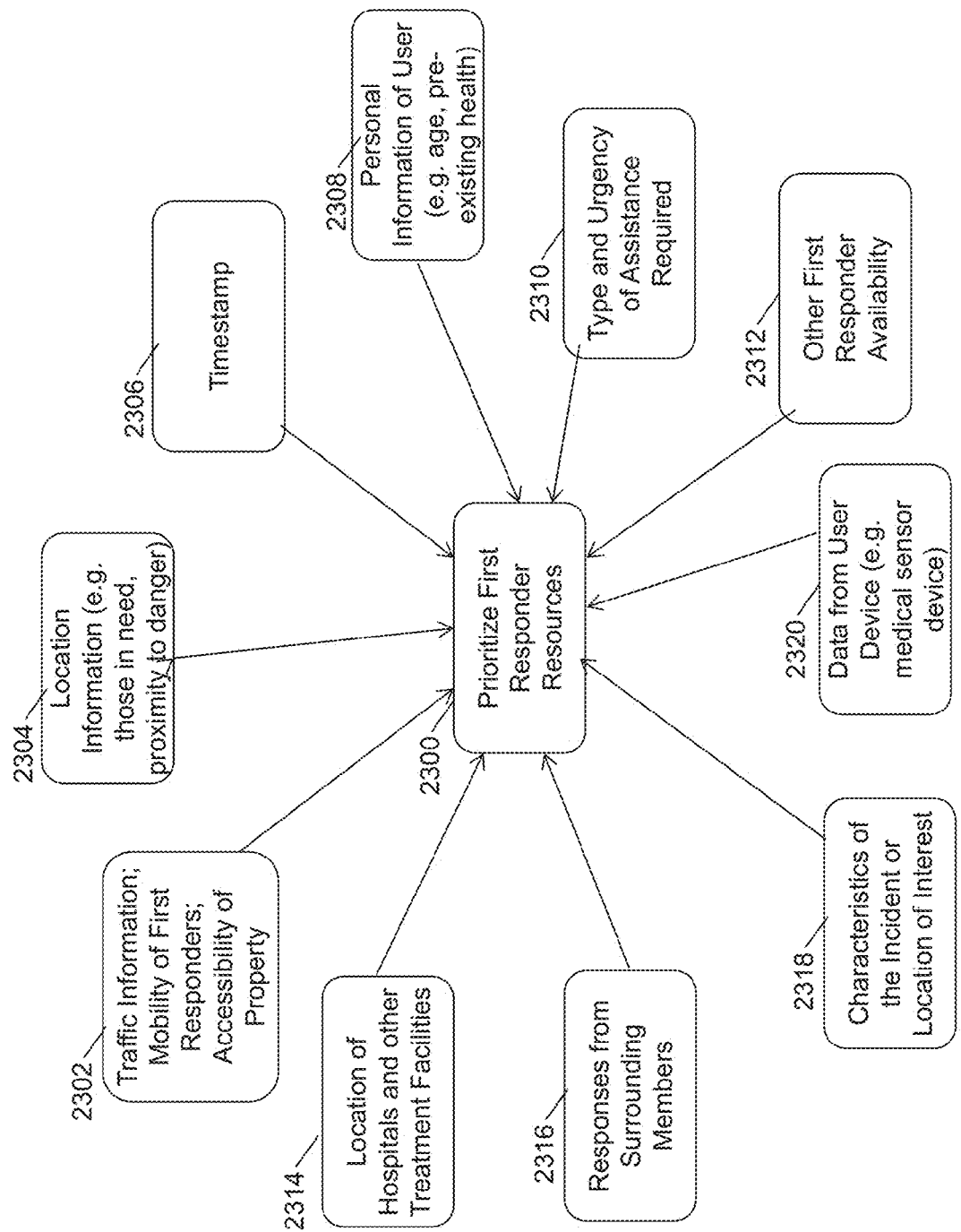

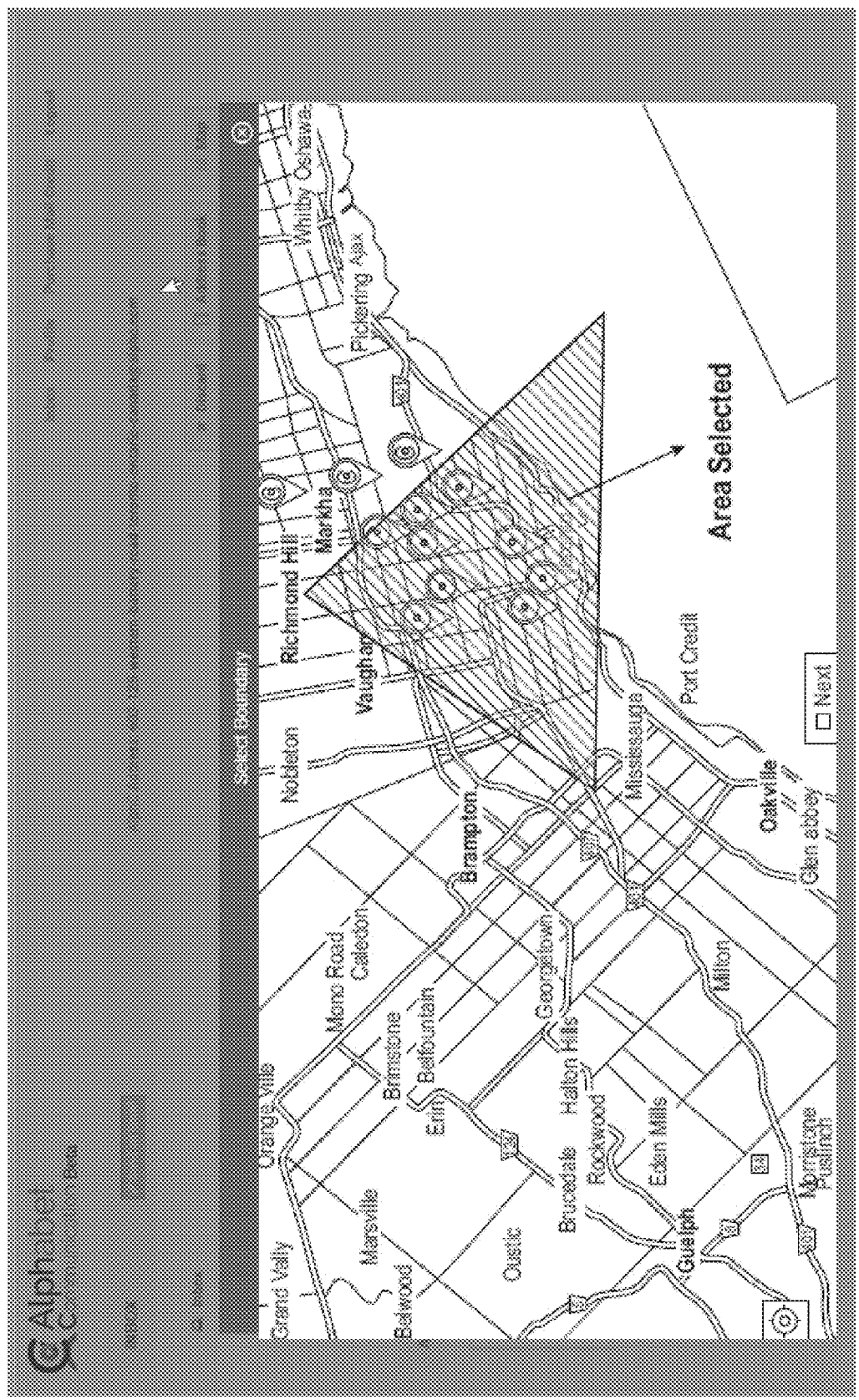

METHODS, SYSTEMS, AND DEVICES FOR GENERATING A UNIQUE ELECTRONIC COMMUNICATIONS ACCOUNT BASED ON A PHYSICAL ADDRESS AND APPLICATIONS THEREOF

CROSS REFERENCE TO RELATED APPLICATIONS

The present application is a continuation application of U.S. patent application Ser. No. 15/603,204, filed on May 23, 2017, and entitled METHODS, SYSTEMS, AND DEVICES FOR GENERATING A UNIQUE ELECTRONIC COMMUNICATIONS ACCOUNT BASED ON A PHYSICAL ADDRESS AND APPLICATIONS THEREOF, which claims the benefit under 35 U.S.C. 119(c) to U.S. Provisional Patent Application No. 62/341,551, filed on May 25, 2016, and titled METHODS, SYSTEMS, AND DEVICES FOR GENERATING A UNIQUE ELECTRONIC ADDRESS BASED ON A PHYSICAL ADDRESS AND APPLICATIONS THEREOF, U.S. Provisional Patent Application No. 62/361,291, filed Jul. 12, 2016, and titled METHODS, SYSTEMS, AND DEVICES FOR GENERATING A UNIQUE ELECTRONIC MAILING ADDRESS BASED ON A PHYSICAL ADDRESS AND APPLICATIONS THEREOF, all of which are hereby incorporated by reference in its entirety for all purposes.

BACKGROUND

Field

The embodiments disclosed herein generally relate to systems and methods for providing and/or improving an electronic communications network and more particularly to generating, managing, communicating, and using an electronic communications account, which can include an electronic addresses associated with physical civic addresses across the globe.

SUMMARY

Various embodiments described herein solve the problems of communicating via personal electronic mail by allowing a user to generate an electronic communications account, which can include an e-mail address and/or other electronic communications account, linked to a physical address.

In some embodiments, an e-mail address can be generated when a user inputs his/her physical location into the system. The format of the inputted physical location can be a physical address or geographic coordinates. The inputted information can be used to derive a location. For example, the inputted information can indicate a building or landmark. The inputted information can be directed to a database that stored previously visited locations. Using the inputted information, the system can be configured to locate the corresponding physical address and generate an e-mail address.

Various embodiments described herein allow users to utilize the system to have greater control over the sources from which they receive information, as well as the type of information received.

Various embodiments described herein address issues with current e-mail communication and improve upon the capabilities of e-mail as an information transmission medium particularly adding transparency of user and reducing spam as well as delivery of letter mail via the systems described herein.

Finally, various embodiments described herein use the system to enhance the ability of government, commercial, and other private entities to have access to target audiences and for those target audiences to respond or initiate communications with those entities.

Some embodiments include a computer-implemented method for generating an electronic communications account based on latitude and longitude and geo coding associated with a location of a user device. In some embodiments, the method comprises receiving, by a computer system, a request to generate the electronic communications account and authorization to access location services; accessing, by the computer system, data related to the location of the user device, wherein the location of the user device is determined by: receiving data from a plurality of transmitters; triangulating a location based on the received data from the plurality of transmitters; and identifying a latitude and longitude for the location; determining, by the computer system, whether the location of the user device is associated with an electronic communications account; in response to determining that the location of the user device is associated with an already existing electronic communications account: sending, by the computer system, an electronic message to the electronic communications account, wherein the electronic message to the electronic communications account indicates that the user device is attempting to generate the electronic communications account; and in response to determining that the location of the user device is not associated with the already existing electronic communications account: automatically generating, by the computer system, the electronic communications account for the location of the user device; associating, by the computer system, the latitude and longitude for the location to the electronic communications account; and transmitting, by the computer system, data associated with the electronic communications account to the user device, wherein the computer system comprises a computer processor and an electronic storage medium.

In some embodiments, the transmitters include at least one of: a satellite, a Wi-fi base station, mobile Wi-fi base or a cellular base station.

In some embodiments, the method further comprises: transmitting, by the computer system, a request for identification verification information associated with an identification document; receiving, by the computer system, the identification verification information associated with an identification document; and verifying, by the computer system, whether the identification verification information associated with an identification document is sufficient to authenticate the user device.

In some embodiments, the automatically generated electronic communications account for the location of the user device includes an indication of the latitude and longitude of the location associated with the user device.

In some embodiments, the method further comprises determining, by the computer system, whether the location of the user device is associated with a location of interest; and in response to determining that the location of the user device is associated with the location of interest, automatically generating, by the computer system, the electronic communications account, wherein the automatically generated electronic communications account is associated with the location of interest.

In some embodiments, the location of interest includes at least one of: a residence, a building, an infrastructure, or a vehicle.

In some embodiments, the method further comprises receiving, by the computer system, personal information of an individual independent of the individual associated with the user device; and associating, by the computer system, the electronic communications account with the personal information of the individual as a secondary individual.

In some embodiments, the method further comprises receiving, by the computer system, a selection to share the automatically generated electronic communications account to a computing device; and transmitting, by the computer system, the electronic communications account to a computing device.

Some embodiments include a system for generating an electronic communications account based on a latitude and longitude associated with a location of a user device, wherein the system comprises: one or more computer readable storage devices configured to store a plurality of computer executable instructions; and one or more hardware computer processors in communication with the one or more computer readable storage devices and configured to execute the plurality of computer executable instructions in order to: receive, from a user device, a request to generate an electronic communications account; access a location of the user device, wherein the location of the user device is determined by triangulating a location based on received data from a plurality of transmitters; determine whether the user device is already associated with an already existing electronic communications account; in response to determining that the user device is already associated with the already existing electronic communications account: transmit, to a user device, a request identification verification information; receive identification verification information from the user device; determine whether the user device is verified based on the identification verification information; in response to determining that the user device is verified based on the identification verification information: automatically generate the electronic communications account for the location of the user device; associate the user device to the electronic communications account; and transmit the electronic communications account to the user device; in response to determining that the user device is not verified based on the identification verification information: initiate a fraud verification procedure to determine whether the request to generate the electronic communications account is a fraudulent request; and in response to determining that the user device is already not associated with the already existing electronic communications account: automatically generate the electronic communications account for the location of the user device; associate the user device to the electronic communications account; and transmit the electronic communications account to the user device.

In some embodiments, in response to determining that the user device is verified based on the identification verification information, the processor is further configured to: transmit, to the user device, a request to select whether the user device is to be associated with the already associated electronic communications account or to the generated electronic communications account for the location of the user device; receive, from the user device, a selection of the electronic communications account to be associated with the user device; and associate the user device with the selected electronic communications account.

In some embodiments, the automatically generated electronic communications account for the location of the user device includes an indication of the location associated with the user device.

In some embodiments, the processor is further configured to: determine whether the location of the user device is associated with a location of interest; and in response to determining that the location of the user device is associated with the location of interest, identify the electronic communications account associated with the location of interest and transmit the electronic communications account to the user device.

In some embodiments, the processor is further configured to: receive, from the user device, personal information of an individual; and associate the electronic communications account with the personal information of an individual as a secondary individual.

In some embodiments, the processor is further configured to: receive, from the user device, a selection to share the automatically generated electronic communications account to a computing device; and transmit the electronic communications account to a computing device.

In some embodiments, automatically generating the electronic communications account includes identifying a channel of communication for the electronic communications account, the channel of communication including at least one of: an email address, an SMS message, or executable code to initiate an alert on the user device.

Some embodiments include a computer-implemented method for transmitting an alert to electronic communications account associated with a particular area, wherein the method comprises: receiving, by a computer system, content for the alert to send to electronic communications account associated with the area; accessing, by the computer system, a selection of an area where alerts are to be sent; identifying, by the computer system, one or more electronic communications accounts associated with the selected area; identifying, by the computer system, a channel of communication for the one or more electronic communications accounts associated with the selected area; and transmitting, by the computer system, the alert to the one or more electronic communications accounts associated with the selected area, wherein the computer system comprises a computer processor and an electronic storage medium.

In some embodiments, the method further comprises: identifying, by the computer system, a location of the one or more electronic communications accounts associated with the selected area; and transmitting, by the computer system, the location of the one or more electronic communications accounts associated with the selected area to be displayed on a map within the area.

In some embodiments, the method further comprises: receiving, by the computer system, a selection of a characteristic of one or more electronic communications accounts; accessing, by the computer system, the one or more electronic communications accounts associated with the selected area that include the received selection of the characteristic; and transmitting, by the computer system, the alert to the one or more electronic communications accounts that include the received characteristic.

In some embodiments, the received characteristic includes at least one of: a percentage of individuals, demographic data, sex, race, economic status, age, level of education, income level, employment, psychiatric data, medical data, a personality trait, an interest, values, attitudes, lifestyles, opinions, preferences, likes, dislikes, predilections, purchase history, browser history, financial history, financial data, credit history, credit data, or personal information.

In some embodiments, accessing a selection of an area where alerts are to be sent comprises automatically determining, by the computer system, the at least a portion of the boundaries of the selection of an area.

For purposes of this summary, certain aspects, advantages, and novel features of the invention are described herein. It is to be understood that not necessarily all such advantages may be achieved in accordance with any particular embodiment of the invention. Thus, for example, those skilled in the art will recognize that the invention may be embodied or carried out in a manner that achieves one advantage or group of advantages as taught herein without necessarily achieving other advantages as may be taught or suggested herein.

All of these embodiments are intended to be within the scope of the invention herein disclosed. These and other embodiments will become readily apparent to those skilled in the art from the following detailed description having reference to the attached figures, the invention not being limited to any particular disclosed embodiment(s).

BRIEF DESCRIPTION OF THE DRAWINGS

A better understanding of the devices and methods described herein will be appreciated upon reference to the following description in conjunction with the accompanying drawings.

FIG. 3B is a diagram depicting an embodiment of a method for triangulating a physical location.

FIG. 13C is a diagram depicting an embodiment of a method for automatically determining radiuses for the areas of interest.

FIG. 15B illustrates a diagram depicting an embodiment of electronic communications accounts associated with an area affected by a flood.

FIG. 17A is a flowchart depicting an embodiment of a method for determining the primary residence of a user.

FIG. 17O illustrates a graphical user interface depicting an embodiment upon initiation by a first responder.

FIG. 17T illustrates an embodiment of change in status to "cleared" based on a "no response" whereas two other electronic communications accounts are changed to a "help" status.

FIG. 19 is a diagram depicting an embodiment of characteristics used to filter electronic communications accounts for targeted marketing.

FIG. 20A is a flowchart depicting an embodiment of a method for sending an alert to electronic communications accounts associated with an area.

FIG. 23 is a diagram depicting an embodiment of prioritizing first responder resources.

FIG. 24G is a diagram depicting an embodiment of an area selected by the user on a map.

FIG. 26A is a diagram depicting an embodiment of an example registration databases that the electronic communications account can be associated with.

DETAILED DESCRIPTION

Figure 1:
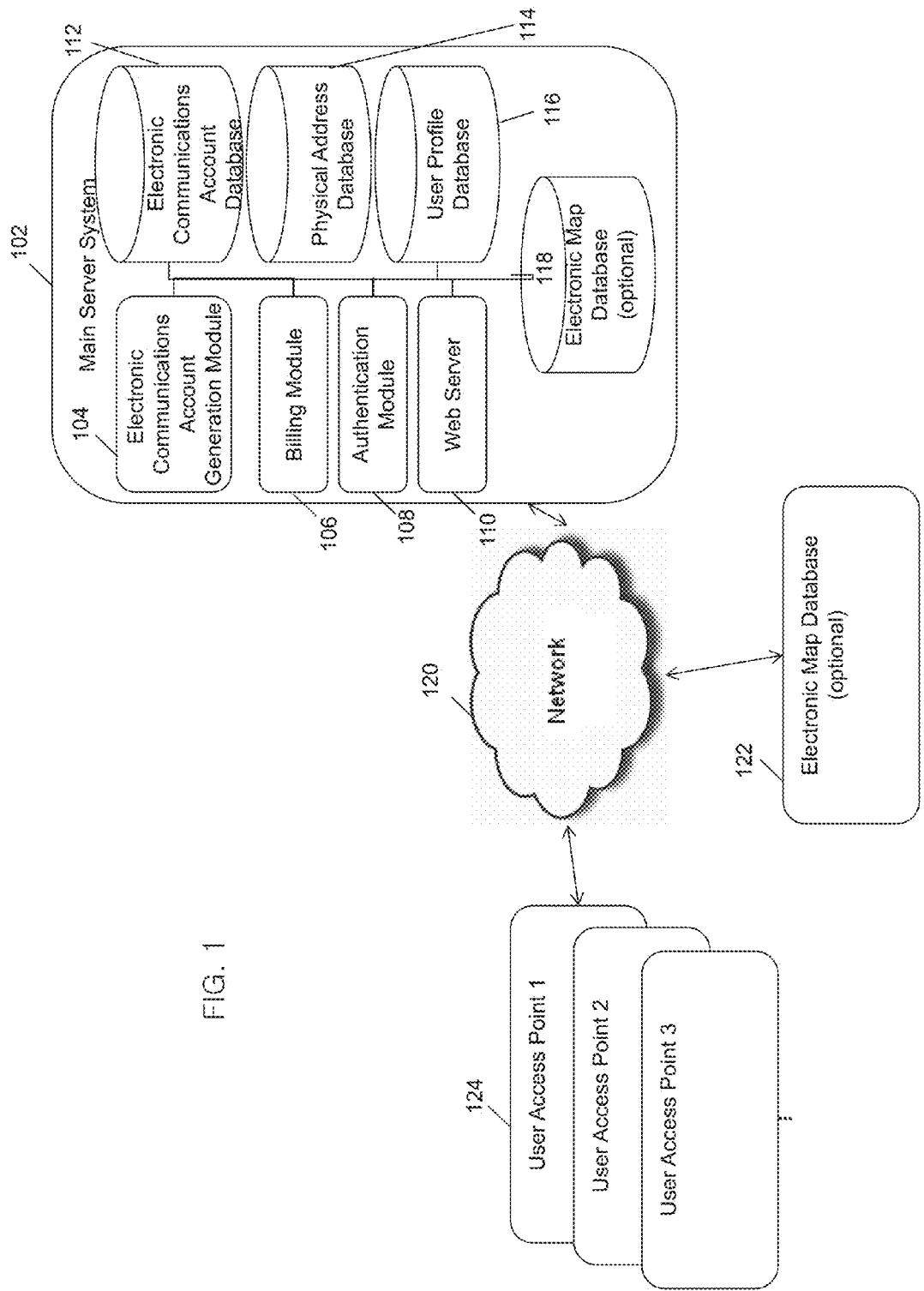
FIG. 1 is an embodiment of a schematic diagram illustrating an embodiment of an electronic communications account generation and management system.

Although several embodiments, examples, and illustrations are disclosed below, it will be understood by those of ordinary skill in the art that the inventions described herein extend beyond the specifically disclosed embodiments, examples, and illustrations and includes other uses of the inventions and obvious modifications and equivalents thereof. Embodiments of the inventions are described with reference to the accompanying figures, wherein like numerals refer to like elements throughout. The terminology used in the description presented herein is not intended to be interpreted in any limited or restrictive manner simply because it is being used in conjunction with a detailed description of certain specific embodiments of the inventions. In addition, embodiments of the inventions can comprise several novel features and no single feature is solely responsible for its desirable attributes or is essential to practicing the inventions herein described.

Various embodiments described herein address one or more shortcomings of communicating via personal electronic mail and physical mailing addresses by providing users with e-mail addresses linked to their physical address. An electronic inbox can also be created for the electronic communications account based on user preference and/or linked to a current email address.

In some embodiments, the communication platform identified and described throughout this enclosure including a response mechanism and analysis of data is a unique system that overcomes technical problems of electronic mail existing today. In some embodiments, the communication platform creates new opportunities of transparent global communication that can be achieved via an electronic communications account that can be created for every physical address in the world.

In some embodiments, each electronic communications account is unique, being tied to a specific physical civic address, and the systems disclosed herein can generate the unique and specific electronic communications account based on the physical civic addresses of all structures that have an address, such as, residential homes, apartments, condominiums and businesses (for example commercial property, industrial property, vacant lots), among others. These electronic communications accounts can remain the same unless the property is demolished and/or becomes non-existent. The systems disclosed herein can also create email addresses for any street furniture as deemed necessary by its owner such as hydro transmission sites, street lights, and so forth. Where a physical civic address is non-existent, for example in rural and remote areas of the world, a generic electronic communications account can be created based on the geographic name of the location, such as the village or hamlet.

Geocode can be tied to an eAddress (or an electronic communications account), such as an email address or can include an email address. Geocode can include location information (such as latitude and longitude information) to ensure that the electronic communications account is site-specific. For example, the electronic communications account can be named Lati43.7901_Long-79.3606@alphc-.com In some embodiments, tying geocode to an electronic communications account ensures that the electronic communications account is unique to that specific site, location, or address. In some embodiments, tying geocode to an electronic communications account ensures that the electronic communications account is unique to the individual working at the specific site, residing at the specific site, and/or otherwise located at the specific site. Geocoding can be used for temporary purposes. For example, geocoding can be used in a rural area where an address does not exist, where a location address is difficult to get to, a location that is unknown to a tourist, or when a client requesting pick-up from a taxi driver in Kenya (no address) and other similar situations. Using geo coding based on latitude and longitude can be used to pin point a user's location for temporary use. This can be converted into an email, linked to an email, or a telephone number, and be associated with a user's bearing to easily locate the user. In an example, an Uber driver in India can determine a location within 10-20 feet of the pick-up place.

In some embodiments, tying geocode to a particular electronic communications account can require a verification process that prevents others from generating such geocode and electronic communications account mapping, such as for fraudulent purposes. Unlike traditional email that can be created at will, the verification process can include an assessment of factors such as identification documents, data from GPS devices, verification from other authorized users, verification from a computing device (for example a mobile device), and the like.

In some embodiments, when the geolocation is tied with the electronic communications account, the system automatically generates the electronic communications account such that the electronic communications account is unique to the particular location. For example, the electronic communications account can be generated and/or predetermined based on global coordinates. This allows for transparency between the sender of the information through the electronic communications account, a characteristic that is absent from traditional emails. This can prevent fraudulent and deceptive messages sent by an electronic communications account.

Postal services provide mail delivery and related services to the public. These services operate by utilizing physical addresses to identify the location of the sender and recipient of physical mail. However, physical mail delivery has become inefficient, cumbersome, expensive, and slow relative to electronic communications channels that have developed in recent years. Electronic delivery of mail provides a faster, more convenient, and environmentally conscience method of transmitting information.

Electronic mail, or e-mail, is one such electronic communication channel, which allows users to generate a unique electronic address through which they can send and receive mail. These electronic addresses become associated with their owner and can be used to transmit information almost instantly across the globe, at very low cost.

The advantages of e-mail are numerous. Sending an e-mail is extremely simple, and requires only basic training to learn. Delivery is almost instantaneous, as recipients usually receive e-mails a few seconds after they are sent. Furthermore, no person must be present to receive e-mail, and they can be sent at any time of day, on any day of the week. The content of e-mails can include text, images, and other files included as attachments. Copies of a message can be sent to a group of people concurrently and carbon copies can be sent to any interested parties. Senders can request proof of receipt of an email being opened. E-mail messages can be prepared in advance and saved until the sender is ready to send them. Finally, messages can be encrypted to ensure the safe delivery of confidential information.

Despite these advantages, there are significant drawbacks to the e-mail system that limit its value as an information transfer medium. Delivering an e-mail to another person requires the sender to know the e-mail address of the recipient. Without this address, no message can be sent. E-mail addresses are often changed frequently, as a result of people switching jobs or changing their internet service providers.

Additionally, e-mail's low cost and ease of use allow it to be used as a means of transferring unsolicited messages and malicious software to unsuspecting recipients. Electronic spamming, the use of electronic messaging systems to send unsolicited messages, afflicts the operation of e-mail as a private medium of communication. Advertisers that gain knowledge of a user's e-mail address can repeatedly send unwanted messages to that user at low cost and with little risk of punishment. This reduces the effectiveness of e-mail communication by greatly increasing the volume of incoming e-mails, making it difficult for the user to locate important messages.

Often, when creating an e-mail account through an e-mail service provider, a user must enter some combination of his/her first and last name, phone number, and/or date of birth. This user information is then stored by the e-mail service provider for verification and recovery purposes. The measure of safety and security of this user information is a significant concern for e-mail users. Should the e-mail service provider's security be compromised, the user information could be accessed and used in any number of undesirable ways.

Traditionally, if a receiver of an email wishes to contact the sender, under traditional processes, the receiver would have to rely on requesting the sender contact information or can have to use complicated network technology to simply retrieve an IP address of the sender, let alone contact information. Furthermore, if an individual wants to contact a person or a company at a particular location, the individual would traditionally have to contact the city government to find a property owner.

Therefore, a system exploiting the speed, convenience, and efficiency of e-mail, but eliminating its shortcomings as a communication medium, is critical to the advancement of electronic communication globally. Using one's physical civic address as a form of electronic communication can be a critical missing link for all communications and has many advantages that person email accounts do not provide.

In some embodiments, the electronic communications system is tied with the physical location, and the sender can be easily located (for example for the purposes of responding to emergencies). The electronic communications system can effortlessly allow a user to identify an individual's contact information by finding the electronic communications account associated with the physical location.

In some embodiments, the system provides users the ability to send messages to any physical location around the world using the electronic communications account. For example, if a user desires to contact a building property manager or superintendent or security, the individual can look up the address of the building. The system can provide a list of electronic communications accounts, categories (for example apartment 1 electronic communications account, apartment 2 electronic communications account, property manager, superintendent, concierge, security), groupings of individuals, or the like for the user to select. The user can then send a message to the electronic communications account of the individual associated with the electronic communications account, name, category, etc. Hence, the person's personal email is not required to make contact. For example, Manager_125King street_W._Toronto_On_Canada@alphc.com would be received by the manager on at the location john.smith@propertymanagement.com.

While e-mail provides a convenient way to instantaneously communicate with others, a major shortcoming is that one needs to know the e-mail address of the recipient in order send an e-mail. Without personally asking or otherwise obtaining the recipient's e-mail address, it is impossible to send an e-mail to that recipient. Furthermore, personal e-mail addresses are changed frequently, which can cause important information to be sent to the incorrect address. E-mail addresses are vulnerable to unsolicited and malicious messages and attachments, and often require a litany of personal identification information to create. As a result, e-mail addresses can expose users to significant risks, including identity theft, computer viruses, and credit card fraud.

Currently a person can create email accounts in a few clicks of a button and/or without much restraint. Accordingly, email is a frequently used means of communication for fraud and other malicious use. A person can have multiple email accounts, alternating between the accounts as needed to commit internet related fraud anonymously. The cost to internet service providers for providing easily accessible email accounts is very high (for example storage place, spam, fraud detection). To maintain a competitive edge, the products and services offered related to email accounts create an open environment for fraudulent activity.

An electronic communications account generated based on geo coding is unique and can share similar characteristics as a finger-print. A geolocation, like a fingerprint, cannot easily be duplicated as it is automatically generated based on your location. This form of account generation reduces fraud due to its requirements for setting up an account as well as verification which can be sent to a cell phone to authenticate the user.

For the shortcomings of e-mail discussed above, traditional postal services and physical mailing addresses are still being used in this Internet age. More specifically, an individual can send a message to a recipient via traditional postal services with knowledge of the physical mailing address of the recipient. However, traditional postal services cannot be used to send to a marker on a map, an individual's other personal information (e.g. phone number or name), an unidentified physical address, a building name, and the like. Still, communication through physical mail is slow, unsecure and unreliable compared to electronic communication channels.

In order to address the shortcomings of e-mail and physical mail delivery, the embodiments described herein provide systems, methods, and devices for electronic communication via e-mail addresses that are uniquely tied to each user's physical mailing address. As used herein, "eAddress" can refer to an e-mail address that is uniquely generated, tied and/or related to a particular physical civic address and/or physical mailing address, or an electronic communications account. In some embodiments, the electronic communications account includes the eAddress. In some embodiments, the eAddress includes the electronic communications account. eAddresses have a number of unique advantages and applications that improve on traditional e-mail and physical mail addresses. Some embodiments of the present disclosure generate a unique email address, eAddress, and/or electronic communications account for each address in the world. Where an address does not exist in a certain area of the world, an electronic communications account can be created based on geo-coding and using latitude and longitude coordinates. The geo-coded addresses in the electronic communications account can be associated with a Lot number, Plot number and/or designated marker(s) based on country usage. For example, Lati43.7901_Long-79.3606@alphc.com can be tied to Lot and/or Plot No. and designated marker(s) for the country. The electronic communications system can generate a global communication network linking existing electronic addresses to geo-coded addresses across the world to provide a transparent communication platform.

Upon generation of an e-mail address linked to a user's physical address, the user can use the system as a global communication network. Any user can send an e-mail to an e-mail address associated with a physical address with or without the personal information of the residents of that address. Thus, the system can replace traditional mail delivery and e-mail for many types of messages.

In some embodiments, physical and/or electronic documents can be delivered based on the location (for example an address) and not based on individuals residing at a particular location. For example, mail containing coupons can be delivered to all apartment units in a particular area based on the physical address of the units. In some embodiments, the mail can be delivered based on the electronic communications account. For example, the physical address can be used to determine the electronic communications account of units in a particular area. Then, the mail can be sent electronically to all eAddresses associated with a particular area. This functionality of sending electronic messages (for example email) to a particular physical area is lacking in traditional email technology.

In some embodiments, a user can use an electronic communications account to mail a package without knowing the physical address of a person and/or via other information (e.g. a phone number tied to an electronic communications account) where traditional post offices would not be able by using electronic communications accounts. For example, mail that is improperly addressed cannot be delivered in traditional post office systems. However, the sender can include other information that the system can use to identify an electronic communications account which can be used to mail the parcel. For example, the system can identify an address via activated electronic communications account, via a name, or a phone number and or QR code specific created for each unique address. Furthermore, the system can alternatively store the mail and send a message to the electronic communications account that a package can be available for pickup based on scanned data. This improves the delivery system and can provide live updates. This can reduce the need to track a package as scanned data is available and sent at every point of the delivery process where the parcel is scanned. For example, points of scanning can include at the point of mailing, arrival at the postal depot, arrival at the main hub, departure to an alternate hub, arrival at the local postal office, scanned for delivery, and/or item delivery (drop or signed delivery). The system can also take a picture image at any point and send to sender based on user preference. Parcel delivery methodology based of predictable delivery can be created automatically based on scanning, addresses for delivery, number of employees working, work load and the like.

The electronic communications system can also enable the ability to email letter mail (for example first class mail) to any activated eAddress in the world using the system. In some embodiments, the system can reduce, or eliminate, the need to buy stamps, envelopes, drive to the mail box, and collecting mail on time, losing or delaying the delivery of mail, waiting for the mail, spending extra cost on mailing, and the like. The system reduces waste (for example less use of envelopes, paper) and improves the environment.

In some embodiments, the electronic communications system replaces physical addresses and/or eAddresses (for example email addresses or phone numbers) all together. Communication can be performed using the electronic communications account linked to the physical geolocation. In some embodiments, the sender's information (for example geolocation) linked to the electronic communications account is encrypted and/or hidden. Accordingly, sending messages via electronic communications accounts can provide security protection for personal information. Thus, using the electronic communications system that protects personal information solves a security issue in electronic communication technology.

In another embodiment, marketing material such as flyers and coupons sent via postal services can be used to target a particular audience based on the mailers needs and/or to specific areas where the current mail system does not permit. For example, the current mail system does not permit delivery of flyers to an Apartment (for example a building with 500 Units) or a retail plaza (for example a plaza of 20 units). The required coverage can be based on all the Apartments in a particular zip code (postal code). Hence the mailer wishing to target an address (500 units) would end up paying for delivery to all apartments in the zip code (3000 units). The mailer/user can hence target mailings based on preferences of both parties targeted to the specific address(es).

Electronic Communications Account or E-Mail Generation and Management System

FIG. 1 is an embodiment of a schematic diagram illustrating an electronic communications account generation and management system. In some embodiments, a main server system 102 can be comprised of an electronic communications account address generation module 104, a billing module 106, an authentication module 108, a web server 110, an electronic communications account address database 112, a physical address database 114, a user profile database 116, and/or an electronic map database 118. The main server system can be connected to a network 120. The network can be configured to connect the main server to an external electronic map database 122 and/or one or more user access point systems 124.

The electronic communications account, eAddress, or e-mail address generation module 104 can function by generating an electronic communications account upon input of a physical address. In some embodiments, the generated electronic communications account can have a standard form, which can comprise the user's street address, unit number, zip code, area code, city, state, county, geographical coordinates, and/or other indicators of location. The billing module 106 can function by charging users for various provided services using any available payment methods. The authentication module 108 can function by verifying the user's inputted physical address, determining if another e-mail address has previously been generated for the user's inputted physical address, determining if the user's inputted address is his/her primary residence, and/or otherwise verifying aspects of the user's inputted information. The web server 110 can function to serve files that form web pages at the request of users. These web pages can provide an interface for users to interact with the system, these interactions comprising the generation, management, usage, deactivation, and troubleshooting of the user's e-mail address.

The results of the verification process can be used to block unsolicited mail that has not been verified. Using the electronic communications account, the sender's geolocation (for example address) can be transparent and can reduce fraud or misuse. This improves security for electronic messages by preventing spamming and/or unwanted solicitation.

The verification process can be based on user input. For example, verification can be based on a code sent to a mobile device. In some embodiments, the user can be required to respond to the code (for example enter it into a system to activate an electronic communications account).

In some embodiments, the individual can access a user interface and review the verification process. The individual can identify portions of the verification process and assess the results. In some embodiments, the system can request further identification verification information (for example identification documents) to verify a user. In some embodiments, the individual can challenge a result in the verification process (for example by submitting a request for the system to reassess an identification document that was interpreted incorrectly).

In some embodiments, the user can block messages coming from a particular geolocation. For example, the user can block all messages coming from a foreign country, a particular industry, a specific company, another individual residing at a location, and the like. This provides a filter for messages that is unavailable in email today. For example, in traditional email systems, the real estate or car dealership can change email accounts or have different affiliates with different names and/or email addresses to contact an individual. However, an individual using the electronic communications system can block all real estate or car dealers from contacting the user.

Processing of the electronic communications account (for example, identification of the electronic communications account) can be performed by the electronic communications system. Accordingly, the electronic communications system can perform the steps of processing, storing, generating, transmitting, and receiving on a remote server instead of performing such processing on the client device. As such, processing can be offloaded to a remote server, storage of the computations, results, and input needed for the results can be stored on the server rather than on the client device, and the required throughput can be reduced based (for example, the results can be sent instead of all inputs needed to determine the result to the client device).

The electronic communications account, eAddress or e-mail address database 112 can provide a collection of all electronic addresses (for example e-mail addresses) generated or identified by the system or a subset that collection. The physical address database 114 can provide a collection of all the physical addresses for which electronic communications account, eAddresses, or e-mail addresses have been generated and linked, a collection of all physical addresses in a certain area, a collection of all physical addresses on earth, and/or a subset of any of these collections. The user-profile database 116 can provide a collection of all the user profiles associated with electronic communications account, eAddresses or e-mail addresses generated by the system, all the user profiles associated with electronic communications account, eAddresses or e-mail addresses generated and linked to physical addresses within a certain area, and/or a subset of either of these collections.

In some embodiments, the unique electronic communications account can include an indication of the sender such as a domain (for example @AlphC) or alphanumerical code (for example portions of an IP address). This can allow users to obtain rights to certain domains. This can enable communication receivers to identify certain information (for example regarding the sender or content of the information).

The electronic map database 118 can provide a collection of maps that the system can retrieve, reference, and/or display on a user's screen or other display for use in the various embodiments. The network 120 can allow the main server system to exchange data with one or more external databases and one or more user access points. The external electronic map database 122 can provide a collection of maps, not stored within the main server system, that the system can retrieve, reference, and/or display on a user's screen for use in the various embodiments. The user access points 124 can provide users with an interface to access and communicate with the main server system, and to utilize the functional aspects of the system.

Figure 2:
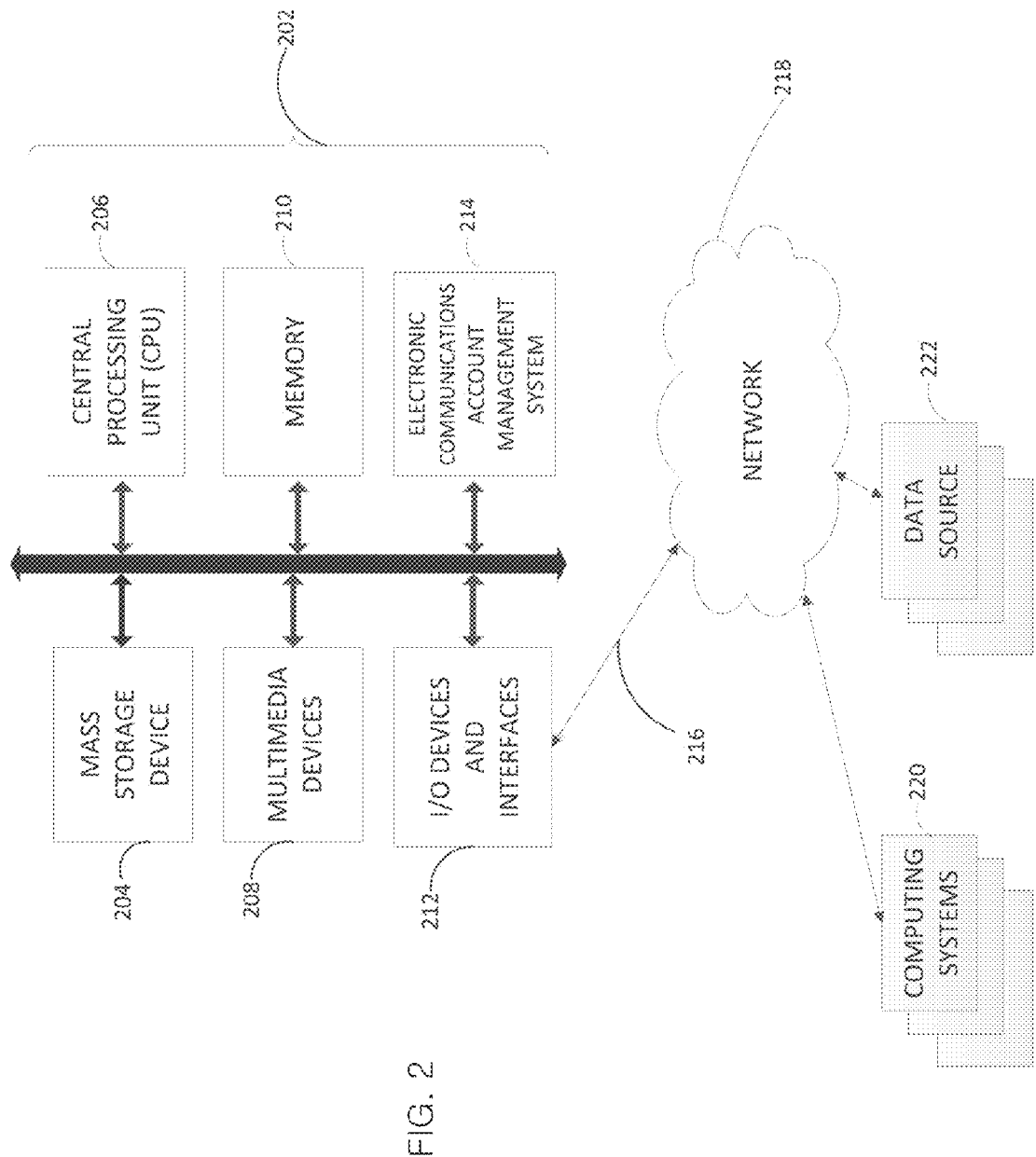
FIG. 2 is a block diagram depicting an embodiment of a computer hardware system configured to run software for implementing one or more embodiments of an electronic communications account generation and management system.

Computer System in some embodiments, the systems, processes, and methods described herein are implemented using a computing system, such as the one illustrated in FIG. 2. The example computer system 202 is in communication with one or more computing systems 220 and/or one or more data sources 222 via one or more networks 218. While FIG. 2 illustrates an embodiment of a computing system 202, it is recognized that the functionality provided for in the components and modules of computer system 202 can be combined into fewer components and modules, or further separated into additional components and modules.

Electronic Communications Account, eAddress or e-Mail Generation and Management System The computer system 202 can comprise an electronic communications account, eAddress or e-mail Generation and Management System 214 that carries out the functions, methods, acts, and/or processes described herein. The electronic communications account, eAddress or e-mail Generation and Management System 214 is executed on the computer system 202 by a central processing unit 206 discussed further below.

In general the word "module," as used herein, refers to logic embodied in hardware or firmware or to a collection of software instructions, having entry and exit points. Modules are written in a program language, such as JAVA, C, or C++, or the like. Software modules can be compiled or linked into an executable program, installed in a dynamic link library, or can be written in an interpreted language such as BASIC, PERL, LAU, PHP or Python and any such languages. Software modules can be called from other modules or from themselves, and/or can be invoked in response to detected events or interruptions. Modules implemented in hardware include connected logic units such as gates and flip-flops, and/or can include programmable units, such as programmable gate arrays or processors.

Generally, the modules described herein refer to logical modules that can be combined with other modules or divided into sub-modules despite their physical organization or storage. The modules are executed by one or more computing systems, and can be stored on or within any suitable computer readable medium, or implemented in-whole or in-part within special designed hardware or firmware. Not all calculations, analysis, and/or optimization require the use of computer systems, though any of the above-described methods, calculations, processes, or analyses can be facilitated through the use of computers. Further, in some embodiments, process blocks described herein can be altered, rearranged, combined, and/or omitted.

Computing System Components

The computer system 202 includes one or more processing units (CPU) 206, which can comprise a microprocessor. The computer system 202 further includes a physical memory 210, such as random access memory (RAM) for temporary storage of information, a read only memory (ROM) for permanent storage of information, and a mass storage device 204, such as a backing store, hard drive, rotating magnetic disks, solid state disks (SSD), flash memory, phase-change memory (PCM), 3D XPoint memory, diskette, or optical media storage device. Alternatively, the mass storage device can be implemented in an array of servers. Typically, the components of the computer system 202 are connected to the computer using a standards based bus system. The bus system can be implemented using various protocols, such as Peripheral Component Interconnect (PCI), Micro Channel, SCSI, Industrial Standard Architecture (ISA) and Extended ISA (EISA) architectures.

The computer system 202 includes one or more input/output (I/O) devices and interfaces 212, such as a keyboard, mouse, touch pad, and printer. The I/O devices and interfaces 212 can include one or more display devices, such as a monitor, that allows the visual presentation of data to a user. More particularly, a display device provides for the presentation of GUIs as application software data, and multi-media presentations, for example. The I/O devices and interfaces 212 can also provide a communications interface to various external devices. The computer system 202 can comprise one or more multi-media devices 208, such as speakers, video cards, graphics accelerators, and microphones, for example.

Computing System Device/Operating System

The computer system 202 can run on a variety of computing devices, such as a server, a Windows server, a Structure Query Language server, a Unix Server, a personal computer, a laptop computer, and so forth. In other embodiments, the computer system 202 can run on a cluster computer system, a mainframe computer system and/or other computing system suitable for controlling and/or communicating with large databases, performing high volume transaction processing, and generating reports from large databases. The computing system 202 is generally controlled and coordinated by an operating system software, such as z/OS, Windows, Linux, UNIX, BSD, PHP, SunOS, Solaris, MacOS, ICloud services or other compatible operating systems, including proprietary operating systems. Operating systems control and schedule computer processes for execution, perform memory management, provide file system, networking, and I/O services, and provide a user interface, such as a graphical user interface (GUI), among other things.

Network

The computer system 202 illustrated in FIG. 2 is coupled to a network 218, such as a LAN, WAN, or the Internet via a communication link 216 (wired, wireless, or a combination thereof). Network 218 communicates with various computing devices and/or other electronic devices. Network 218 is communicating with one or more computing systems 220 and one or more data sources 222. The electronic communications account, eAddress or e-mail Generation and Management System 214 can access or can be accessed by computing systems 220 and/or data sources 222 through a web-enabled user access point. Connections can be a direct physical connection, a virtual connection, and other connection type. The web-enabled user access point can comprise a browser module that uses text, graphics, audio, video, and other media to present data and to allow interaction with data via the network 218.

The output module can be implemented as a combination of an all-points addressable display such as a cathode ray tube (CRT), a liquid crystal display (LCD), a plasma display, or other types and/or combinations of displays. The output module can be implemented to communicate with input devices 212 and they also include software with the appropriate interfaces which allow a user to access data through the use of stylized screen elements, such as menus, windows, dialogue boxes, tool bars, and controls (for example, radio buttons, check boxes, sliding scales, and so forth). Furthermore, the output module can communicate with a set of input and output devices to receive signals from the user.

Other Systems

The computing system 202 can include one or more internal and/or external data sources (for example, data sources 222). In some embodiments, one or more of the data repositories and the data sources described above can be implemented using a relational database, such as DB2, Sybase, Oracle, CodeBase, and Microsoft® SQL Server as well as other types of databases such as a flat-file database, an entity relationship database, and object-oriented database, and/or a record-based database.

The computer system 202 can also access one or more databases 222. The databases 222 can be stored in a database or data repository. The computer system 202 can access the one or more databases 222 through a network 218 or can directly access the database or data repository through I/O devices and interfaces 212. The data repository storing the one or more databases 222 can reside within the computer system 202.

Figure 3A:
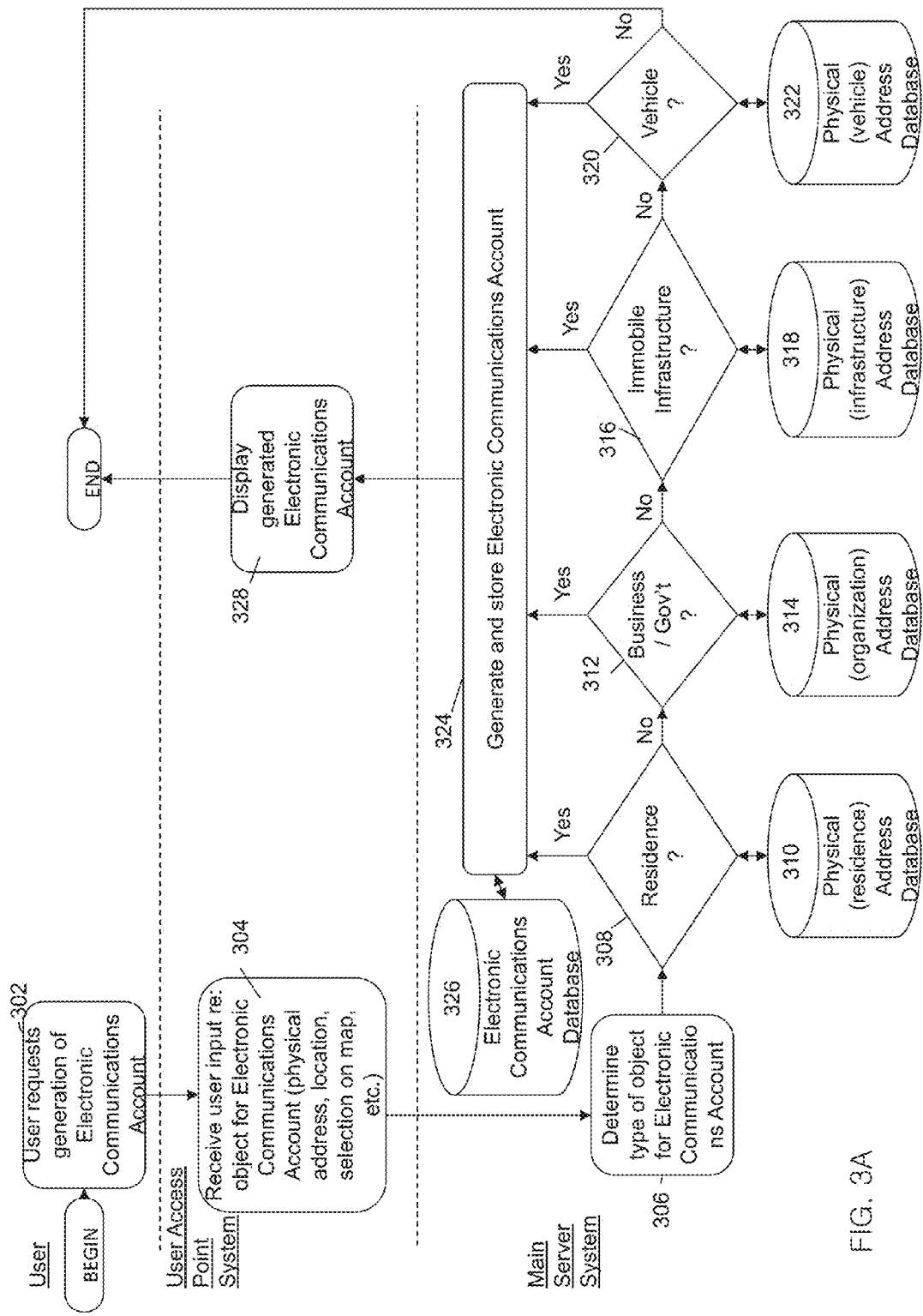
FIG. 3A is a flowchart depicting an embodiment of a method for generating an electronic communications account address linked to a physical address.

Generation of an Electronic Communications Account, eAddress or Unique E-Mail Address Linked to a Physical Address FIG. 3A is a flowchart depicting an embodiment of a method for generating an electronic communications account, eAddress or unique e-mail address linked to a physical address. In some embodiments, a user can request generation of an electronic communications account, eAddress in block 302. The user can input one or more physical locations via a user access point system through any available means in block 304, such as for example inputting text of a physical address, selecting a location on a map, or allowing the user access point system to locate the user's current location through GPS tracking. This information can be electronically transmitted from the user access point system to the main server system in block 306, which can determine the category of location to which the generated e-mail address can be linked. For example, the main server system can be configured to determine if the inputted location corresponds to a residence, business or government office, immobile infrastructure, a vehicle, or the like by cross-referencing corresponding database 310, 314, 318, or 322, respectively.

In some embodiments, the user can register a physical address and the electronic communications account can automatically be generated by the electronic communications system. For example, the user can request registration of their car via the Department of Motor Vehicles ("DMV"), or register their house with the local government. Then, the DMV and/or the local government can automatically register an electronic communications account based on certain criteria.

More specifically, in some embodiments, the main server system can be configured to determine if the inputted location corresponds to a residence in block 308. To do so, in certain embodiments, the main server system can be configured to compare and/or otherwise cross-reference the user-inputted location with physical residence addresses stored in one or more physical residence address databases 310. If the system determines that the inputted location is a residence, the system can be configured to generate and/or store a unique electronic communications account and/or an eAddress tied to that residential physical address in block 324. The generated electronic communications account and/or eAddress can be stored in one or more electronic communications account databases 326.

Similarly, in certain embodiments, the main server system can be configured to determine if the inputted location corresponds to a business or government office or location in block 312. To do so, in certain embodiments, the main server system can be configured to compare and/or otherwise cross-reference the user-inputted location with physical organization addresses stored in one or more physical organization address databases 314. If the system determines that the inputted location is a business or government office or location, the system can be configured to generate and/or store a unique electronic communications account tied to that organization's physical address in block 324. The generated electronic communications account can be stored in one or more electronic communications account databases 326. In some embodiments, business and/or government organizations can have the ability to include their names (business name) as deemed necessary by the user and create additional sub-categories such as computer department, furniture, etc. Businesses and/or government organizations can also add names of employees should they deem this necessary.

In some embodiments, the main server system can be configured to determine if the inputted location corresponds to an immobile infrastructure in block 318. To do so, in certain embodiments, the main server system can be configured to compare and/or otherwise cross-reference the user-inputted location with physical infrastructure addresses stored in one or more physical infrastructure address databases 318. If the system determines that the inputted location is an infrastructure, the system can be configured to generate and/or store a unique electronic communications account tied to that infrastructure's physical location in block 324. The generated electronic communications account can be stored in one or more electronic communications account databases 326.

For example, in some embodiments, an electronic communications account, an eAddress or e-mail address can be generated for infrastructural features, including traffic lights, intersections, fire hydrants, transformers, and other structural features. This can provide local residents with means to electronically communicate with a responsible organization regarding required maintenance, malfunctions, or requests for relocation, reprogramming, or any other message regarding the infrastructural feature. By allocating a particular electronic communications account, eAddress or e-mail address to each infrastructure, the electronic communications account itself can be used as a unique identifier for the particular infrastructure and its exact location. In certain embodiments, communication with particular infrastructure can be two-way where by the department responsible for the street furniture or other infrastructure can contact the affected residents based on the issues on hand. This database can also be used as a repository of data by the department. For example, the electronic communication system can provide construction updates on a bridge, dates, times, etc. This is hence available for the residents to view. The department may also embed a website link for any further information and or contact information. In some embodiments, the same process can be applied to electronic items and/or items with serial numbers. For example, an electronic communications account can be created for an IP address 99.227.243.148@alphc.com or a serial number for a device such as an appliance. These electronic items can be linked with the electronic communications account of the entity to whom they belong for any communication based needs and or the like as needed by entity, manufactures and the like.

In certain embodiments, the main server system can be configured to determine if the inputted location corresponds to a vehicle in block 320. To do so, in certain embodiments, the main server system can be configured to compare and/or otherwise cross-reference the user-inputted location with physical vehicle addresses stored in one or more physical organization address databases 314. If the system determines that the inputted location is a business or government office or location, the system can be configured to generate and/or store a unique electronic communications account tied to that organization's physical address in block 324. The generated electronic communications account can be stored in one or more electronic communications account databases 326.

The electronic communications system can be configured to detect vehicles that are rented and/or cross reference the license plates with the electronic communications account of the person renting the vehicle. This data can be cross-referenced by police, border services, and similar authorities to detect criminal activities. For example, multiple vehicles can be rented from various rental agencies by individuals living at the same location (or within a location). When these vehicles cross states lines or borders, license plates can be read automatically and cross referenced with associated electronic communications accounts to alert authorities of suspicious activities. The same methodology can be applied with passport no. connected to an electronic communications account and other similar government based identification.

Triangulation and Other Technology to Close in on a Location

In some embodiments, the physical location can be automatically determined. The physical location of the device transmitting a message can be used. In some embodiments, GPS technology can be used to triangulate a location of the device. The device can receive information from multiple satellites and triangulate its location. Wi-Fi technology can be used to triangulate a location. The location information can include latitude, longitude, elevation, boresight, address, city, state, intersection, street, and the like. Sensors that detect changes to motion (for example inertial sensors and/or barometers) can be used to determine an updated location (for example when traveling through a location without internet connection). Sensors that detect changes to motion can also be used to detect changes in elevation that GPS technology may not be able to provide. For example, if a user is on the 10th floor of a building and travels to the 9th floor, GPS technology may not be able to sense that the user is at a different elevation. However, using an inertial sensor, the electronic communications system can generate a different electronic communications account for an individual on the 9th floor than the individual on the 10th floor For multiple users requesting an address of the same location, item, infrastructure, address, or the like, triangulation can be used to determine a more accurate physical location. In the embodiment of FIG. 3B, is an example of three user devices 350, 354, 358. The first user device 350 can request an electronic communications account of a fire hydrant 362. Based on the location of the user device 350, the system can determine a general area of the fire hydrant 362.

Upon a second request by a second user device 354 for an electronic communications account of the same fire hydrant 362, triangulation can be used to determine that the fire hydrant 362 is likely in the overlapping region of the radius circles of 352 and 356. Upon a third user device 358 requesting an electronic communications account of the same fire hydrant 362, the system can triangulate an overlapping area around the radius 352, 356, 360 surrounding the user devices 350, 354, 358.

The system can use triangulation to determine which of a multiple of items the user can be referring to. For example, there can be multiple items within the radius 352 of user device 350. However, if user device 354 requests an electronic communications account related to a similar infrastructure, then the system can determine that there is a higher probability that both user devices 350, 354 are referring to the fire hydrant 362 rather than another item that is located only within the radius 352 and not within the radius 356.

In some embodiments, the system can determine the address, infrastructure, person, location, and/or other item that can be associated with a location automatically based on user input that is not a particular address. For example, the user can send a picture of a location. The system can utilize certain methods, such as image recognition, to determine the location, building, item, or the like that the user is trying to capture through the video or image.

The system can use a radar, or other type of distance tracking system, to determine the location of interest. For example, the user can point a device at an object. The device can transmit electromagnetic signals and receive the response. Based on the time between transmission of the electromagnetic signals $t_1$ and the time between electromagnetic signals reflecting back from the object to reception at the user device $t_2$, the distance from the user to the object can be determined.

Figure 3C:
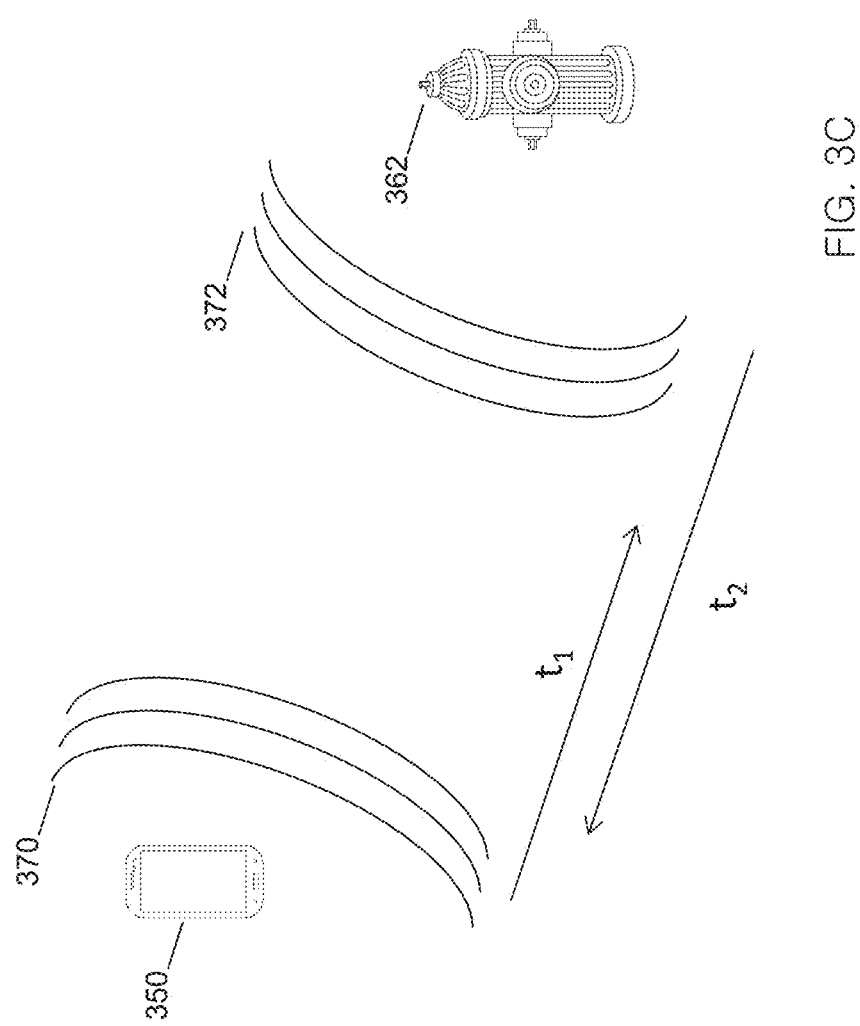
FIG. 3C is a diagram depicting an embodiment of a method for triangulating a physical location.

The embodiment of FIG. 3C illustrates the first user device 350 that transmits electromagnetic signals 370 toward a fire hydrant 362. The electromagnetic signals 370 can bounce off the fire hydrant 362 and propagate back 372 to the first user device 350. Based on the time between transmission and reception, the system can determine the distance from the user device 350 to the fire hydrant 362.

In some embodiments, the electronic communications system generates and/or identifies electronic communications accounts associated with utilities, such as hydro transformers, gas lines, and the like.

Electronic Communications Account Generation and User Verification

In generating an electronic communications account for users, whether it be for residential, business, or other users, it can be advantageous to ensure that each physical address or mailing address is associated with only one representative electronic communications account, eAddress or unique e-mail address. However, in order to do so, it can be helpful to effectively prevent others from activating and/or generating false electronic communications accounts that are associated with someone else's physical address or mailing address. As such, in some embodiments, the system is configured to require a user activating and/or generating an electronic communications account, eAddress or unique e-mail address tied to a physical location to input the user's personal contact information. In certain embodiments, such inputted personal contact information can be verified by the system and/or be stored in order to maintain a record of that user's personal information and verification.

Figure 4:
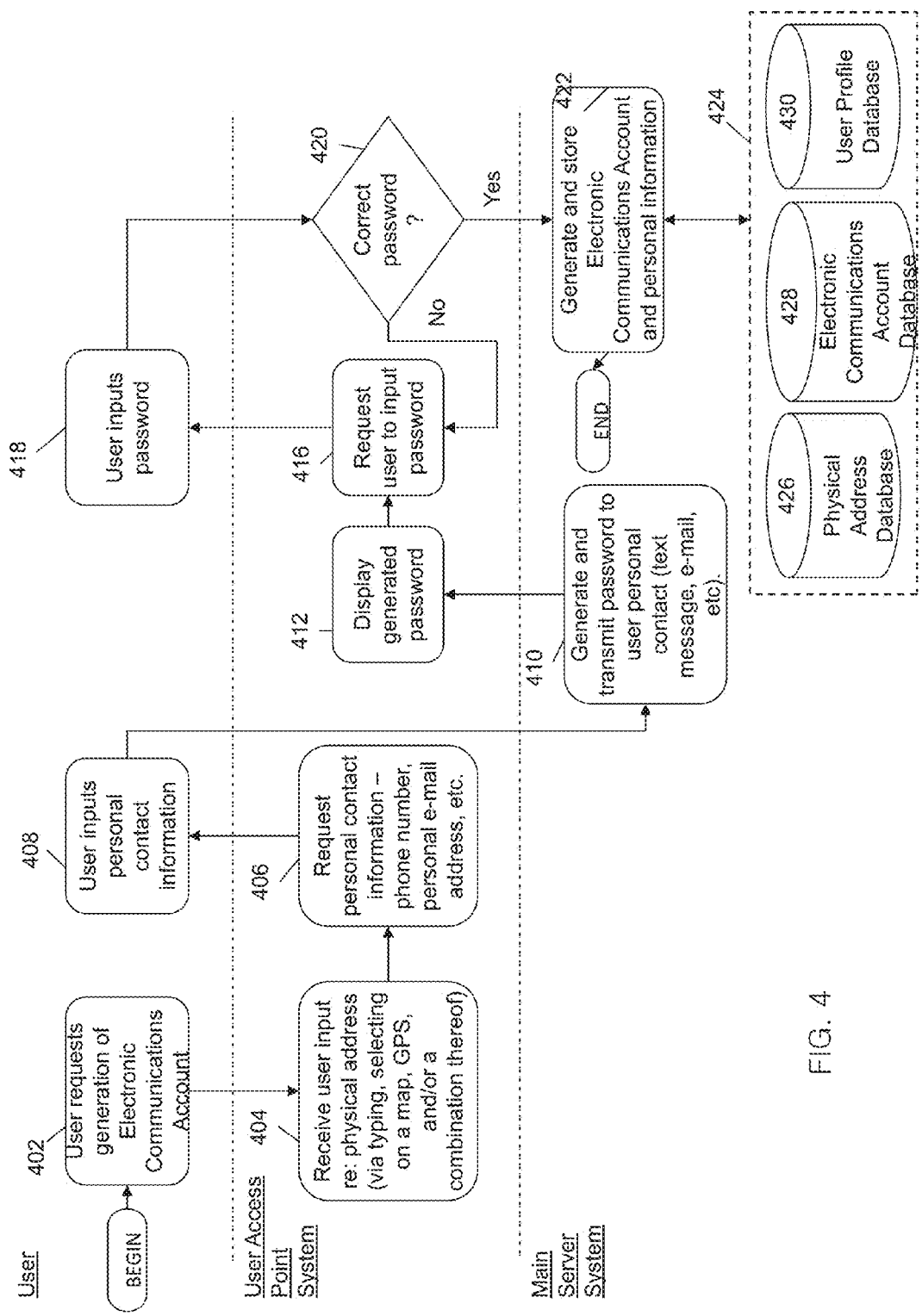
FIG. 4 is a flowchart depicting an embodiment of a method for generating an electronic communications account address linked to a physical address

FIG. 4 is a flowchart depicting an embodiment of a method for generating an electronic communications account, eAddress or unique e-mail address linked to a physical address with one or more features of requesting and/or storing personal information. In some embodiments, a user can request generation and/or activation of an electronic communications account, eAddress or unique e-mail address tied to a physical location in block 402. The user access point system can be configured to receive user input regarding one or more locations for generation and/or activation of an electronic communications account in block 404 by one or more means. For example, the user access point system can be configured to receive user input regarding a physical location or address via the user typing in text, selection on an electronic map, location determination via GPS and/or any combination of the foregoing.

In certain embodiments, the user access point system can be configured to additionally request personal contact information of the user in block 406. For example, such personal information can comprise the user's name, birthday, social security number, credit card number, bank account number, phone number, personal e-mail address, mailing address and/or another form of contact information. Once the user has inputted his/her personal information in block 408, the main server system can generate a unique password in block

410, and transmit that password using the inputted contact information to the user access point system.

After the password has been transmitted to the user, the user access point system can display or otherwise communicate the generated password to the user in block 412, and can prompt the user to input the transmitted password in block 416. The user can then input the generated password into the user access point system in block 418. In some embodiments, either the user access point system and/or main server system can be configured to determine whether the inputted password is correct in block 420. If the inputted password is correct, an electronic communications account, eAddress or e-mail address linked to the physical address or location inputted by the user can be generated and stored by the main server system in block 422. The physical address or location inputted by the user, electronic communications account, and/or user information can be stored on corresponding databases 426, 428, and 430, respectively in block 424. However, if the user inputted password is incorrect, the user access point system can be configured to request the user to input the password again in block 416.

In some embodiments, user authentication occurs based on certain criteria. A user requesting an electronic communications account and/or a physical address, authentication can happen automatically either partially or fully. For example, if a request for generation of an electronic communications account is received from a trusted user access point system, then the user can automatically be authenticated. In some embodiments, if a request is received from a trusted user access point system, then one type of user authentication system (for example driver's license) would be sufficient whereas if the request comes from a different user access point system, then another type of user authentication system (for example passport and birth certificate) can be required.

In some embodiments, the type of electronic communications account, eAddress or the associated address, infrastructure, building, etc determines the type of authentication required. In some embodiments, a particular username, password, identification, document, etc can be required for an electronic communications account.

Previously Linked Physical Addresses and Changes in Physical Addresses

In some instances, a user can attempt to generate and/or activate an electronic communications account or e-mail address linked to a physical address for which another user has already generated and/or activated an e-mail address. For example, User 1 can who used to live in X location can have generated and activated an electronic communications account uniquely tied to X location but can have moved. When User 2, who subsequently moved to X location, attempts to generate and/or activate an electronic communications account, the system can deny User 2 of generating and/or activating an electronic communications account as there is already one that has been generated for X location. In such and other situations, it can be advantageous for the system to be configured to check whether an old user or resident of a particular electronic communications account is in fact still using the electronic communications account and transfer that particular electronic communications account to a new user if not.

Figure 5A:
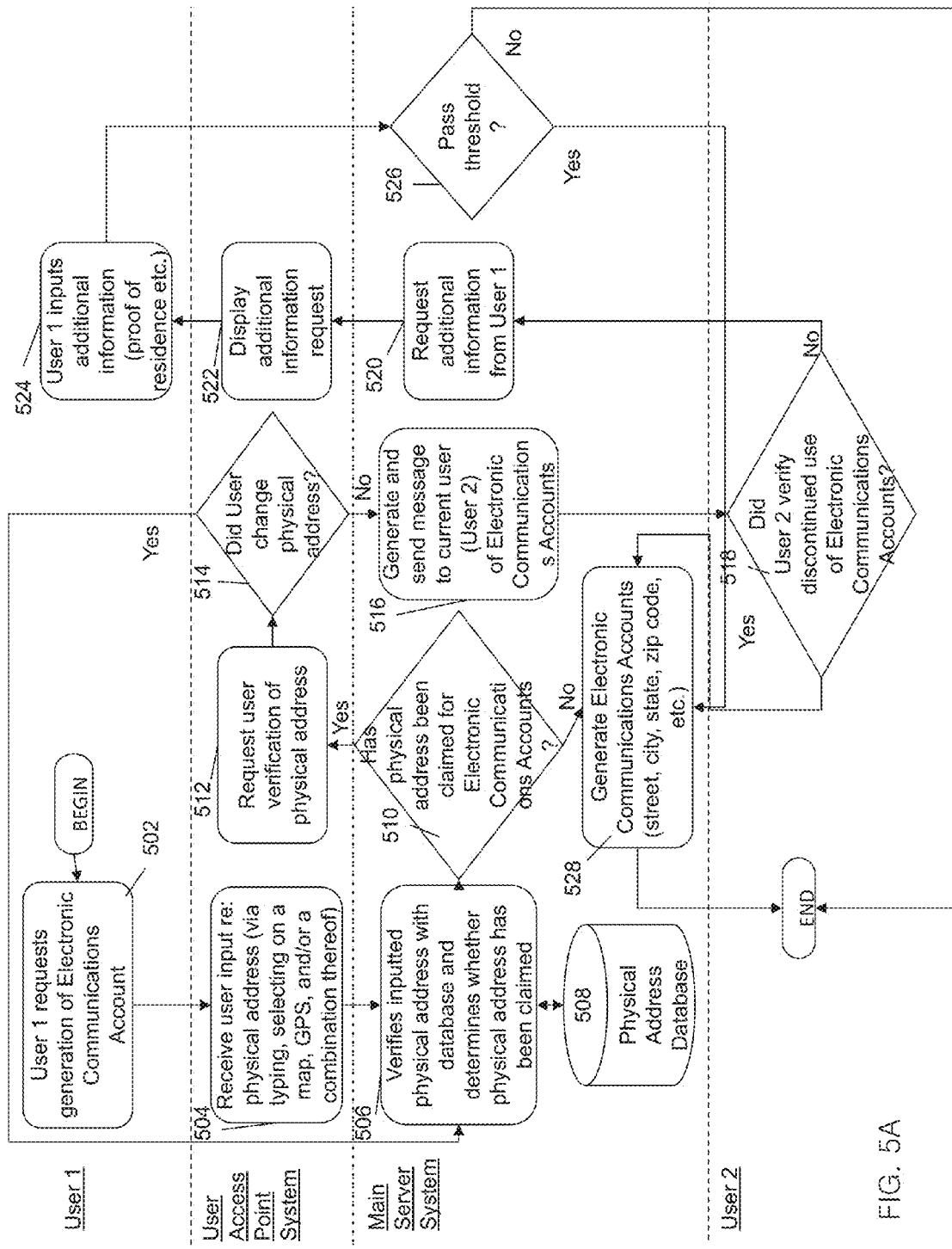
FIG. 5A is a flowchart depicting an embodiment of a method for generating an electronic communications account address linked to a physical address, and verifying whether an electronic communications account address has already been linked to that physical address.

To address such issues, FIG. 5A illustrates a flowchart depicting another embodiment of a method for generating an electronic communications account, eAddress or e-mail address linked to a physical address and verifying whether an electronic communications account, eAddress or e-mail address has already been linked to the user-inputted physical address. In some embodiments, the user can request generation and/or activation of an electronic communications account in block 502 similarly to any of the other embodiments described herein. Then, the user access point system can be configured to receive the user input in block 504 similar to any of the other embodiments described herein.

In certain embodiments, the main server system can be configured to cross-reference or otherwise verify using one or more physical address databases 508 to determine if an electronic communications account, eAddress or e-mail address has previously been generated for the inputted physical address in block 506. If the main server system determines that an electronic communications account, eAddress or e-mail address has not previously been generated for the inputted physical address, an e-mail address can be generated and linked to the physical address in block 528.

However, if the main server system determines that an electronic communications account has previously been generated and/or activated for the inputted physical address in block 510, the user can be prompted to verify the inputted physical address in block 512 via the user access point system. In response, the user can either change the inputted physical address or verify the previously inputted address in block 514. If the user changes the inputted physical address or location, then the system can be configured to repeat one or more blocks starting with block 506.

However, if the user verifies the address, the main server system can generate and send a message to User 2, the current user of the electronic communications account, eAddress or e-mail address linked to the inputted physical address in block 516. In some embodiments, the system can request User 2 to verify his/her continued use of the electronic communications account, eAddress or e-mail address in block 518. If User 2 verifies that he/she has discontinued use of the electronic communications account, eAddress or e-mail address, the main server system can continue to process generation and/or activation of an electronic communications account, eAddress or e-mail address linked to the inputted physical address in block 528 and/or transfer the current electronic communications account, eAddress or e-mail address to the new user. In some embodiments, when a user moves and deactivates their electronic communications account, the system can be configured to prompt the user to activate their new electronic communications account, for example via one or more communications methods provided by the user.

However, if User 2 does not verify discontinued use of the e-mail address linked to the inputted physical address, the system can be configured to request and/or display a request for additional verification information from the new user in blocks 520 and 522. For example, the system can be configured to request the new user for additional information such as proof of residence, title, deed, utility bill, lease contract, or the like. If the user inputs the requested information in block 524, the main server system can be configured to verify that the inputted information passes a security threshold in block 526. If the information passes the threshold, the main server system can generate a new electronic communications account, eAddress or e-mail address linked to the inputted physical address or transfers the current electronic communications account, eAddress or e-mail address to the new user in block 528.

Under the current mail delivery process, when an individual moves in or out of a location, delivery of mail and parcels does not occur until various processes are completed by the Post Office. Not only does the individual have to notify the Post Office of the address change, the Post Office also has to internally adapt to this change (for example assigns delivery paths, allocations sortation of parcels at the Post Office, update databases). Some embodiments of the electronic communications account system solve this problem by automatically activating a new address for the resident when moving in or out of a location. The system can send mail using the electronic communications account tied with the new geolocation. This can allow for an immediate update and thus users can receive mail effortlessly and swiftly after the change is notified.

In some embodiments, the system identifies the resident's change of location automatically. For example, the individual can tie their personal accounts (for example credit card addresses or electric bills), computing devices (for example mobile phones), employer databases, other sources or databases including updated addresses for an individual, and the like, such that the system can automatically detect a change of physical address. The system can then automatically update the electronic communications account associated with the individual. The system can send a notification to the user requesting that the electronic communications account be updated.

In some embodiments, when an individual moves to a new location, the user can notify the system of the move. The system can identify that an individual moved to a new location automatically by using locational information of a user (for example GPS location of a mobile device residing at a location for an extended period of time). The system can request the user to verify whether the new address is the new residence of the user. As such, a secure method for reassigning the electronic communications account can be implemented by the system.

Figure 5B:
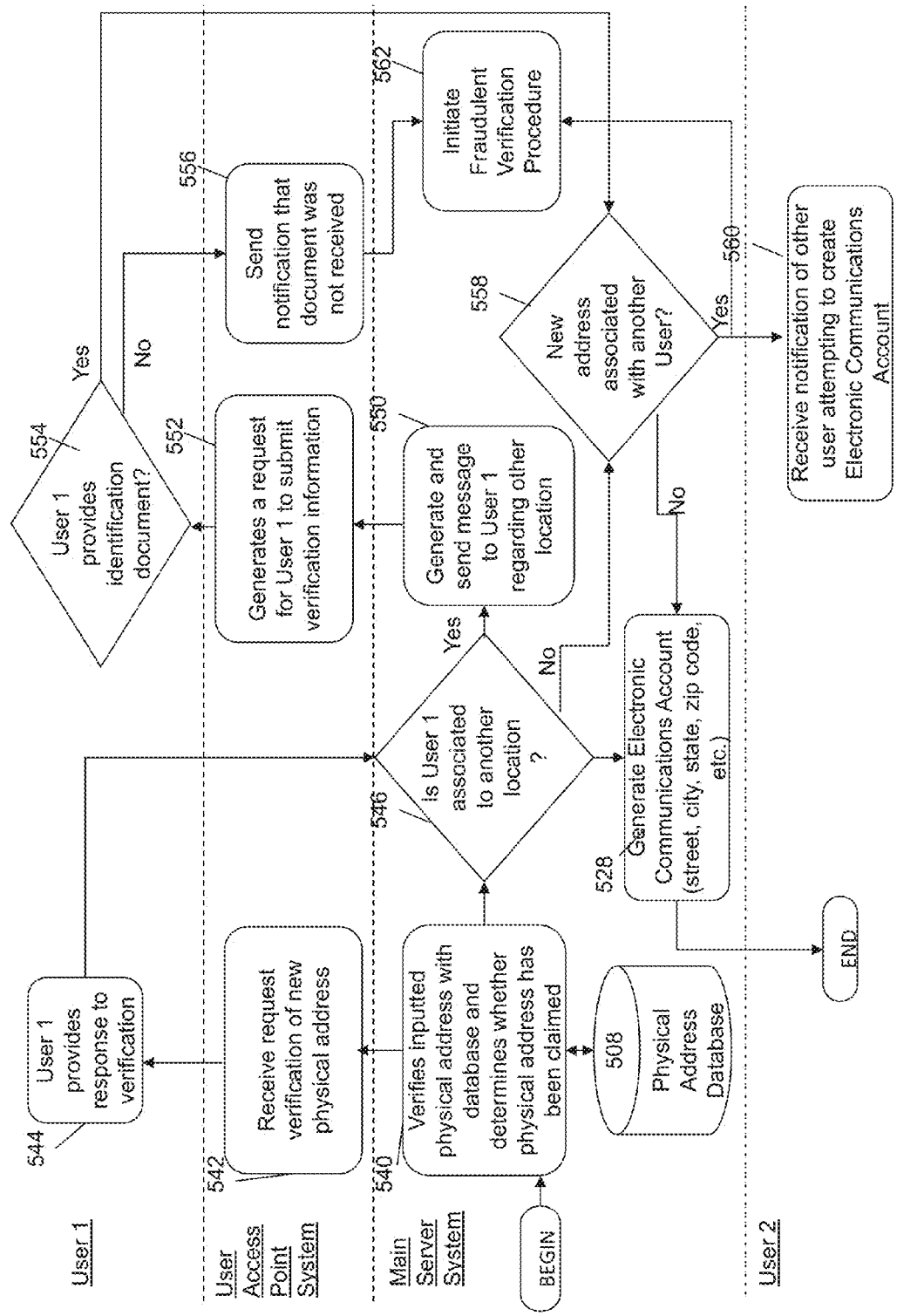
FIG. 5B is a flowchart depicting an embodiment of a method for updating a physical address of an individual.

FIG. 5B is a flowchart depicting an embodiment of a method for updating a physical address of an individual. At block 540, the main server system identifies that User 1 is associated with a new electronic communications account. This can be a result of User 1 sending notification of a move of residence. The main server system can identify the new address automatically.

The main server system can update the physical address database 508 using the newly identified physical address retrieved for User 1.

At block 542, the user access point system can receive a request to verify the new physical address associated with User 1. The request can be a simple confirmation of the physical address. The request can request the User to enter in the new physical address, whereby the main server system does not disclose the identified new physical address to User 1. The request can simply ask whether User 1 has moved to a new residence. In some embodiments, the request can be verification of a new physical address that User 1 is located in (for example not necessarily where User 1 resides but other associated location such as a work place address).

At block 544, User 1 can provide a response to the verification. For example, User 1 can provide confirmation of the address. User 1 can send the response via an SMS message, an application on a mobile phone, on a website, or other input to be received by the main server system.

At block 546, the main server system receives the response from User 1. The main server system checks to see if User 1 is associated with another geolocation. If not, the system proceeds to block 558 and checks if the new address is associated with another user. If the new address is not associated with another user, then the system generates an electronic communications account using the physical address (for example, street, city, state, zip code, etc.) at block 528.

If the new address is associated with another user at block 558, then the main server system sends a notification to User 2 and User 2 receives a notification of another user attempting to create an electronic communications account. The notification can include a request to verify whether User 2 is still associated with the new address. The notification can include information on User 1. The notification can include an option for User 2 to indicate that the User 1 attempt can be fraudulent.

If User 1 is associated with another location, then the main server system generates a message to send to User 1 regarding the other location. At block 552, the User Access Point system generates a request for User 1 to submit verification information in response to receiving the message of User 1 associated with the other location. For example, if User 1 has not deactivated the other location, then the user access point system can request a government issued identification document as proof of the new residence.

At block 554, User 1 can provide the requested identification document. A copy of the identification document can be sent to the main server system. In some embodiments, a picture of the identification document can be taken by the user using the user access point system. In some embodiments, information pertaining to the identification document (for example passport number, driver's license expiration date) can be requested and the User can enter this information.

If the identification document is provided by User 1, then the main server system checks whether the new address is associated with another user at block 558. If the new address is not associated with another user, then the main server system generates an electronic communications account at block 528. If the new address is associated with another user, then the main server system can send a notification to User 2 notifying User 2 of the other user attempting to create the electronic communications account.

If the identification document is not provided at block 554, then at block 556, the user access point system sends a notification that the identification document was not received. The main server system can then initiate a fraud verification procedure at block 562. The fraud verification procedure can include notifying a third party, such as a police department for further investigation. The fraud verification procedure can include internal verification, such as identifying the source of the request from User 1 (for example identifying the IP address or looking at information pertaining to the other location.

At block 558, if the new address is associated with another user, the main server system mal also initiate the fraudulent verification procedure at block 562.

Updating the residence information using some embodiments of the present disclosure is an improvement to traditional current mail technology. Changes to the current residence traditionally require a change of address form that can include human error, where mail continues to be redirected to an incorrect mailing address. If the mail is rejected, mail can be placed for extended periods of times until the home owners come to collect the mail, increasing the security risk of safe delivery. The use of updating the electronic communications account using the systems described in some embodiments of the present disclosure provide secure and swift updates to databases and timely delivery of mail.

In some embodiments, the change of address using the electronic communications account system occurs in substantially real time. Thus, mail is delivered to the correct address substantially immediately upon the change.

Generation of an Electronic Communications Account Using Geographic Coordinates In some embodiments, a user can use his/her geographic coordinates directly or indirectly to generate and/or activate an electronic communications account, eAddress or e-mail address linked to a physical location. For example, a user can use his or her smartphone or other electronic device with location services, via GPS, Wi-Fi, or the like, to determine his or her current location comprising his or her geographic coordinates. However, depending on the situation, one-to-one mapping between a single set of geographic coordinates and a single physical address or mailing address may not be possible. For example, in some circumstances, a plurality of geographic coordinates can map to a single physical address or mailing address. Similarly, in certain circumstances, one set of geographic coordinates can map to or at least potentially map to a plurality of physical addresses or mailing addresses.

Figure 6A:
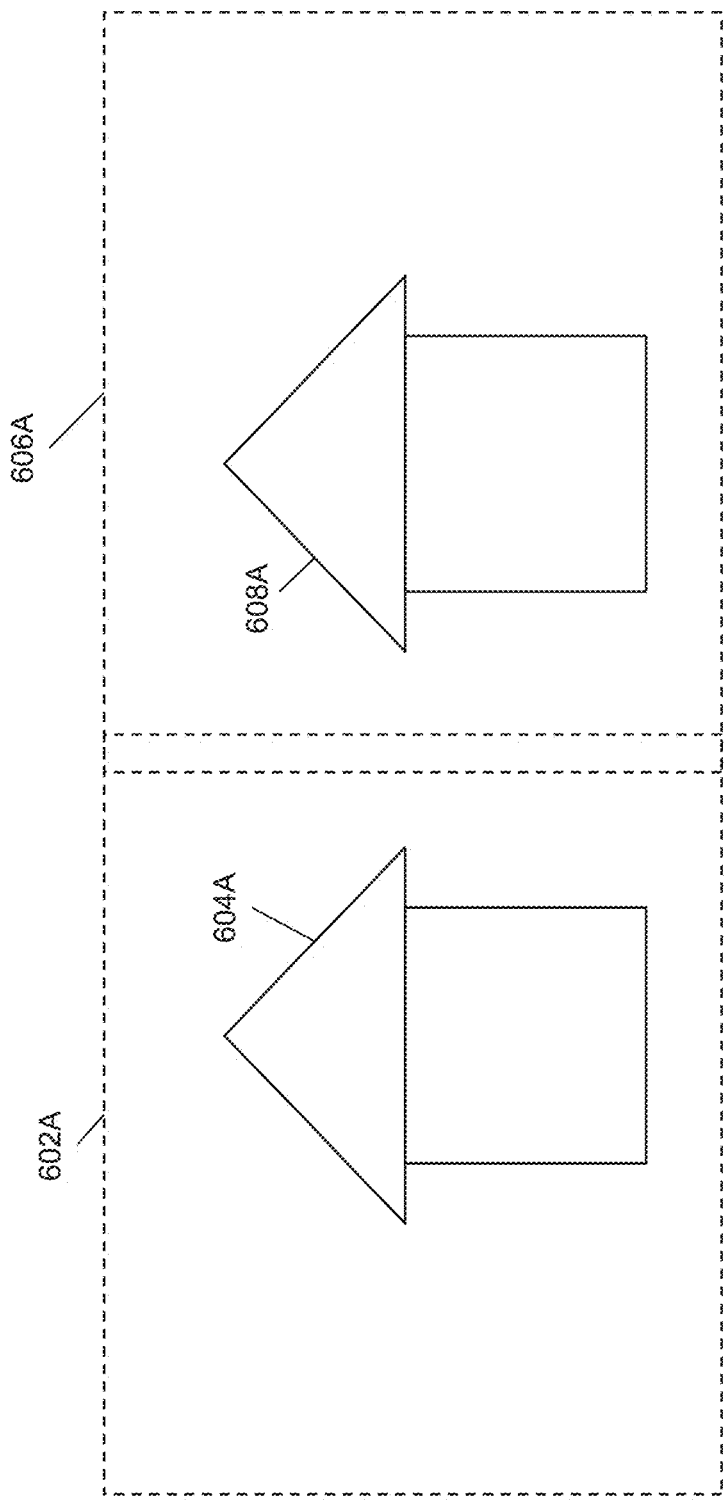
FIG. 6A is a diagram illustrating the correlation between a plurality of coordinates and a plurality of physical addresses.

FIG. 6A is a diagram illustrating this issue with mapping geographic coordinates to physical and/or mailing addresses. For example, 602A and 606A represent two adjacent properties, while the dotted lines represent the property boundaries. Within the property boundary of property 602A, there is a single residence 604A, but a plurality of latitudes and longitudes. Similarly, within the property boundary of 606A, there is a single residence 608A. Thus, to create an electronic communications account using inputted latitude and longitude data, the system can associate a plurality of coordinates with one physical address.

Figure 6B:
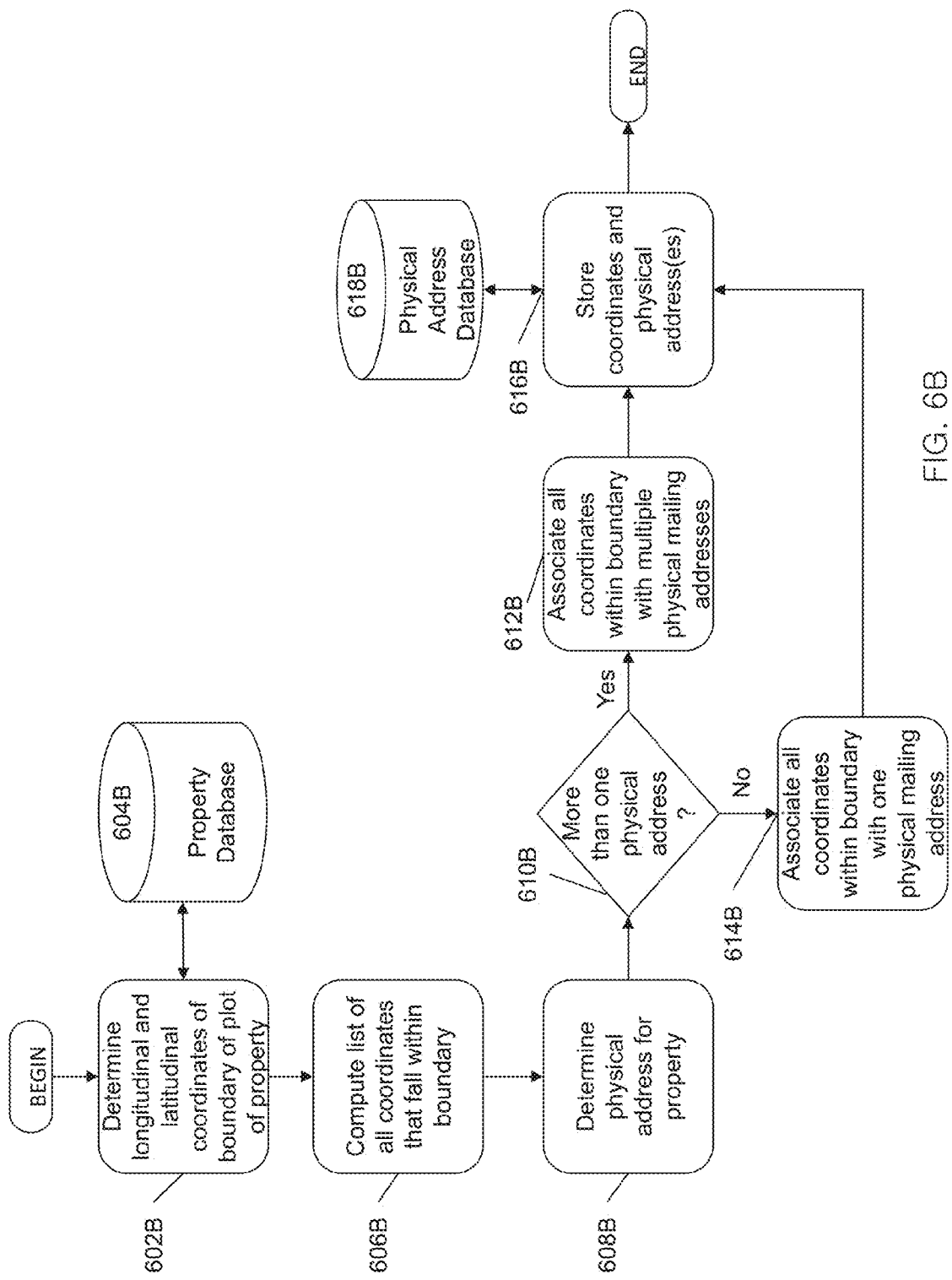
FIG. 6B is a flowchart depicting an embodiment of a method for associating coordinates with a physical mailing addresses.

To this end, FIG. 6B illustrates a flowchart depicting an embodiment of a method for associating a plurality of coordinates with physical addresses. The system can use the property database 604B to determine the longitudinal and latitudinal coordinates of the boundary of a property at block 602B. Using the boundary coordinates, the system can then compute a list of all the coordinates that fall within the boundary at block 606B, and determine the physical mailing addresses that fall within the boundary at 608B. At block 610B, the system can determine if there is more than one physical address within the property boundary). For example, there can be multiple units in an apartment building, condominium, or duplex. If there is only one physical address, the system can associate all the coordinates within the property boundary with that address at block 614B, and store the set of coordinates with the physical address in the physical address database 618B at block 616B. If there is more than one physical address within the property boundary, the system can associate all coordinates within the boundary with the multiple physical addresses at block 612B. This information can be stored within the physical address database 618B. Consequently, if a user inputs one of those coordinates to generate his/her electronic communications account, the system can prompt him/her to select the correct addresses from a list of the multiple associated physical addresses.

Alternatively, the system could be configured to associate certain coordinates with certain physical addresses within a single property boundary. If a user enters one of those coordinates to generate his/her electronic communications account, the system can locate the correct physical address without prompting the user.

Figure 6C:
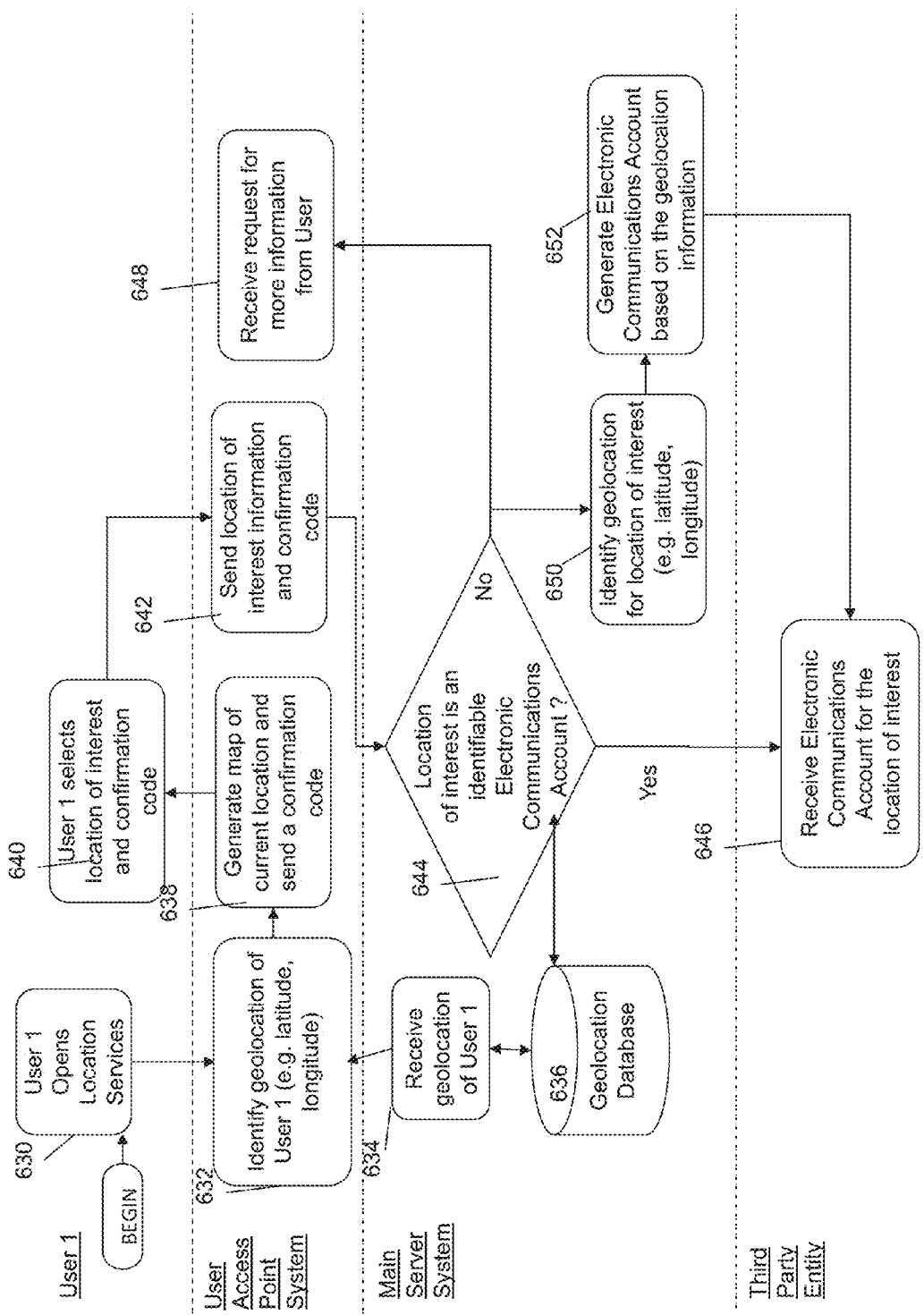
FIG. 6C is a flowchart depicting an embodiment of a method for generating an electronic communications account based on a location on a map.

FIG. 6C is a flowchart depicting an embodiment of a method for generating an electronic communications account based on a location on a map. At block 630, User 1 enables location services. For example, User 1 can enable location services on an application on a user access point system. At block 632, the user access point system identifies the geolocation of User 1. For example, the user access point system can identify the latitude and longitude of User 1. In some embodiments, User 1 can set a location at block 630. Then, the user access point system identifies the geolocation of the location set by User 1.

At block 634, the main server system receives the geolocation of User 1 and adds the location to the geolocation database 636. The main server system can store the geolocation received (for example latitude or longitude information). In some embodiments, the main server system can process the geolocation of User 1 and add it to the geolocation database. For example, the main server system can determine a change in location of User 1 and add the change to the geolocation database 636. In some embodiments, the main server system can determine the geolocation of the user access point system over a period of time and store a trace of the geolocation in the geolocation database 636.

At block 638, the user access point system generates a map of the current location of the user access point system (or the location of choice as described above). The map can be displayed to User 1. In some embodiments, an indication of the location can be generated to the User 1 that indicates the location. For example, instead of a map, an address can be displayed.

At block 640, User 1 selects a location of interest. The User 1 can select the location of interest by indicating the location on the displayed map. For example, User 1 can press down on the map and the user access point system can automatically determine the location of interest based on the User 1's selection on the map. User 1 can select a location of interest by entering in a physical address. User 1 can select a location of interest by adding other information that can be used to identify a location, such as a name of a business.

At block 642, the user access point system can send the location of interest information to the main server system.

At block 638, the User can also receive a confirmation code. At block 640, User 1 can enter in the confirmation code. The confirmation code can be sent via SMS and the user can enter in the code into the application. This can added layer of security and verification that it is in fact User 1 making the selection of the location of interest. At block 642, the user access point system can send the confirmation code to the main server system.

At block 644, the main server system can determine whether information associated with the location of interest is identifiable. The main server system can determine whether the location of interest is associated with other information in the geolocation database 636. For example, the main server system can determine whether the location of interest is associated with a business or a park.

At block 644, the main server system can also determine if the location of interest is associated with an electronic communications account. If the location of interest is associated with an electronic communications account, then the main server system can send the electronic communications account of the location of interest to a third-party entity at block 646, such as to first responders.

At block 644, if the main server system determines that the location of interest is not associated with an electronic communications account, then the main server system can send a request for more information from the user at block 648. At block 644, if the main server system determines that the location of interest is not associated with an electronic communications account, the main server system can also identify the geolocation for the location of interest at block

650. For example, the main server system can identify a latitude and longitude of the location of interest.

At block 652, the main server system can generate an electronic communications account based on the geolocation information. For example, the main server system can generate the following electronic communications account based on the latitude and longitude: L43.7901 L-79.3606@AlphC.com. Accordingly, an electronic communications account can be generated for an unidentifiable location based on the physical location (for example latitude and longitude information).

In some embodiments, the electronic communications account can indicate information regarding the sender. The electronic communications account can include an address and a name of a business. For example, the electronic communications account can be: 2-8-log-fern-way-toronto-ontario-canada@alphc.com. The example electronic communications account shows the address and unit number for a particular residence. In some embodiments, the electronic communications account can include information on the business, such as a department name, a business name, a name of a person working at the address, or the like.

In some embodiments, the electronic communications account appends information provided by the user. For example, if the user appended a name or a purpose, then the name or purpose can be appended to the electronic communications account. In some embodiments, locational information (for example latitude and longitude) information is searched to determine an indicator of the location such as a street number. In some embodiments, the indication of the location can be in an incorrect format. The system can correct the format using its internal format correction component, can use a format and/or address provided by the user, or can use the incorrect format. In some embodiments, the electronic communications account is created by appending at least one of: a unit number, a street number, a street name, a city, a province or state, a country, or a zip code. The electronic communications account can be generated in different formats (for example lower case, separated by dashes).

In some embodiments, the electronic communications account includes information of the category of business. For example, retirement homes and hospitals can create an electronic communications account that indicate the type of business. This information can be used to identify the type of response and/or information regarding the individuals in the area. For example, in the event of a disaster, first responders can use these categories to identify the locations of individuals (for example, Room No.). In another example, in the event of a disaster, first responders can identify the type of assistance required based on the number of elderly in the area. This can provide a more effective identification system than traditional hospital databases and procedures.

The main server system can then send the generated electronic communications account for the location of interest to a third-party entity at block 646.

Figure 6F:
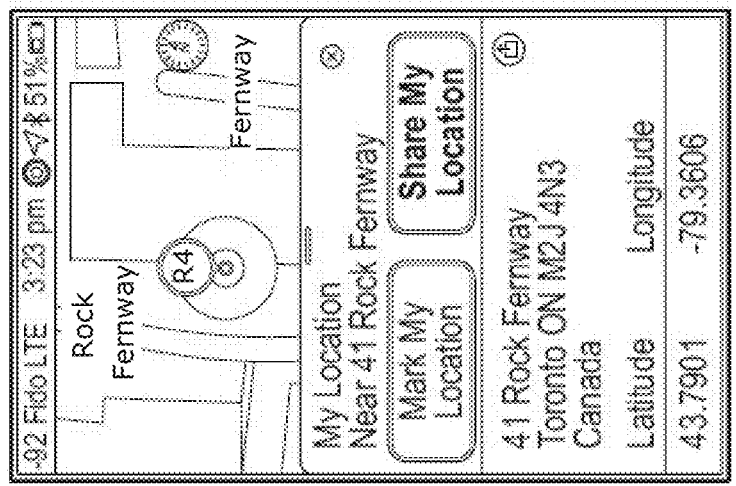
FIG. 6F is a diagram depicting an embodiment of a graphical user interface of an option to mark the current location of the user and create an electronic communications account.
Figure 6E:
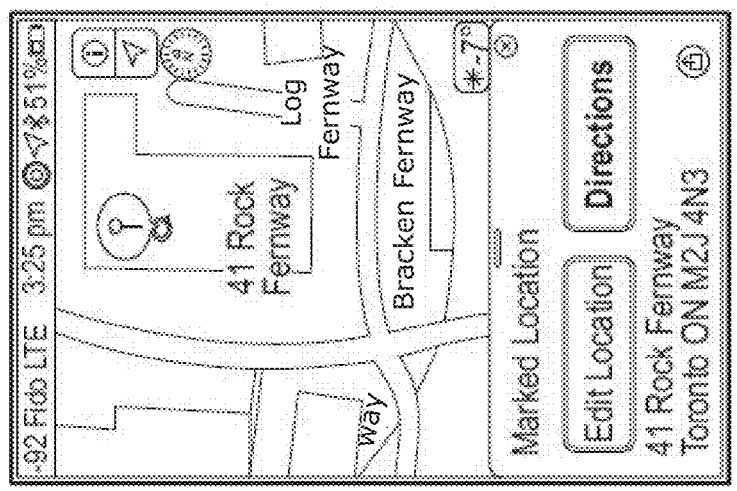
FIG. 6E is a diagram depicting an embodiment of a graphical user interface of a location of interest that the user placed on the map.
Figure 6D:
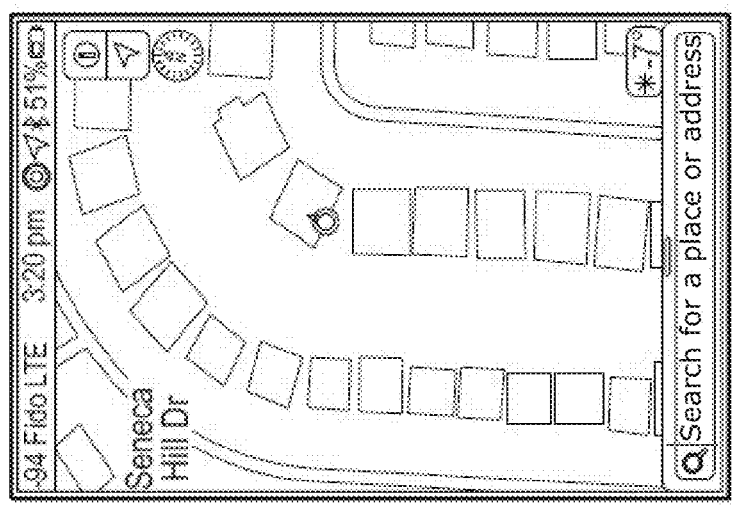
FIG. 6D is a diagram depicting an embodiment of a graphical user interface using the geolocation of a user device and generating a map.

FIG. 6D-F are diagrams depicting an embodiment of a user interface for generating an electronic communications account based on a location on a map. FIG. 6D illustrates using the geolocation of a user device and generating a map. FIG. 6D also illustrates an input toolbar for an individual to input the place or address of a location of interest.

FIG. 6E illustrates a location of interest that the user placed on the map. The user can mark a location on the map. The example in FIG. 6E illustrates a marked location in the same location of User 1. The user has the option to edit the location and/or determine directions to the location.

FIG. 6F illustrates an option to mark the current location of the user. The user interface example also shows latitude and longitude information, as well as address information. The user also has the option to share the user's location. This can be used to share the location of a user in emergency situations immediately and quickly.

Figure 7:
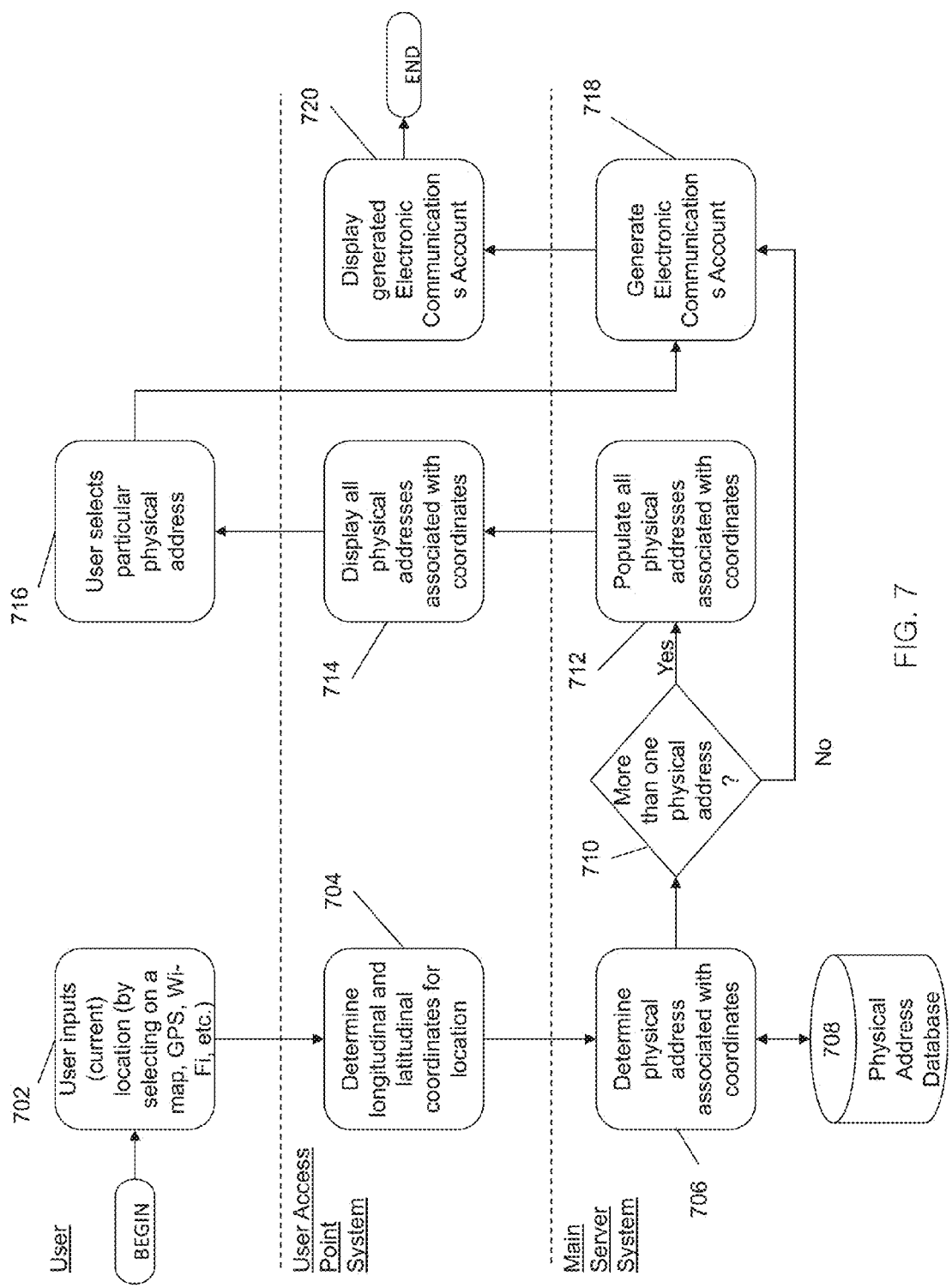
FIG. 7 is a flowchart depicting an embodiment of a method for generating an electronic communications account address linked to a physical address, using a user-inputted location.

FIG. 7 illustrates a flowchart depicting an embodiment of a method for generating an e-mail address linked to a physical address, using longitudinal and latitudinal coordinates. In this embodiment, the user can input a location at block 702 through any available means, including selection on a map or GPS tracking. Using the inputted location, the system can determine the longitudinal and latitudinal coordinates corresponding with this location at block 704. At block 706, the main server system can then determine the physical address or addresses associated with the coordinates using the physical address database 708. If there is only one physical address associated with the coordinates, the system can generate an e-mail address linked to that physical address at block 718. However, as noted previously, in some cases, there can be more than one physical address within the property boundary within which a set of coordinates falls. If the system determines that there is more than one physical address associated with the longitudinal and latitudinal coordinates at block 710, the system can populate a list of all those physical addresses at block 712 and display them at block 714. The user can be prompted to select the physical address for which he/she would like to link an e-mail address at block 716. After selection, the system can generate an e-mail address linked to the selected physical address at block 718. The generated electronic communications account can be displayed to the user at block 720.

In some embodiments, associating electronic communications accounts with certain areas can be stored in a self-referential table. For example, when a user enters a certain area, the electronic communications account associated with a device of the user can be referenced in a table of electronic communications accounts of the area. The database can include the entry of the electronic communications account and/or a reference of the electronic communications account and/or other information related to the electronic communications account and/or the physical location/infrastructure/building, or the like.

When a user leaves a certain area, the electronic communications account associated with a device of the user can be removed from electronic communications accounts for that area. This can allow for more flexibility in configuring the database, resulting in the improvement of database storage technology. Furthermore, deploying such a relational database can be automated and/or can result in substantially real-time. Furthermore, the self-referential table can allow for more effective storage of data such that looking at an area will identify electronic communications accounts associated with that area.

The self-referential table can also refer to other types of information, documents, databases, or the like. For example, the self-referential table can reference a database that saves GPS locations for a particular individual. This can improve database efficiency by not having to save all GPS locations for the individual. This can also improve look-up by having a precise alternative database for identifying past GPS history. This can also provide for additional electronic privacy and security by not having sensitive GPS history information saved by the entity that maintains the self-referential table. Although certain embodiments are described for GPS data, it is appreciated that other types of data can be used, such as credit data, financial data, personal data, other sensitive data, or the like.

Verification of Physical Address

Figure 8A:
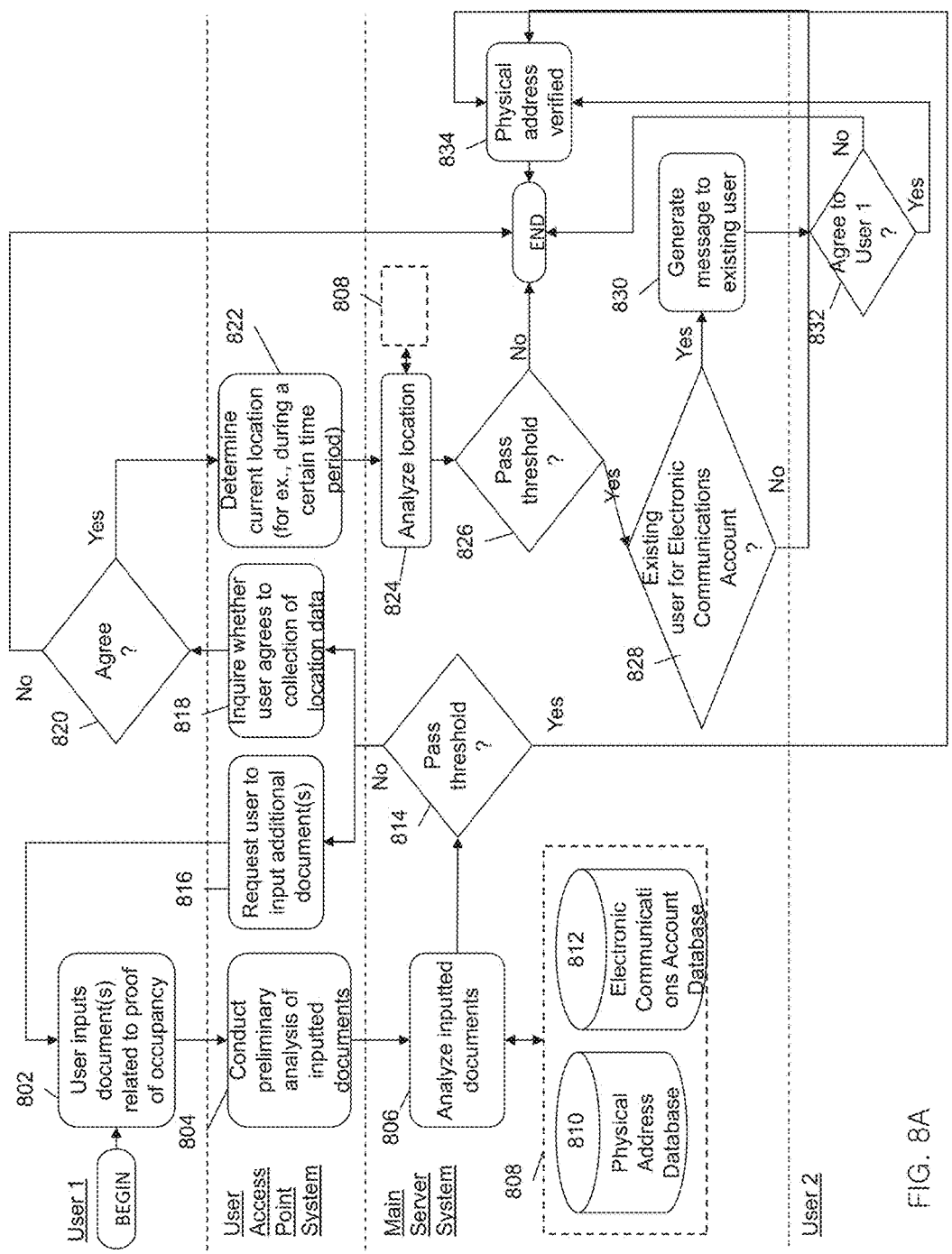
FIG. 8A is a flowchart depicting an embodiment of a method for verifying the physical address of a user.

In some embodiments, a user can need to verify his/her physical address before an email-address can linked to that address. Without verification, an electronic communications account could be created by persons wholly unconnected to the physical address for which the electronic communications account is being generated. Since one aim of the embodiments is to provide access to communication and services and improve upon the utilization of electronic mail and physical mail, it can be important to restrict access to electronic communications accounts to the residents and/or owners of the physical address for which the electronic communications account is being generated and others that gain permission from the residents. Another related issue is a situation in which one user has generated and activated an electronic communications account for which another user later attempts to generate. This can be common when a User 1 generates an electronic communications account for his/her physical address, then later moves to another physical address. When a User 2 moves into User 1's previous physical address and attempts to generate and activate an electronic communications account, the system can be able to verify that User 2 is a resident of that address and transfer access of the electronic communications account. To assist in restricting access to the proper users, FIG. 8A illustrates a flowchart depicting an embodiment of a method for verifying the physical address of a user. In this embodiment, a User 1 can input documents related to proof of occupancy and/or ownership at block 802. For example, proof of occupancy and/or ownership can comprise a leasing agreement, deed, title, utilities bill, financial statements, or the like. The user access point system can conduct a preliminary analysis of the inputted documents at block 804. Following preliminary analysis, the main server system can complete a full analysis of the inputted documents at block 806, using a set of databases 808, which can comprise a physical address database 810 and/or an e-mail address database 812. If the documents are found to be adequate by the main server system at block 814, the physical address can be verified at block 834, allowing the user to access the linked electronic communications account.

On the other hand, if the documents are found to be inadequate for verification purposes at block 814, User 1 can be prompted to submit additional documentation to prove occupancy at block 816. Alternatively and/or additionally, the user access point system can prompt User 1 to accept collection of data at block 818. This collection can allow the user access point system to track the user's location to determine if the user is currently located at the physical address and/or was previously at the physical address for which an electronic communications account is being generated. If User 1 agrees to the collection of data at block 820, the user access point system can track User 1's location, for example over a predetermined period of time, at block 822.

The main server system can analyze the collected location information at block 824 using the set of databases 808. If the system determines that the location information indicates that User 1 is and/or was located at the physical address for which he/she wishes to generate a linked e-mail address at block 826, the main server system can check if there is an existing e-mail address linked to that physical address at block 828. If the system determines that there is no existing e-mail address linked to the physical address for which User 1 wishes to generate a linked e-mail address at block 828, the system can verify the physical address at block 834 and allow the user to generate an electronic communications account. If, however, the system determines that there is an existing e-mail address linked to the physical address for which User 1 wishes to generate a linked e-mail address at block 828, the system can send a message to the existing electronic communications account at block 830, asking a User 2, the current user of that address, to agree to the transfer of that email address to User 1. If User 2 agrees to transfer the electronic communications account at 832, the system can verify the address for which User 1 wishes to generate a linked e-mail address at block 834 and transfer access to the electronic communications account to User 1.

Figure 8B:
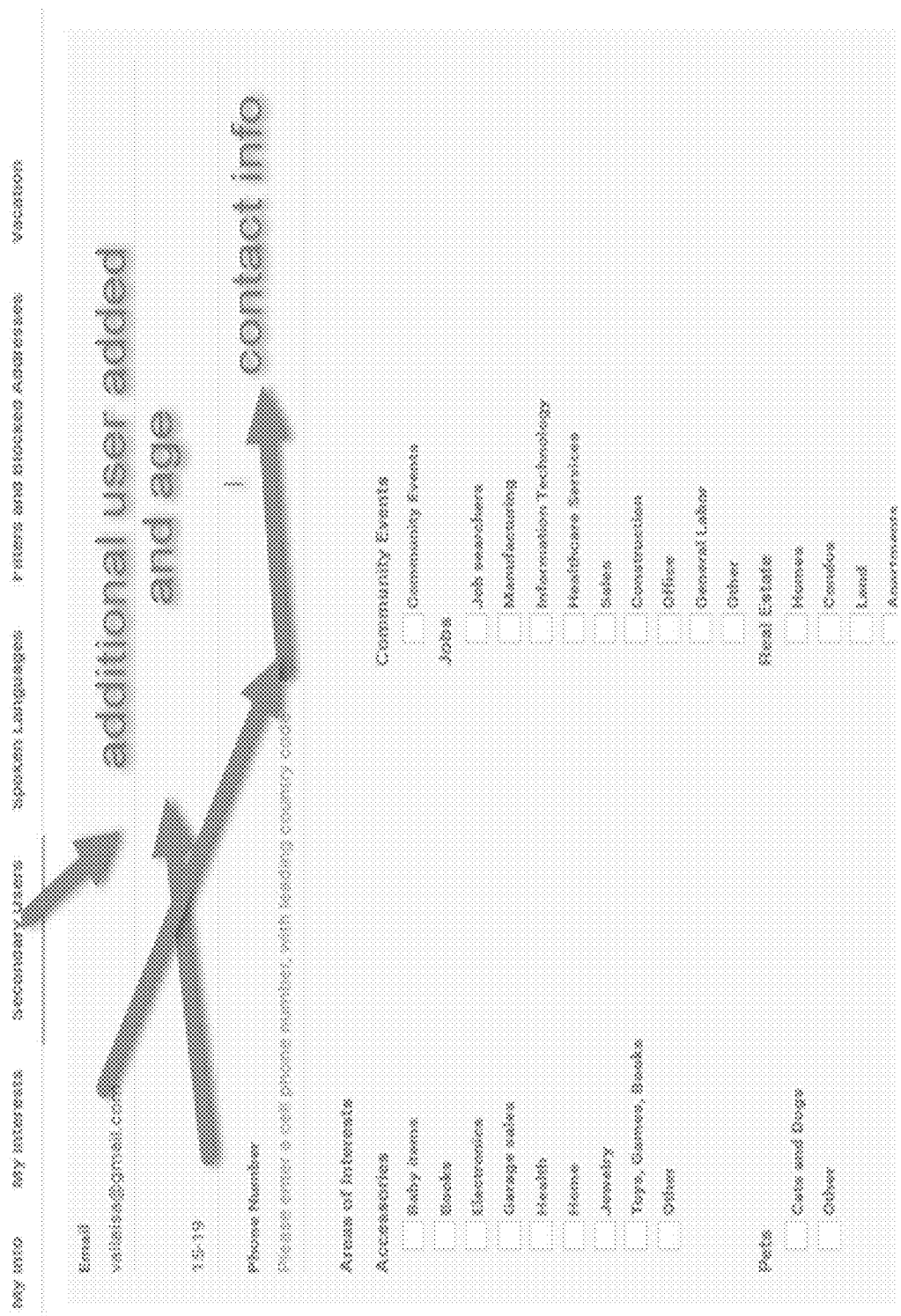
FIG. 8B is a diagram depicting an embodiment of a graphical user interface for entering in users associated with an electronic communications account.

In some embodiments, an electronic communications account can be linked to other individuals. For example, an electronic communications account can be linked to employees of a business, people in a particular area, members of a household, or the like. FIG. 8B is a diagram depicting an embodiment of a graphical user interface for entering in users associated with an electronic communications account. For example, an electronic communications account can be linked with secondary users such that all secondary users would receive alerts based on contact information (for example an email address or a contact phone number). The electronic communications account can be used as a main source of any other form of communication.

In some embodiments, an electronic communications account is linked to individuals based on a characteristic, such as percentage of individuals, demographic data, sex, race, economic status, age, level of education, income level and employment, psychiatric data, medical data, a personality trait, an interest, values, attitudes, lifestyles, opinions, preferences, likes or dislikes, predilections, purchase history, browser history, financial history and data, credit history and data, personal history and data, other activity data, and the like. In the example of FIG. 8B, characteristics such as an area of interest, community, jobs, real estate, and pets can be used.

User Profiles and Preferences

In some embodiments, a user can associate a user profile with his/her e-mail address, which can be used to filter mail to specific residents at one physical address, set message and alert preferences, and for various other purposes. Often, there can be multiple residents or other occupants at a single physical address. In that case, the creation of unique user profiles for each residence and/or location could allow each resident and/or occupant to customize the source and type of messages that he/she receives. To this end, the system can be configured to store and utilize user profiles to enhance the services and communication capabilities of electronic communications accounts.

Figure 9:
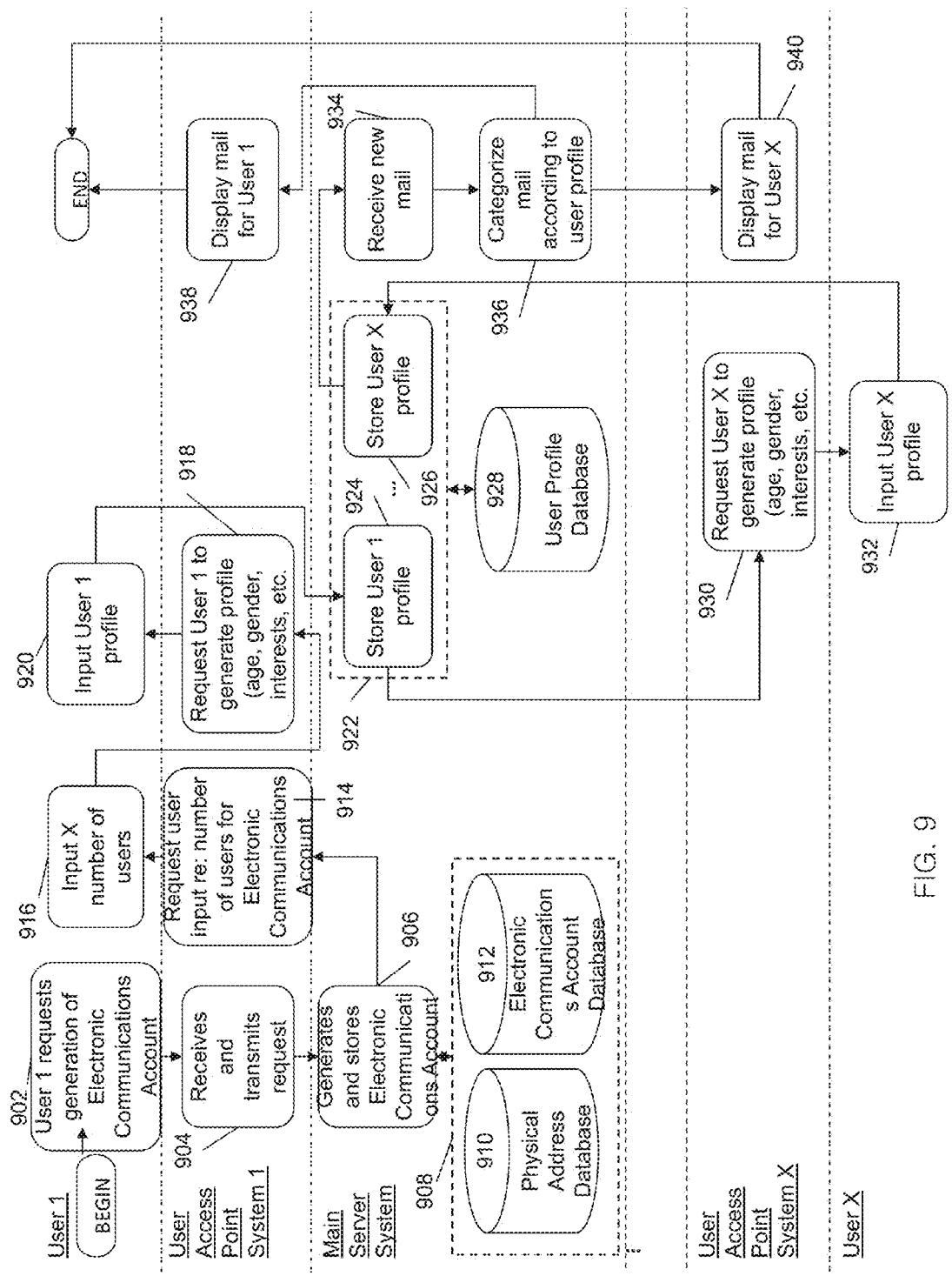
FIG. 9 is a flowchart depicting an embodiment of a method for generating a plurality of user profiles associated with a single electronic communications account address linked to a physical address.

FIG. 9 illustrates a flowchart depicting an embodiment of a method for storing a plurality of user profiles and associating them with a single e-mail address linked to a physical address. In some embodiments, a User 1 can request generation of an electronic communications account at block 902, a user access point system 1 can receive and transmit this request to the main server system at block 904, and an electronic communications account can be generated by the main server system at 906 via one or more processes described herein in relation to one or more embodiments. This electronic communications account, eAddress or e-mail address can be stored within an e-mail address database 912, while the linked physical address can be stored in a physical address database 910, with both databases forming part of a plurality of databases 908 in some embodiments.

After generation of the e-mail address linked to the physical address of a User 1, a user access point system 1 can prompt User 1 to enter the number of users who are residents at the inputted physical address, or alternatively, the number of users who can use the electronic communications account, eAddress or e-mail address linked to the physical address at block 914. After User 1 inputs the number of users at block 916, the user access point system 1 can prompt the user to generate a profile at block 918, including User 1's age, gender, occupation, interests, and/or any other useful information. Upon input by User 1 at block 920, the profile can be stored within a user profile database 928 as User 1 profile 924. If User 1 indicates that more than one user can use the e-mail address linked to the physical address at block 914, the main server system can also request that the additional user or users, denoted User X, generate profiles at block 930. Upon input by User X at block 932, the profiles can be stored in the user profile database 928 as User X profile 926. The user profile database can be a part of a plurality of databases 922.

Upon the delivery of new mail at block 934, the main server system can categorize the mail according to user profile at block 936. The mail can be displayed to User 1 at block 938 and/or User X at block 940, depending on the content of the user profiles (938, 940).

Message Alert System

In some embodiments, user profiles can be configured so that the system alerts users when they have received a message of a particular type, from a specific source, at a specific time, or based on other preferences. For example, a user could set a preference so that he/she is alerted every time they receive a message from a User 1 and a User 2, but not when he/she receives one from User 3. Similarly, the user could select an option so that he/she is alerted every time they receive an e-mail with a particular subject line or with a particular file type attached. These alert settings allow users to receive immediate notification regarding messages that they deem to be important. In addition, such heightened alert systems can be useful for sending emergency-related messages to ensure that the recipient is notified as soon as possible regarding emergency situations.

Figure 10A:
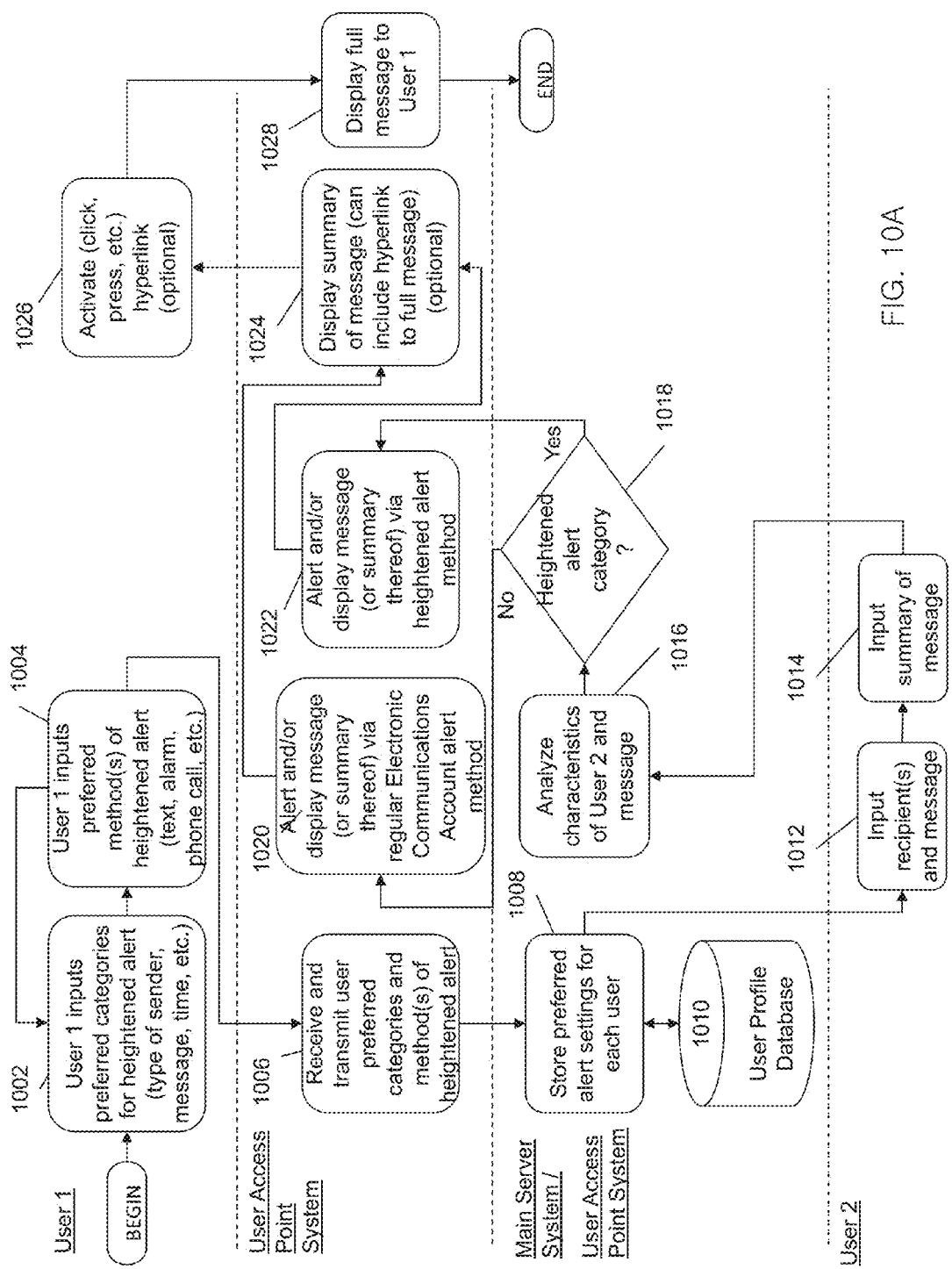
FIG. 10A is a flowchart depicting an embodiment of a method for receiving messages based on user-preferences.

FIG. 10A illustrates a flowchart depicting an embodiment of a method for transmitting messages based on user-preferences. In this embodiment, a User 1 can input categories for which he/she would prefer to receive heighted alerts at block 1002. These categories can comprise the type of sender, type of message, time of delivery, and/or another category or any combination of the above. User 1 can also input his/her preferred method or methods of alert delivery, including text, alarm, phone call, e-mail, physical mail, and/or another method of delivery, electronic or physical, or any combination of the above at block 1004. A user access point system can receive and transmit User 1's preferred categories and methods of delivery to the main server system at 1006, where the information can be stored in a user profile database 1010 at block 1008.

In some embodiments, a User 2 can input a message at block 1012 and/or a summary of the message at block 1014 for delivery to User 1. The main server system can analyze the characteristics of User 2 and/or his/her inputted message at block 1016. At block 1018, the system can determine whether the characteristics of the sender and message match the user preferences inputted by User 1 relating to heightened alert methods. If the characteristics do not match User 1's preferences, the main server system can send User 2's message to User 1 via User 1's electronic communications account, eAddress or e-mail address linked to a physical address at block 1020 via the regular alert method. However, if the system determines that the characteristics do match the preferences inputted by User 1 relating to heightened alert methods at block 1018, the main server system can send User 2's message via User 1's preferred methods of heightened alert delivery at block 1022. Whether the characteristics match the preferences of User 1 or not, the user access point system can display the inputted summary of User 2's message, with or without a hyperlink to the full message at block 1024. User 1 can then activate the hyperlink at block 1026 to display the full message at block 1028.

In other embodiments, user profiles and the associated alert settings can facilitate user sales and purchases. Users who wish to sell or purchase certain items, such as a car or home, can select options so that others are alerted to this fact. For instance, a User 1, who is selling their motorcycle, can select an option within the system to indicate that User 1's motorcycle is for sale and an option that causes the system to send an alert to User 1 if another user indicates that he/she is looking to buy a motorcycle. A User 2, who is looking for a motorcycle to purchase, can similarly choose an option that indicates that he/she is in the market for a motorcycle and an option that causes the system to send an alert to User 2 if another user is selling a motorcycle. Users can personalize the alerts to match their preferences. Users can specify both the type of messages they wish to receive and the area for which they would like to receive messages. For example, a user could specify that they only wish to be alerted about home sales in a 2-mile radius around a user-specified physical address. Users can also update their user profiles to alert businesses about their interests. For example, a user could enter "basketball shoes" as an interest. Companies that sell basketball shoes could then compose a message to all users with "basketball shoes" listed as an interest. This allows companies to interact directly with users with interest in their products.

In other embodiments, the system can generate a map showing current sellers and buyers for an area around a user-specified address. The system can also be configured so users can select options indicating that they are having garage sales, estate sales, giveaways, or other relevant events. Event organizers, including those organizing charity events, volunteering events, political rallies, debates, or any other events, can post their event on the map and alert everyone in the relevant area about the details of their event. In addition, the map can be filtered to show only specific types of events or people. The map can also be configured to show only events and people within a user-specified area around a user-specified address. This can permit commercial activity within the community and across borders and countries. For example, a shoes manufacture in Japan can contact all business that sell shoes in Canada. Likewise, a local grocery store/farmer, can advertise their apples at 0.39 cts lb based on an early harvest. The same concept can be applied in the developed world for missing persons and local foods for sale.

In other embodiments, businesses can use the user profile, alert, and map functionality to indicate the existence of a sale or job opening at the business. In other embodiments, the business can send a message to all users within a user-specified area of residences or to all users at specific addresses. Users can view current sales and job openings on the map generated by the system. Businesses can also integrate their user profiles and the map functionality into their own websites, to directly show sales and job openings at different locations on the website.

In other embodiments, users can utilize the user profile, map, and alert functionality to advertise available rooms for rent in their home or apartment, and to communicate with their tenants.

In other embodiments, user profiles can include wish lists for specific products they are currently considering purchasing. When a user inputs a message regarding a sale on one or more of the items on a user's wish list, that user can receive an alert.

In some embodiments, users can be able to deactivate alerts for a user-specified period of time.

In some embodiments, alerts can be managed such that a notification and/or a response can affect the notifications of other individuals of interest. If alerts are sent to multiple individuals, a response from one or more individuals can be displayed to other individuals. For example, in the case of an emergency, a notification can be sent to all members of a household with parents and children. Then, upon a response from one of the children, the parents can be notified of the children's safety and status.

Figure 10B:
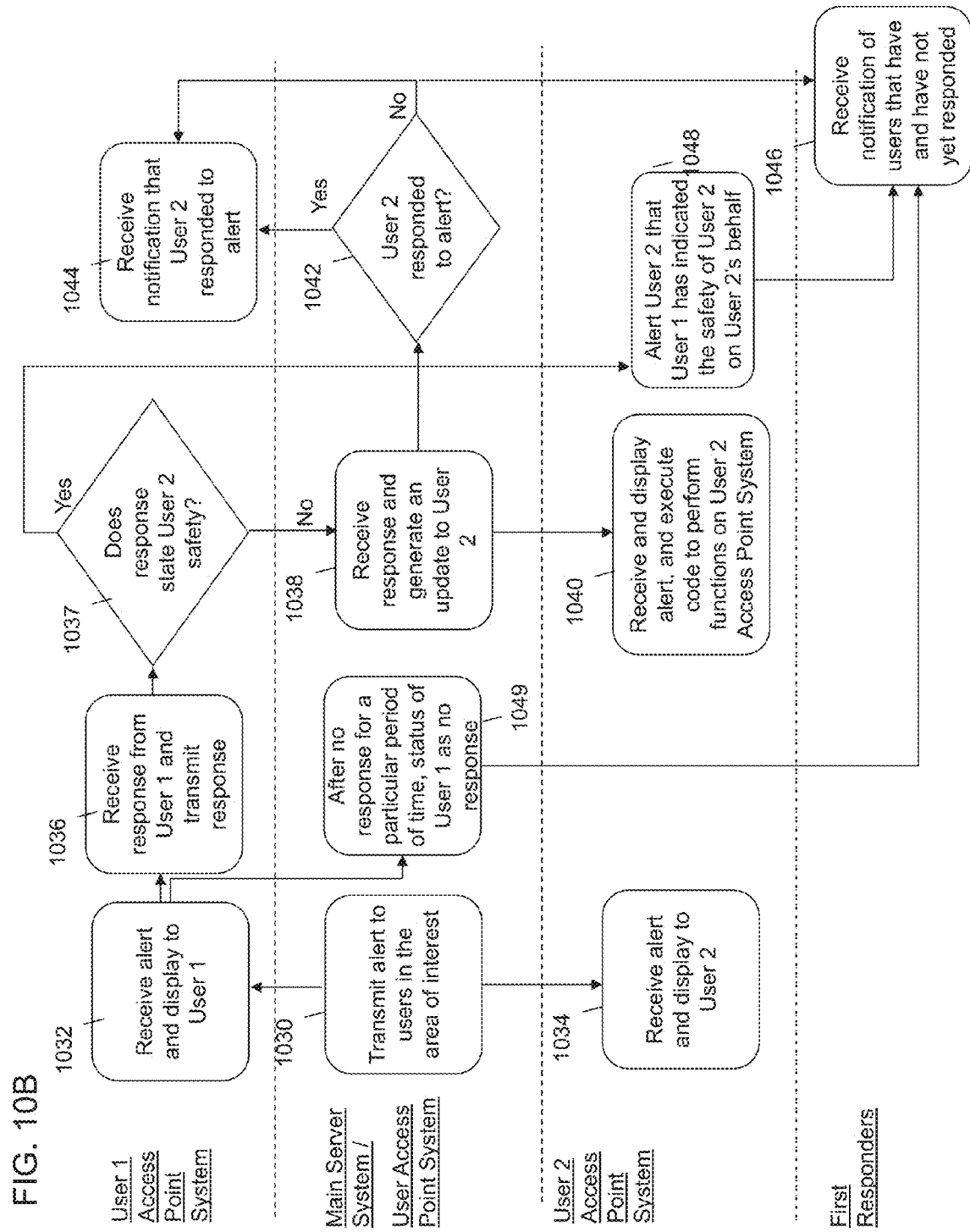
FIG. 10B is a flowchart depicting an embodiment of a method for handling messages for a group of individuals.

FIG. 10B illustrates an embodiment of a method for handling messages for a group of individuals. In some embodiments, a main server system and/or a user access point system can transmit an alert to users within an area of interest at block 1030. In some embodiments, the main server system prioritizes the alerts. For example, the alerts can be sent to parents and children. In some embodiments, the alerts can be sent based on an urgency. For example, the alerts can first be sent to those located in the area of danger, and a second round of alerts sent to those outside of the area of danger.

At block 1032 and 1034, user 1 and user 2 can receive the alert and display the alert onto the user 1 access point system and the user 2 access point system respectively. For example, the main server can dispatch an alert to multiple individuals of a dangerous criminal in the area. At block 1049, the main server system can indicate a status of no response if User 1 has not responded after a certain period of time. Then at block 1046, the first responders can receive an indication of such a status.

The alert can be an email address tied to an individual associated with a physical address in the area of interest. The alert can be sent to a mobile device of a user. For example, the alert can be an SMS message, a phone call, a message embedded in an application of a mobile device, executable code that enables the mobile device to display an alert, and the like.

The alert can be interactive. The alert can allow an individual to select certain people and/or devices to update and/or notify. For example, the alert can include an option for the user to notify others in the area of his or her current situation. In some embodiments, this is used in situations where the user is notifying others of a dangerous scenario, a safety indication, an incident, or area of interest, or the like. For example, the user can notify a government agency and/or other drivers of a broken street light.

At block 1036, user 1 can provide a response to the alert. In block 1037, the response can include information related to User 2. If so, the system can alert User 2 that User 1 has indicated the safety of User 2 at block 1048. At block 1046, the first responders can receive notification of users that are deemed to be safe, in need of help, not yet responded, and other status information. Otherwise, the response can be sent to the main server system at block 1038. For example, if the response from User 1 includes an indication that User 2 is also safe, then the system can end the process in block 1039. If User 1 does not respond with User 2 safety, then the main server can send another response to User 2 at block 1038.

In some embodiments, the response from User 1 can be automatically determined. For example, the user 1 access point system can identify certain data being used on the device. Then, the use of data will be sent to the main server system to indicate that the user 1 access point system is currently being used. In some embodiments, user 1 access point system can identify a location of the device. The location can indicate that user 1 is in safe area and can transmit this information to the main server system.

In some embodiments, the main server system or the user 1 access point system can be linked to another device that indicates the status of an individual. For example, the user 1 access point system (for example a mobile device) can be linked to a wearable device (for example an electronic watch). Based on the physiological readings of the electronic watch, the main server system can identify that the individual is still alive and/or is currently in motion (for example higher than normal heart rate can be indicative of running).

At block 1040, the user 2 access point system can receive the update based on the response of the alert from User 1. The alert can include executable code that performs certain functions of the User 2 Access Point System. For example, the code can include identifying GPS coordinates of the User 2 Access Point System and returning the information to the Main Server System. Then, the Main Server System can send the returned information to appropriate entities. For example, GPS coordinates can be sent back to User 1 who can be a father looking for User 2, the child. The code can include turning on other functionality of the phone, such as automatically turning on audio such that the main server system (or another entity or individual associated with the main server system) can communicate with User 2 automatically.

The response by User 1 can identify more information regarding the incident that initiated the alert. For example, if there is a shooter, then User 1 can identify that the shooter has two semi-automatic weapons and is checking from room to room. This would provide nearby individuals this notification such that the individuals can decide that it is safer to run far away rather than to hide in a nearby room. Furthermore, this response to the alert can provide nearby authorities the appropriate backup to call to respond to the level of threat.

In some embodiments, the response can be a snapshot, video, audio, or otherwise capture of the current incident. If the incident is a situation of interest, such as a food truck location, celebrity, or a live concert, the user can share a capture of the situation such that other individuals in the area can decide whether the situation of interest is worth attending in real-time. Location services that have been activated on a mobile device in a disaster area can be pinned by the systems and tracked, based on persons registered in an area and with "unknown" status.

In some embodiments, the system can make a determination based on the response. For example, the system can identify whether User 2 already responded to the alert at block 1042. If yes, then the system can generate an update to send to the User 1 Access Point System, and User 1 can be notified that User 2 already responded to the alert at block 1044. This can be useful in emergency situations where in the case of a natural disaster, a father can identify whether his children and his wife are safe based on their responses to the alert.

If User 2 has not responded to the alert, then notification can also be sent an entity, such as a third-party entity. At block 1046, notification is sent to a first responder, such as fire fighters, that receive an indication of the danger. For example, the notification can include who has responded as safe, who has responded as not safe, an indication of individuals in the area of danger (for example via GPS on mobile devices), an indication of individuals that have not responded, and the like.

Sending Messages

A key aspect of some embodiments is the transmission of messages between users. While users can send messages to others by inputting the recipients electronic communications account, in some embodiments, users can send messages to other users by selection of those users on a map. This allows users to send messages to other users without knowing the electronic communications account of that user. Traditional email does not allow for this functionality.

Figure 11:
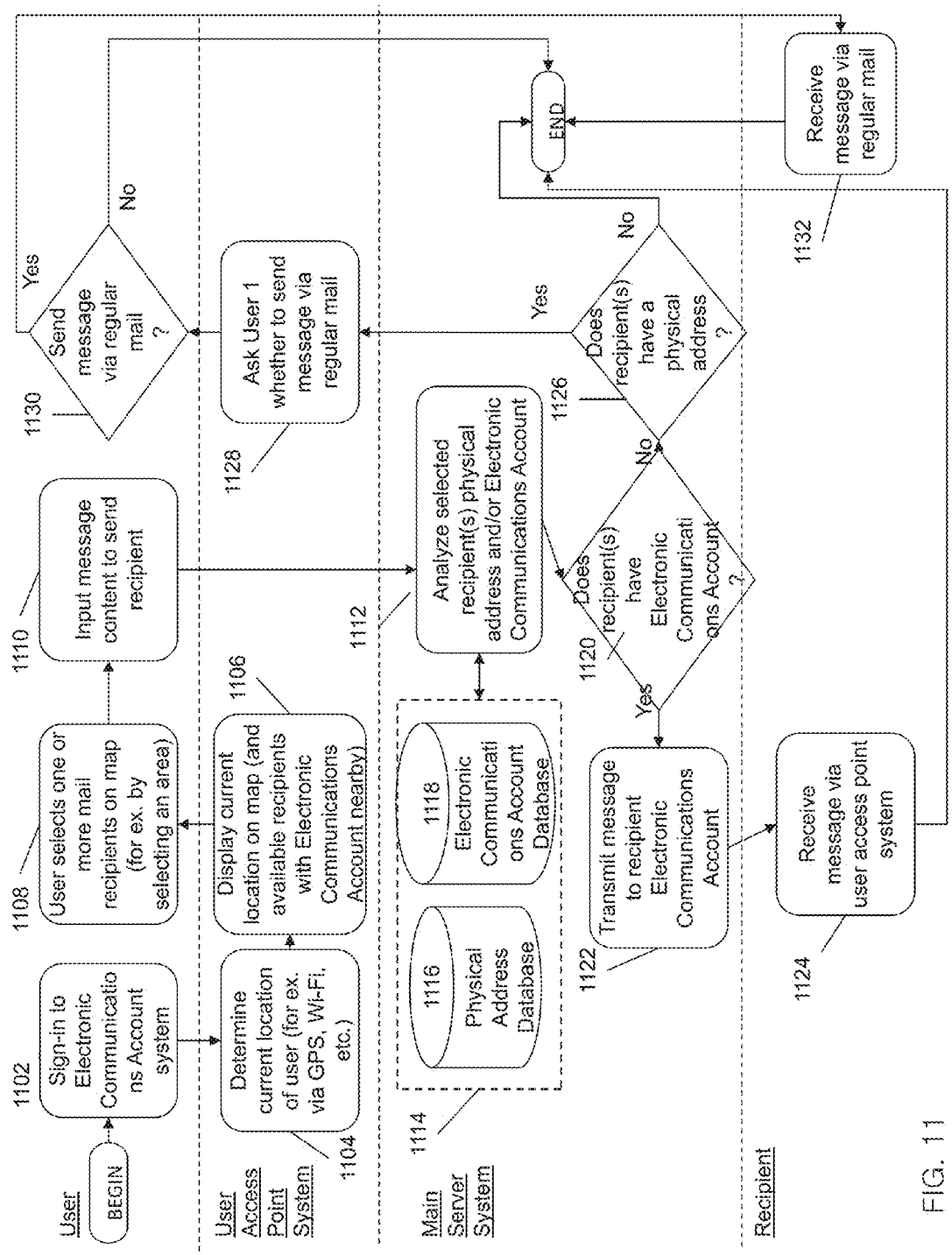
FIG. 11 is a flowchart depicting an embodiment of a method for sending messages via an electronic communications account linked to a physical location.

FIG. 11 illustrates a flowchart depicting an embodiment of a method for sending messages via an e-mail address linked to a physical location. In some embodiments, a user can access the e-mail address linked to his/her physical address at block 1102. Upon accessing the system, the user access point system can determine the user's current location at block 1104, using GPS, Wi-Fi, or another available means. At block 1106, this location can be displayed on a generated map, which can include the location of other residents. The user can select one or more points on the generated map and/or one or more areas to which the message can be sent at block 1108. Upon input of a message by the user at block 1110, the main server system can analyze the selected points and/or areas to find physical addresses and/or electronic communications account, eAddresses or e-mail addresses linked to those points and/or areas using a physical address database 1116 and an e-mail address database 1118 at block 1112. These databases can form a part of a plurality of databases 1114.

The main server system can first determine whether the selected recipients have an electronic communications account at block 1120. For those selected recipients that do have an e-mail address linked to their physical address, the inputted message can be transmitted via each recipient's e-mail address at block 1122. Those recipients can receive the message using their user access point systems at 1124. If some selected recipients do not have an e-mail address linked to their physical address, the system can determine whether these recipients have a physical address at 1126. For those selected recipients that do have a physical address, but do not have an e-mail address linked to that physical address, the system can ask the sending user whether the message can be sent via physical mail at block 1128. If the sending user consents to delivery via physical mail at block 1130, the message can be sent via physical mail at block 1132.

Figure 12:
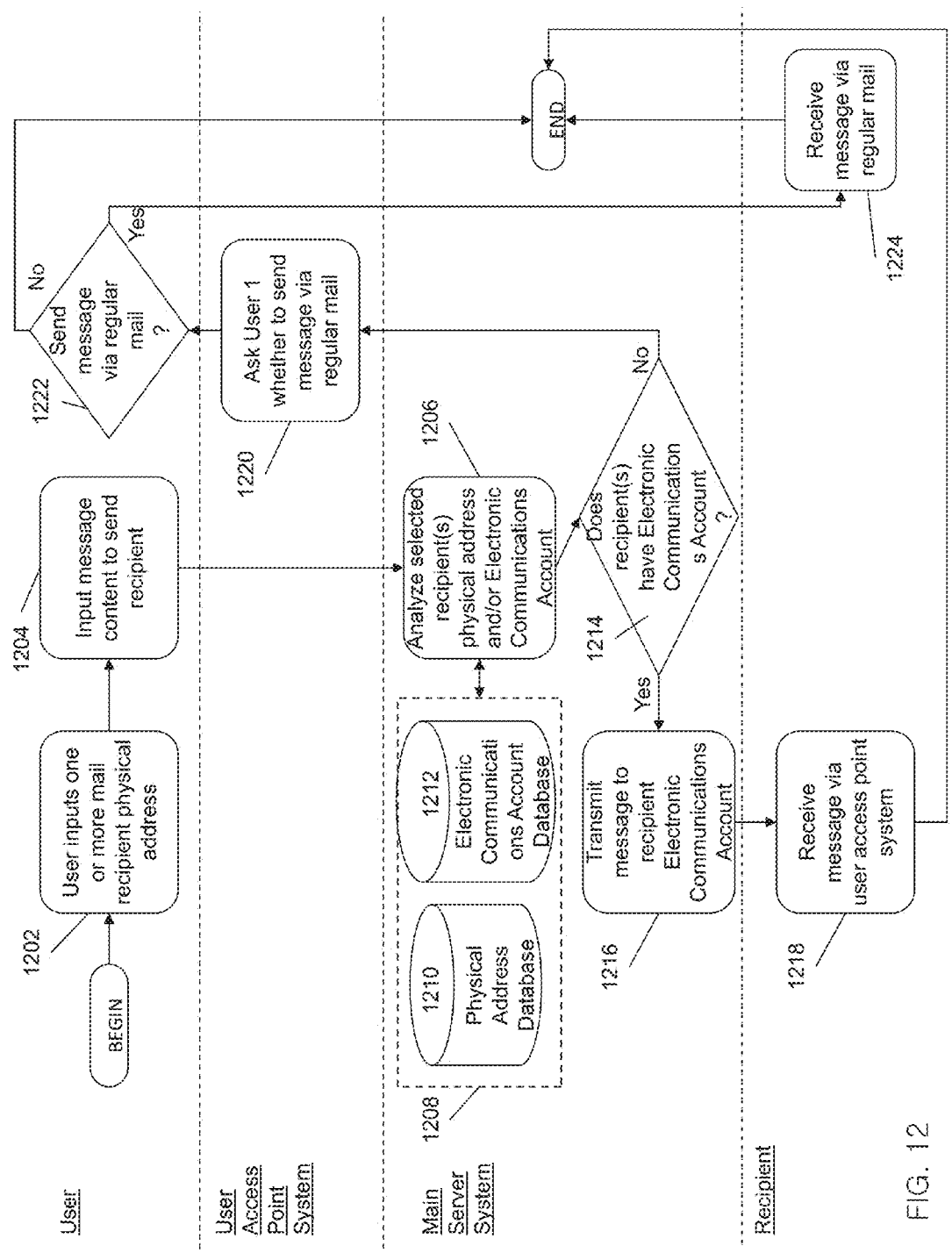
FIG. 12 is a flowchart depicting an embodiment of a method for sending messages via and electronic communications account linked to a physical location.

In other embodiments, users can send messages using only the physical address of the recipient. Knowing the linked electronic communications account or finding the physical location on a map is not necessary. The user can input the physical address and the system can match that physical address with the linked electronic communications account. FIG. 12 illustrates a flowchart depicting embodiment of a method for sending messages via and e-mail address linked to a physical location. In some embodiments, a sending user can input one or more physical addresses of intended recipients at 1202, as well as a message to be sent to the recipients at block 1204. Upon input of a message by the user, the main server system can analyze the inputted physical addresses and e-mail addresses linked to those physical addresses using a physical address database 1210 and an e-mail address database 1212 at block 1206. These databases can form a part of a plurality of databases 1208. The main server system can determine whether each inputted physical address has a linked e-mail address at block 1214. For those inputted physical addresses that do have linked e-mail addresses, the main server system can send the message via the linked e-mail addresses at block 1216. The recipients can receive the message via their user access point systems at block 1218. If some inputted physical addresses do not have linked e-mail addresses, the system can ask the sending user whether the message can be sent via physical mail to the inputted physical addresses at block 1220. If the sending user consents to delivery via physical mail at block 1222, the message can be sent via physical mail at block 1224.

In other embodiments, users can send messages to all or a subset of users within an area inputted by the user. These areas could be cities, zip codes, counties, neighborhoods, building complexes, or any other area. Again, this functionality solves the technical problem of not being able to send messages to others without knowing an e-mail address, physical address, and/or electronic communications account. Sending a message to other users within a certain area by using associated electronic communications accounts expands the reach and functionality of electronic messaging. For example, the local government can send a notification to the specific area for a political rally, a fund raising event, local community event or the like.

Figure 13A:
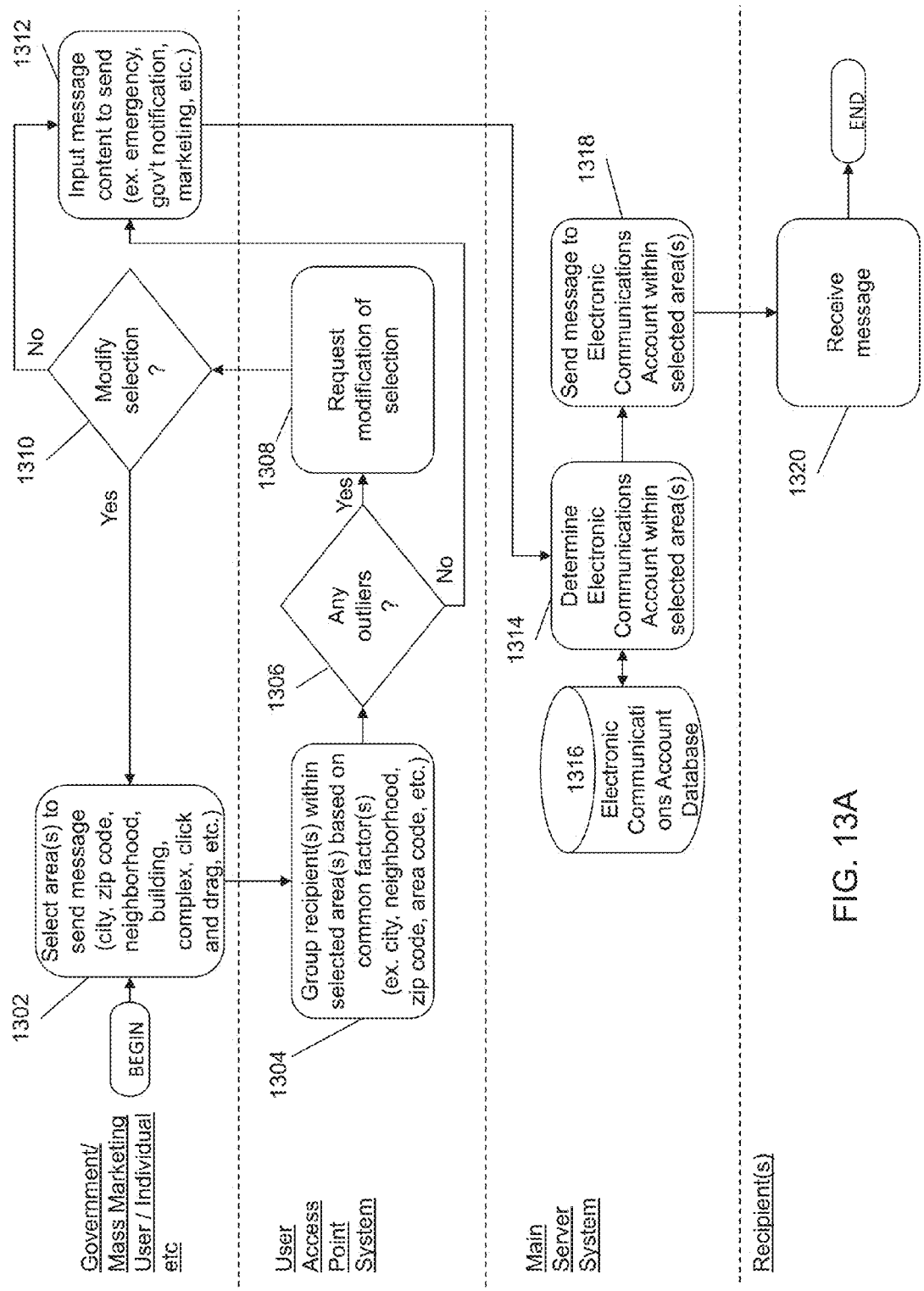
FIG. 13A is a flowchart depicting an embodiment of a method for sending messages to all users within a sending user's specified areas via an electronic communications account linked to a physical address.

FIG. 13A is a flowchart depicting an embodiment of a method for sending messages to all or a subset of users within a sending user's selected area. In this embodiment, a sending user can select an area or areas within which users can be sent a message at block 1302. Upon input of an area, the user access point system can group the recipients within the selected areas based on common factors, including the recipients' city, neighborhood, zip code, area code, or another factor at block 1304.

After grouping the recipients, the user access point system can determine whether any recipients cannot be grouped with the other recipients based on a common factor at block 1306. If the system determines that there are any recipients that cannot be grouped with the other recipients based on common factors, the user access point system can request modification of the area selection from the sending user at block 1308. If the sending user modifies the selection at block 1310, the user access point system can continue to group the recipients based on common factors at block 1304 and determine whether any recipients cannot be grouped at block 1306 until there are no such recipients. When the system determines that all recipients can be grouped based on a common factor or if the sending user refuses to modify the area selection at block 1310, even though one or more recipients cannot be grouped, the sending user can input a message to be sent to the grouped recipients at block 1312.

Upon message input, the main server system can determine the e-mail addresses linked to the physical addresses within the selected areas using an e-mail address database 1316 at block 1314. After the main server system has determined the e-mail addresses linked to the physical addresses within the selected areas, it can send the inputted message to each determined e-mail address at block 1318. The recipients can then receive the message at block 1320.

In some embodiments, the area can be automatically selected. The area can be selected based on an algorithm that determines an optimal area for a particular purpose. The algorithm can select a certain area indicative of a particular marketing campaign's effectiveness. For example, New York City can be selected by the algorithm for a marketing campaign for luxury goods based on average salary and number of luxury brands. Similarly, New York City Tourism can send an email to an area in Boston or Montreal about a special timed special weekend gateway.

In some embodiments, the area can be selected based on predetermined preferences. The area can be selected based on an urgency and/or a magnitude. For example, a fire started in an area with houses made of wood can be considered higher urgency, and thus the warning message can be sent to individuals in a larger area. If the fire has already spread to several hundred acres, the fire can be considered one of high magnitude, and thus, a warning message can be sent to individuals in a larger area.

Figure 13B:
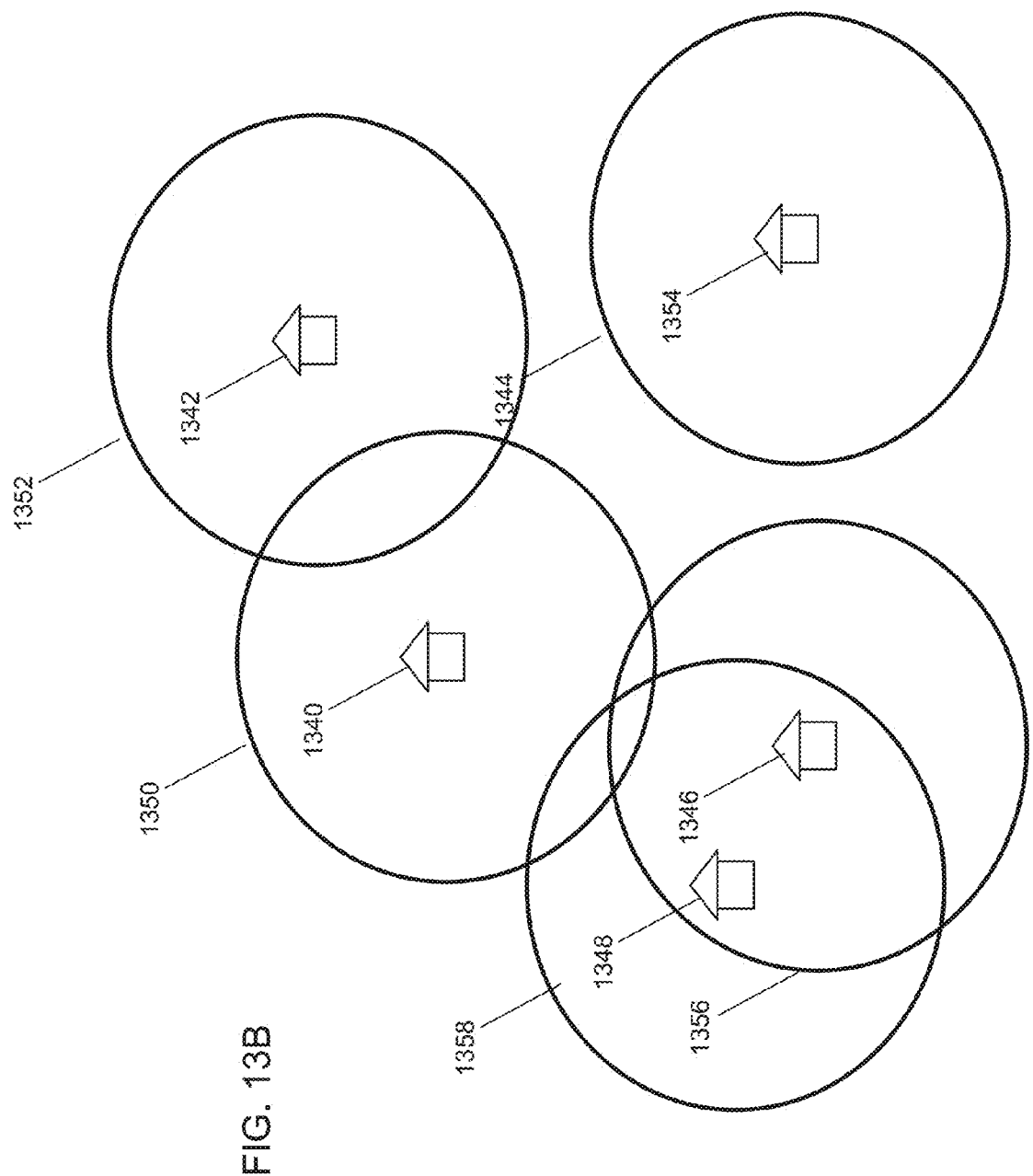
FIG. 13B is a diagram depicting an embodiment of a method for automatically selecting areas of interest for notification.

The area can also be selected automatically and/or manually based on factors that indicate a particular group and/or a location. The area can be selected based on an association. For example, the area can be selected based on a 5 mile radius around all branches of a particular franchise. FIG. 13B illustrates five locations of interest 1340, 1342, 1344, 1346, and 1348. In this embodiment, the system can select a radius 1350, 1352, 1354, 1356, and 1358 around the five locations of interest 1340, 1342, 1344, 1346, and 1348.

In some embodiments, various factors can be used to select individuals within a particular area. Customers associated with a physical address within the area and/or customer devices physically located within the area can be selected for a marketing campaign. For example, a food delivery service can provide electronic coupons to individuals that reside near the area of interest as well as provide electronic coupons to individuals with mobile devices located within the area of interest.

Areas can be automatically selected and messages automatically sent. For certain time-sensitive information, the message can be sent to a remote device of a user. This solves the technical problem of sending time-sensitive information in real-time to individuals that can have a high probability of being affected by the incident initiating the message. For example, as illustrated in the embodiment of FIG. 13C, if there is a fire in the area, then the area can be automatically determined and a warning message sent to those in the area. This would provide a more effective means of communication to provide increased safety to those in the area. Three fires are shown in FIG. 13C, a small fire 1374, a medium fire 1372, and a large fire 1370. For the area affected by a large fire, it can be desirable to notify a larger surrounding area as the danger can be greater as compared to the medium fire 1372 or the small fire 1374. Thus, the area 1370 for the large fire 1370 for notification is greater than the area 1382 for the medium fire 1372, and the small fire 1374 has the smallest notification area 1384. These radiuses can also be manually and/or partially manually selected by an entity, such as individuals that notify first responders in the area (for example systems associated with ambulance and/or fire truck dispatch).

Although embodiments describe a message, notification, and/or alert being sent, it is appreciated that such messages, notifications, and/or alerts can include executable code. Executable code can include code that initiates an application on a remote device. Thus, the executable code would initiate an application that would have otherwise not been available to the user. This can allow certain time-sensitive information to be transmitted to a user which would not have otherwise had access to this information.

The area can be a collection of residences and/or an area around the collection of residences. The area can be selected based on families that have children attending a particular school.

The area can be based on a particular time. The area can be updated on real time. The area can be for a particular window of time in the past, present, or future. The areas that have met a certain threshold for a period of time can be selected. For example, the areas that are noted to be affected by the fire for over 4 hours can be selected.

The individuals selected within the area can be based on time. Individuals that are in the area for a length of time, during a particular time period, and/or other factor of time can be used alone or in combination with another factor. The user interface can be interactive. In some embodiments, the user interface can display a region associated with an area of interest. The user can select criteria that can determine an area of interest. The user can control the area of interest, such as radius, size, outer parameters, exclude certain areas, and the like.

The user can control the density of selected individuals within a particular area. For example, the user can desire to select a subset of individuals within a particular area. This selection can be based on a percentage of individuals, demographic data, sex, race, economic status, age, level of education, income level and employment, psychiatric data, medical data, a personality trait, an interest, values, attitudes, lifestyles, opinions, preferences, likes or dislikes, predilections, purchase history, browser history, financial history and data, credit history and data, personal history and data, other activity data, and the like.

Although embodiments describe factors or options available to a user control, it is appreciated that these factors or options can be automated using an algorithm, and vice versa.

In other embodiments, users can send messages to organizations responsible for maintenance and management of infrastructure. These embodiments will facilitate infrastructure management and allow community residents to take an active role in the maintenance of community infrastructure.

Figure 14:
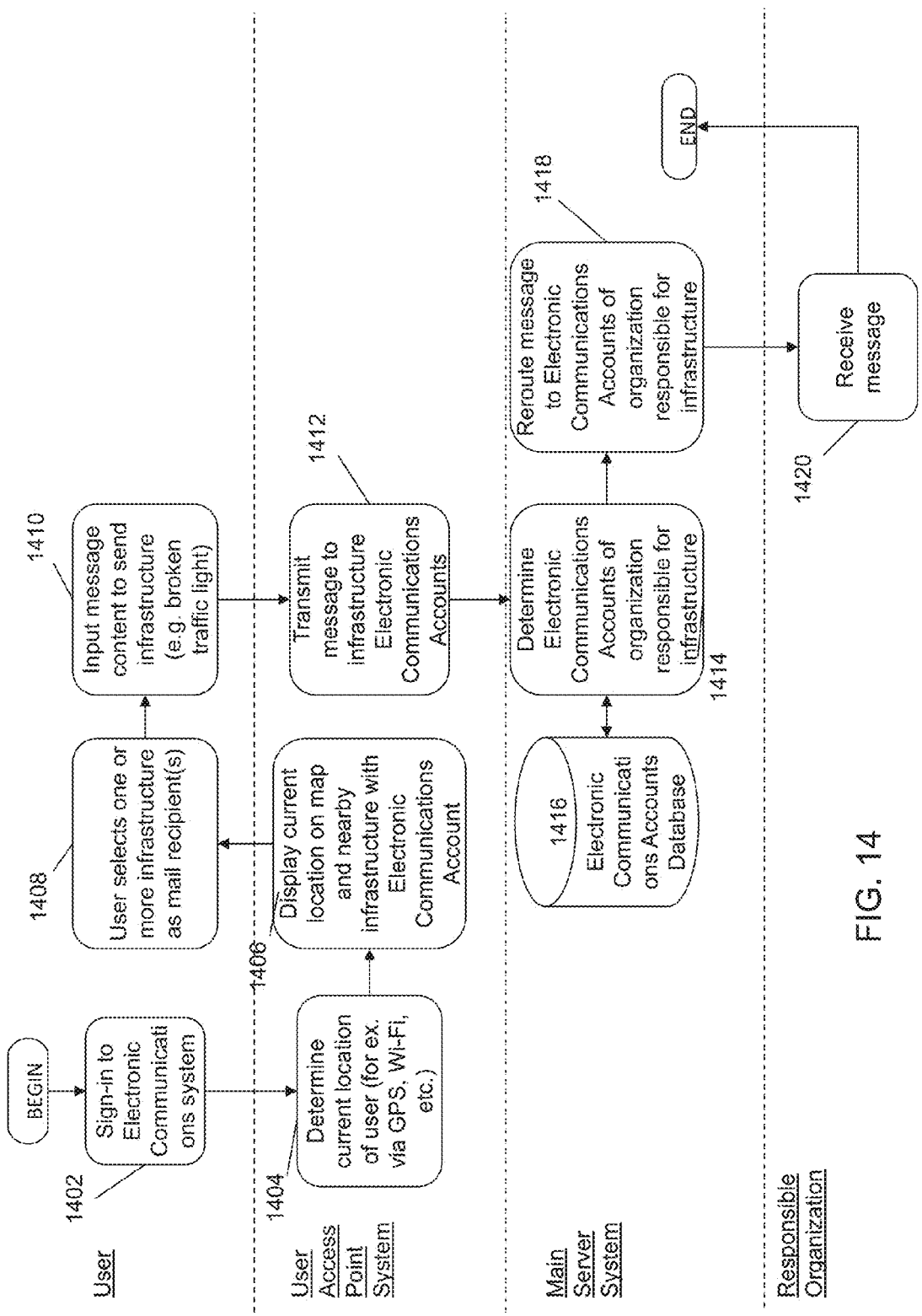
FIG. 14 is a flowchart depicting an embodiment of a method for sending messages related to infrastructure management via an electronic communications account linked to a physical address.

FIG. 14 illustrates a flowchart depicting an embodiment of a method for sending messages related to infrastructure management via an e-mail address linked to a physical address. In this embodiment, a user can access the e-mail address linked to his/her physical address at block 1402. Upon accessing the system, the user access point system can determine the user's current location at block 1404, using GPS, Wi-Fi, or any other available means. This location can be displayed on a generated map at block 1406, which can include the location of nearby infrastructure with linked e-mail addresses. The user can select one or more of the nearby infrastructure as mail recipients at block 1408, and input a message to be sent at block 1410. The user access point system can transmit the message to the selected e-mail addresses at block 1412. Also, the main server system can determine the e-mail addresses linked to the organizations responsible for the maintenance and management of the selected infrastructure using an e-mail database 1416 at block 1414. The main server system can then reroute the inputted message to the e-mail addresses linked to the organizations responsible for the maintenance and management of the selected infrastructure at block 1418. The recipient organizations can then receive the message at block 1420.

In other embodiments, a quick response code or other similar unique code, for example one that can be scanned, can be generated for each electronic communications account. The code can be used as a method of sharing a user's electronic communications account with other users, and can be stored in a database within the main server system. This code can be used in place of the full generated e-mail address and can be read by an imaging device and processed using Reed-Solomon error correction. For example, the unique code can be tied to a fingerprint or DNA of an individual. Scannable codes can be generated and printed to be placed on parcels for delivery. The scannable codes can be used to track packages. The scannable codes can be generated upon entering of an authentication code (for example a password).

Use by First Responders and Law Enforcement

In other embodiments, information about the residents at the physical address linked with a generated e-mail address can be provided to assist first responders, police, fire departments, and any emergency preparedness services. Information provided by users can include the number, names, and ages of residents, special health needs, languages spoken, information about pets, and any other information requested by the specific emergency service provider. Property managers can be required to provide such information about their residents to first responders database. The provided information can be sent to the emergency service provider for use in emergencies and incorporated with the National Incident Management Systems. This database can be invaluable for any emergency preparedness program or emergency operations center. It can guarantee that the applicable authorities have a profile for each residence prior to an emergency, ensuring rescue efforts are planned and executed to save as many lives and resources as possible. The provided information can also be provided to the Department of Transportation at the time of vehicle registration or the granting of a driver's license in order to provide accurate data to first responders or residents home profile for emergency usage. This information can be collected by the government but the data is not used to its full potential. The information can also be provided for a neighborhood watch that can help target specific areas for alerts.

Figure 15A:
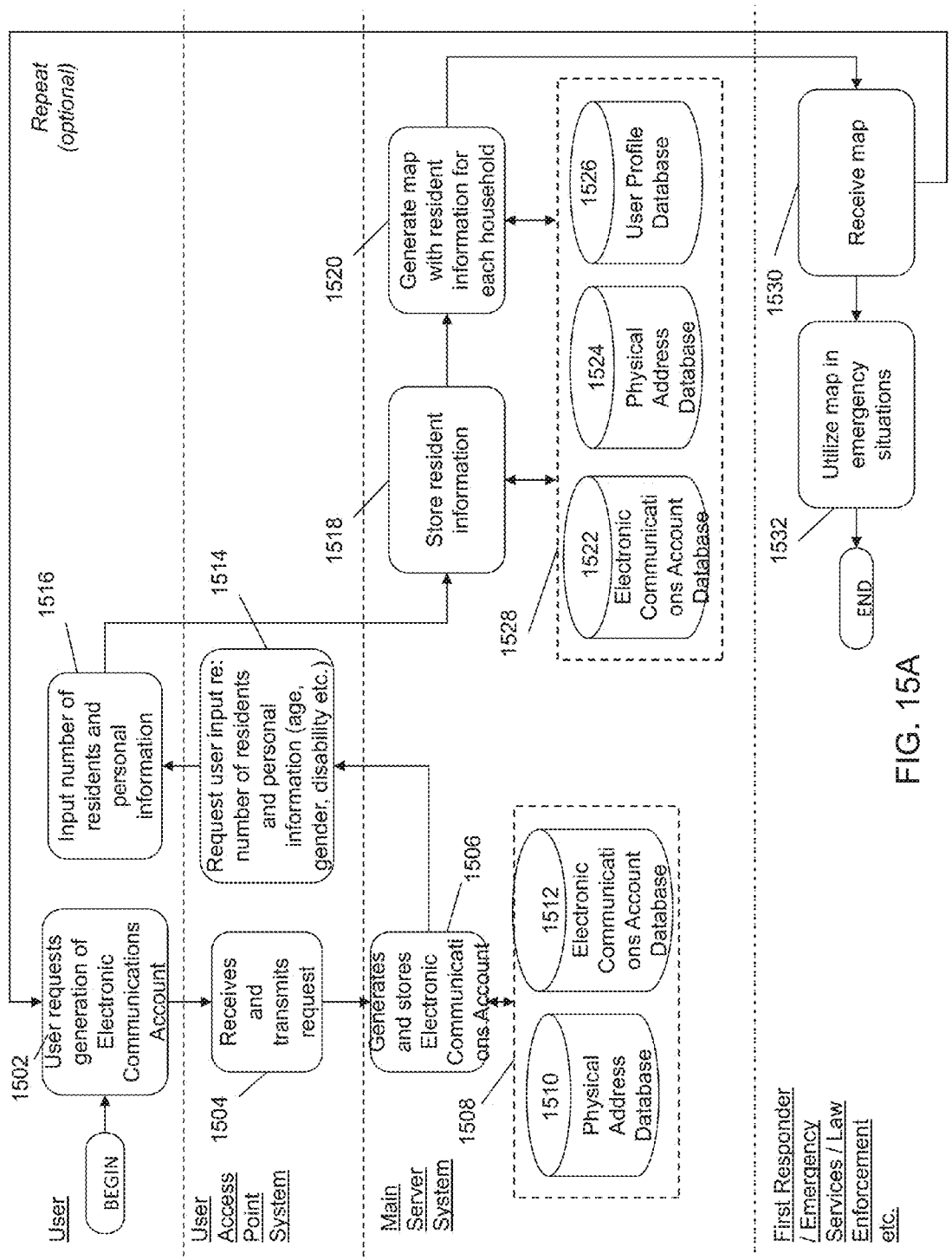
FIG. 15A is a flowchart depicting an embodiment of a method for collecting and sending resident information to recipients via an electronic communications account linked to a physical address.

FIG. 15A is a flowchart depicting an embodiment of a method for collecting and sending resident information to recipients via an email address linked to a physical address. In this embodiment, a user can request generation of an e-mail address linked to a physical address at block 1502, a user access point system can receive and transmit the request to a main server system at block 1504, and the main server system can generate and store the e-mail address linked to the physical address within an electronic communications account database 1512 at block 1506. The physical address can be stored within a physical address database 1510. These databases can form part of a plurality of databases 1508. Upon generation of the e-mail address linked to the physical address, the user access point system can request user input regarding the number of residents at the physical address and the personal information of those residents at block 1514. This personal information can include gender, age, disability status, and any other useful information. Upon input by the user at block 1516, the main server system can store the information in a resident information database 1528 at block 1518. The resident information database can include an electronic communications account database 1522, a physical address database 1524 and a user profile database 1526. These databases can form part of a plurality of databases 1528.

In some embodiments, the main server system can generate a map at any time, showing resident information for each household at block 1520. This map can be sent to the e-mail address linked to emergency services organizations, law enforcement organizations, or any other recipient at block 1530. The recipient can utilize this information in emergency situations at block 1532.

In other embodiments, the system can be used by law enforcement organizations to assist in reporting crimes. Criminal activity at a specific physical address can be reported through the e-mail address associated with that physical address. This can eliminate any doubts about the location at which the crime is occurring.

In other embodiments, the system can be used by law enforcement organizations to assist in ongoing investigations. Law enforcement officials can send e-mails to all the residents in a particular area using any of the embodiments described above, updating them on the status of investigations or alerting them to possible danger. In another variation, residents can use the system to submit tips to law enforcement agencies regarding ongoing investigations. These e-mails can then be consolidated into a centralized database to help investigators in identifying and locating possible witnesses and suspects.

In other embodiments, the applicable authorities can have the ability to communicate critical information to a residence, area, or specific building instantly by e-mail. These emails can contain advice about necessary precautions based on the nature of the emergency, resulting in more efficient evacuations and rescues. The system can facilitate the return of residents to their homes and the assist with post-incident communications and distribution of aid. Similarly, in an ongoing emergency, residents can respond to emergency services via email, advising responders regarding the existence of an emergency or an update on their current status.

FIG. 15B illustrates a diagram depicting an embodiment of electronic communications accounts associated with an area affected by a flood. In this example, the flood plain represents the area affected by the flood. The graphical user interface can display the electronic communications accounts that are in the near vicinity of the affected area. In some embodiments, the first responders and/or the electronic communications accounts can receive this graphical user interface. The electronic communications accounts can be indicated by a marker and/or by another representation. The graphical user interface can display the statuses of the electronic communications accounts. For example, the graphical user interface can show some electronic communications accounts that are in need of help, an unknown status, or a safe status.

The flood plain (and/or an area affected by an incident) can be determined automatically. For example, the flood plain can be determined by sensors determining a characteristic of the situation (for example, the water height of an area).

Figure 16:
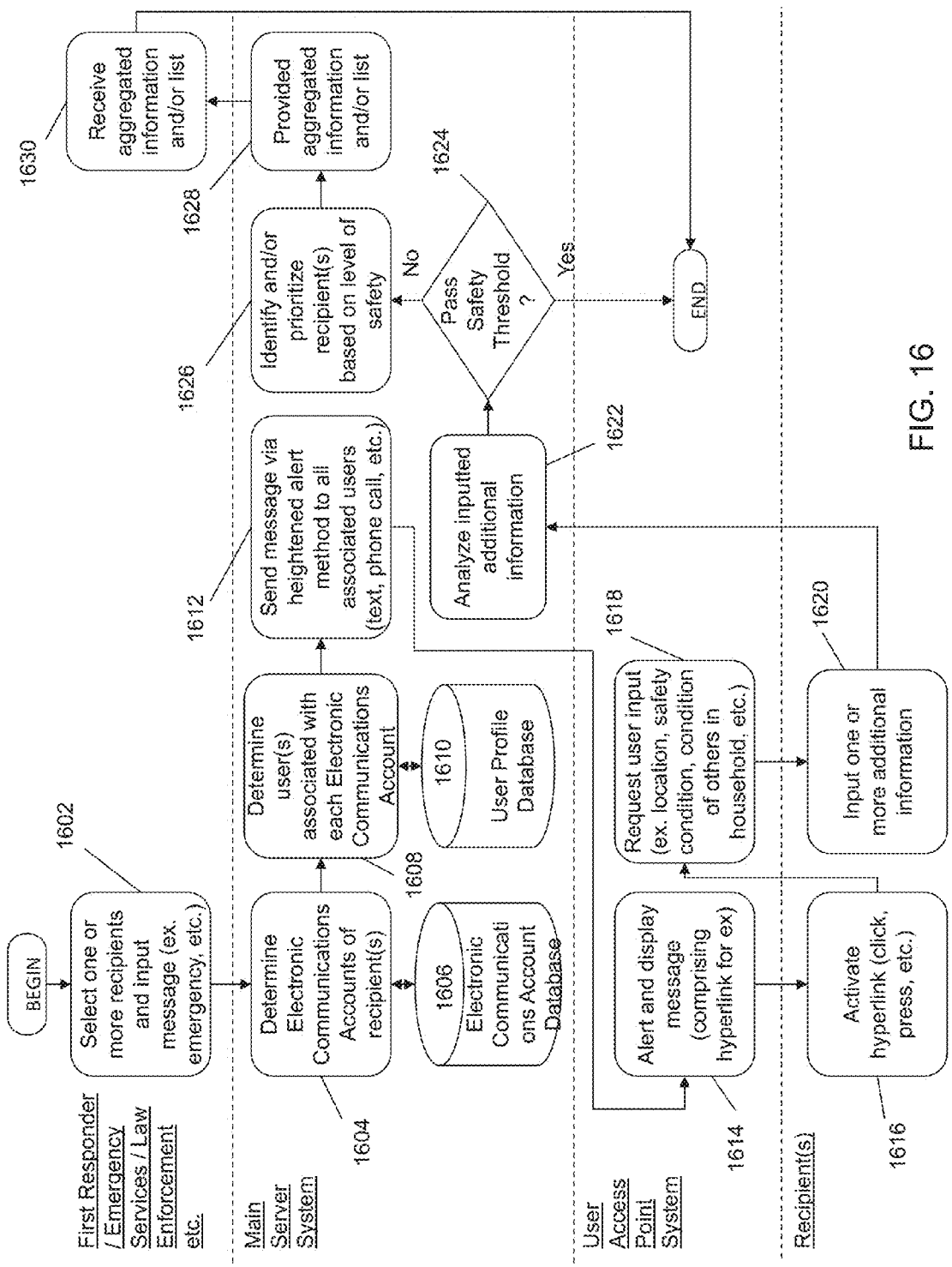
FIG. 16 is a flowchart depicting an embodiment of a method for sending messages to residents via an electronic communications account linked to a physical address.

FIG. 16 illustrates a flowchart depicting an embodiment of a method for sending messages to residents via an email address linked to a physical address. In this embodiment, a sending user, which can be a first responder, emergency service organization, law enforcement organization, or any other entity, can select one or more recipients and input a message to be sent at 1602. The message can be an emergency alert, evacuation information, or any other message. Using an e-mail address database 1606, the main server system can determine the e-mail addresses linked with the physical addresses of the selected recipients at block 1604. The main server system can then use a user profile database 1610 to determine the user or users associated with each e-mail address at block 1608. The system can then send the inputted message via e-mail or another heightened alert method to all associated users at block 1612. This message can consist of a full message or a summary of the message and a hyperlink that links to the full message. The users can access the message through a user access point system at block 1614 and can activate the hyperlink to the full message at block 1616. Upon the user receiving the message, the user access point system can request user input regarding the status of the user, including his/her location, safety condition, condition of others, and/or other useful information at block 1618. Upon user input regarding status at block 1620, the main server system can analyze the inputted information at block 1622 to determine the level of the user's safety at block 1624. For example, if the user input indicates that the user has a broken leg and his/her house is on fire, the system can deem the user's safety to be very unsafe. If the user is determined to have an unsafe status, the system can identify and/or prioritize users based on level of safety at block 1626 and generate an aggregated list of users with an unsafe status at block 1628. This list can be sent to the sending user to assist with the handling of emergency situations at block 1630.

Government bodies, countries or local emergency preparedness entities, civil society and the like, can also create their own database of their metropolis. Using data from census, local community knowledge, and the like, a mapped and/or map-able database can be created for planning purposes. This eAddress database can be configured based on variables such as time (am, pm), date (days of the week, holidays), season, population, geographical characteristic, demographic characteristic, political lines, earthquake faultlines, underground gas or pipelines (urban and rural areas), flood plain areas, and the like. This database can be used for pre-planning and post disaster rescue missions and/or for residents that may not have activated and or signed onto eAddress platform. For example, a University campus, a small town or village or remote mountainous region and the like may create such database. Based on the above, predictable rescue missions can be forecasted using models based on scientific research and area demographics Use by Government and Relief Organizations In another embodiment, government entities can send census forms to every e-mail linked with a physical address. This can reduce delivery time and guarantee delivery to maximize accurate and efficient data collection and response rates. Government entities can also use the system to send voting ballots to users. Voters can then respond using their eAddress and/or electronic communications account. This can reduce congestion at voting centers and allow users who cannot attend the physical voting center to vote remotely.

FIG. 17A is a flowchart depicting an embodiment of a method for determining the primary residence of a user. In this embodiment, the Census Bureau can request census analysis of one or more areas at block 1702. The main server system can retrieve all the e-mail addresses associated with all the physical addresses within the specified areas using an e-mail address database 1706 at block 1704. At block 1708, the system can then retrieve all user profiles associated with the retrieved e-mail addresses using a user profile database 1710. The system can analyze the retrieved user profiles to determine if there are any identical user profiles at block 1712. The system checks for duplicate user profiles to ensure that users are not counted more than once. If there are no identical user profiles, the user profile, e-mail address and physical address of each user in the specified areas can be sent to the Census Bureau at block 1732. If, however, there are identical user profiles associated with multiple e-mail addresses, the system can determine all the physical addresses and e-mail addresses linked with these physical addresses associated with the identical user profiles at block 1714. A message can be generated and sent to each of the user's electronic communications accounts, containing a list of the associated physical addresses and/or e-mail addresses linked with the physical addresses at block 1716. The message can be displayed at a user access point system at block 1718 and the user with multiple e-mail addresses linked with physical addresses can select one of the e-mail addresses or physical addresses as a primary residence may block 1720. The user's location can then be tracked over a system-specified period of time at block 1722 and analyzed to find a user location pattern and determine the actual primary residence of the user at block 1724. If the determined primary residence of the user matches the user-selected primary residence at block 1726, this information can be sent to the Census Bureau at block 1732. Otherwise, the system can prompt the user to confirm the determined primary residence at block 1728. If the user confirms that the determined is primary residence is his/her actual primary residence at block 1730, this information can be sent to the Census Bureau at block 1732. If the user fails to confirm that the determined primary residence is his/her actual primary residence at block 1730, the user can again be prompted to select one of the e-mail addresses or physical addresses as a primary residence at block 1720. This cycle can continue until the determined primary residence matches the user-selected primary residence.

In other embodiments, the system can be used to track people when they are displaced from one area to another. For instance, users that have been displaced by war, natural disaster, or otherwise, can alert support and aid services regarding their condition and new location. In another variation, the displaced users can be tracked using the GPS functionality in their phones. Widespread use of this application can allow aid organizations to organize and execute a relief effort more effectively, and to narrow the search parameters for missing persons from the affected area. The information can also be sent to local authorities from the affected area, who can contact displaced citizens with updates about the situation. Furthermore, use of the system by displaced users can allow for real-time updates on the flow of people over time, including their starting locations, movements, and final destination.

Figure 17B:
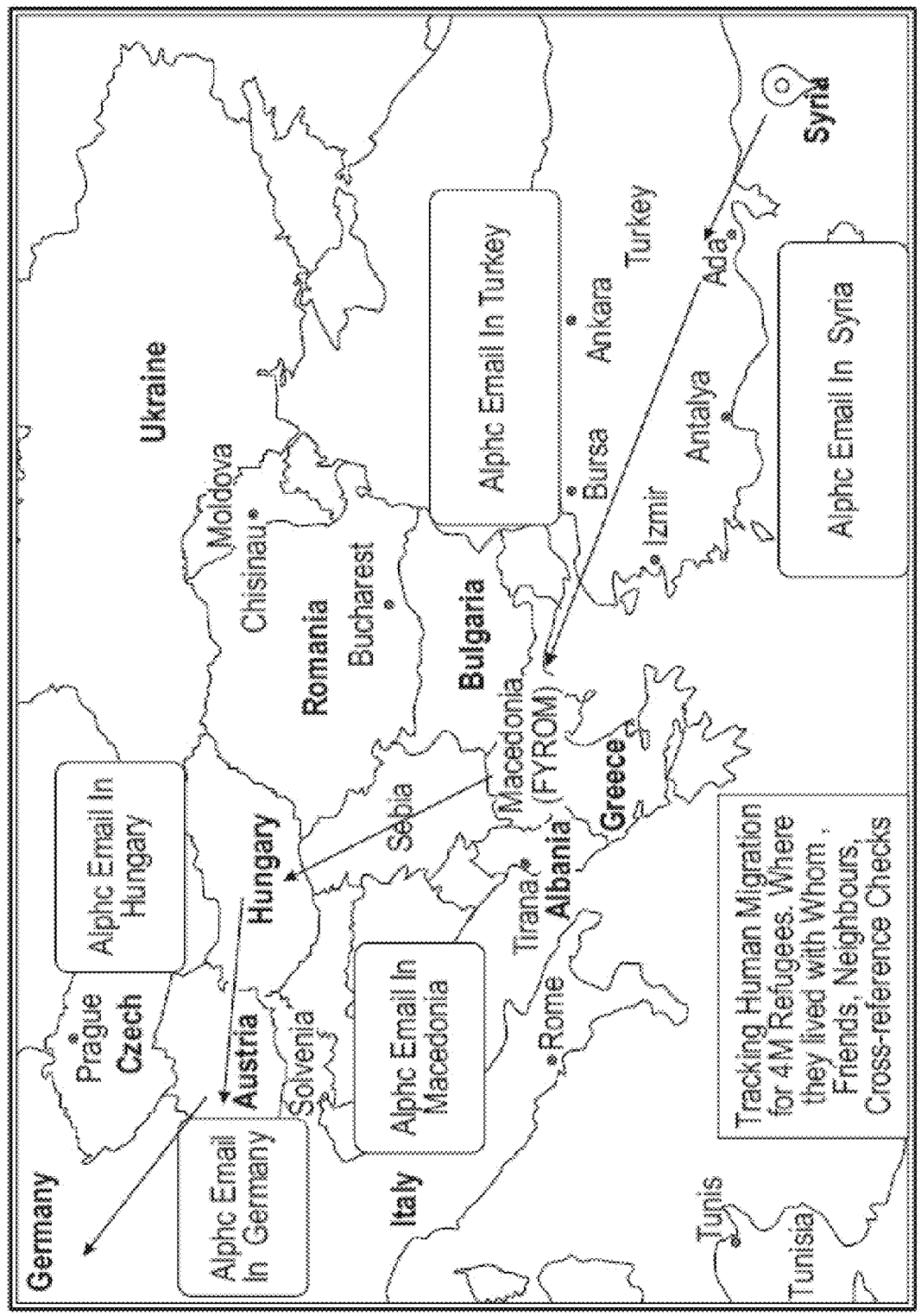
FIG. 17B illustrates a diagram depicting an embodiment of the use of an electronic communications account to track displacement of people.

In some embodiments, the electronic communications system can be used to track displacement of people. For example, during war, a natural disaster, political discourse, or the like, people can move from location to location. FIG. 17B illustrates the use of electronic communications accounts to track displacement of people. For example, FIG. 17B illustrates migration of refugees from Syria, to Turkey, Macedonia, Hungary, Austria, and Germany. During each phase of the migration, aid services and organizations (UNHCR) can track where people were and what type of aid is needed. For example, the names of refugees from Syria can be added to an electronic communications account based on their respective phase of migration. Then, the electronic communications account can be used to notify the refugees of critical information, such as where to go for safety, food, shelter.

This electronic communications system can store information and can be used to identify individuals associated with the electronic communications account at a later time. For example, the government of Syria can contact their citizens 20 years later based on the historical eAddresses of the persons even though the place may not exist.

Individuals associated with an electronic communications account can be cross referenced and linked. For example, Immigration Services can cross reference people associated with a particular electronic communications account and identify family members and friends for each phase of the migration. The electronic communications system can allow individuals to contact family members and friends through the electronic communications account.

The electronic communications system can also track past history of individuals. For example, the electronic communications system can help track where the individuals came from and provide valuable information for Border and Immigration Services.

Police service can use electronic communications account as another form of gathering data to map activities and complaints as required and based on needs.

Use by Financial Institutions, Utilities, and Creditors

In other embodiments, bills or bank statements can be sent to the e-mail address linked with a physical address, rather than through physical mail. Using this embodiment can guarantee delivery, so that creditors need not worry about mail disruption and delivery failures.

In other embodiments, utility companies can use this system to instantly contact residences regarding interruptions in service and timelines for the restoration of services.

In other embodiments, the e-mail address and associated user profile linked with a physical address can be connected to a financial institution or credit card, so that users can receive communications from the financial institution via e-mail. This can allow users to make payments to the linked financial institution as well as third party creditors. By linking their e-mail to their financial institution, users could also deposit checks by uploading a picture of the check and e-mailing it to the financial institution, as well as request a withdrawal. Using the electronic communications account can add an additional source of security compared to a personal email that can be more easily compromised as we have seen in the endorsements within this document.

In some embodiments, alerts and notifications can be sent to a community or an area. For example, utility companies (such as gas or water) can connect directly with a particular address. Hydro transformers serving a particular area communicate directly with individuals linked with the addresses it serves. In response to a power outage, an email or an alert can be sent to electronic communications accounts associated with the affected homes. Counter-terrorist organizations can use historical electronic communications account information of an individual to track a person's historical movement. This movement can be compared with other individuals to identify similar movement patterns. Cross referencing this data can help identify suspicious individuals and improve counter-terrorism procedures and technology.

EAddresses and/or electronic communications accounts can be linked to a vehicle. For example, electronic communications accounts can be linked to license plates. These electronic communications accounts can be read by Border Services and identify whether other cars are traveling to a destination with a similar pattern based on information associated with the electronic communications account (for example traveling from the same area of the electronic communications account). Rental cars (for example and rented vehicle license plates) can be associated with an electronic communications account for cross reference checks. For example, individuals or suspects can be placed into a database, and the pairing of the license plate by the rental company to their electronic communications account would trigger a red-flag for the relevant authorities at the time of rental. Such additional information and verification procedures can assist with identifying criminals and be an added tool against terrorism activity and the like.

In some embodiments, electronic communications accounts can be used for research and for collecting data and data analysis. For example, epidemics can be traced and associated neighbors of the areas where the epidemic is traced can be notified. The same can be applied for passengers on a plane in close quarters that require to be contacted. Communication can be more fluid and instantaneous to reduce the spread of infection. Person visiting places like hospitals can be contacted should the need arise via the electronic communications account.

Social Media Functionality

In other embodiments, the system can also include social media functionality, so that users in the same area can interact and communicate instantly using their accounts linked to their physical addresses. Users can use the map functionality described in previous embodiments to find other users located in the same area, and connect with them using e-mail and other social media. Social media private accounts can be set up using the electronic communications system. The social media accounts can be private or public (for example based on a user's preference).

User Interface

Figure 17C:
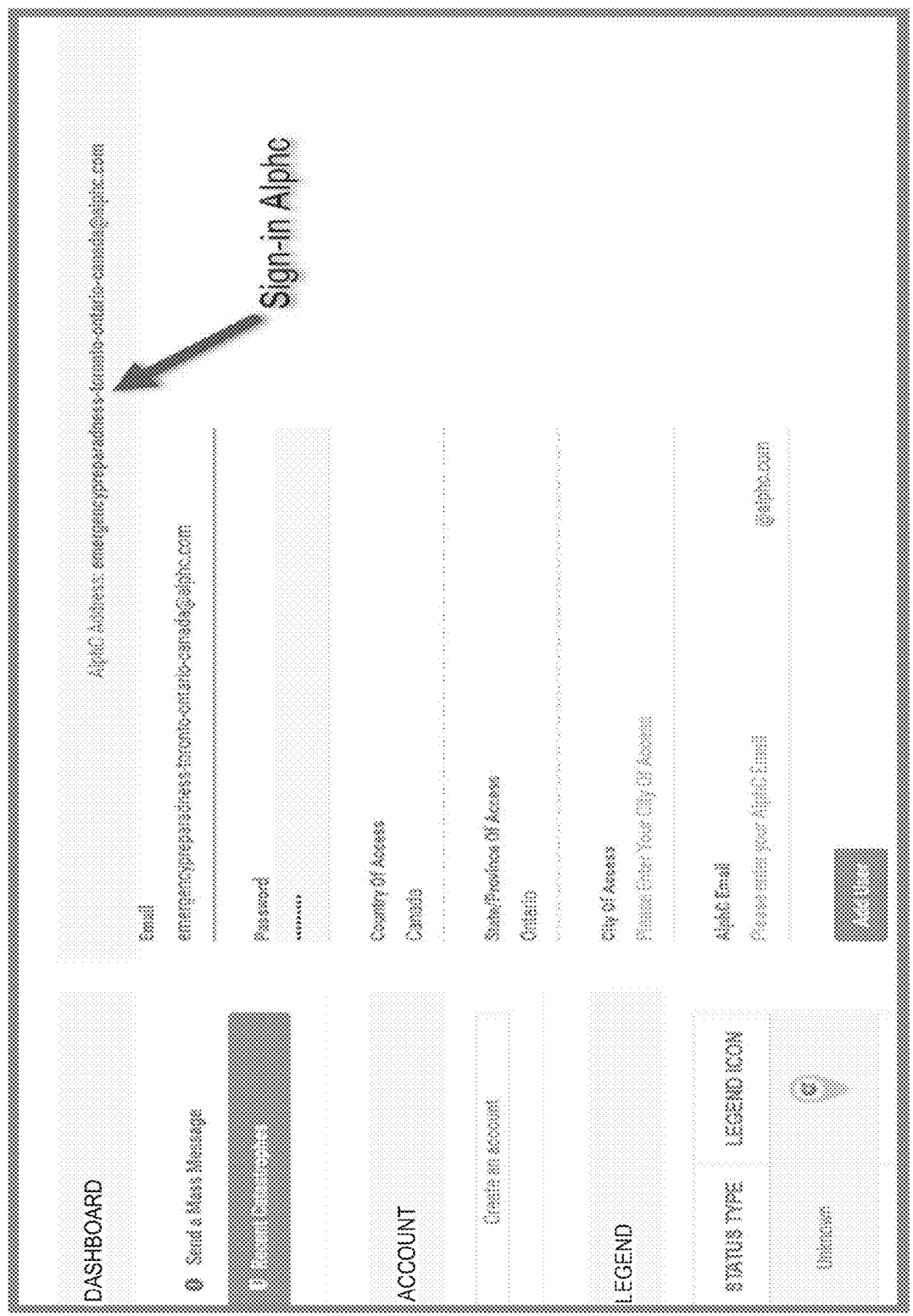
FIG. 17C illustrates a diagram depicting an embodiment of a graphical user interface of a dashboard for the sign-in page by First Responder.

FIG. 17C illustrates a diagram depicting an embodiment of a graphical user interface of a dashboard. In FIG. 17C, first responders can sign into an application (for example a webpage). The electronic communications account for the first responders is illustrated as: emergencypreparedness-toronto-ontario-canada@alphc.com. Accordingly, the receiver of a communication from this electronic communications account can retrieve information associated with the sender. The sign on page includes a section where the electronic communications account is associated with an email address, a location, and a data field to enter in a password. New users can also be added to the electronic communications account, such as supplemental users as described above.

Figure 17D:
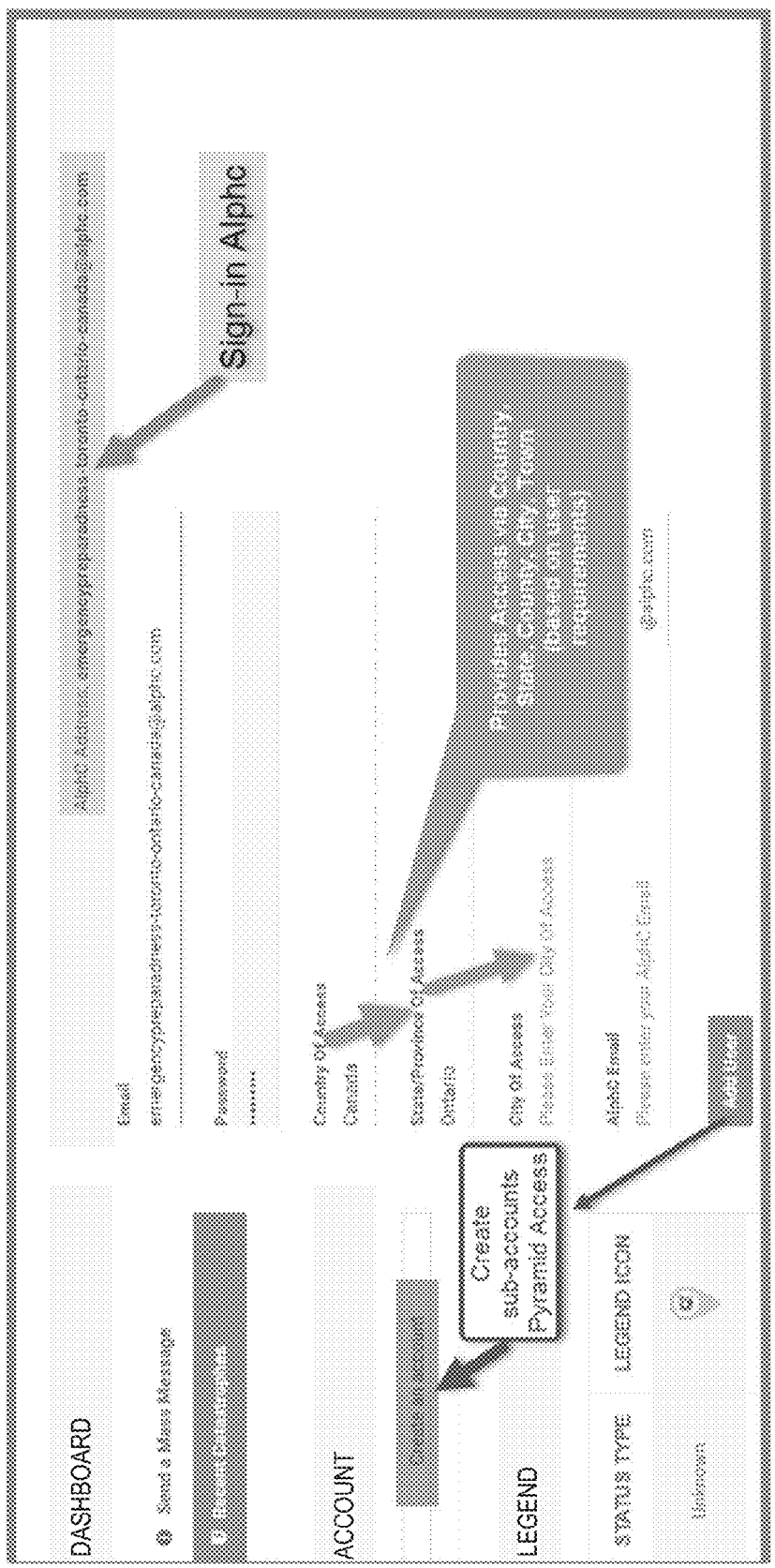
FIG. 17D illustrates a diagram depicting an embodiment of creating a new account by an Emergency Preparedness team member.

FIG. 17D illustrates a diagram depicting an embodiment of creating a new account. In FIG. 17D, an individual can create a new account and add an email, an address (for example country, state, county, city, town, street name, and number), an electronic communications account, and other information to be tied with the electronic communications account. Sub-accounts can also be created under an electronic communications account. For example, supplemental users can have varying levels of access to the electronic communications account. The sub-accounts can create a pyramid access.

Figure 17E:
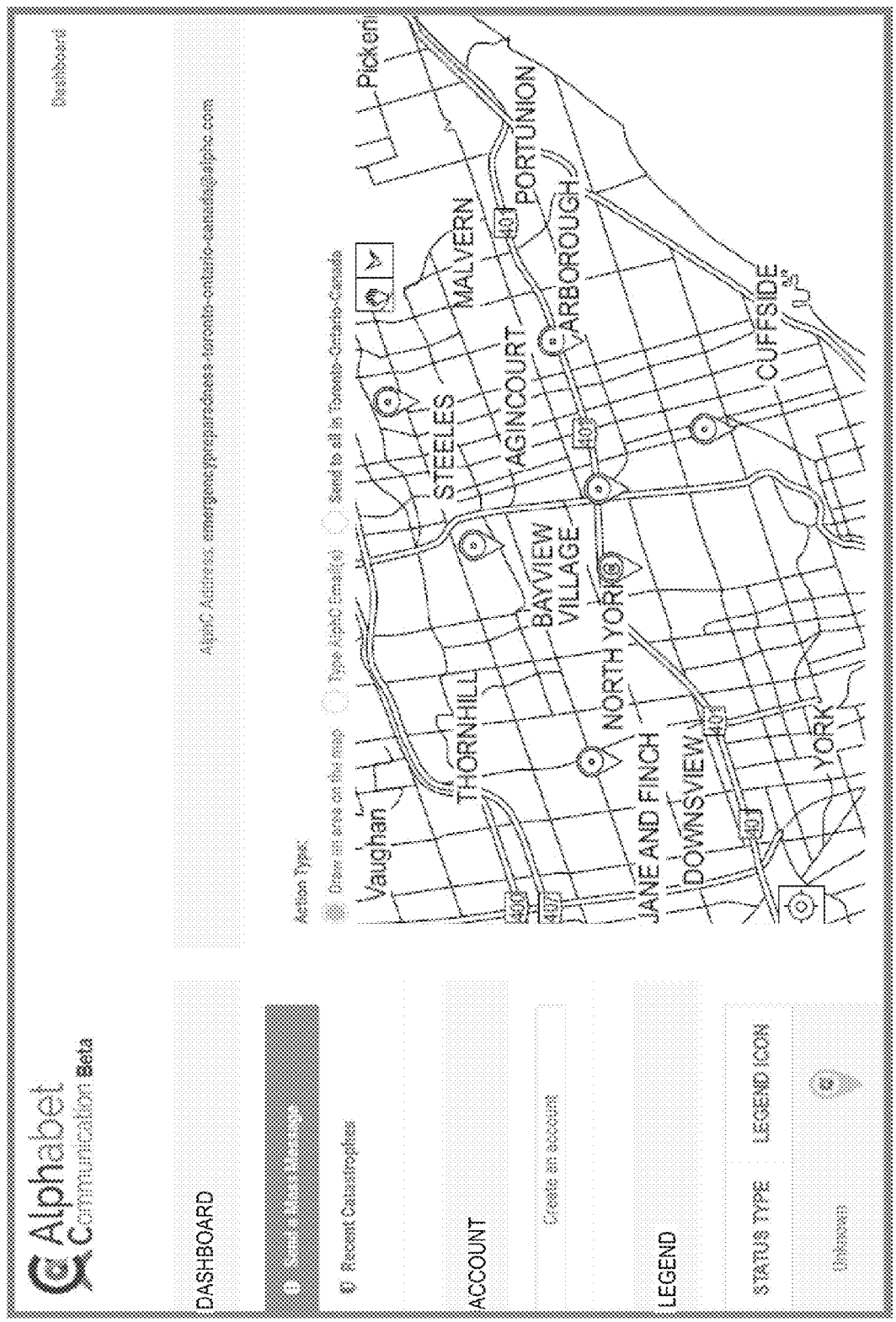
FIG. 17E illustrates an embodiment of how a first responder can send a message to a particular area.

FIG. 17E illustrates an embodiment of how a first responder can send a message to a particular area. In this embodiment, first responders can see how many people are signed onto the area by the pins on the map. First responders can send a message to a select group of users identified on the map. For example, first responders can send a message by drawing an area on the map, typing an electronic communications accounts (for example AlphC emails), or send to a category of users (for example send to all Toronto-Ontario-Canada users).

Figure 17F:
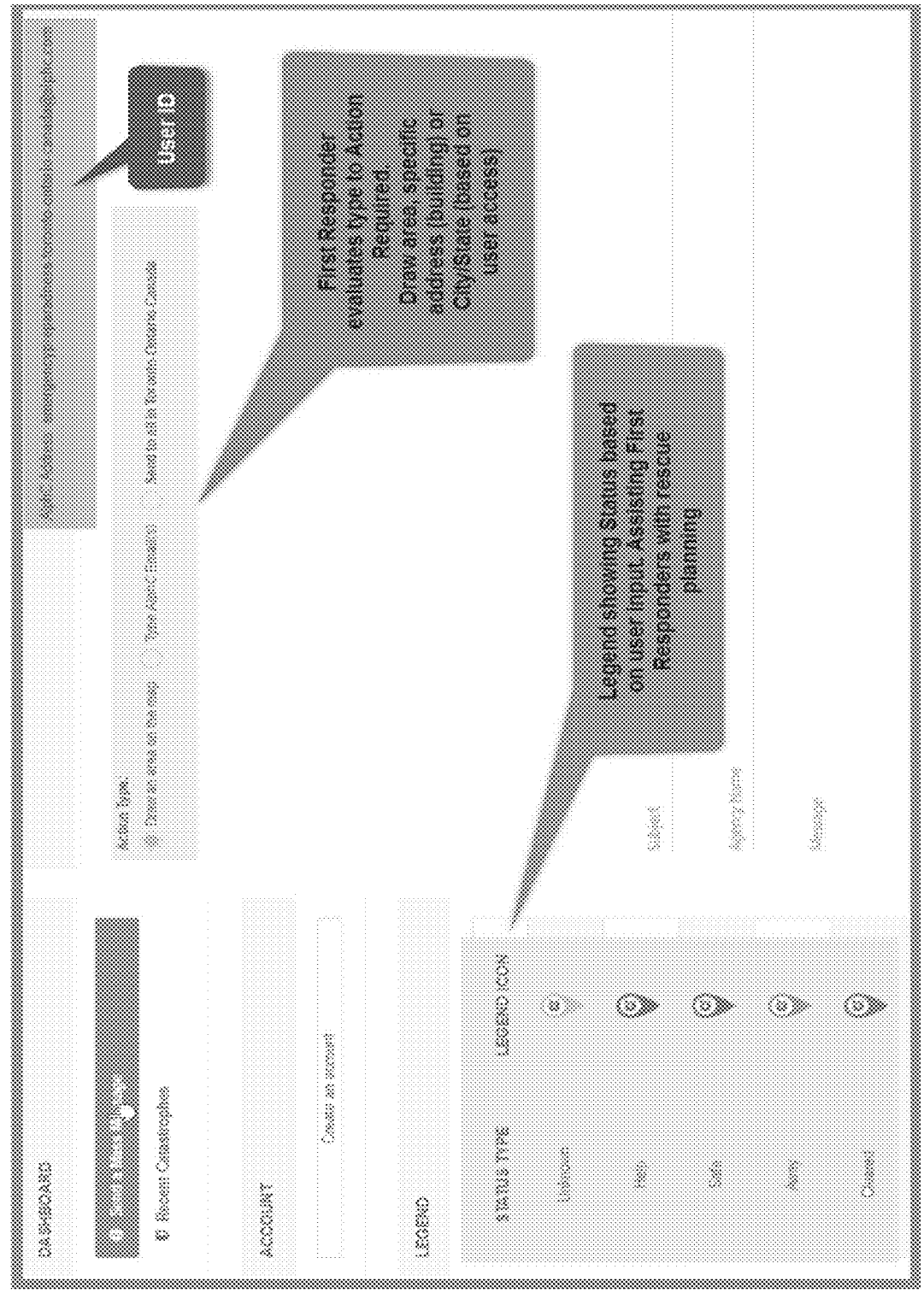
FIG. 17F illustrates an embodiment of a graphical user interface where a first responder can select an option to send a message.

FIG. 17F illustrates an embodiment of a graphical user interface where a first responder can select an option to send a message. The User ID can be the electronic communications account associated with the first responder. The legend can show the status of individuals associated with a particular address. Characteristics of the legend icon can indicate the status of the electronic communications account. For example, the colors of the icon can indicate different statuses (for example unknown, need help, safe, away, cleared). The first responder can select a particular action to select where the message will be sent. For example, the first responder can draw an area on a map. The first responder can type in an electronic communications account (for example an AlphC email), or send to a group of electronic communications accounts (for example all electronic communications accounts associated with Toronto, Ontario, Canada).

Figure 17G:
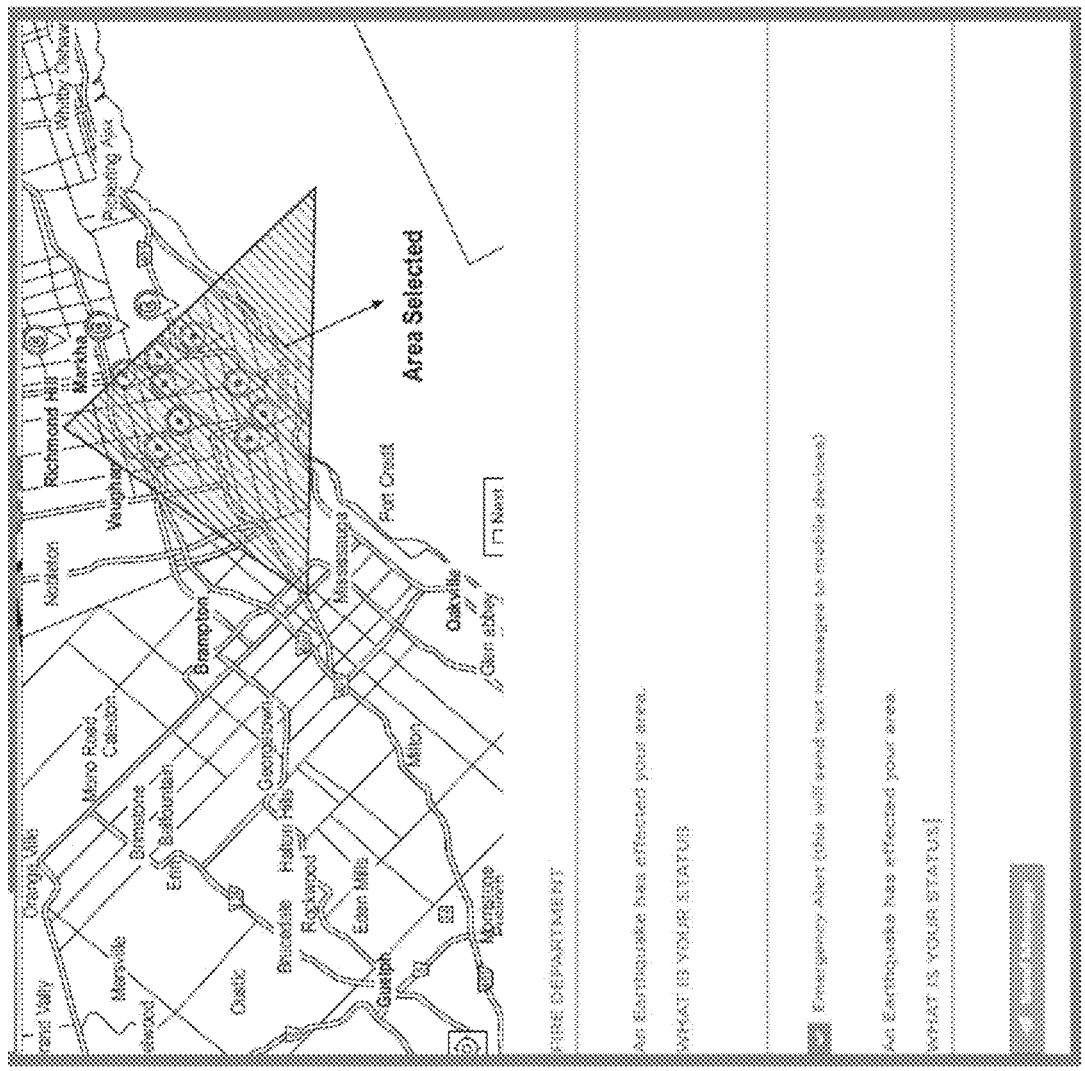
FIG. 17G illustrates an embodiment of a graphical user interface where a first responder has drawn an area on a map.

FIG. 17G illustrates an embodiment of a graphical user interface where a first responder has drawn an area on a map. This area can be automatically selected based on characteristics, such as boundaries for a community, a radius or distance from a location, bordering on a particular street, near a landmark or site, or the like. The area can also be selected by a first responder. For example, the user can select four points on the map whereby the area as illustrated by FIG. 17E-1 is created.

Figure 17H:
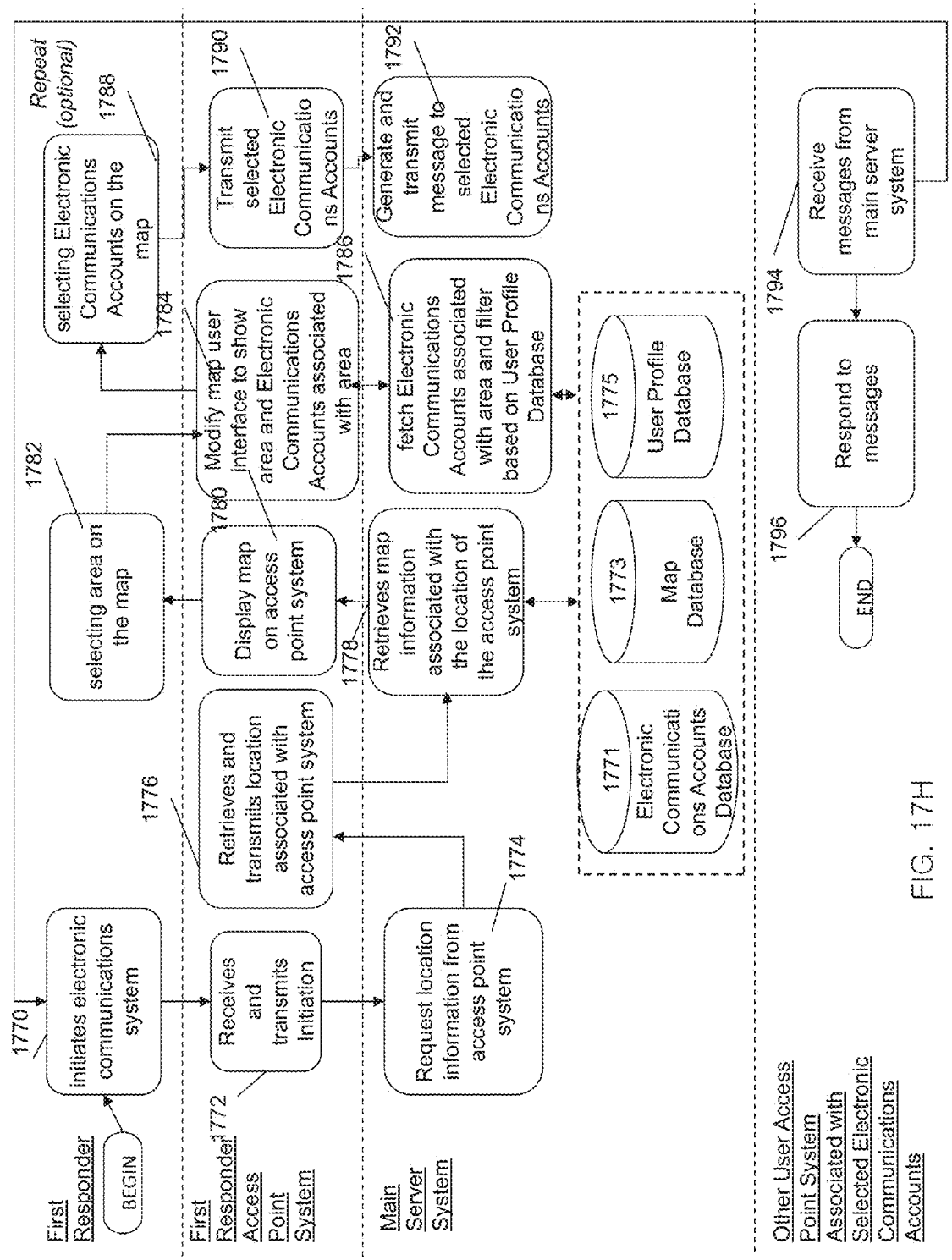
FIG. 17H illustrates a flowchart depicting an embodiment of a method for a first responder sending a message to an electronic communications account.

FIG. 17H illustrates a flowchart depicting an embodiment of a method for a first responder sending a message to an electronic communications account. At block 1770, the first responder can initiate an electronic communications system. The electronic communications system can be initiated via opening an application such as on a user device. At block 1772, the first responder access point system receives and transmits the initiation of the system to the main server system.

The main server system can request locational information from the access point system at block 1774. In some embodiments, the location information can be automatically determined based on prior data retrieved from the first responder access point system. In some embodiments, the location information can automatically be pulled from the access point system, or other system, to identify the current location.

At block 1776, the first responder access point system retrieves and transmits location of the access point system. At block 1779, the main server system can retrieve map information associated with the location of the access point system. The map information can be retrieved from a map database 1773.

At block 1780, the first responder access point system can display a map on the first responder access point system, and the user can select an area on the map at block 1782. The area selected on the map can be automatically generated by a user's response such as coordinates or several intersections. The area can be selected via a user's input pointing to certain areas in the map.

At block 1784, the map that is displayed can be updated to show the area of emergency, such as earthquake or other disaster. This area can be sent to the main server system, where the main server system can fetch electronic communications accounts associated with the area and filter based on the User Profile database 1775 at block 1786. For example, a user profile can indicate that the first responder should only receive electronic communications accounts associated with teenagers, persons with certain medical conditions, visitors, or the like. This information can be sent to the first responder access point system and further information can be displayed to the first responder.

The first responder can select certain electronic communications accounts within the area to send a message to, at block 1788. In some embodiments, the first responder can send to all electronic communications accounts in the area. In some embodiments, the first responder can select the area after viewing the electronic communications accounts in the area. In some embodiments, the first responder can select electronic communications accounts within a subset area of the selected area.

The first responder can select electronic communications accounts by choosing the pinned electronic communications accounts on the map. In some embodiments, the first responders can select criteria to send the message based on the emergency.

At block 1790, the first responder access point system can transmit the selected electronic communications accounts to the main server system to generate a message at block 1792. In some embodiments, the first responder access point system can generate and send the message itself. This would help create a form of redundancy; in any case the main server system is unable to send the messages (for example affected by an electromagnetic blast).

At block 1794, the other user access point system associated with the selected electronic communications accounts can receive the messages from the main server system at block 1794. In block 1796, the other user access point system can send a response to the message.

In some embodiments, the first responder access point system can identify the Urgency of the message to be sent and can determine the channel of communication based on the length of the message. For example, if the nature of the message is Urgent it can be sent via Text. Less urgent communication can be sent via Email. Or the first responder can elect to send via both mediums based on their preference and judgement.

Figure 17I:
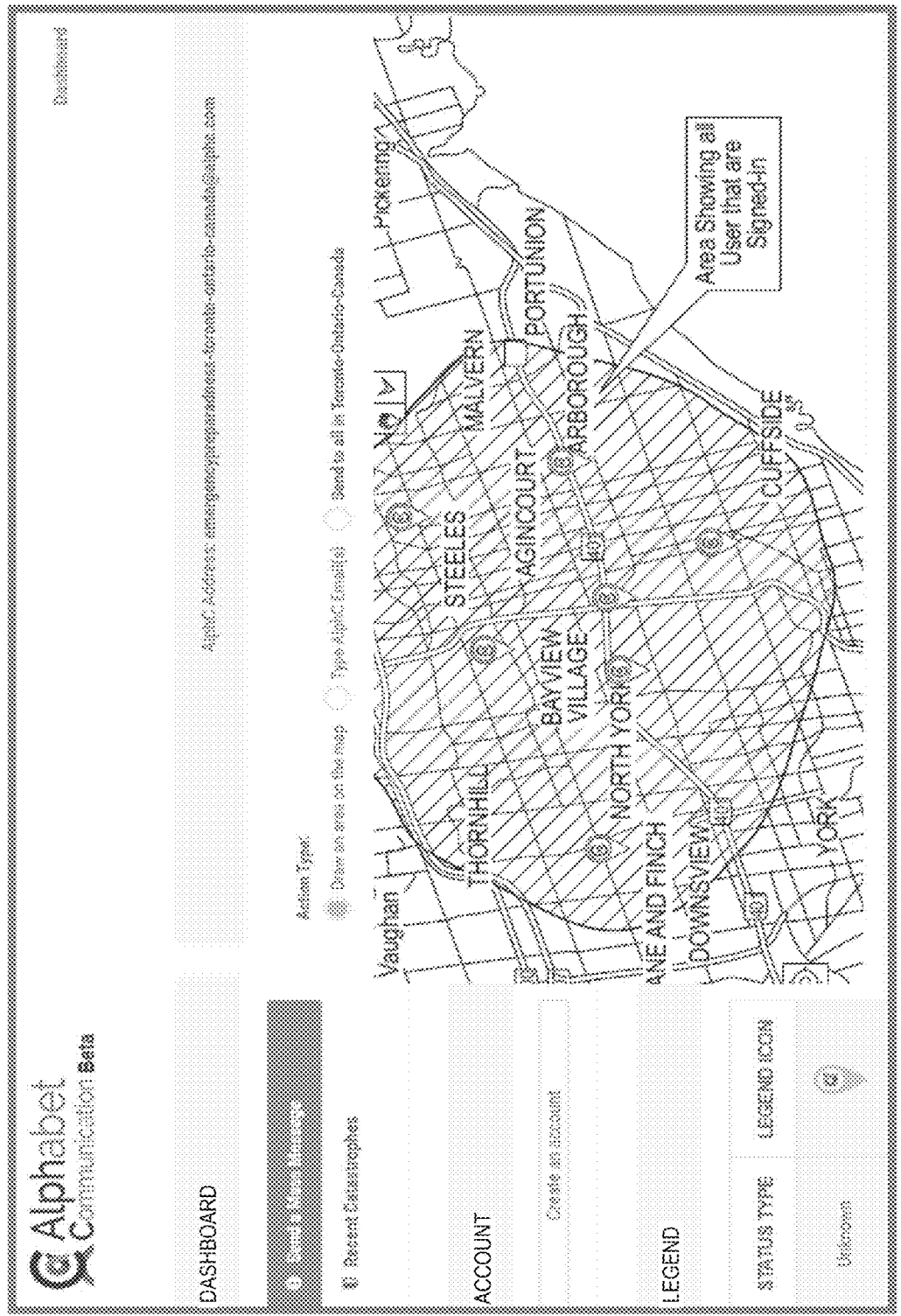
FIG. 17I illustrates an embodiment of electronic communications accounts signed-in and located within the area on a map drawn by the first responders.

FIG. 17I illustrates an embodiment of electronic communications accounts signed-in and located within the area on a map drawn by the first responders. In this example, seven electronic communications accounts are currently signed in and located within the selected area. Accordingly, the message can be sent to all seven electronic communications accounts. In some embodiments, all electronic communications accounts associated with an area is displayed. In some embodiments, a subset of electronic communications accounts is displayed. For example, the electronic communications system can identify a user profile and depending on the first responder profile, the electronic communications system can filter certain electronic communications accounts from the map. For example, an ambulance first responder can display electronic communications accounts associated with individuals in need of medical attention, whereas police first responders can get notified of electronic communications accounts of criminals in the area.

Figure 17J:
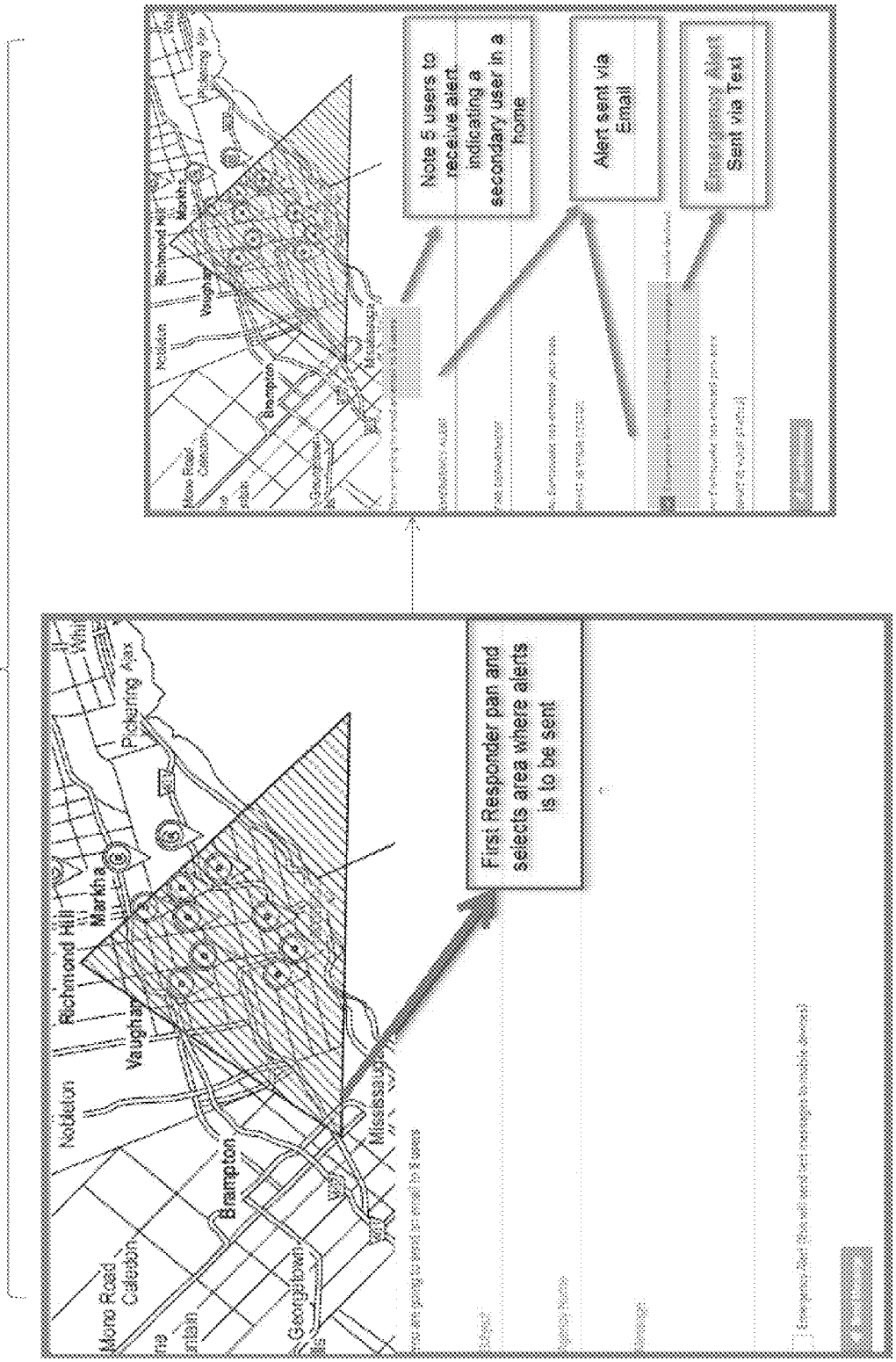
FIG. 17J illustrates an embodiment where the first responders select a subset of electronic communications accounts signed-in and located within an area on a map by drawing a boundary around the subset of electronic communications accounts and an example of an Alert to be sent.

FIG. 17J illustrates an embodiment where the first responders select a subset of electronic communications accounts signed-in and located within an area on a map by drawing a boundary around the subset of electronic communications accounts. Thus, the electronic communications system would only send the message to the subset selected by the first responders. Also shown in FIG. 17J, the first responders can select additional options and the graphical user interface displays additional information. For example, although only 4 electronic communications accounts are selected, the electronic communications system is sending an alert to 5 users, indicating a secondary user associated with one of the electronic communications accounts (for example, an additional user residing at the physical address associated with the electronic communications accounts). Furthermore, the graphical user interface notes that the alert is sent via email. The graphical user interface allows the first responders to select an option for an emergency alert, whereby a different channel of communication can be used (for example a text message).

In some embodiments, selecting an area displays how many users the communication will be sent to. The graphical user interface can allow the user to enter in the alert (for example that an earthquake has affected your area), a department (for example from the fire department), request for a particular status (for example in trouble, in a fire, safe), or the like. The message can be sent to communication channels associated with the electronic communications account (for example text message, mobile phone application, email address).

Figure 17K:
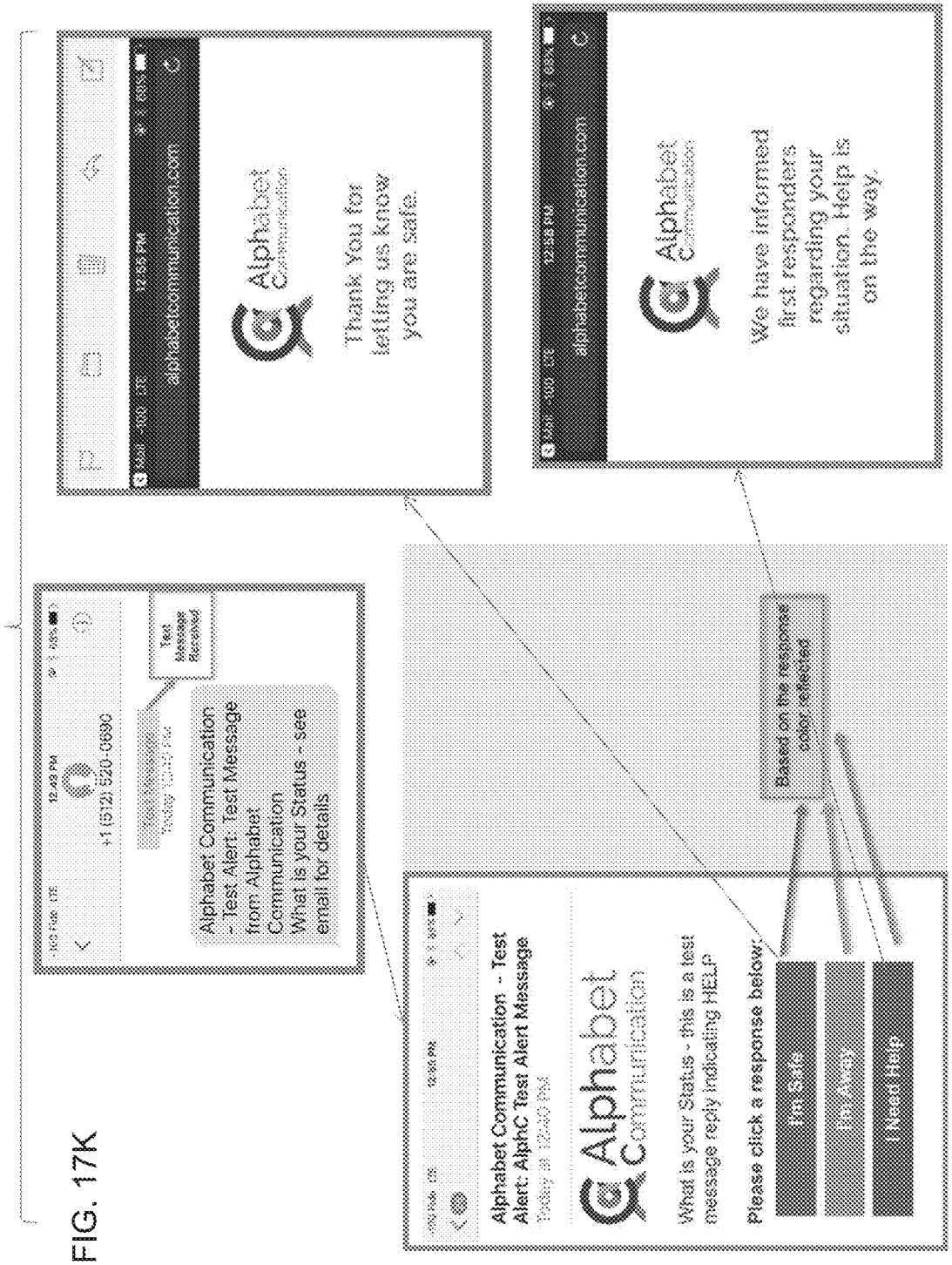
FIG. 17K is a diagram depicting an embodiment of a graphical user interface of the messages sent to individuals associated with the electronic communications account.

FIG. 17K is a diagram depicting an embodiment of a graphical user interface of the messages sent to individuals associated with the electronic communications account. In this example, a text message is sent for the alert. The text message includes content for the alert (for example a test message for the communication). The text message can request the status of the user. The text message can also indicate when the text message was sent and/or received. The alert includes a notification of the danger (for example Urgent, please stay in your homes. Heavy flooding reported in your area. We will be coming to evacuate you.)

The notification can include a response mechanism for the individual, as described throughout this disclosure. In this example, the notification includes the option to respond that the individual is safe, away, or in need of help. Based on the response, the color of the icon can be reflected. For example, if the response is that the individual is safe, then the icon can be colored in blue, if away then in green, and if in need then in red.

If the individual response that he or she is safe, the electronic communications system can acknowledge that the individual is safe. If the individual response that he or she needs help, the electronic communications system can acknowledge the response and note that first responders are on their way. This system can save many lives by creating a system that enables quick and reliable communication between first responders and individuals in the area.

In some embodiments, the context of the message can be determined based on the appropriate communication channel. For example, a text message can include minimal text alerting the individual of a warning. The alert can include a link (for example a hyperlink) that the user can select to obtain further information.

Figure 17L:
FIG. 17L illustrates a diagram depicting an embodiment whereby in response to a user clicking the "I need help" option, further options can be displayed.

FIG. 17L illustrates a diagram whereby in response to a user clicking the "I need help" option, further options can be displayed. For example, an "I am home" or "help not home" options can be displayed. Providing easily selectable further questioning can help custom tailor the messages to the first responders based on the further selections made. For example, if the "help not home" option is selected, then the message can include an indication of the new location and the type of assistance required. The new location can be automatically generated by a user device, inputted in by the user, and the like. The new location can be displayed on the first responder map with other useful information for the first responder. For example, type of assistance required, age, any special needs traffic data, weather data, accident data, miles per hour data, can be provided. Such information can be helpful for first responders, such as helping first responders finding the fastest route to the user.

Figure 17M:
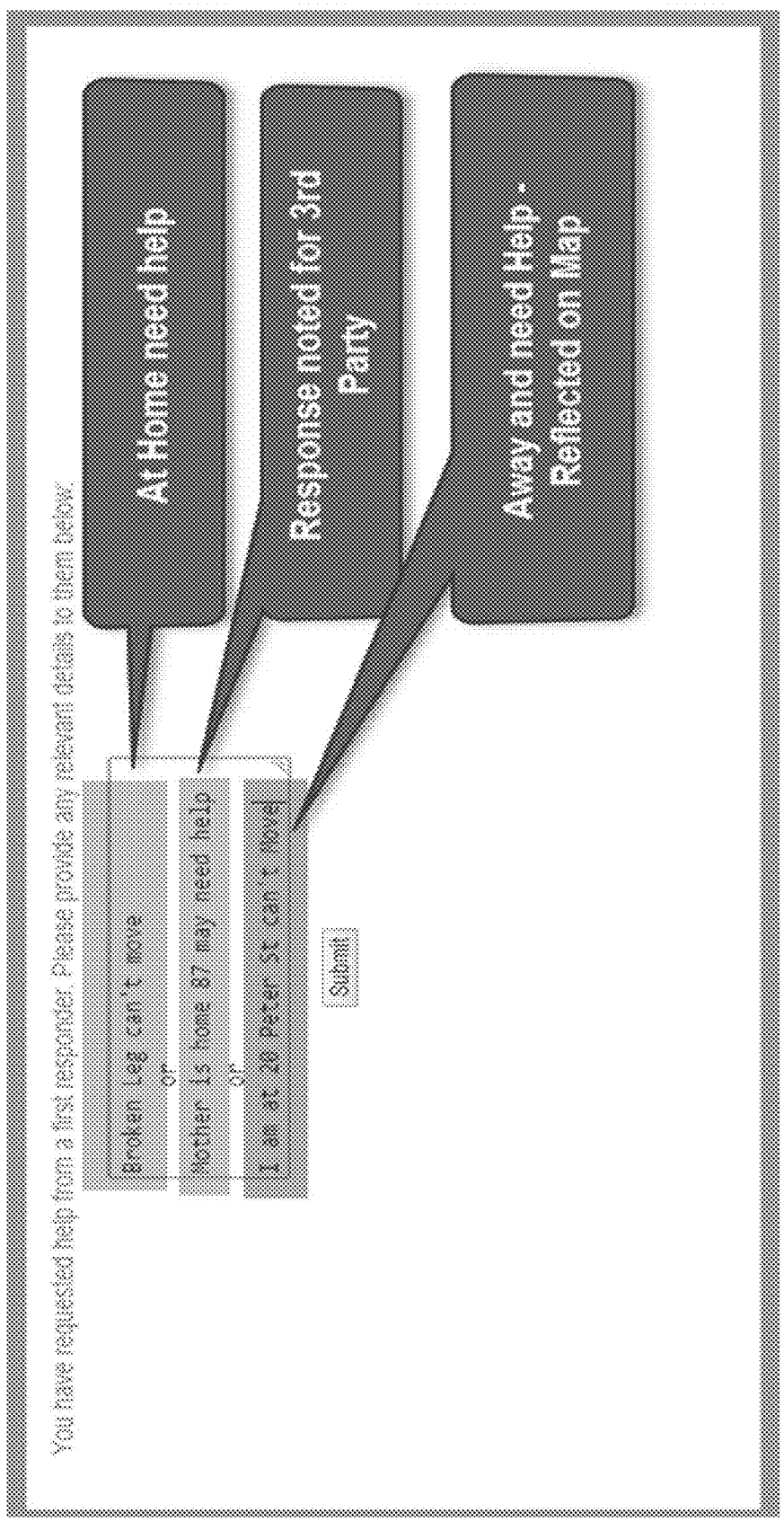
FIG. 17M illustrates a graphical user interface depicting an embodiment where a specific help request is sent to a first responder based on a need.

FIG. 17M illustrates an exemplary graphical user interface where a help request is sent to a first responder. The request for help can include further information regarding the request for help. The request can include information that can be selected, such as in the example of FIG. 17M, showing an example of three entries. A broken leg and cannot move, mother is home and may need help, and I am at location 20 Peter St. but cannot move. In some embodiments, the user can further customize its request for help. For example, the user can enter in text or record a command or audio/video to send to the first responder. The user can describe the incident and/or show a clip (for example a video clip). The user can provide guidance on the danger at the incident, such as a gas leak. The user can provide information on how to provide guidance and/or the type of particular guidance needed (for example firetrucks, entrance through the back door).

The electronic communications system can assess the response and make further determinations helpful for a first responder. For example, if the user selects a broken leg and cannot move response, then the electronic communications system can determine that the user is at home and in need of help. The electronic communications system can select the urgency of the response, location, and the like. If the user selects that mother is at home and needs help, the electronic communications system can note that the response was referential to another party. The electronic communications system can determine that the response from an electronic communications account is for a concern at a location other than the physical address associated with the electronic communications account.

Figure 17N:
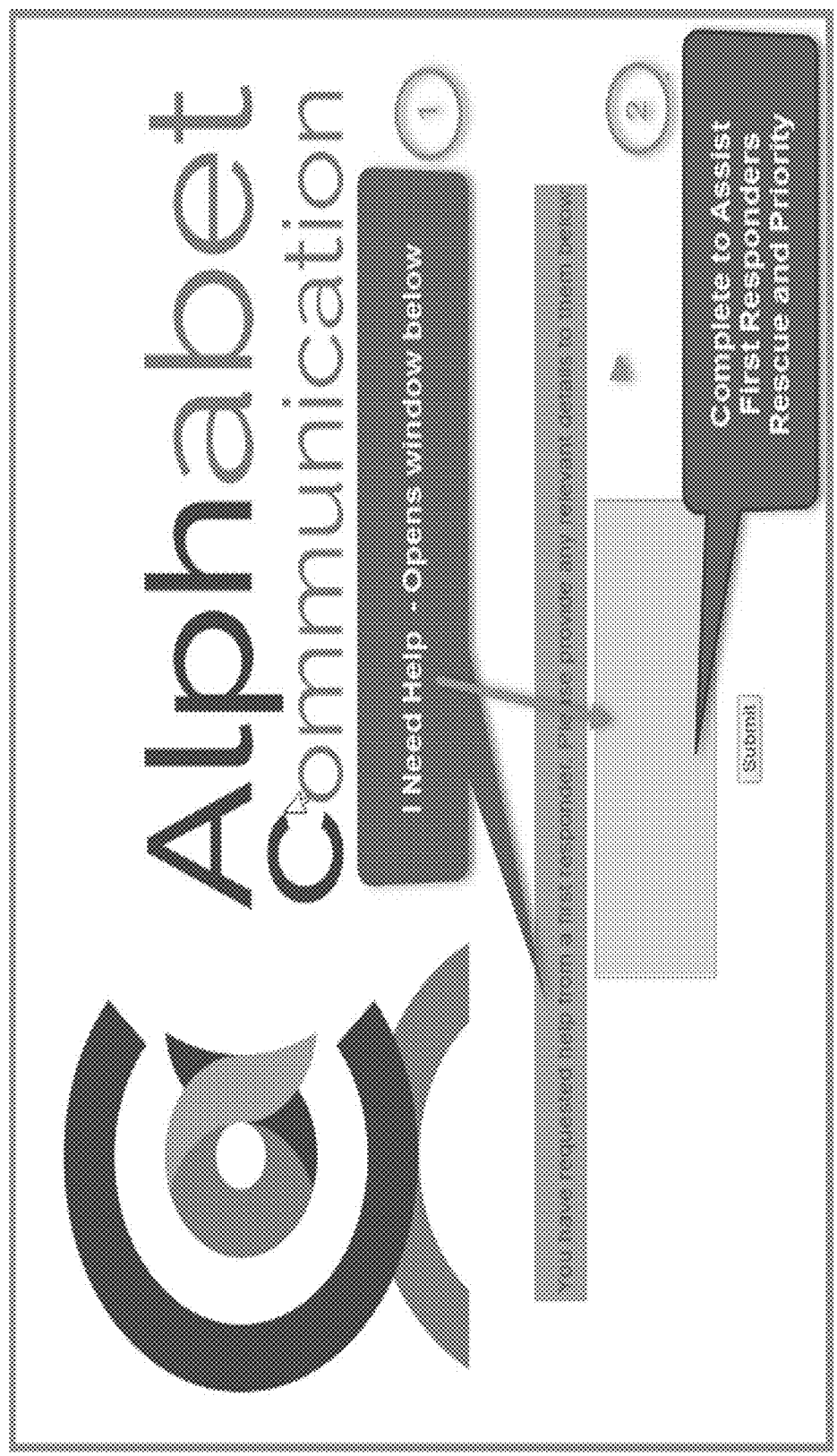
FIG. 17N illustrates a graphical user interface depicting an embodiment of a text box that can be used to enter in text to send to first responders.
Figure 170:
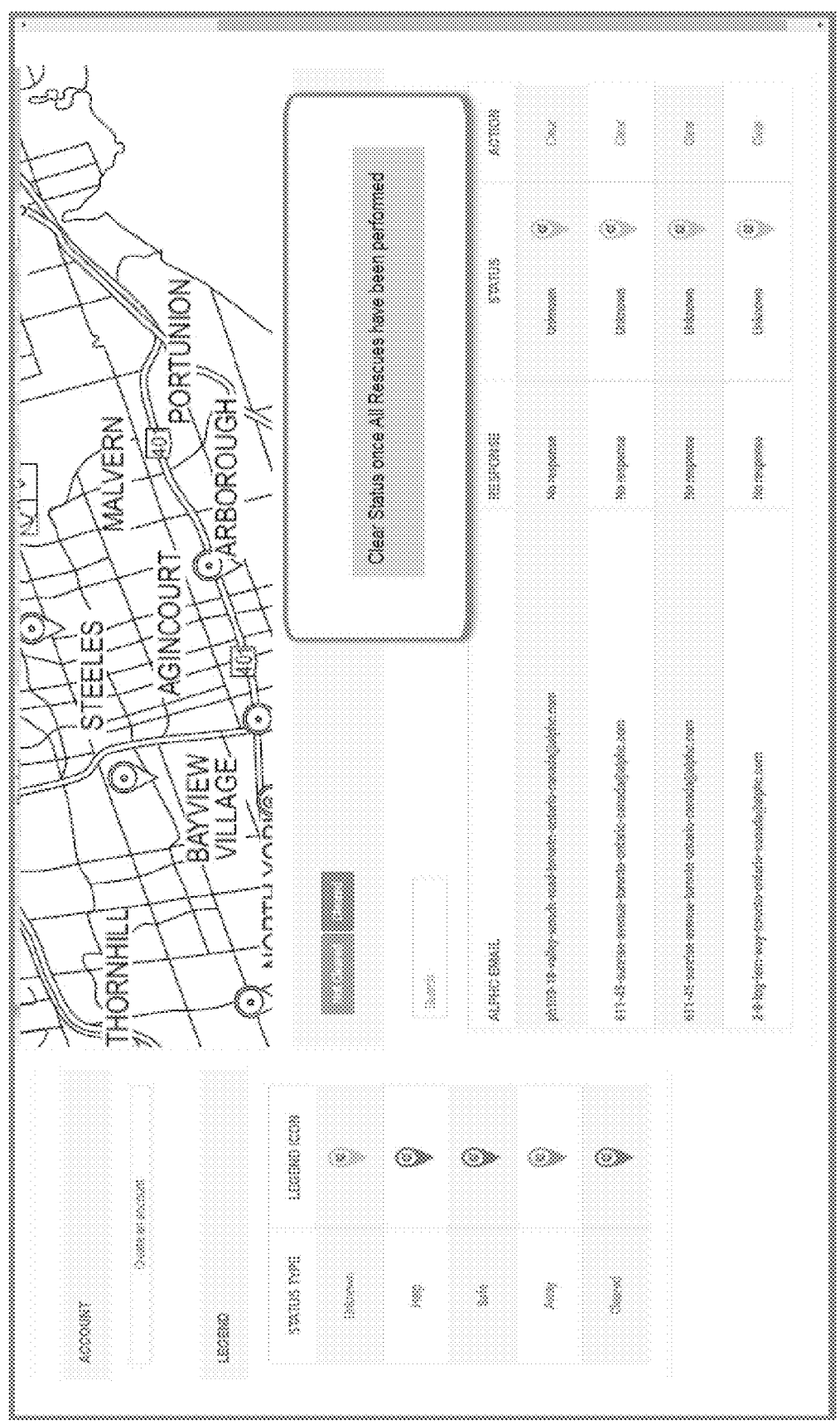

FIG. 17N illustrates an exemplary graphical user interface of a text box that can be used to enter in text to send to first responders. In some embodiments, a voice capture and/or video capture option can be used. Voice recognition and/or image recognition can be used to automatically categorize and assess the response to send to the first responders. In some embodiments, the actual audio and/or video clip can be sent to provide further information on the situation and/or urgency. Under certain circumstances first responders can provide guidance for first aid via live video feed.

FIG. 17O-W is a diagram depicting an embodiment of a graphical user interface for providing information on individuals in an area. FIG. 17O illustrates a graphical user interface upon initiation by a first responder. In this example, several individuals are identified in a particular area. The electronic communications accounts (for example AlphC email) indicate an address and an association to AlphC:

ph103-18-valleywoods-road-toronto-ontario-canada@alphc.com 611-45-sunrise-avenue-toronto-ontario-canada@alphc.com 611-45-sunrise-avenue-toronto-ontario-canada@alphc.com 2-8-log-fern-way-toronto-ontario-canada@alphc.com These individuals are identified but the status is currently unknown and no response has been received. The first responders can have the option of clearing the status of these individuals. The default for individuals can be unknown, or other available status. The default status of the individuals can also be based on a recent assessment on a characteristic of the electronic communications account. For example, the default status can indicate the last location or data usage of the device.

Figure 17P:
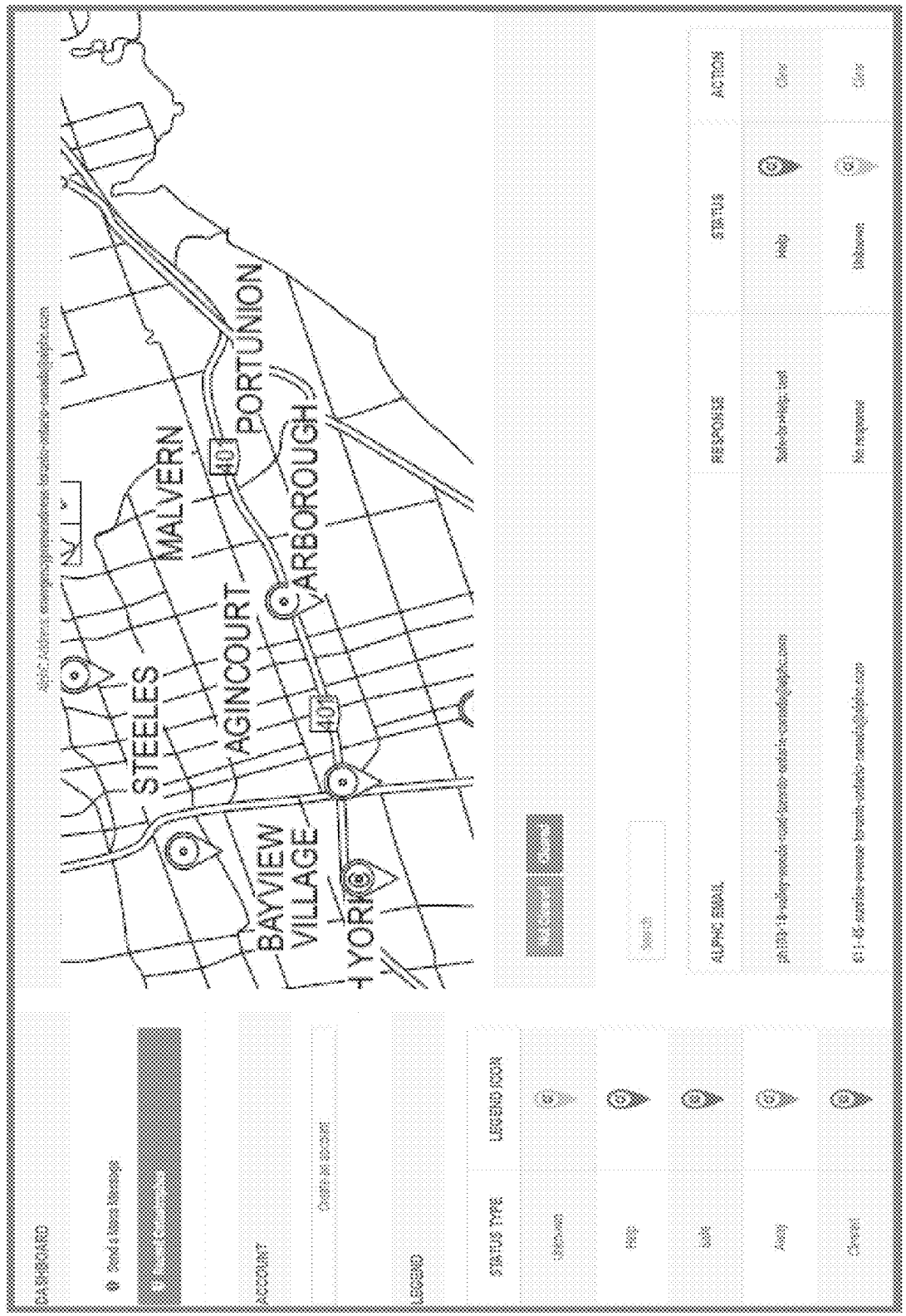
FIG. 17P illustrates a graphical user interface depicting an embodiment where messages have been sent and responses received.

FIG. 17P illustrates an exemplary graphical user interface where messages have been sent and responses received. The graphical user interface can indicate a legend that visually portrays the status of the individuals. For example, a color code can be used to indicate different status types (for example unknown, help, safe, away, cleared). In this example, the individual associated with the electronic communications account ph903-18-valleywoods-road-toronto-ontario-canada@alphc.com indicated that they are in need of help: Thus, the status icon is changed to the color indicative of a help status. The response indicates that this is a test simulation for this individual. The graphical user interface can also display a map with the legend icon indicating the status on the map itself, showing the first responder where the individual in need of help is located.

Figure 17Q:
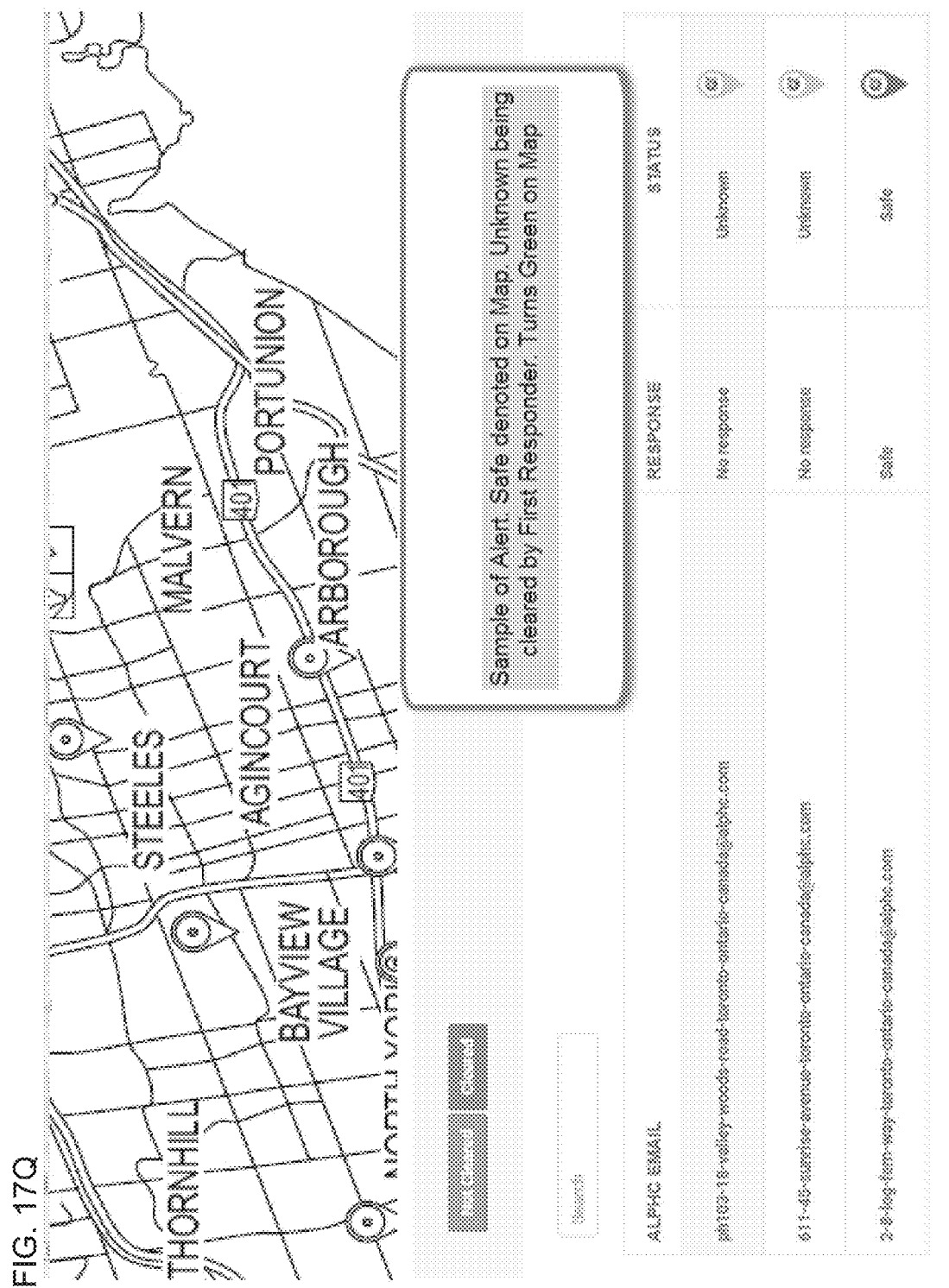
FIG. 17Q illustrates an embodiment of change in status to "safe" reflecting in a change in the icon.

FIG. 17Q illustrates an exemplary change in status to "safe" reflecting in a change in the icon. For example, the electronic communications account2-8-log-fern-way-toronto-ontario-canada@alphc.com responds with a "safe." This is reflected in the response section, the status section, and the icon on the map. The icon can be a change in the icon shape, size, color, or other indication of a change. The first responder has an option to change the status back from safe to not cleared.

Figure 17R:
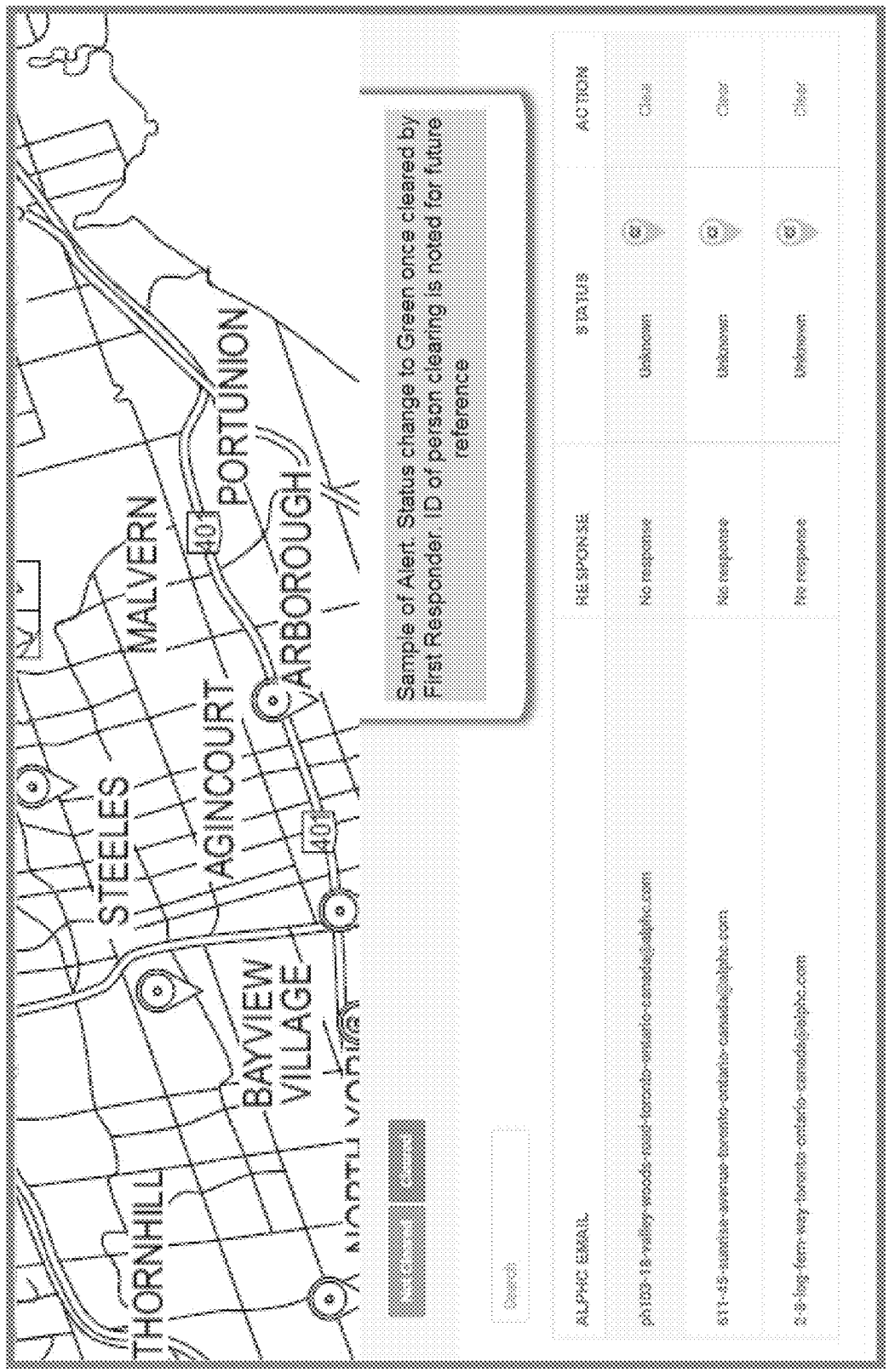
FIG. 17R illustrates an embodiment of change in status to "cleared" reflecting in a change in the icon.

FIG. 17R illustrates an exemplary change in status to "cleared" reflecting in a change in the icon. For example, a first responder can change the status to "cleared" once the first responder responds to the need or identifies that there is no need (or less need). The icon can reflect this change (for example changing to a green color). The identification of the first responder that cleared the electronic communications account can be noted. Based on a "clear" status, the color of the indicator can change to visually display the urgency of an area quickly to a first responder.

Figure 17S:
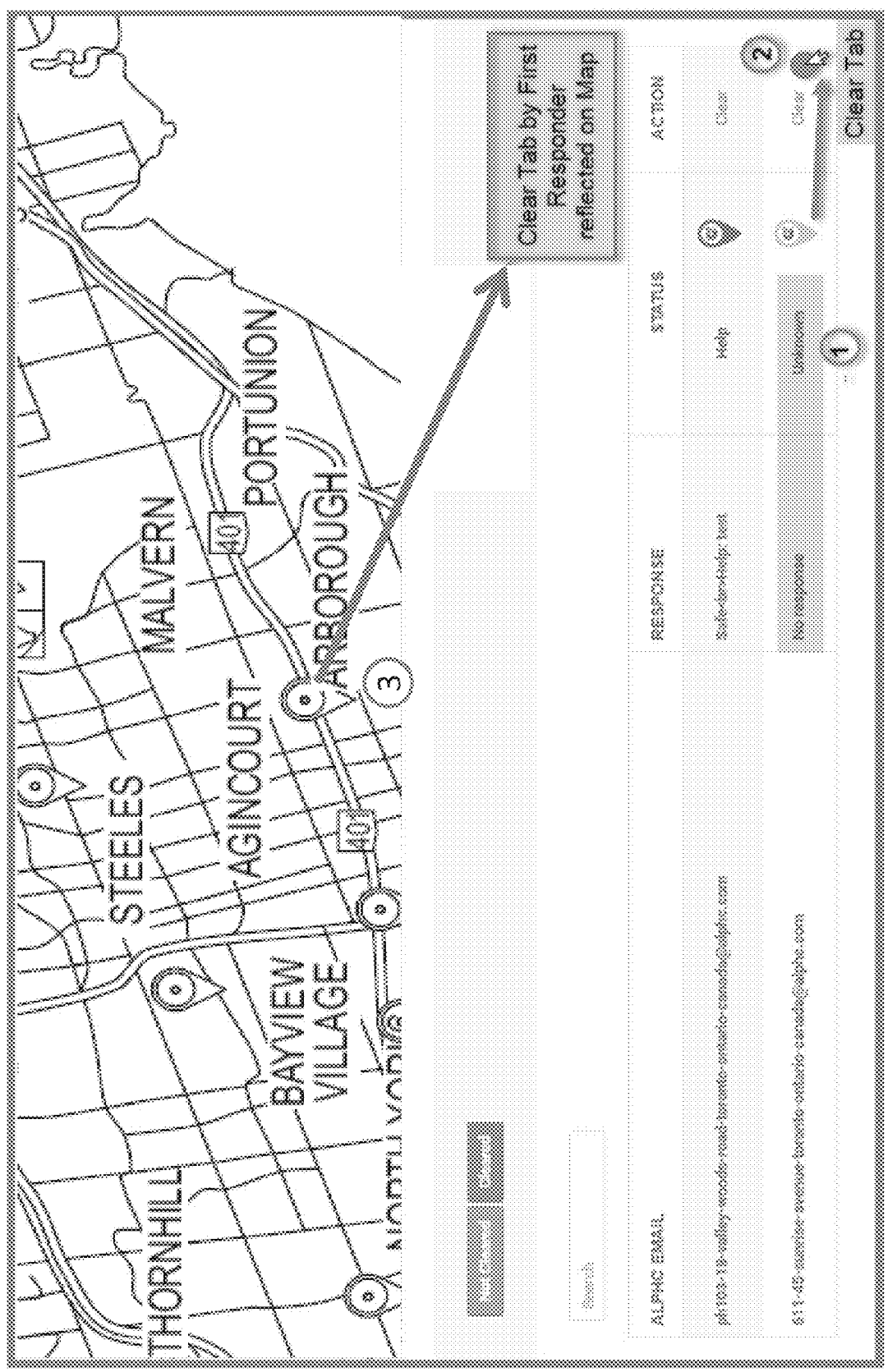
FIG. 17S illustrates an embodiment of change in status to "cleared" as discussed throughout the graphical user interface.

FIG. 17S illustrates an exemplary change in status to "cleared" as discussed throughout the graphical user interface. In response to the first responder selecting the clear tab, the electronic communications account associated with the selection can be updated to reflect a "clear" status in the table and/or the map. The status can be updated in an electronic communications account database to be used to update other graphical user interfaces and/or other user devices and systems. This can allow for real-time updating across several systems connected to the electronic communications system.

FIG. 17T illustrates an exemplary change in status to "cleared" based on a "no response" whereas two other electronic communications accounts are changed to a "help" status. The help status can be a result of a response from an alert. The icons in the status and/or the map can reflect these different statuses via a visual indication (for example color change).

Figure 17U:
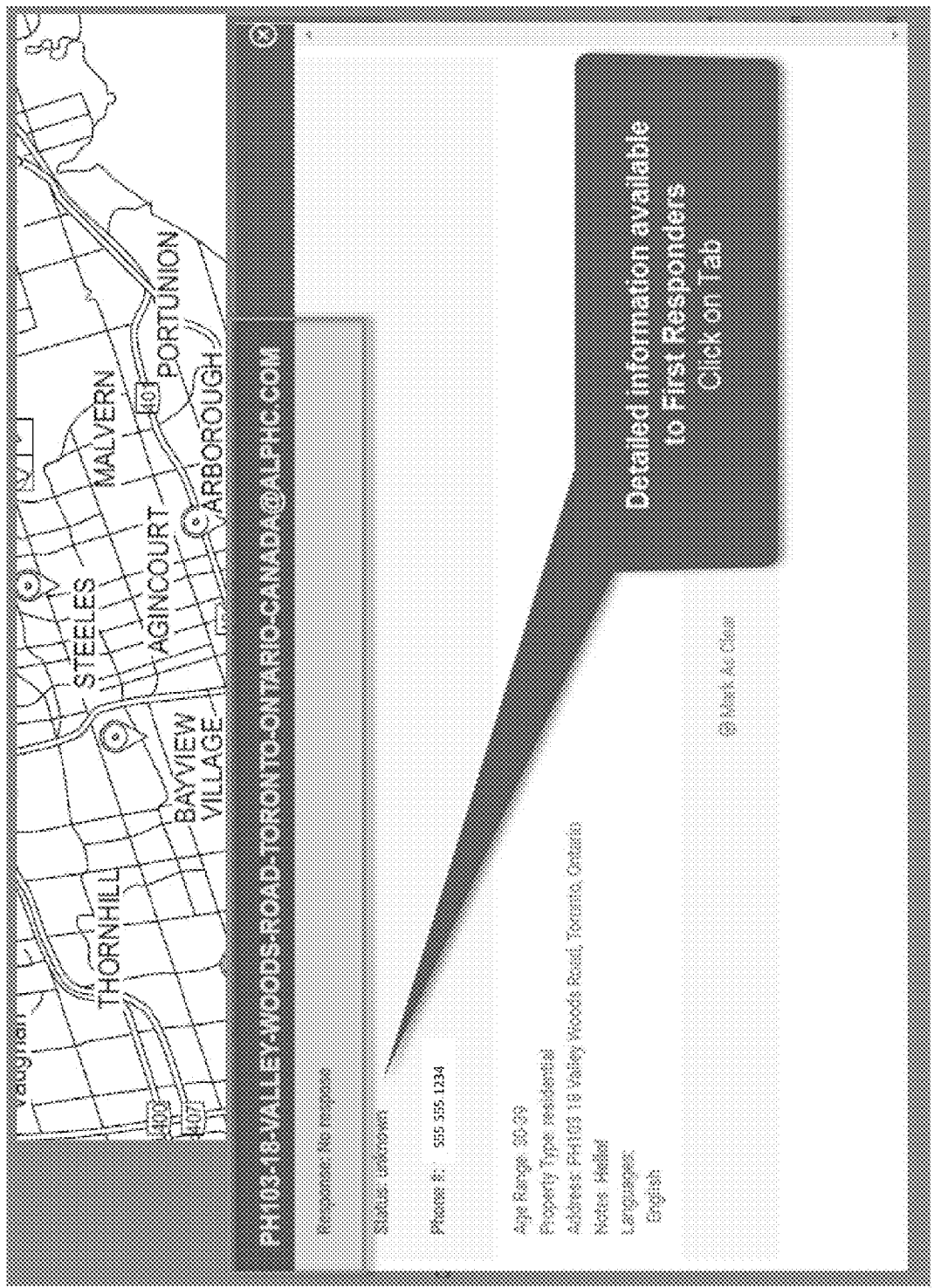
FIG. 17U illustrates an embodiment of graphical user interface that depicts an embodiment of displaying detailed information of an electronic communications account for the first responders.

FIG. 17U illustrates an exemplary graphical user interface that depicts an embodiment of displaying detailed information of an electronic communications account for the first responders. In this example, the first responder can access detailed information on the electronic communications account: a phone number, an address, languages spoken, the property type, age range, and notes. The detailed information can be a text, embedded into the map, interactive to display further information, or the like.

Figure 17V:
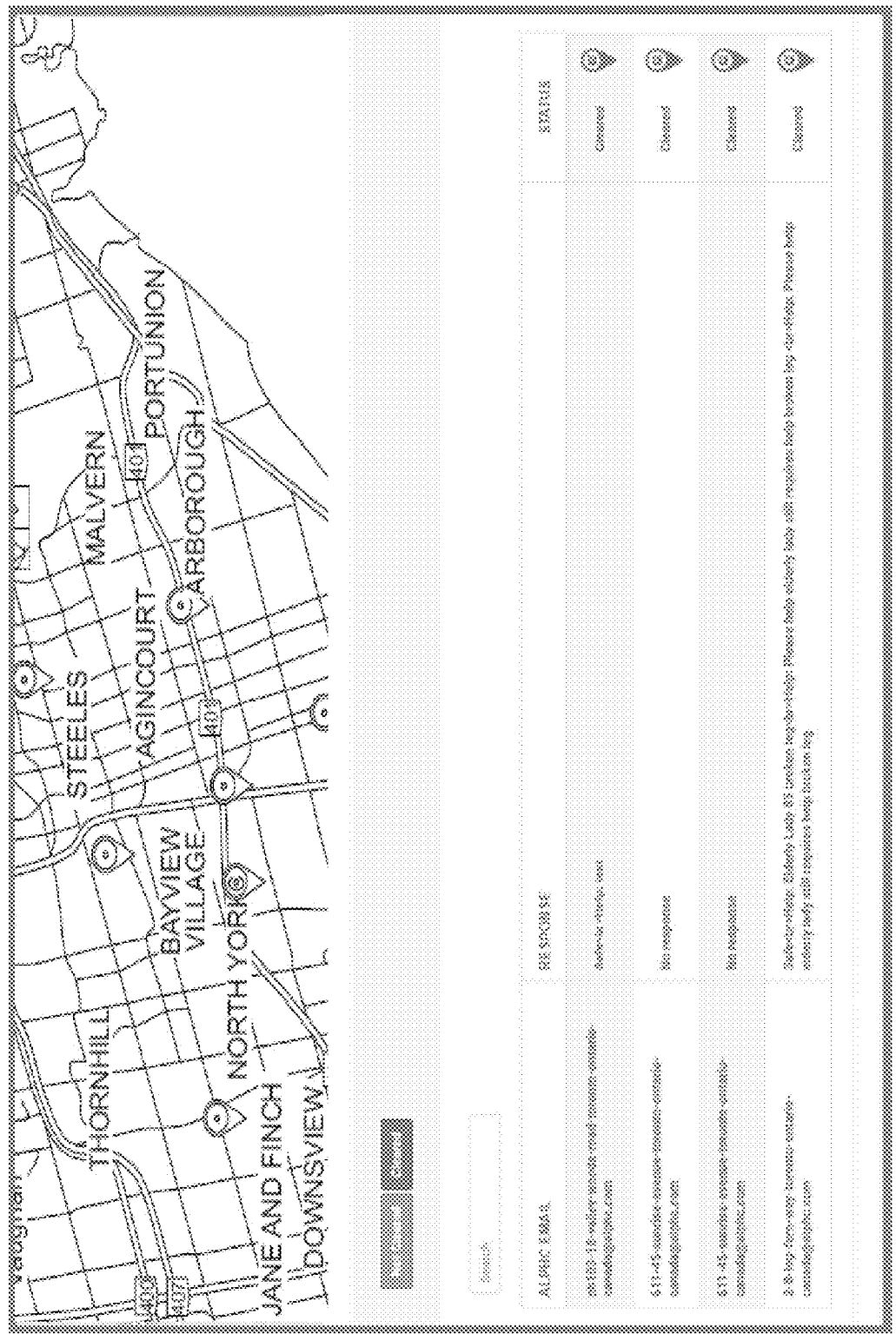
FIG. 17V illustrates an embodiment of graphical user interface where one individual has a help response but is a test simulation.

FIG. 17V illustrates an exemplary graphical user interface where one individual has a help response but is a test simulation. The second and third individuals have no response. The fourth individual has responded several times indicating that an elderly lady requires help associated with a broken leg. The response can be a response received by the electronic communications system via a text or email. Based on the color of the indicator, the first responder can quickly identify the urgency of the assistance required. Having a real-time indication of status and/or urgency of help, first responders can plan rescues based on live data improving the safety of the lives at risk.

The example graphical user interface of FIG. 17V illustrates that the first responder can clear the status of the individuals. For example, all four individuals have status listed as "cleared." This can indicate that a first responder has already responded to the request for help or that the area has been deemed safe and thus even without a response, the individual's status can be cleared. The cleared statuses can be updated in real-time and thus increase effectiveness and efficiency time of first responders. This becomes imperative in situations where time is sensitive (for example a few minutes could mean life and death in certain circumstances).

Figure 17W:
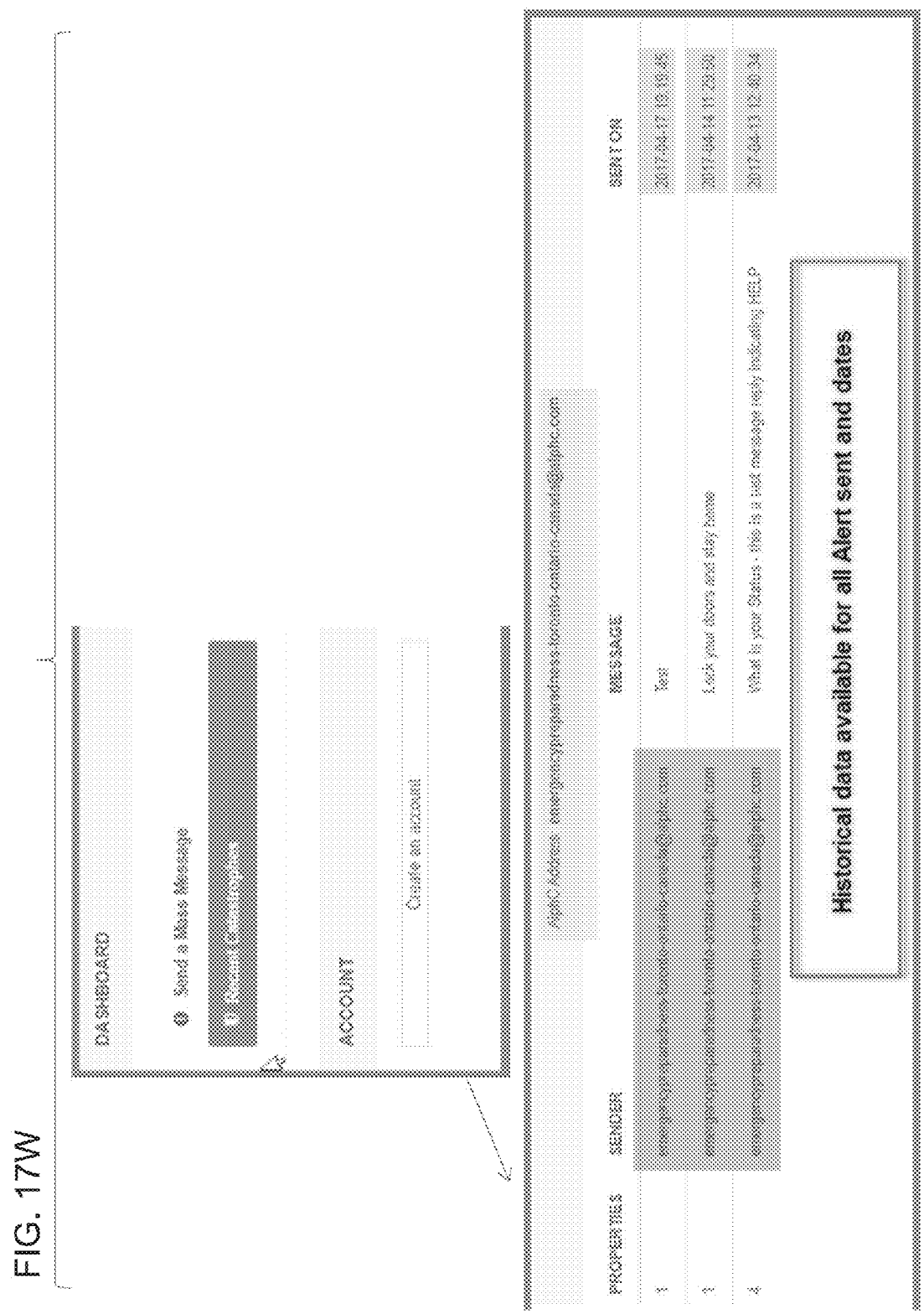
FIG. 17W illustrates an embodiment of a graphical user interface of messages sent.
Figure 17X:
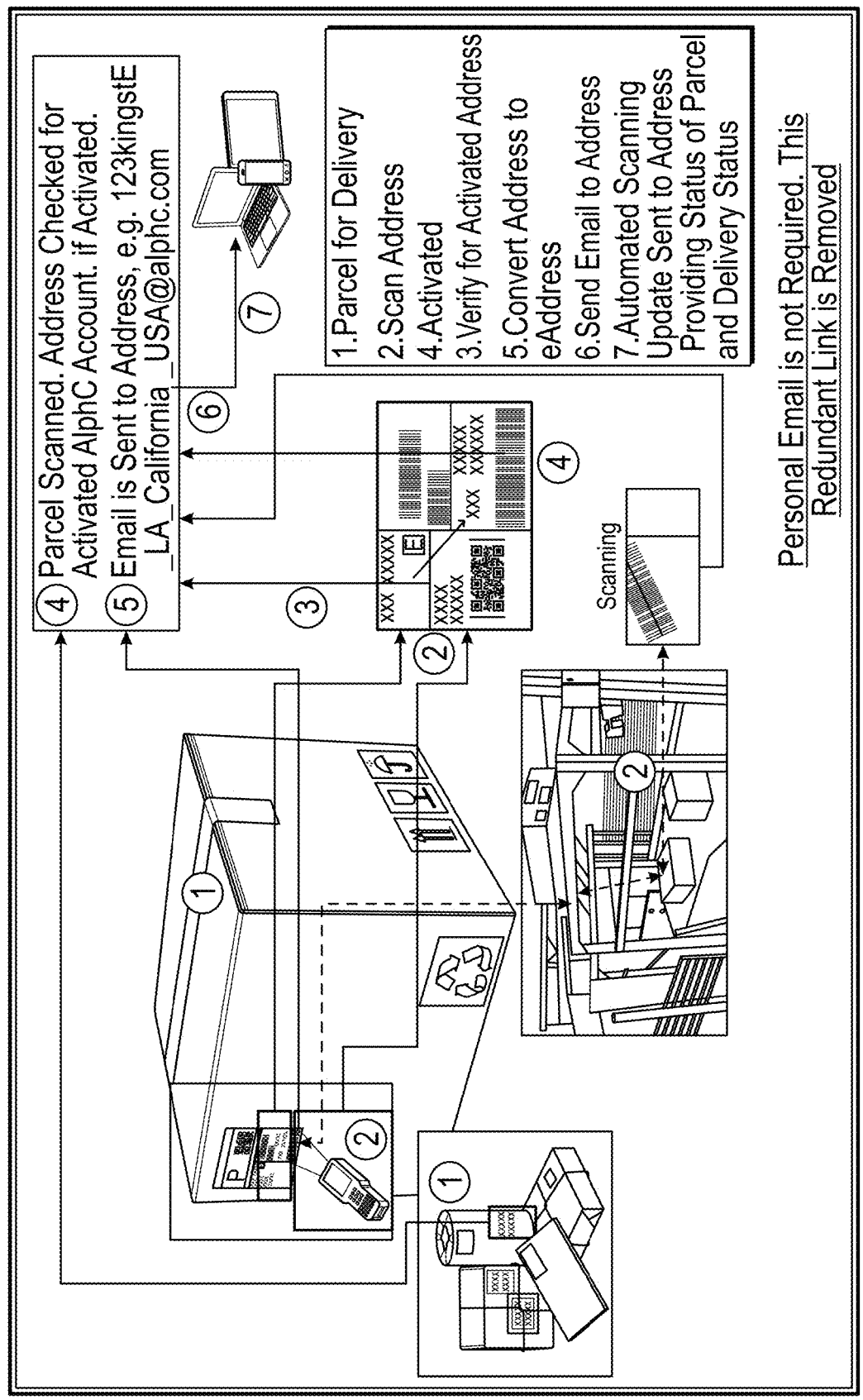
FIG. 17X illustrates a diagram depicting an embodiment of a parcel delivery process.

FIG. 17W illustrates an exemplary graphical user interface of messages sent. In some embodiments, the graphical user interface stores and displays historical data. The graphical user interface can have the functionality to send alerts or notifications in the future upon a set period of time (for example in a week) or in response to a condition (for example earthquake over a magnitude of 5.2). The first responder can also have the option of setting an algorithm to send different types of messages and/or alerts and various times based on the occurrence of a condition (for example a different message sent to a wider area for a higher magnitude earthquake). Precautionary alerts can also be sent days in advance based on needs. For example, in response to an approaching hurricane, residents can be notified of what precautions need to be taken or an advanced flooding precaution, site specific and targeted messages and alerts, to best prepare residents and first responders. In another example, first responders can be notified of which homes will be occupied based on information provided by the residents. For example, the notification can state: "1 adult male age 35 will remain and the family 1 woman and child will drive to safe site". This specific collaborative communication can be vital for all parties and increase safety.

In some embodiments, multiple alerts sent to various areas at the same time can be viewed. Each alert can have its own mapped information.

In some embodiments, when a resident activates an account information can be provided to first responders, police, fire departments, and any emergency preparedness services, local, regional or national. This information can include residents' names, number of residents, ages, special health needs, pets, and other relevant information. The goal of providing this information is to ensure that the required authorities can have the required profile for each house, apartment, and/or area prior to any disasters. Hence ensuring, rescue missions are planned effectively to save lives and resources.

In some embodiments, persons that have not signed-on and need assistance can be assisted by an activated account. The address of the person requiring assistance can be mapped for first responders to provide help. The information of the activated account can be visible to first responders, The activated account can provide further details such as contact number, type of assistance, nature of injury, etc. For example, in response to an earthquake in an area, 911 services can be overwhelmed. An activated account can receive a call from a friend indicating he needs help. The friend can send the location and details for first responders via the application which would be mapped with the relevant information as noted above.

Communication using electronic communications accounts can also be incorporated with National Incident Management Systems (NIMS)-FEMA, 911, and the like. This database could be invaluable for any Emergency Preparedness Program/Emergency Operations Centre (EOC). The aid organizations can communicate any critical information to an area or specific building by instant group/mass email advising residents of what precautions are deemed necessary based on the nature of the emergency. Evacuations can be streamlined; residents returning to their homes can be effectively coordinated and financial aid better disbursed via electronic communications account communication.

Figure 18:
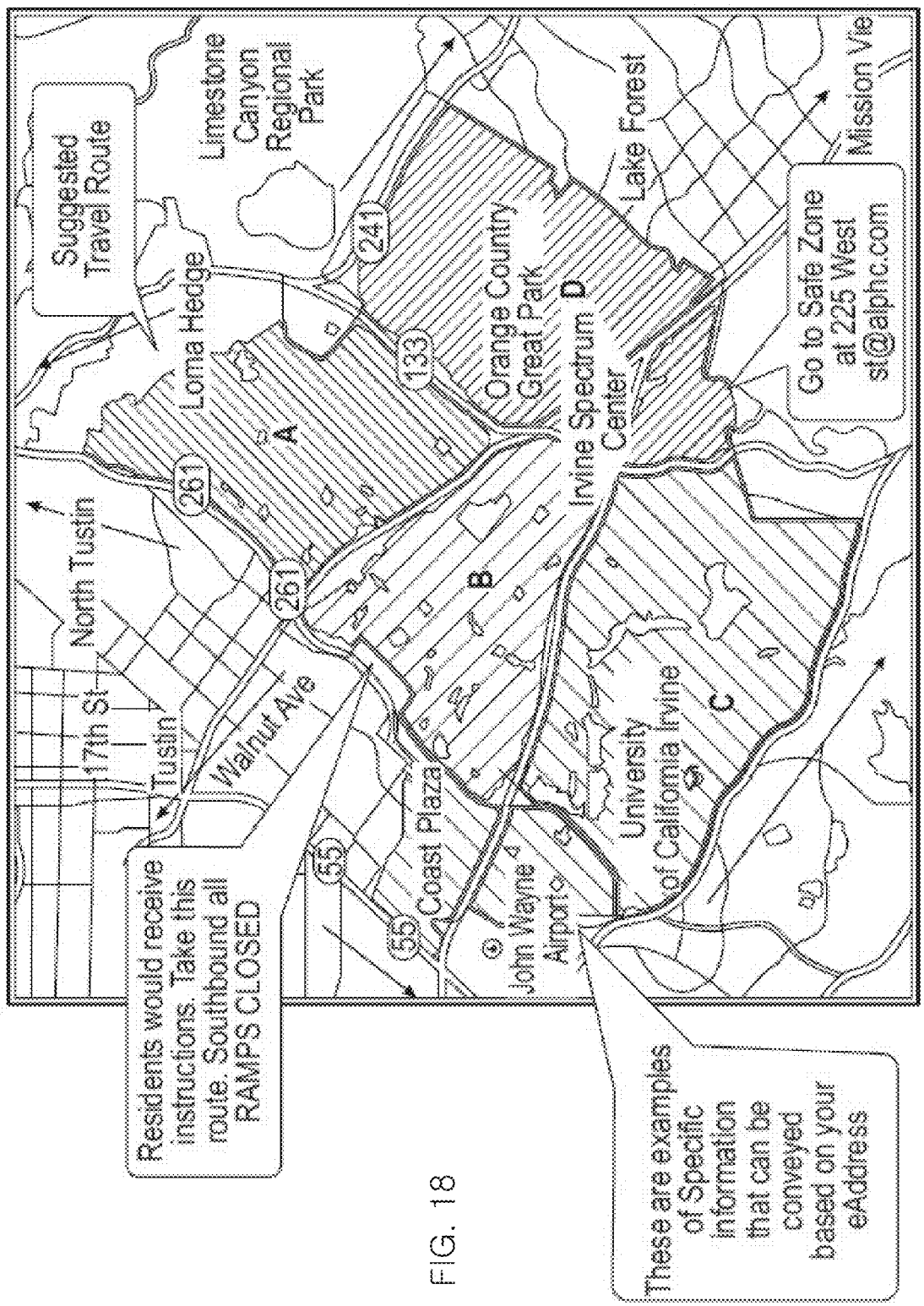
FIG. 18 is a diagram depicting an embodiment of different messages sent to different electronic communications accounts.

In some embodiments, different messages can be sent to different electronic communications accounts based on the circumstances of the incident. FIG. 18 is a diagram depicting an embodiment of different messages sent to different electronic communications accounts. In this example, electronic communications accounts associated with the area A are provided a suggested travel route. This can indicate that the area is not yet in imminent danger. The electronic communications system can use map and traffic information to provide the best route of escape and evacuation for individuals located within and/or associated with area A.

Electronic communications accounts associated with area B can receive a message with very precise instructions. The instructions can indicate that several other alternative routes are closed and are told to take a particular route for evacuation.

Electronic communications accounts associated with area C can indicate two routes that residents can take.

EAddresses associated with area D can include a message to go to a Safe Zone at 225west_st_Los_Angeles_California_USA@alphc.com. This electronic communications account can be associated with a particular address. The individuals receiving this message can identify the address and travel to the safe zone. In some embodiments, the electronic communications account itself can be entered into an application (for example into a route finder that would find the best route to the physical address associated with the electronic communications account).

During fire, earthquakes, or other emergencies, relevant rescue operations can also be planned with efficiency as critical profiles for each home is available to the authorities. For example, the authorities can know a particular house has three people, and rescue operations can be planned accordingly. Homeowners and/or care givers can also respond via email during an ongoing emergency, notifying the proper authorities that they are not home, or that an elderly family member is the only person inside the home. Precious time and resources can be deployed accordingly, allowing contingency planning for all rescues. Using communication via electronic communications account permits the command center on site to coordinate efficiently with personnel on site.

In some embodiments, the electronic communications system can be applied in pre-disaster planning. For example, the electronic communications system can develop a plan for a disaster based on the demographic of the area.

In other embodiments, radio frequency communication aided with hand-held smart phones can provide timely communication designed to flash/vibrate providing timely communication to rescue teams. For example, a red flashing "703—10 yr child"—meaning rescue required unit 703; green flashing "1816—clear" unit 1816 is empty; "Blue flashing—1506C" pet cat unit 1506; Constant Red—evacuate building immediately. The numbers and type of alerts can vary depending on the specific authority. The source of the information relayed to the personnel on site can be electronic communications account communications from residents.

Providing smartphones with appropriate protection from water, fire and chemicals and turning on location services can also act as a safety feature for first responders or other relevant authorities that can require assistance. For example, an injured person associated with an electronic communications account and/or first responders being swept away in a flooding can be located and can provide further information to other first responders for help. Vital signs of first responders can also be monitored.

In other embodiments, electronic communications account communication can be used by anyone, warning a resident of a fire or any other emergency or non-emergency event at his/her residence. For example, a resident on vacation in Rome can receive notification via electronic communications account about a fire at his house in Ohio.

In other embodiments, communication between residents and aid organizations can be made using other methods of communication when Wi-Fi is not available and incorporated into a local readiness plan. Where Wi-Fi is not available during large scale natural disasters, balloons such as "project loon or "mobile Wi-Fi transportation vehicles" can be deployed providing critical Wi-Fi communication.

In other embodiments, the system can be used to track people displaced from one area to another. It can also provide more accurate data of death and persons displaced and age profile. This data can permit aid agencies to plan for logistics and send resources more effectively. The migration of displaced population can be tracked as they settle in safe zones. Local authorities from where they were displaced can also have the capacity to contact their displaced citizens. This capability can be an invaluable tool for all parties.

Further to the above application, people displaced and applying for refugee status in a foreign country or under temporary care of UN could be required to have a registered electronic communications account. A database can show the real-time flow of people by dates, including their place of origin, their movements, and final destination. For example, a refugee from Syria travels to Lebanon then Turkey then Greece then Macedonia then Germany then Canada and finally to Calgary. The flow can be tracked via his/her electronic communications account.

In another embodiment, a database of the 4.5 Million refugees displaced by the war in Syria can be created. As data can be traced back to town of origin in Syria, cross reference checks can now be done for any suspicious person verified against "friendly," neutral, and suspicious electronic communications accounts of neighbors. This database would provide an enormous aid to Secret Service and show the plight of humanity. Similar databases can be created around the Globe to fight crime providing authorities access to friendly electronic communications accounts for cross-reference verification.

In other embodiments, police services can use electronic communications accounts to assist them in fighting crime. Cross referencing criminal activity and having the ability to communicate with "friendly" electronic communications accounts. This ability would work in reverse as well, allowing resident electronic communications accounts to communicate with police.

Police services can map areas of high criminal activity and/or areas where crimes are currently taking place. Police services can indicate further information on the crime in the message to electronic communications accounts to inform individuals of the safety risk (for example the type of crime occurring, the name and picture of a suspicious individual under investigation). Police services can inquire individuals to report any person that can be identified as a suspicious individual and/or provide updates on the incident in real-time. Police services can warn individuals to stay indoors or drive away from an area of interest based on knowledge of electronic communications accounts of homes, vehicles, and/or individual locations in the area.

In other embodiments, the delivery of letter-mail by Postal Services can be demonetized by the use of electronic communications accounts. Residents with active accounts can communicate with any electronic communications account, even those across the globe, for free or nominal cost. Large volume mailers can pay a fee for this service, but reduce overall cost, overhead, and equipment cost. These embodiments can reduce waste, and the use of paper. The environment can benefit.

In some embodiments, large volume mailers can send targeted marketing material to a particular building or an area/region using the electronic communications account. The entity can choose certain characteristics. These characteristics can be used as a filter when applied to information associated with the electronic communications accounts. Thus, electronic communications accounts that do not meet the characteristics can be filtered out and the message only sent to electronic communications accounts that have met the characteristics.

FIG. 19 is a diagram depicting an embodiment of characteristics used to filter electronic communications accounts for targeted marketing. The characteristics can include interests, selected individuals associated with an electronic communications account, spoken languages, addresses that are filtered or blocked, or vacations. In the example of FIG. 19, the interest characteristics are chosen. The entity chose electronic communications accounts associated with characteristics associated with the categories that are checked. For example, the entity desires to market to real estate owners of homes, condos, land, and apartments.

In other embodiments, bills can be sent via electronic communications accounts by utility companies, which can eliminate problems resulting from mail disruption and delivery failures. Bills can also be paid by linking an electronic communications account to a financial institution. Financial institutions can store client address on file. Hence all correspondence can be based on your eAddress, or electronic communications account for further transparency and security. There may be more risk with sending mail via the physical format as opposed to an eAddress. As described earlier, with few safe guards, the electronic communications system can provide further security than a personal email, furthering security for the bank and their clients. Your electronic communications account can add another layer of security for financial institutions, governments bodies and the like. An individual using an electronic communications system, eAddress, physical address, phone number, and the like for means of misrepresentation can be red-flagged.

Companies, such as utility companies, banks, and credit card companies, can link their billing information to an electronic communications account. This would improve delivery of bills, products, and services. For example, under traditional procedures, when a bill is paid, the customer service representative asks if the customer desires a confirmation via email. If yes, the customer service representative would have to request the email address. However with the electronic communications system, communication can be directly sent using the electronic communications account, and the electronic communications account would route the message appropriately to the means of communication desired by the individual. This can add a level of security as personal information (for example actual email address or physical address) is not exposed and/or passed along.

In other embodiments, customer service operators does not need to verify an email or mailing address as all receipts can be sent to an electronic communications account directly. This delivery can be instant, reducing the cost of customer service interactions. The reduction of time spent on the phone by telephone operators, would further reduce overhead and overall cost.

In other embodiments, a local Post Office can have the option to send a message to an electronic communications account advising a user that a parcel can be collected at a retail office. In some embodiments, parcels can be scanned using the electronic communications account (or a code associated with the electronic communications account). Furthermore, electronic communications accounts can include information indicating where parcels can be picked up (for example based on the address where they reside). In some embodiments, some areas would have a central delivery pick-up location with an electronic communications account for ease of reference for a delivery agent, resident, and/or a local post office.

In other embodiments, optical character readers, scanning equipment and the like deployed by postal offices/parcel delivery companies in their mail systems can be linked to the electronic communications system, providing various efficiencies, including delivery notification and status updates to homeowners sent directly to their electronic communications account. For example, when a homeowner has activated their electronic communications account, they can have the option of receiving a picture or other status notifications of their delivery.

FIG. 17W illustrates a diagram depicting an embodiment of a parcel delivery process. The parcel can include an identifier for the electronic communications account. For example, the parcel can include an email (for example 123KingStE_LA_California USA@alphc.com. At block 1, the parcel can include the identifier in a way that a delivery system can identify the identifier. For example, the identifier can be written on the parcel. The identifier can be a scannable code (for example OR Code). The identifier can be a chip (for example RFID tag) that can be electronically scanned. The scanner can scan the identifier at block 2.

The identifier can be placed on, in, around, or otherwise near the parcel to be associated with the parcel. For example, the identifier can include a sticker to be placed on the side of the parcel. The identifier can be a chip inserted into the parcel.

The identifier can be identified and associated with an electronic communications account. The identifier can include a scan to identify an AlphC account and an associated email address. At block 3, the identifier can be verified to determine whether the identifier is for an activated address. At block 4, in response to determining that the identifier is for an activated account, to activate the identifier for delivery.

At block 5, the electronic communications system can convert the identifier to an electronic communications account. For example, the identifier can be a physical address, and the electronic communications system can convert the physical address to an electronic communications account. In some embodiments, the identifier is the electronic communications account and is converted to a physical address. At block 6, a communication can be sent to the identifier and/or the electronic communications account. For example, an email can be sent to the email address associated with the electronic communications account. At block 7, the parcel can be sent and the delivery status updated.

In some embodiments, part or all of the system for delivery can be automated. For example, the parcel can be sent to an RFID scanner that automatically scans an RFID tag. The parcel can automatically be inputted into the system, the system can determine where the parcel is to be delivered, and the system can automatically deliver the parcel and update the delivery system.

In some embodiments, one or more parcels can be placed on a moving platform (for example a conveyor belt) that passes by a reader (for example an RFID reader). Accordingly, the electronic communications system can identify parcels via the identifier (for example the RFID tag) of many parcels that are placed on the conveyor belt. This type of system can automate the mail delivery system for many mail parcels that are unidentified and/or unorganized. The electronic communications system can automatically determine where the parcel came from, which can be useful if the destination cannot be determined and/or if the destination was incorrect. The electronic communications system can determine where the parcels need to go.

The electronic communications system can determine other characteristics of the parcel using the identifier. For example, the identifier can be associated with an electronic communications account that has a parcel registered containing certain items. The items can be identified by a characteristic (for example fragile, food, currency, medical device, and the like).

The use of electronic communications accounts can minimize, or eliminate, the need for emails and/or physical addresses. Once registered, the electronic communications account can be activated and a message sent directly to the electronic communications account with information associated with the parcel or mail (for example scanned information, expected delivery dates, the type of product, or other information helpful to the receiver of the parcel).

In other embodiments, a personal e-mail address of a resident is not required to create an electronic communications account. This removes a redundant link, providing direct communication for every electronic communications account globally.

In other embodiments, utility companies can instantly contact residences. For example, a hydro-transformer can have its electronic communications account linked to a resident's home. Any power outages can be instantly conveyed to the effected residents. Power restoration information can also be conveyed. In other embodiments, this same application can be applied for cable, water, gas, utility services, city services, and other services.

In other embodiments, electronic communications accounts can be created for traffic lights and intersections. This would allow neighborhoods and/or traffic centers to communicate any information to the required authorities. For example, a traffic light changing at 4 am on a quiet street can now reprogrammed by sending an e-mail to the correct electronic communications account.

In other embodiments, any postings on a map generated by the system can be made via a resident's electronic communications account or using a generic electronic communications account for the entire area. For example, a home for sale can be posted via the electronic communications account linked to the physical address of the home and a car sale can be posted using generic electronic communications account for the zip code in which the car is stored.

In other embodiments, residents with a registered electronic communications account can post consumer goods on a generated map that can be filtered by area of interest. For sale postings can be communicated to a targeted audience as specified in their areas of interest. The electronic communications system can provide the ability to cross-reference buyers and sellers and hence target the relevant prospective audiences.

For example, a home and/or rental property can be listed by an agent on the generated map. The posting can then be sent to a target audience based on their area of interest. A consumer can also browse an electronic communications account website and filter down to real estate and contact the agent/buyer via his/her electronic communications account. Homeowners can list their own homes for sale on the generated map and target prospective buyers based on their areas of interest. This option to sell and target buyers provides flexibility and savings to all users. Condos and apartments and retail space for lease can be posted on the electronic communications account map.

In other embodiments, a retail store can also have a "Flash Sale" for a specified time period, and/or to a targeted audience of their choosing to achieve maximum response. For example, a pizza restaurant can have a pizza sale targeting three high rise apartment addresses on Tuesday 5-7 pm.

In other embodiments, garage sales can also be posted on the generated map.

In other embodiments, businesses can target neighborhood or area for any consumer goods and or marketing.

In other embodiments, job postings can be posted by businesses on the generated map. This can enable residents to view and apply using their electronic communications accounts.

In other embodiments, hotels and motels can have the capability to post any flash sales or room rates on the generated map. Homeowners can have a capability to advertise available rooms for rent in their home via the generated map.

In other embodiments, community events can be posted on the generated map and targeted to neighborhoods for maximum benefit of all. Political rallies can be broadcasted by area.

In other embodiments, census forms can be distributed via electronic communications account to ensure timely delivery and to maximize data efficiency.

In other embodiments, various parts of city planning and business can be incorporated by planners into the electronic communications system. For example, a database of residents' ages can assist with planning.

In other embodiments, voting via electronic communications account can provide an accurate and viable methodology. This can be combined with other applications as dictated by the relevant voting rules.

In other embodiments, the Department of Transportation can incorporate electronic communications account data into vehicle registrations. This can provide accurate data to first responders during emergencies.

In other embodiments, the system can include social media capability via electronic communications generic accounts for each zip code. The electronic communications system can include social media affiliated usernames to further protect identity of users and their electronic communications accounts.

In other embodiments, the electronic communications account for businesses and retailers can be incorporated into their external websites. This can permit consumers to contact businesses and retailers. The capability to connect to a retailer using a uniform resource locator and then electronic communications account can be called "shop link."

In other embodiments, a user can input a physical address and an electronic communications account, and a home location would appear on the generated map. Another optional input would provide the option to activate or deactivate the inputted electronic communications account.

The user can complete a simple profile and a password would be sent to a personal e-mail address or mobile device. Once authenticated, the account can be active. When a user moves, he/she can deactivate the account, and can be prompted to activate a new account. Utility companies can also require an electronic communications account to be activated at the time of account set-up.

In other embodiments, property management companies can be obliged to provide resident information to first responders. In the event of an emergency, first responders can have critical information needed to save lives. Insurance companies and or by-laws can require resident. to be registered Property management companies can use this database to communicate with residents. All communication can make electronic communications account identification easier. For example, 603-125-western-battery-road-toronto-ontario-canada@alphc.com can be easily identified by the unit number as opposed to john.smith@gmail.com.

In other embodiments, anyone with a registered electronic communications account can have the ability to search businesses. This would provide a regional or global communication network to link parties for commerce or other activities. For Example, a shoe retailers in Los Angeles can be contacted by a wholesaler or manufacture from France based on panning the city under the "shoes" identifier. This panning ability is not available in a traditional email system.

In other embodiments, residents that do not have third-party email accounts can sign onto their electronic communications account and receive e-mails directly into their electronic communications accounts. Family members concerned about elderly members of their family can register their own electronic communications account and/or their telephone contact numbers as an additional contact in the event of an emergency. These family members can be in the anywhere and receive alerts.

In other embodiments, owners with multiple residences can register a separate electronic communications account for every residence, indicating "vacant" unit where applicable In other embodiments, residents can have the opportunity to link their electronic communications account to their credit card. This would allow residents to pay for items, like pizza, with their credit-cards connected to their electronic communications account via touch-to-pay. The pizza restaurant in this case can have the resident's electronic communications account and the process can be streamlined. This feature can save time for the resident as well as the vendor.

In other embodiments, during dates and times of high demand such as Super Bowl Sunday, hockey nights, and other events, demands from food vendors can be very high. A surge pricing module can be activated. For example, during the Super Bowl, a pizza restaurant can wish to advertise via the embodiments described above. However, in a time of high demand, the restaurant can pay surge prices to advertise using the system. The price can depend on the demand and time of the sale. Higher demand can result in higher fees for posting.

In some embodiments, only a limited number of pizza restaurant's sales can be permitted during surge periods. For example, a chain pizza restaurant can advertise across America and pay a certain fee for a sale 1-2 hours prior to an event. A chicken restaurant can wish to have a sale during half-time. Vendors can also advertise a sale 2-5 days in advance of the game. Residents can order early for delivery on the specified day and time. This can provide smaller vendors the ability to also advertise as surge prices can be very high at the day of the event.

This application can ensure residents are not overwhelmed by a large number of sales. Residents can also have the ability to turn off notifications in their "area of interest" for a temporary or extended period.

In other embodiments, a quality response code or similar unique code can be generated when a user activates an electronic communications account. This code can be scanned, and can link to an electronic communications account. It can be used for sharing purposes and can be stored in a server providing scanning functionality for any delivery and other uses. This unique code can one day replace a readable address providing digital capability for future use. The system can have a unique repository for all activated electronic communications account across the globe and their unique codes. This quality response code can also be generated for infrastructure electronic communications accounts.

In other embodiments, residents can choose one or more "Areas of Interest," based on these interests, they would receive e-mails from certain vendors. These areas of interest can include real estate, pizza, shoes, or any other interests. An additional field called "wish list" can be filled, which the resident can change based on what he/she is looking for at any given time. For example, "basketball shoes men size 12" or "pants size 6 (black or grey)" or "toaster oven 9 inches" or "Books about Gandhi." The user can be as specific as he/she wishes. Vendors and business can search for a term within wish lists and send users specific offers and prices based on the wish lists. This feature can allow vendors to contact users directly. Vendors can pay a fee for this service.

In other embodiments, companies and government organizations can access a module within the system, in which tenders can be posted and vendors can view and make their offers directly with the firm requesting the bid. There can be a paid site on the system where bidders can use a filter to isolate their areas of expertise. Companies may have the option of adding their web site links for further ease of reference.

In another embodiment, such as a military base, the Base Command Centre or any similar body can have their own generic account where the location would remain confidential. Base personal can be provided covert accounts to ensure their privacy is protected (location data not provided as would person(s) on location). Based on the need of the military and as deemed necessary the system can be programmed to ensure access to external and internal communication can be readily accessed as required.

In other embodiments, medical research can be conducted by tracking user travel patterns and tracking person who may have been infected. Tracking historical and present patterns of infectious transmissions can be implemented in certain embodiments.

In other embodiments, reviews can be posted on a generated map for restaurants, hotels, businesses, family and children activities, health and well-being, among others.

In other embodiments, an electronic communications account can be connected to the weather network providing alerts as deemed necessary by the government body.

In other embodiments, an "Alert" feature can be added to the system with direct contact to 911 emergency services.

In other embodiments, visitors to an area can register under a visitors section for an area or city or state. Based on this, the visitors can receive emergency alerts while visiting the area. Their area of interest profile can remain active ensuring that they receive any targeted alerts such as sales and restaurant specials. To ensure security a unanimous email account can be created for visitors, for example visitor 1, visitor 3 and so on. Visitors linked to an electronic communications account for emergency, marketing, and/or other information relevant to a visitor can be provided unique electronic communications accounts for their visitations. In some embodiments, the new unique electronic communications account can be linked with the visitor's residence electronic communications account. In some embodiments, the new unique electronic communications account can be a temporary electronic communications account provided for the visitor until the end of their visitation. The electronic communications system can periodically request status information for visitors.

In other embodiments, residents can wish to add historical addresses where they lived tracing back to many generations. This database and mapping ability can provide a historical migration mapping capability. In some embodiments, the system can also comprise the ability to contact persons that may have been your neighbor years ago.

In other embodiments, residents can wish to register for traffic alerts for their town. This can ensure traffic alerts are provided via text or email as required.

In other embodiments, one can communicate in real-time 'live stream' using your electronic communications account.

In some embodiments, credit card companies can link credit cards (visa, American Express, MasterCard, etc. to your electronic communications account for further authentication of user. QR codes can be generated for each address to add simplicity and while ensuring that security of data is not breached.

In some embodiments, insurance companies can require their clients to create an electronic communications account and show proof of use to ensure their safety is further enhanced as they can receive emergency alerts furthering their safety As cell phone usage increase, the need for a home line is decreasing. Your home phone number can be directly connected to 911 services. In some embodiments, cell phones, cell and/or cell phone lines can be connected to your electronic communications account and hence to 911 to further increase safety. First responders can have your address when 911 services are required.

In some embodiments, the system can be configured to generate unique electronic communications account, eAddresses and/or e-mail addresses based on a phone number of a user in addition to and/or instead of a physical civic address of the user. For example, the system can be configured to generate a unique electronic communications account that is tied to a cell phone number of a user. In certain embodiments, such generated electronic communications account, eAddress or e-mail address can comprise of the cell phone number of a user or a portion thereof before the domain name. For example, such generated electronic communications account, eAddress or e-mail address can comprise the general form of: 123.456.7890@alphc.com. The particular process for generating an electronic communications account, e-mail address or eAddress linked to a phone number can comprise any one or more processes that are similar to those described herein with respect to electronic communications account, eAddresses and/or e-mail address linked to physical civic addresses. For example, when activating such an electronic communications account, the system can be configured to generate and transmit an activation code to a phone of the user, which the user can input into the system via his or her phone or other user access point system for verification. By allowing generation of unique electronic communications account, eAddresses and/or e-mail addresses linked to a phone number of a user, one can easily communicate with the user via electronic communication simply by knowing the phone number of the user without actually knowledge of the e-mail address of the user in some embodiments.

Although certain embodiments refer to electronic communications account, eAddress as an e-mail address, and/or cell phone number, the electronic communications account can include additional and/or other forms of information indicative of an electronic address. For example, electronic communications account can include an application and/or program, a wireless device and/or remote device, text message and/or SMS messaging application, a card and/or card reader, an e-book reader, a database, a memory, a processor, a log-in, a username and/or password, biometric data, identification data and/or documents, a locational device (for example a GPS), a wearable device, an automotive device, infrastructural device, an identification device, a tracker, a device that can be carried and/or used by an individual, and the like.

In some embodiments, the electronic communications system is the source of means for communication to an individual. A sender can send a message to an electronic communications account, and the electronic communications account can send the message to the appropriate communication channel. For example, the receiver can desire emails over text messages. The electronic communications account can decide that for more urgent messages, a text message is more appropriate whereas marketing material can be sent via email.

In some embodiments, the sender can send a message via a communication channel (for example an email). Then, the electronic communications system can determine that the appropriate communication channel is not email but text message. Then, the electronic communications system can take the message and send it via text message to the individual.

In some embodiments, the electronic communications system allows a sender to email a telephone number. For example, the sender can send an email to 1.555.555.1234@alphc.com where the telephone number is (555) 555-1234. Thus, the phone number can be tied to an electronic communications account, and the electronic communications system can route the message to the email associated with the phone number electronic communications account. This provides flexibility in sending emails that is not available with traditional email systems.

In some embodiments, the electronic communications system allows a sender to send a message to a particular structure, address, individual, or other identifying information. For example, the sender can send an email to a license plate number, a name of a bridge, to a first and last name, or the like. Then, the electronic communications system can associate the appropriate communication to the desired receiver.

In some embodiments, the electronic communications system allows a sender to send a message to a particular location when the address can be associated with multiple particular locations. For example, apartment complexes, hospitals, retirement homes, adult living centers, buildings, or the like can a add room number to the electronic communications account. Thus, the sender can send a message directly to a particular location (for example room number, first floor, cafeteria). This would assist first responders by providing a profile of individual(s) at the specific room and related information that may be need at the time of the emergency.

Sending an Alert to EAddresses in an Area and User Interface for Electronic Communications Account Inbox FIG. 20A is a flowchart depicting an embodiment of a method for sending an alert to electronic communications accounts associated with an area. At block 2000, the main server system can transmit data associated with concerns in an area. The data can indicate a natural disaster, or a bounded area (for example the outline of a city), or an area surrounding a first responder, or the like. For example, in response to a flood, the areas of concern can indicate areas that are hit with the highest water levels.

The first responder access point system can at block 2002 generate a map of the areas associated with the concerns. In some embodiments, the first responder access point system can indicate a single area of concern with options to view other areas of concern. The displayed area can be interactive, such that a first responder can zoom in or out, can click for further information, and the like. The area of concerns displayed can be prioritized based on an urgency level. For example, the graphical user interface can display a first area of 10 feet of flooding, and have an option to display a second area of 8 feet of flooding.

At block 2004, the first responder can select an area of concern from the map interface. For example, the first responder can want to service the second area of 8 feet of flooding for various reasons. For example, there can be other responders attending the first area, the first responder can be in a closer vicinity of the first area, the first area of concern can have individuals in need clustered in a single area, and the like. The first responder access point system can send the selected concern to the main server system in block 2005.

At block 2006, the main server system can retrieve updated status of the electronic communications account in the area of concern. The main server can interface with the electronic communications account database 2022 to retrieve the updated statuses. The statuses can be retrieved by the first responder access point system by input of the first responder. The updated electronic communications accounts can be filtered based on a user profile. User profiles can be stored in the user profile database 2026. The main server system can identify the locations of the electronic communications accounts and map it to the data retrieved from the map database 2024.

At block 2008, first responder access point system can display further information regarding the electronic communications accounts in the area of concern. For example, the graphic user interface can display an icon on the map where the electronic communications account is associated with. The display can further provide indications of the need on the map. The display can show icons of different sizes, icon shapes, icon colors, and the like.

At block 2010, the first responder can select an electronic communications account to clear the status of an electronic communications account. If the first responder selects an electronic communications account to clear, then the electronic communications account status is updated as "clear" in block 2014. The electronic communications account database can be updated. Then, the method can continue to block 2006 by accessing the electronic communications account database and the "clear" status updated in the first responder access point system at block 2008.

At block 2010, if the first responder has not selected to clear the status of an electronic communications account, then at block 2012, the first responder can select an electronic communications account(s) to send a message. The first responder can also add additional information to include in the alert. The first responder can select to send a message to all electronic communications accounts. The first responder can have additional options to the message. For example, the first responder can decide to send a message on a particular channel of communication. The first responder can request certain types of information from the electronic communications account. The first responder can send a customized warning or message to the electronic communications accounts.

If the first responder selected the option of sending a message, then the first responder access point system at block 2013. The main server system can receive the command to send the message at block 2016, and generate a message to send to the selected electronic communications accounts. The message can be selected based on a filter. For example, the first responder can select a preference for sending the message, and the main server can identify the electronic communications accounts that meet the requirements of the preference. For example, the preference can be to send the message to the elderly or those in imminent danger.

At block 2018, other user access point systems associated with the selected electronic communications accounts can receive the messages from the main server system, and at block 2020 the other user access point systems can respond to the messages.

Figure 20B:
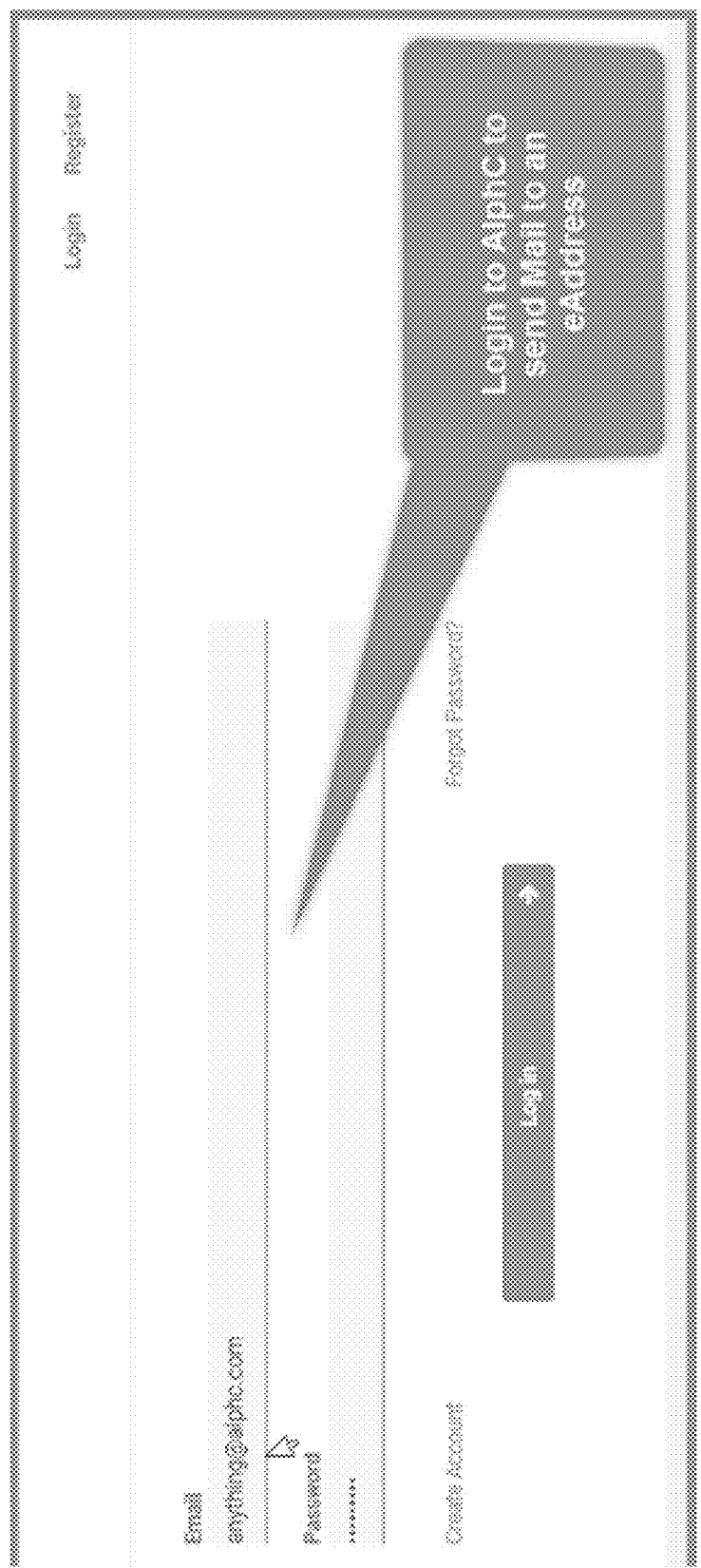
FIG. 20B is a diagram depicting an embodiment of a log-in screen for the electronic communications system.

FIG. 20B is a diagram depicting an embodiment of a log-in screen for the electronic communications system. The first responder, an individual associated with an electronic communications account, supplemental individuals associated with the electronic communications account, individuals with an account with the electronic communications account system, and the like can enter in credentials to log into the electronic communications system. For example, an email address and password can be used. In some embodiments, the electronic communications account can be entered. In some embodiments, biometric data is used to verify an individual.

Figure 20C:
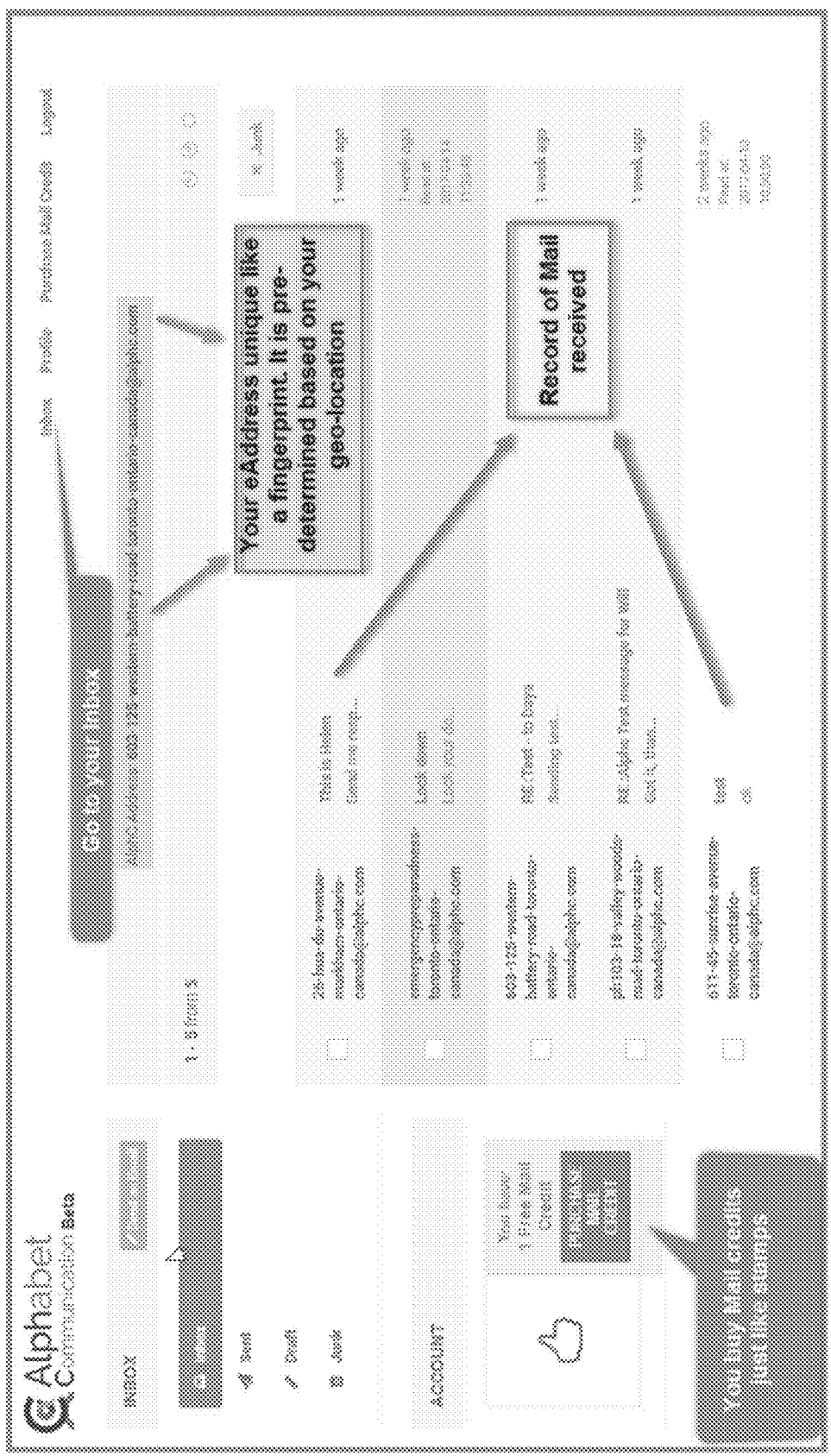
FIG. 20C is a diagram depicting an embodiment of an inbox of the electronic communications system.

FIG. 20C is a diagram depicting an embodiment of an inbox of the electronic communications system. The inbox can be for a particular electronic communications account (for example, 603-125-western-battery-road-toronto-ontario-canada@alphc.com). The electronic communications account can be predetermined based on a location, created by a user, predetermined by another characteristic (for example description of the location of interest such as "parking lot"), or a combination of a subset.

The inbox includes an option to view incoming mail, sent mail, draft mail, and junk mail. The spam filtering can be more efficient than traditional spam filtering. Where traditional spam filtering relies on other characteristics (for example whether the email address is associated with prior spam mail), the electronic communications system can filter spam more readily because the electronic communications account can be tied to a physical location. Not only can the electronic communications account generation itself be regulated (for example requiring verification of residency of a location), the mail can be assessed based on the physical location associated with the electronic communications account. For example, if mail arrived from an electronic communications account that is located in the middle of the ocean or out in a desert, the electronic communications system can determine that this mail is likely spam.

The inbox can include a preview of the mail received. For example, the electronic communications account, the title, a preview of the first few lines of the mail, and the time of arrival for the mail can be displayed.

The inbox can also allow a user to purchase mail credit and display available credit for the account owner of the electronic communications account. For example, the account owner can have 1 free mail credit available per day but have the option to purchase more mail credit. This can replace the need for stamps, envelopes, and other requirements for mailing a parcel via the post office.

Figure 20D:
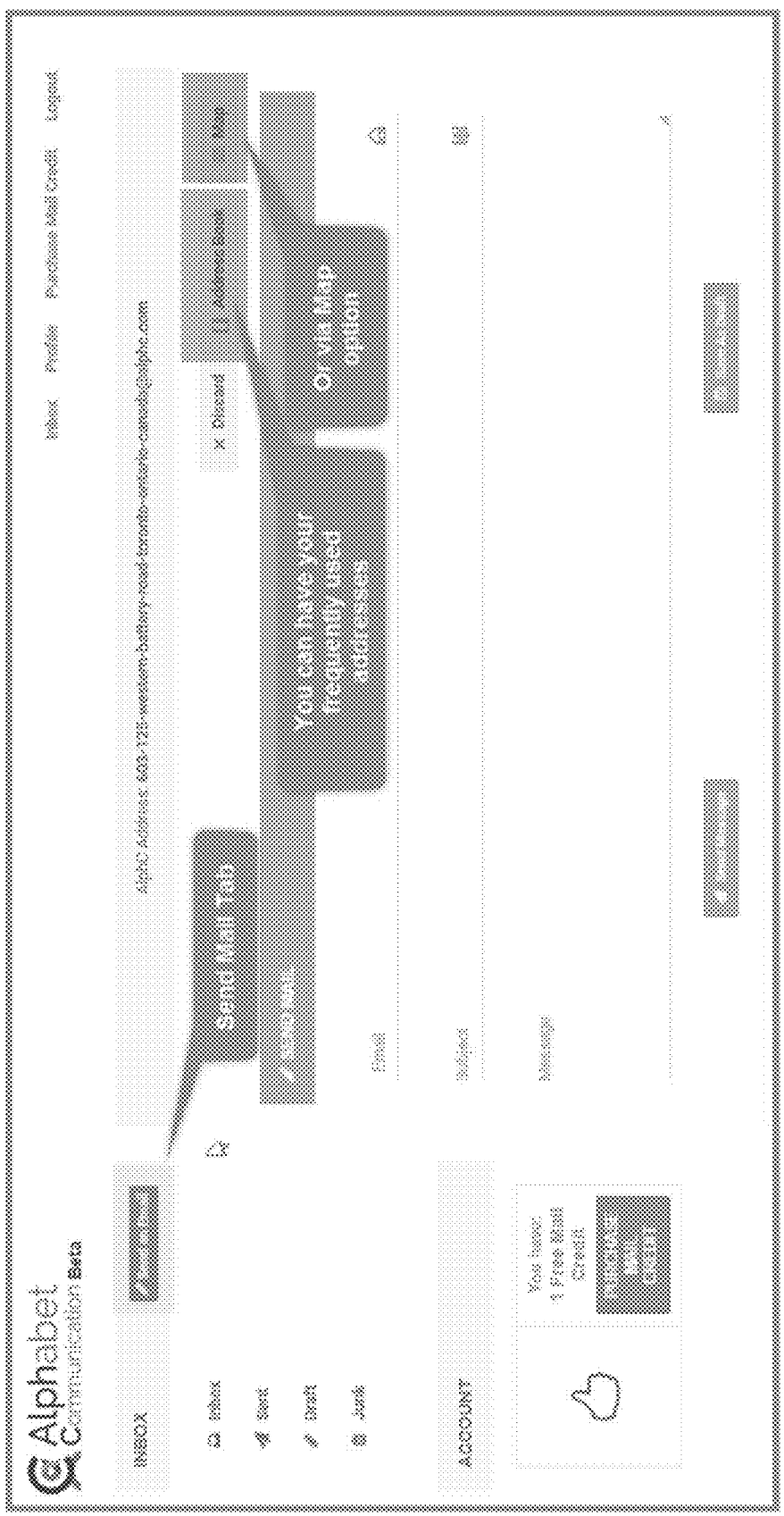
FIG. 20D is a diagram depicting an embodiment of a draft mail to be sent via an electronic communications account.

FIG. 20D is a diagram depicting an embodiment of a draft mail to be sent via an electronic communications account. The user display includes an address book where previously accessed electronic communications accounts can be retrieved. This option also allows physical mail, phone numbers, or other means of communications to be retrieved from the Address book. The mail can be sent from the electronic communications account to a physical mail address, text messaged to a phone number, executed on an application on a user device (for example a phone application), and the like.

The graphical user interface can include a map option. The draft mail can be sent to a physical location. The electronic communications system can determine the electronic communications account (or other address such as physical address) based on a marker placed on a map. The inbox can include an input where a user can manually enter in an electronic communications account, a phone number, or other communication address.

Figure 20E:
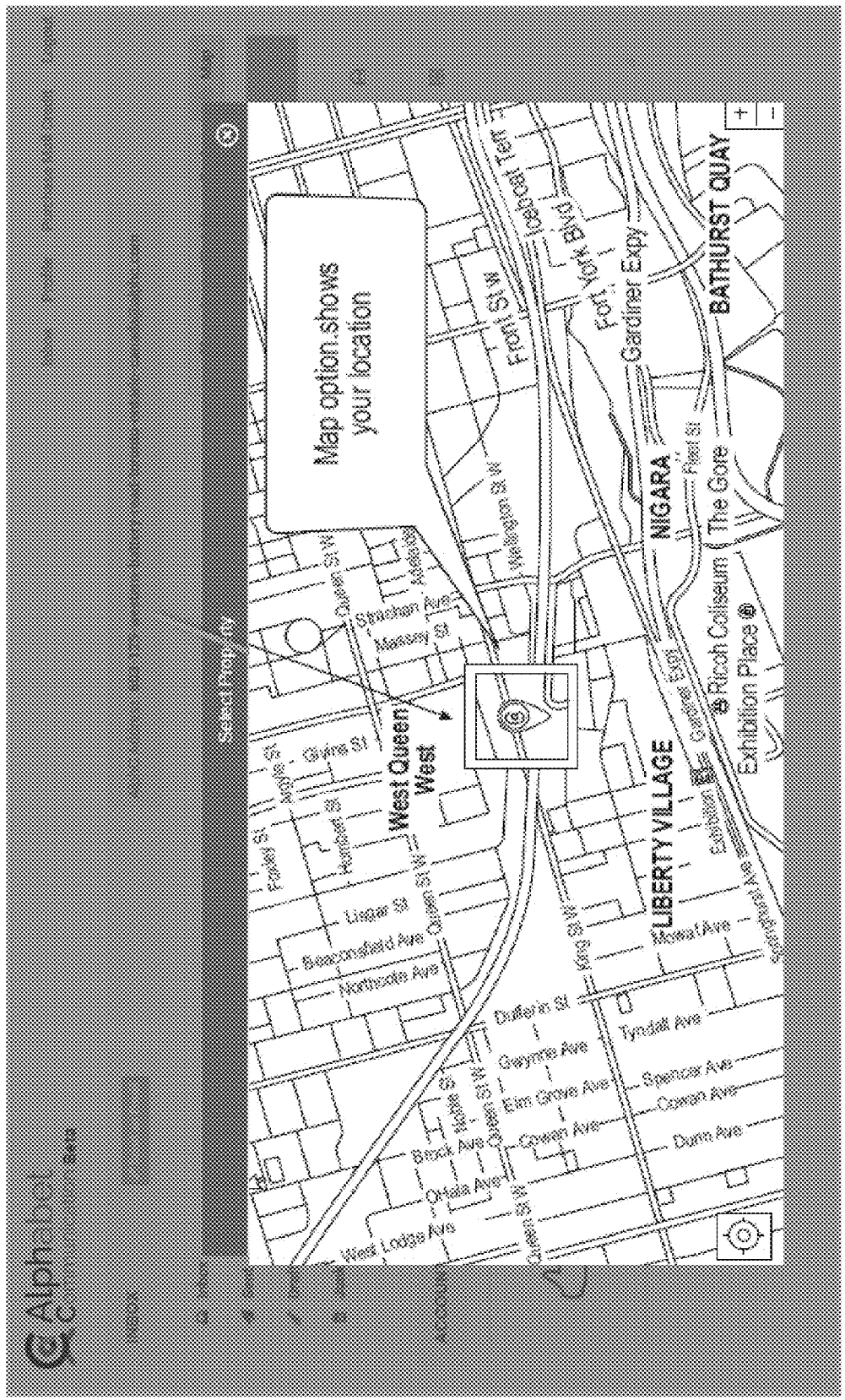
FIG. 20E is a diagram depicting an embodiment of a map option for sending mail from an electronic communications account.

FIG. 20E is a diagram depicting an embodiment of a map option for sending mail from an electronic communications account. The electronic communications system can display a map showing the location of the electronic communications account. The location can be the location of the user device. The location can be a location based on an electronic communications account that is to receive the mail. The location can be locations saved in the address book, or locations associated with accounts in the address book (for example the location of a phone associated with a phone number in the address book). The user can change the view of the map, such as zooming in or out. The user can search for particular locations (for example an intersection or a building name). The user can then select a location to send the mail to.

Figure 20F:
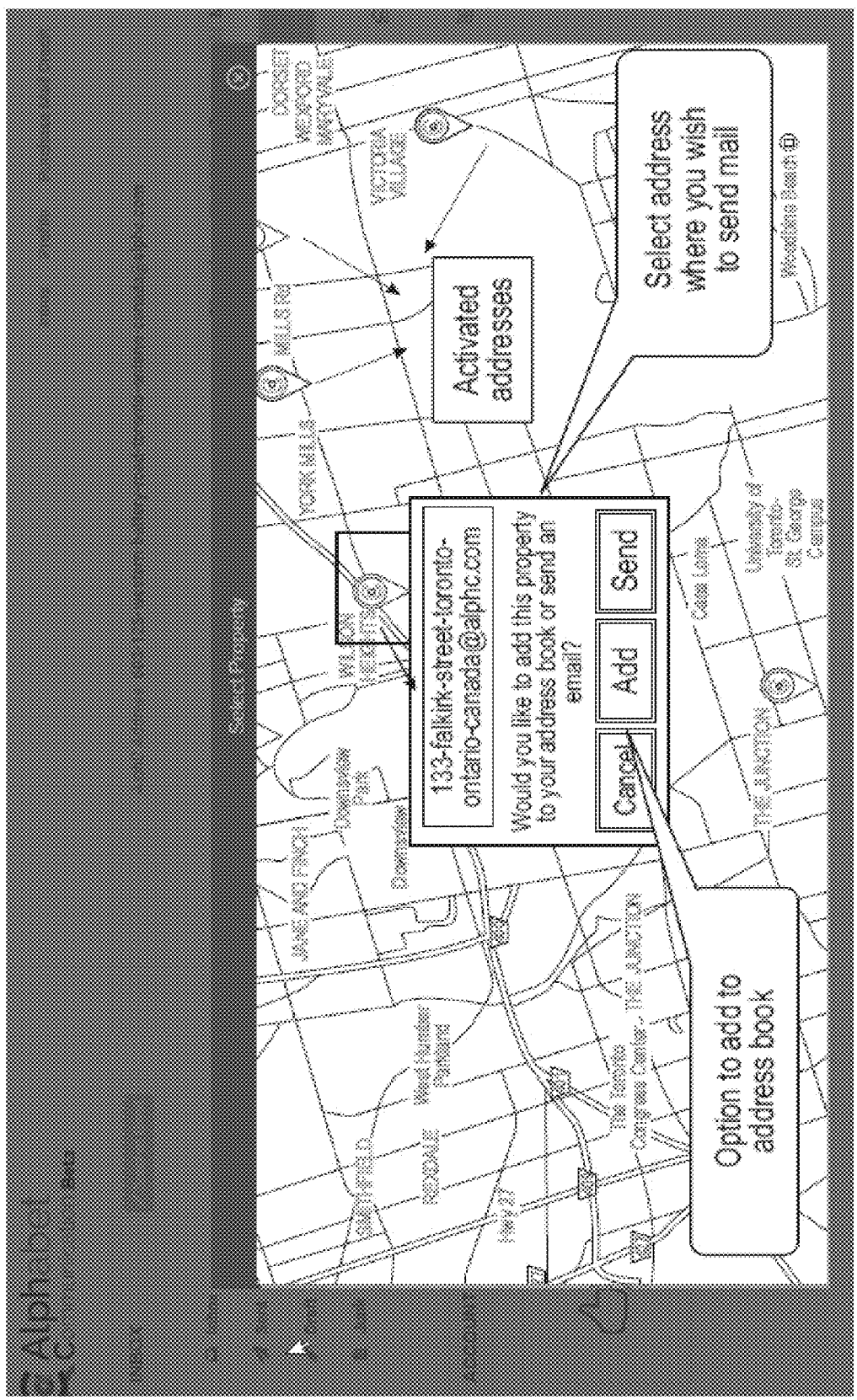
FIG. 20F is a diagram depicting an embodiment of a map providing the option to add an address and/or location of interest to the address book.

FIG. 20F is a diagram depicting an embodiment of a map providing the option to add an address and/or location of interest to the address book. The electronic communications system can provide the user the option to look at several points on a map. For example, the graphical user interface places several markers in a location. These markers can be based on a search or category (for example a search for nearby post offices).

The user can select the marker and the graphical user interface can provide more information on the location. For example, the graphical user interface can provide the electronic communications account of the marker. The user can be provided the option to add the marker and/or the information associated with the marker (for example the electronic communications account associated with the marker). The user can select to add the location to an address book and/or send a mail to the address marker.

Figure 20G:
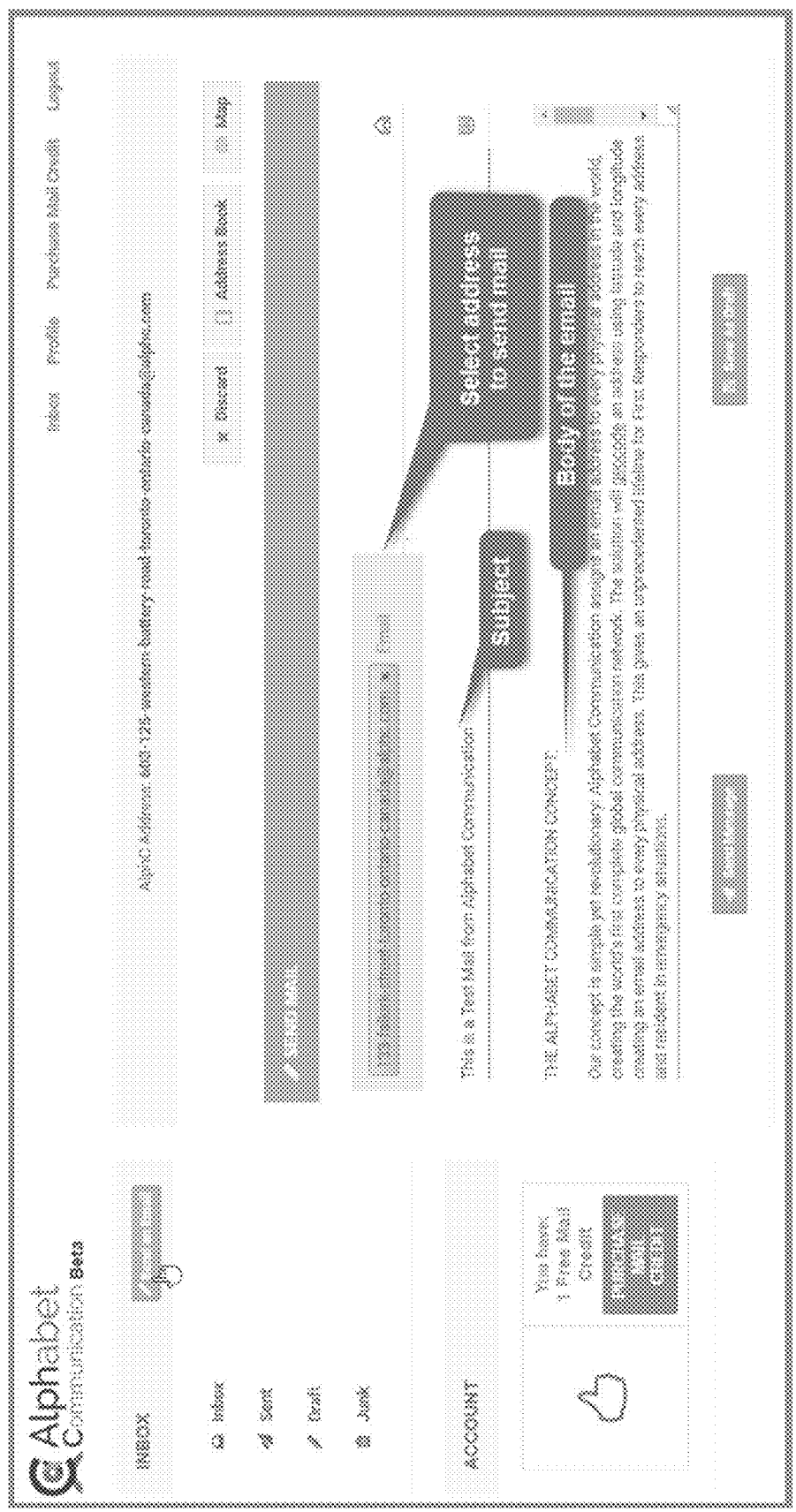
FIG. 20G is a diagram depicting an embodiment of a draft mail to be sent to an electronic communications account.
Figure 20H:
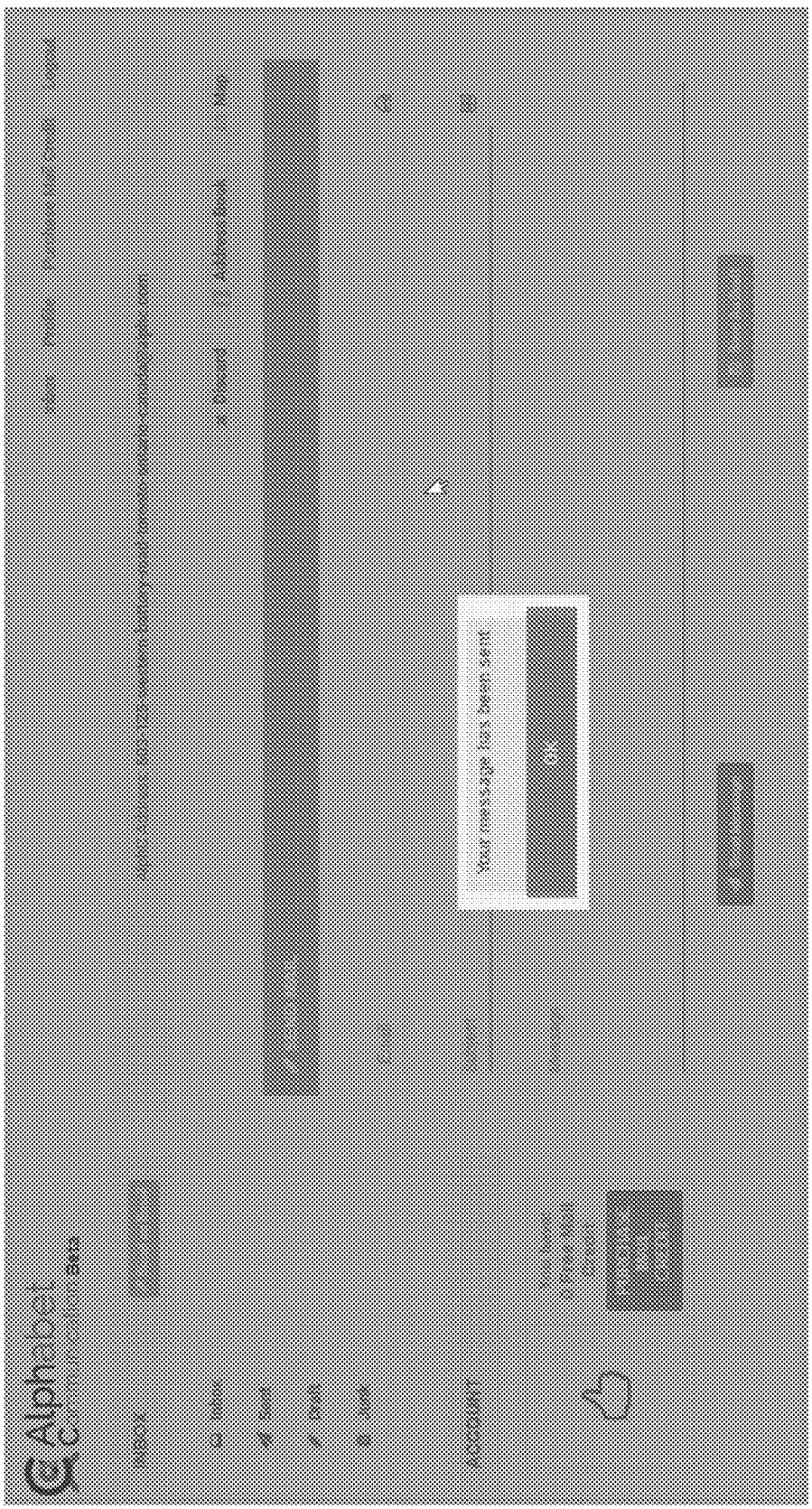
FIG. 20H is a diagram depicting an embodiment of a sent mail to an electronic communications account.

FIG. 20G is a diagram depicting an embodiment of a draft mail to be sent to an electronic communications account. The electronic communications account inbox can provide a location on the draft email to enter in the destination for the mail. For example, the destination can be an electronic communications account, an email, a physical address, a phone number, an application ID, and the like. The draft mail can include a subject line to add a title and a body section to add the body of the mail. FIG. 20H is a diagram depicting an embodiment of a sent mail to an electronic communications account.

Figure 20I:
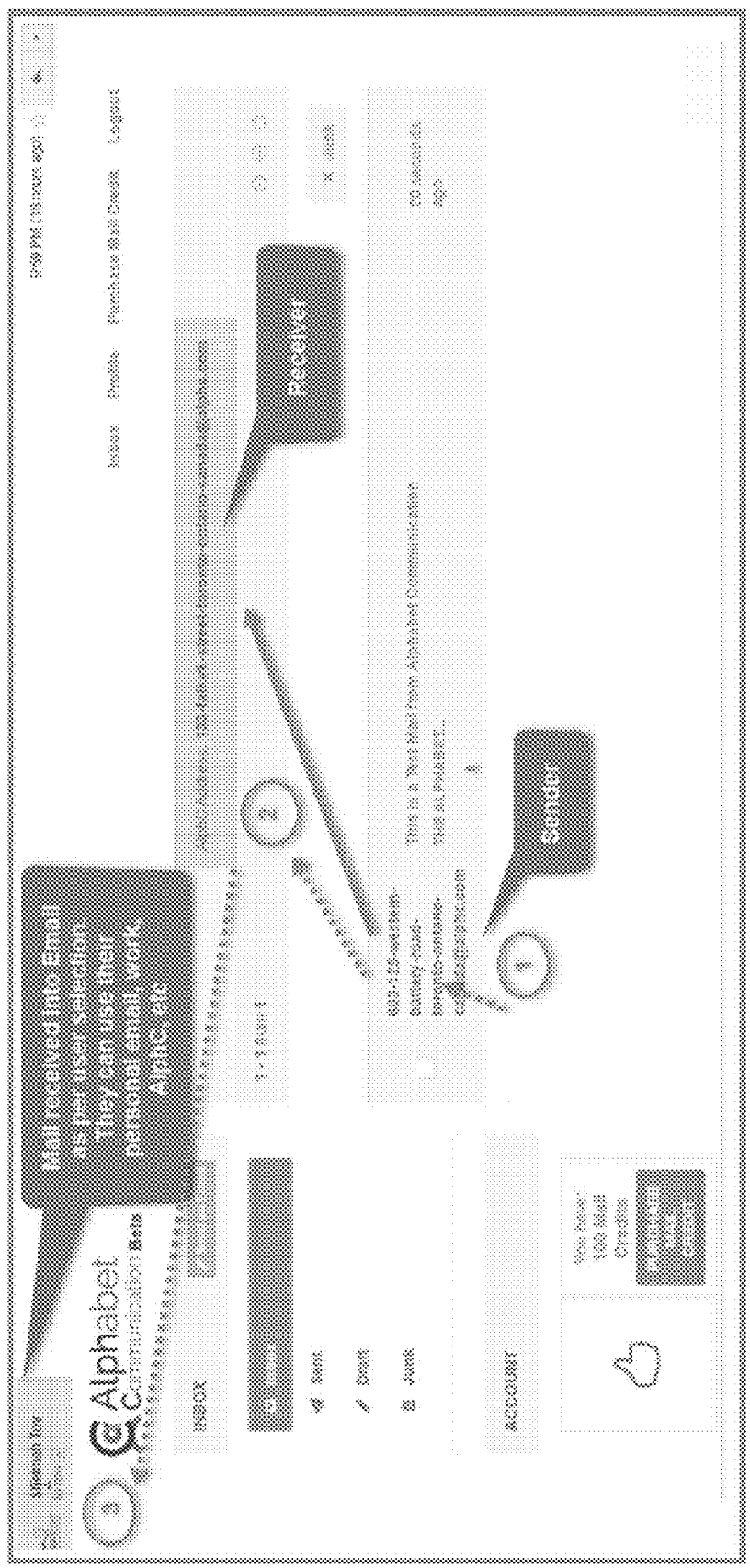
FIG. 20I is a diagram depicting an embodiment of selecting a channel of communication.

FIG. 20I is a diagram depicting an embodiment of selecting a channel of communication. In some embodiments, the mail can be received by a sender. In this embodiment, the sender is an electronic communications account (603-125-western-battery-road-toronto-ontario-canada@alphc.com). The receiver is an electronic communications account (133-falkirk-street-toronto-ontario-canada@alphc.com).

The user can indicate how the mail will be received. For example, the user can indicate that all mail will be sent via personal email, work email, directly to the electronic communications account inbox, text message, application on a user device (for example phone application), other channels of communication, and/or a combination. In some embodiments, the user can create filters for determining how the mail will be determined. For example, for short messages, the user can set a text message to be sent. In some embodiments, the filter can include identifying characteristics of the sender (for example sent from a particular area, from an electronic communications account, from a company, etc.) and the electronic communications system will determine which channel of communication the mail will be sent.

Figure 20J:
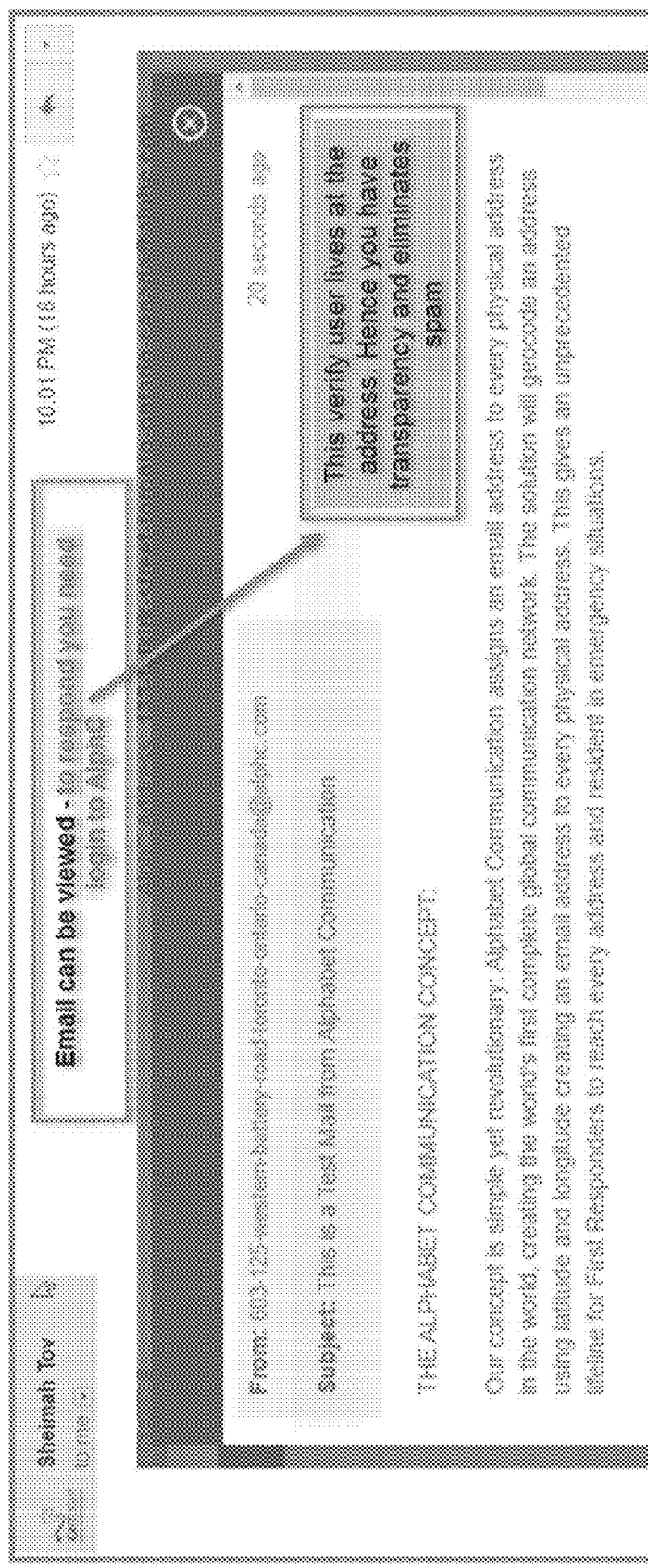
FIG. 20J is a diagram depicting an embodiment of electronic communications account verification to reduce spam and increase transparency.

FIG. 20J is a diagram depicting an embodiment of electronic communications account verification to reduce spam and increase transparency. In some embodiments, the electronic communications account sender can need to verify the user before generating an electronic communications account, being able to receive and/or send mail via the electronic communications account, send the electronic communications account to another user, or other functionality associated with the electronic communications account. For example, a mail sent to the electronic communications account can only be viewable upon logging into the system and verifying user information (for example verifying that the user resides at the address associated with the electronic communications account).

Figure 20K:
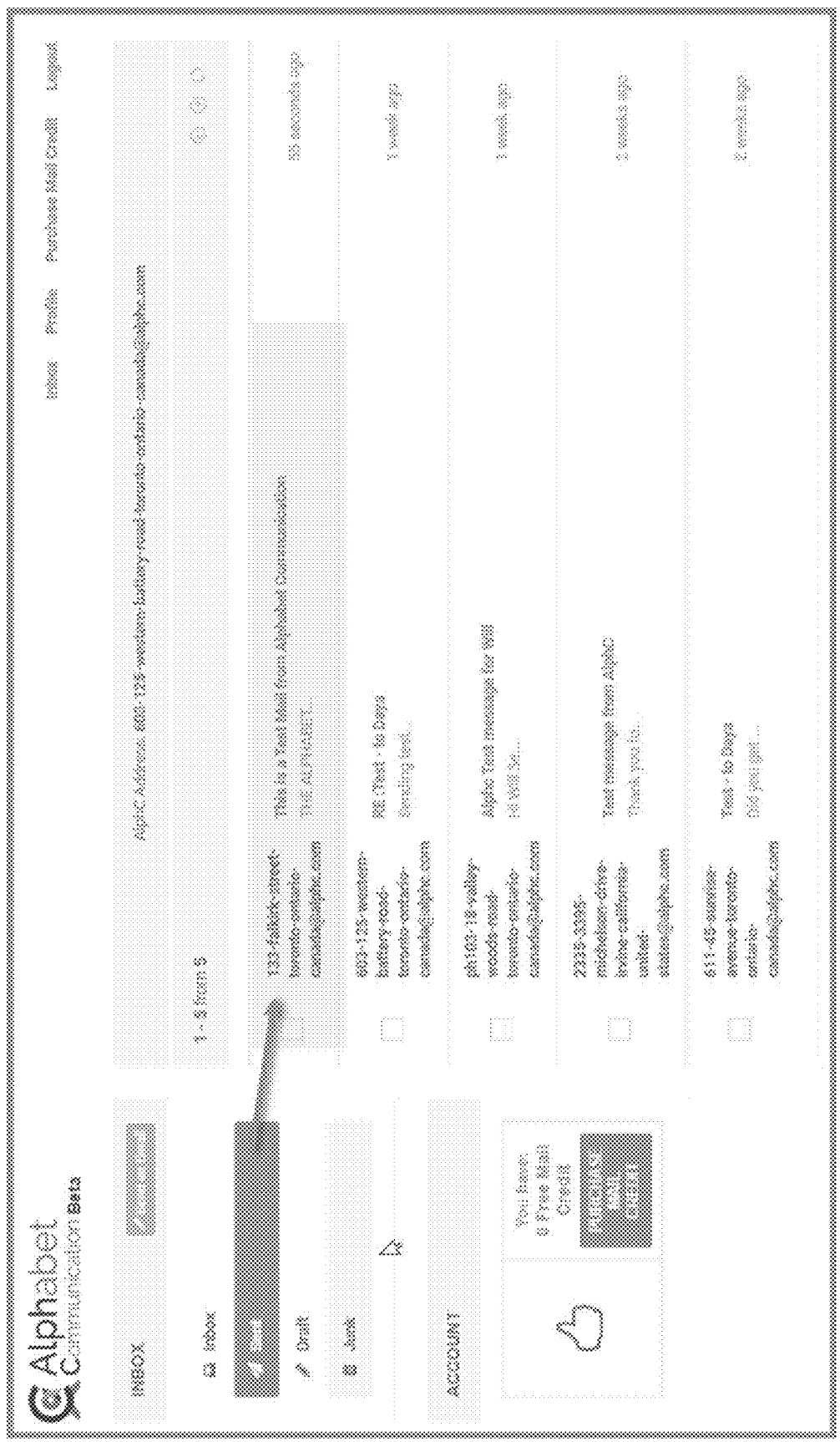
FIG. 20K is a diagram depicting an embodiment of a sent box for an electronic communications account.

FIG. 20K is a diagram depicting an embodiment of a sent box for an electronic communications account. The sent box can list mail sent to other addresses (for example electronic communications account, physical address, phone number). The illustration of FIG. 20K illustrates a list of electronic communications accounts where mail was sent. The sent mail can indicate a channel of communication. In some embodiments, the sent mail indicates an electronic communications account, and the receiving account determines the channel of communication. In some embodiments, the sent mail can indicate a characteristic of the mail that affects the channel of communication. For example, the sent mail can indicate an urgency whereby the receiving account can send the mail via text message if a higher urgency is indicated.

Figure 20L:
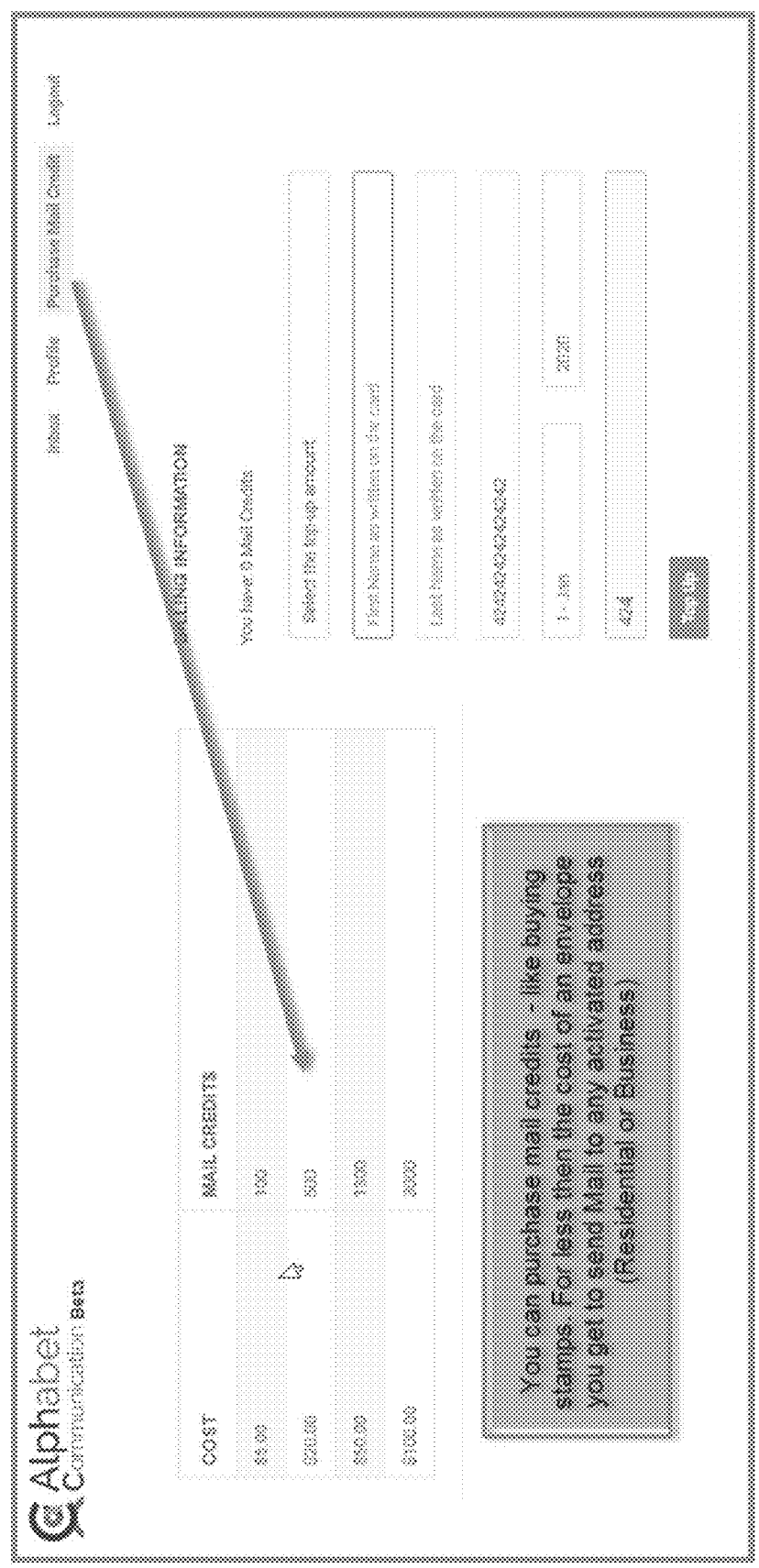
FIG. 20L is a diagram depicting an embodiment of an option to purchase mail credits.

FIG. 20L is a diagram depicting an embodiment of an option to purchase mail credits. In some embodiments, mail credits can be purchased. For example, mail credits can be purchased according to the amount of mail credits. For example, each mail credit can cost $5 if purchasing 100 credits, but can cost $100 if purchasing 3000 credits.

Figure 20M:
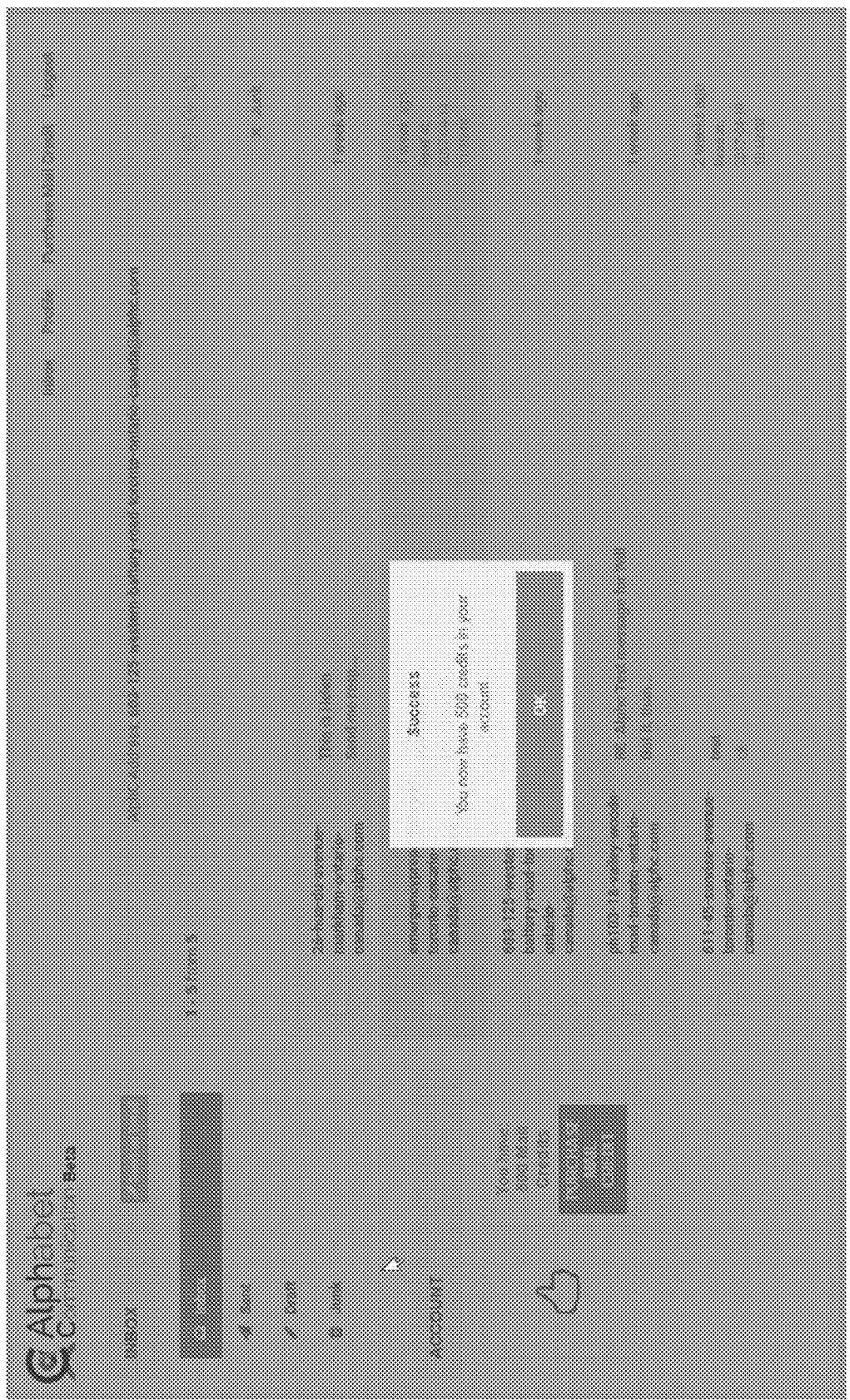
FIG. 20M is a diagram depicting an embodiment of successfully purchasing mail credit.

Mail credits can be used for different purposes and/or can cost different credit amounts. For example, it can cost a credit to receive and/or send a mail to an electronic communications account. There can be a surcharge for certain features. For example, additional mail credits can be required for sending a message through a particular channel of communication (for example more credits for a text message). Mail credits can be used to send large files and/or send messages at a particular period of time. FIG. 20M is a diagram depicting an embodiment of successfully purchasing mail credit.

Figure 20N:
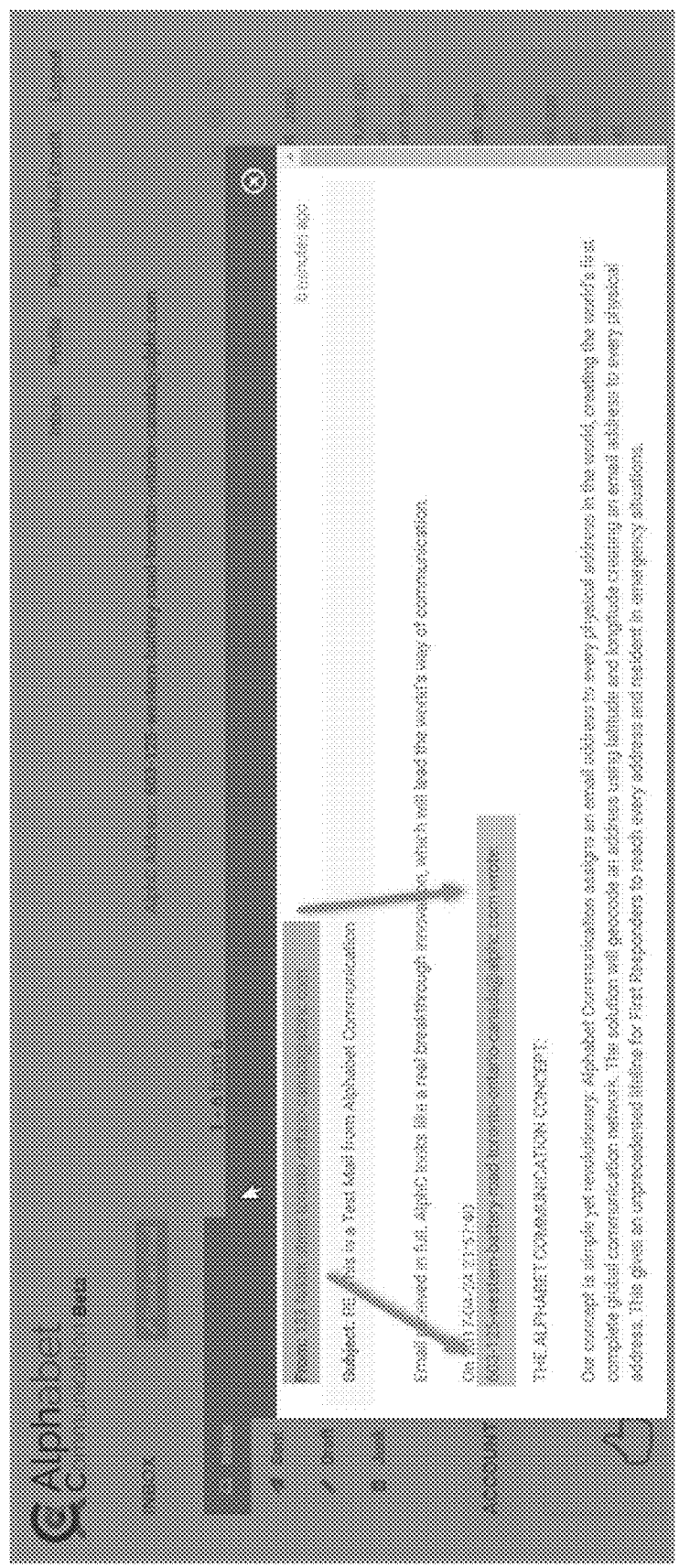
FIG. 20N is a diagram depicting an embodiment of a reply mail whereby the original email indicates the electronic communications account.

FIG. 20N is a diagram depicting an embodiment of a reply mail whereby the original mail indicates the electronic communications account. In some embodiments, for a reply and/or forward mail indicates information on the prior mail. Traditional emails show just the email of the sender. However, in some embodiments of the electronic communications system, the email address can be hidden, and only the electronic communications account can be shown. This improves privacy and security by adding an additional layer between the receiver and the email address.

Figure 20O:
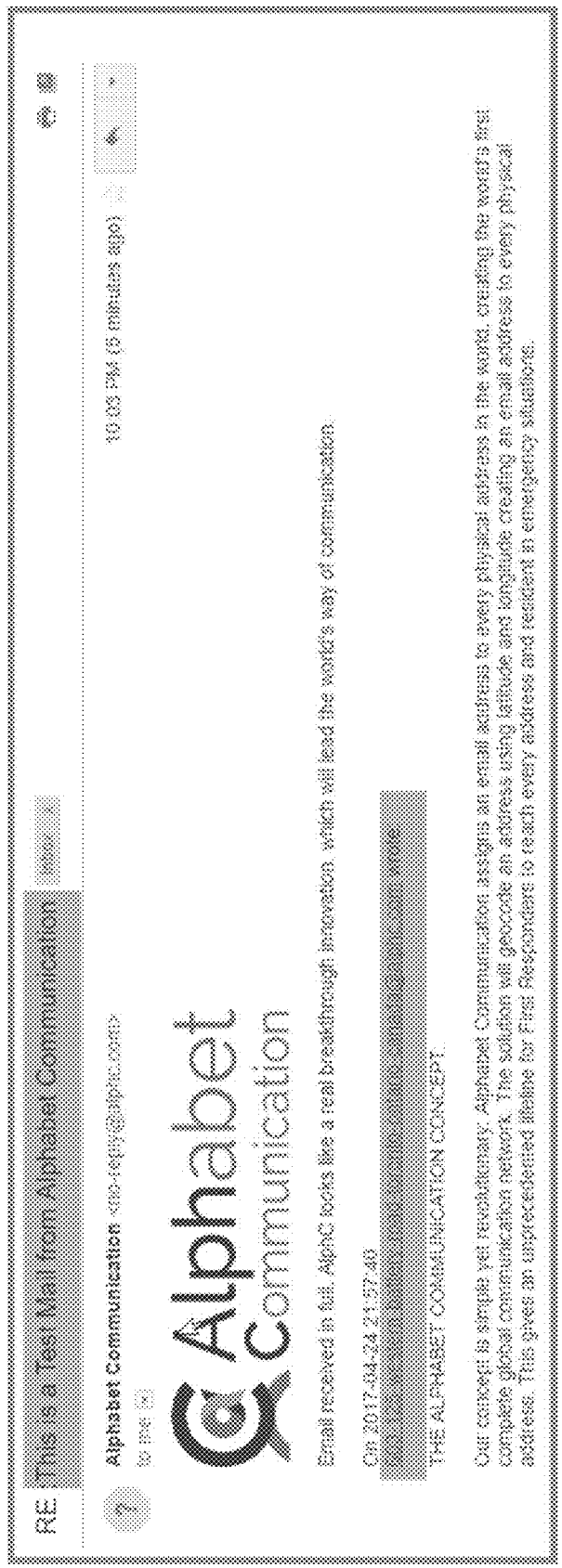
FIG. 20O is a diagram depicting another embodiment of a reply mail indicating the electronic communications account of the original sender.

In some embodiments, the reply and/or forward email can contain more information. For example, a physical address, a phone number, or other information associated with the electronic communications account can be shown. The electronic communications account can be shown to those that have authentication to see the electronic communications account (and other information). In some embodiments, the channel of communication is shown in the mail. For example, if the mail is sent via text message, then the reply email can show that the message was sent to a phone number. FIG. 20O is a diagram depicting another embodiment of a reply mail indicating the electronic communications account of the original sender.

Figure 20P:
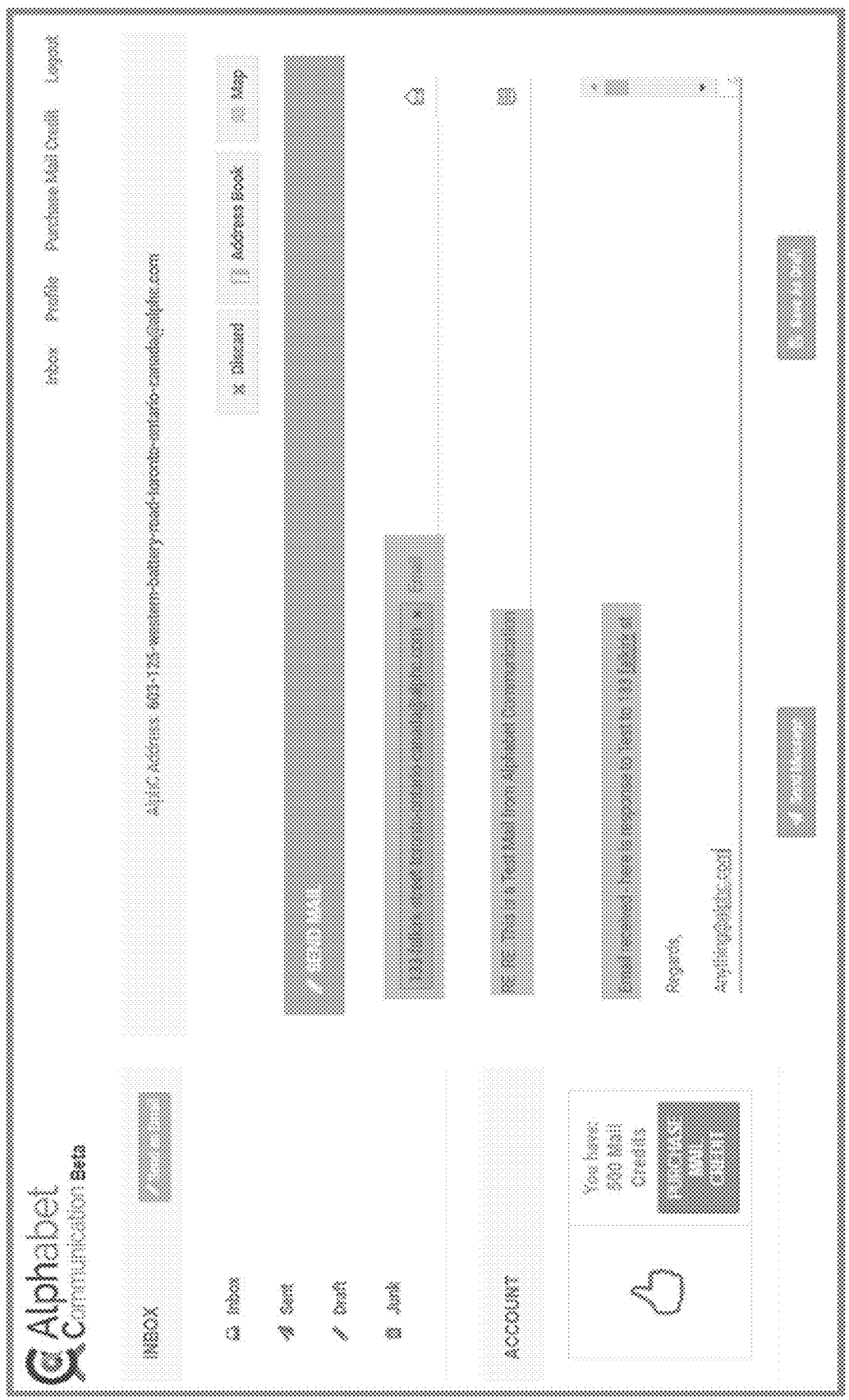
FIG. 20P is a diagram depicting an embodiment of drafting a response reply email.
Figure 20Q:
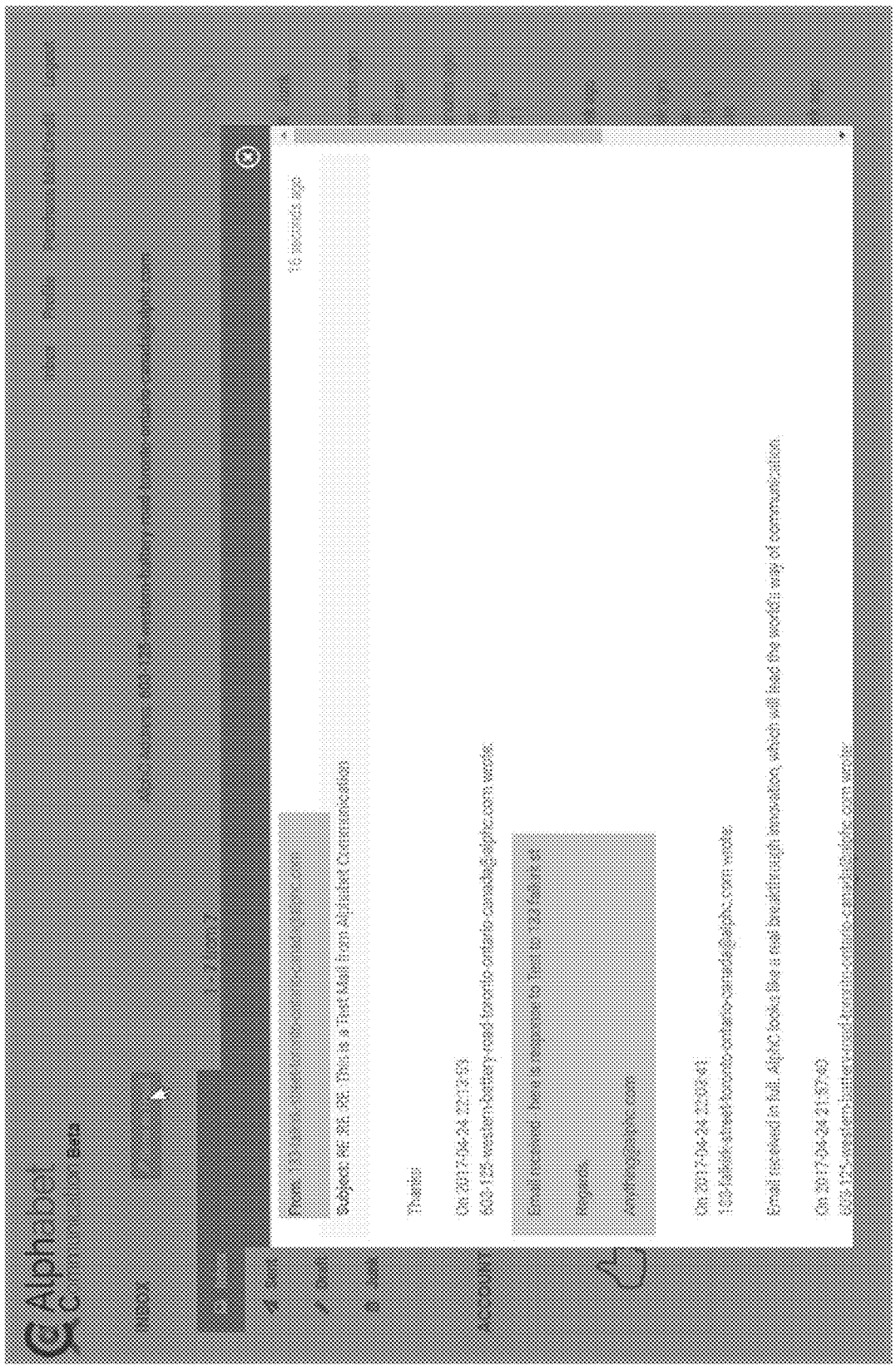
FIG. 20Q is a diagram depicting another embodiment of drafting a response reply email.

FIG. 20P is a diagram depicting an embodiment of drafting a response reply email. In some embodiments, a response reply email can be requested. For example, upon generation of the electronic communications system, the electronic communications system can run a test whereby mail is sent to an electronic communications account. In the example of FIG. 20P, the electronic communications account is associated with a physical address (133 Falkirk st). The response reply email indicates that the electronic communications account is functional to the electronic communications system. FIG. 20Q is a diagram depicting another embodiment of drafting a response reply email.

Status Between User and First Responder

Figure 21:
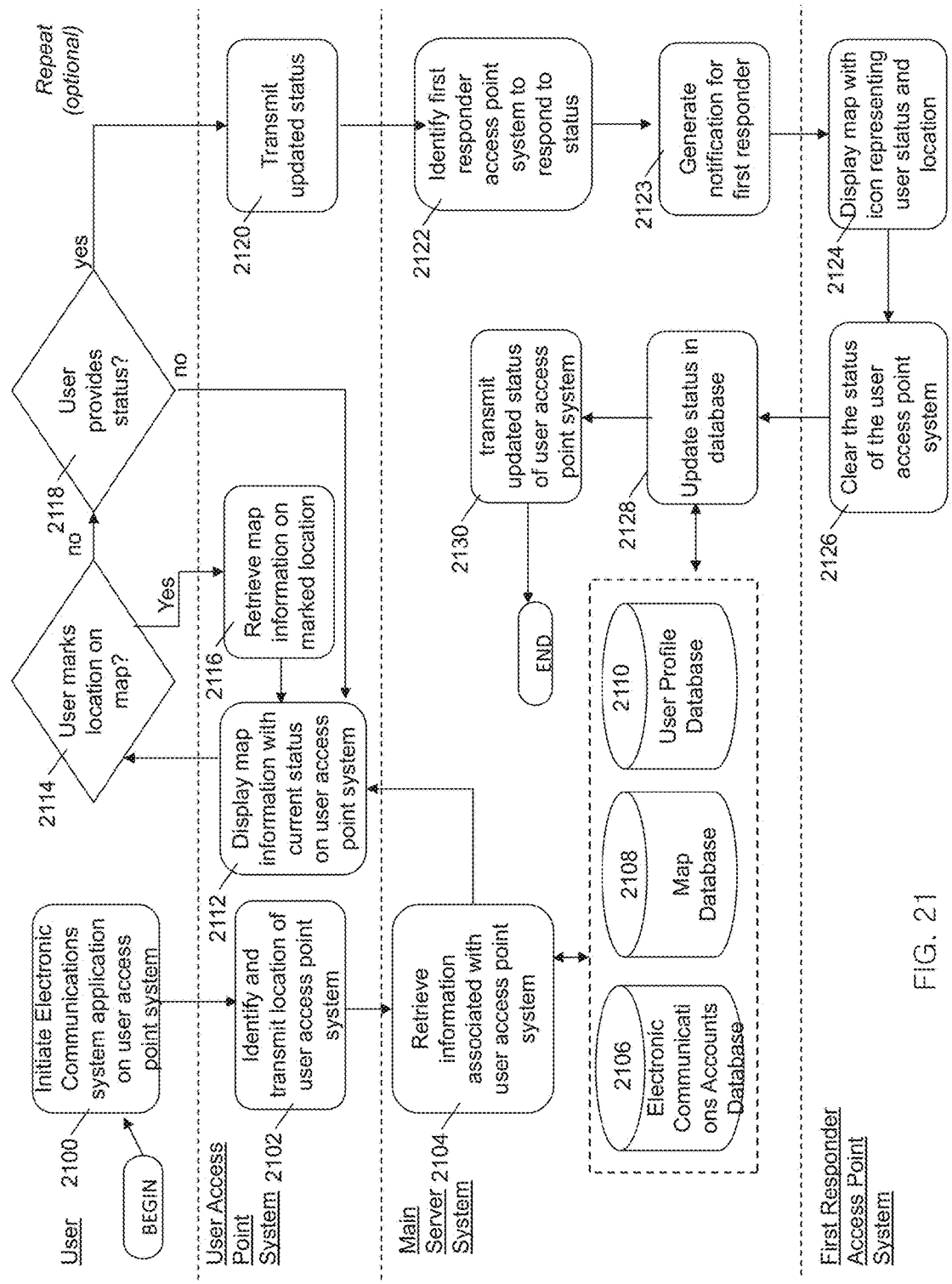
FIG. 21 is a diagram depicting an embodiment of statuses between a user access point system and a first responder access point system.

FIG. 21 is a diagram depicting an embodiment of statuses between a user access point system and a first responder access point system. At block 2100, the user can initiate an electronic communications system application on the user access point system. For example, the user can open an application on a remote device that initiates an application for the electronic communications system. In some embodiments, the remote device is continually transmitting information to the electronic communications system without requiring the user to open a separate application.

At block 2102, the user access point system can identify the location of a user access point system. In some embodiments, the user can designate another device for the location to be accessed and sent to the main server system. In some embodiments, the location of several user access point systems can be sent. For example, the location of a remote user device (for example cell phone) and the location of a vehicle can be sent to the main server system.

At block 2104, the main server system can retrieve information associated with the user access point system. For example, the main server system can retrieve map information of the location for the user access point system from a map database 2108. The main server system can retrieve user profile information from a user profile database 2110. A user profile database 2110 can be helpful in determining characteristics associated with an electronic communications account. For example, the user profile database 2110 can request location information for a remote device for one user, but can request location information for a vehicle for another user.

At block 2112, the user access point system can display map information. The map information can be of a location of the user access point system. For example, if the user access point system is currently located in Toronto, Canada, the map can be a map of Toronto.

In some embodiments, the current status of the user can be illustrated. For example, the default status can be "unknown." In some embodiments, the user access point system can determine a status based on information available. For example, the user access point system can use the last status that was available for the user access point system. The user access point system can change the default status based on an incident. For example, for a routine update of map information, the last status can be used, but in response to a recent fire in the area, the system can set all default statuses to "unknown," given the new danger.

In block 2114, the user can mark a location on the map. The mark can be to direct the attention of the first responders. For example, if the user is close to the fire but not directly there, the user can mark a certain area such that the first responders can have a better idea for the location of the fire. The mark can be for a particular specific location or can be drawn with boundaries or a certain area (for example radius). The user can use these features to indicate an area (for example when the user is unsure on the exact location).

If the user marks a location on the map, the map is retrieved in block 2116 and displayed at block 2112. The map can illustrate the user access point system and/or the marked location. The map can be sent to the first responder access point system to display the marked location and/or the user access point system in reference to the first responder access point system location.

If user does not mark a location on the map, the user can provide a status at block 2118. If the user does not provide a status on the graphical user interface, then the user access point system can continue to display map information at block 2112 and determine whether the user marks the map at block 2114 and whether the user provides status at block 2118.

If the user provides a status, then the status is transmitted at block 2120. The main server system receives the transmitted updated status, and the main sever system identifies a first responder access point system to respond to the status at block 2122. The main server system can determine the first responder based on characteristics of the first responder, the user access point system, and/or the type of alert. For example, the main server system can identify a first responder in the vicinity of the user access point system. The first responder can be chosen based on the particular need (for example firefighters for a fire). The first responder can be chosen based on the availability (for example some first responders can be busier than others).

At block 2123, a notification can be generated and sent to the first responder access point system. At block 2124, the first responder access point system can display a map with the icon representing the user access point system and its location, status, and/or other information.

At block 2126, the first responder access point system can change the status of the user access point system (for example clear the status of the user access point system). For example, the first responder can have addressed the need of the user (for example broken leg). Then, the first responder can clear the status at block 2126 of the user access point system, and the main server system can update the status database at block 2128 and transmit updated status of the user access point system to other systems. For example, the status can be sent to the user access point system such that the user can see that the status is changed. The user can thereafter challenge the change of status, or request more information on the change. The status can be sent to other user access point systems (for example family members concerned about the user). The status can be sent to other first responders notifying them that the help request has been handled.

Inferring Status of Users

Figure 22:
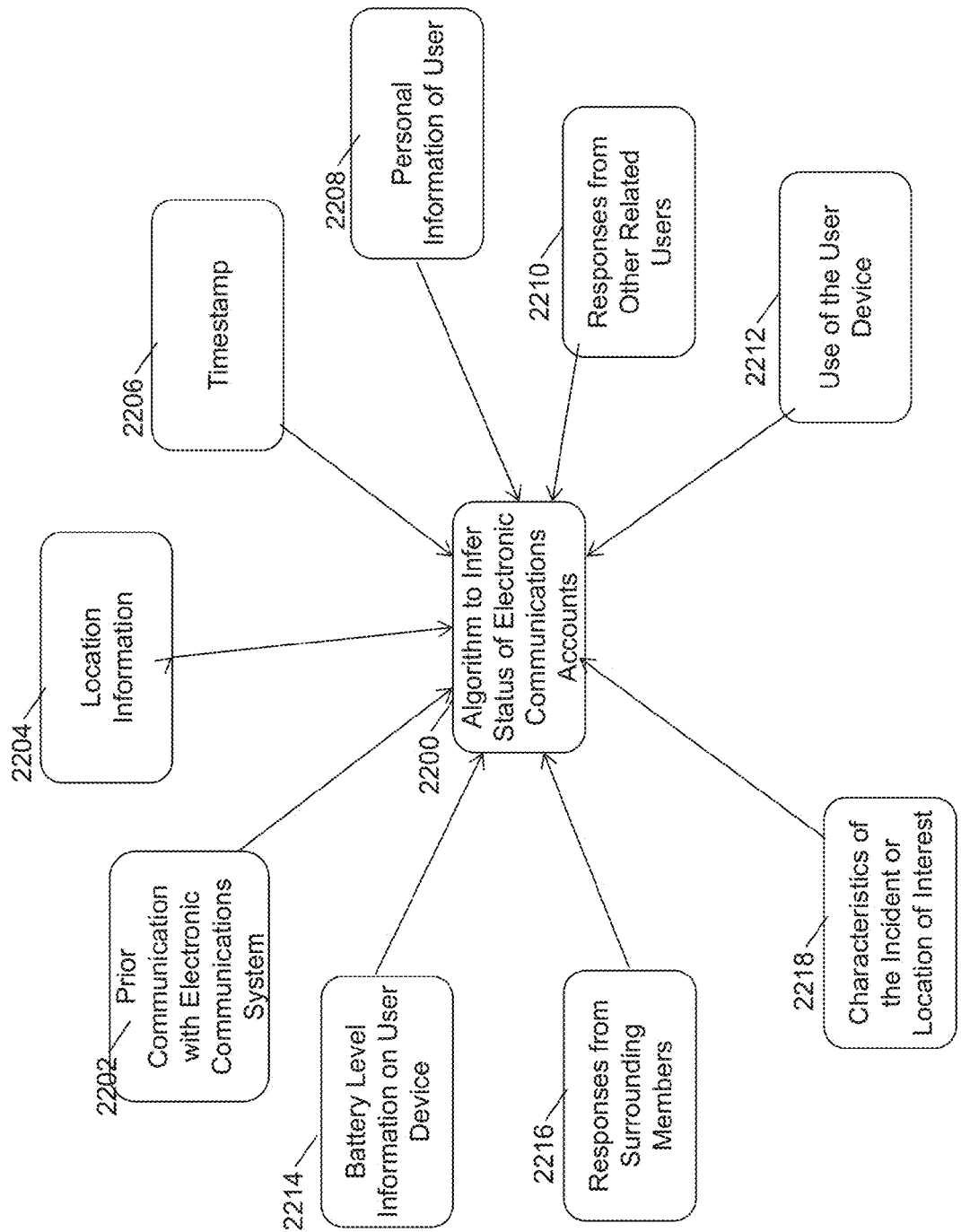
FIG. 22 is a diagram depicting an embodiment of an algorithm for inferring the status of an electronic communications account.

FIG. 22 is a diagram depicting an embodiment of an algorithm for inferring the status of an electronic communications account. The algorithm can be used to infer a status of an electronic communications account. For example, the algorithm can be used to determine a default status (for example upon initiation of the system for the user device). The algorithm can also be used when a response from an electronic communications account has not been received. The time the system waits before the algorithm is run can be based on several factors. The system can wait a shorter period of time when the urgency of an incident is more imminent. The algorithm can be run on some user devices but not other user devices associated with the same electronic communications account. The algorithm can use one set of characteristics for one device, and another set of character At block 2200, the algorithm can determine a status (and/or infer a status) of an electronic communications account based on different characteristics. The algorithm can infer the status of an electronic communications account using prior communication with the electronic communications system at block 2202. For example, if the user device was connected with the electronic communications system an hour before in a location far away, then the algorithm can determine that the user is not likely affected by the incident (for example user is likely far away from the fire in California if the user connected with the electronic communications system in New York). In another example, the user can have connected with the electronic communications system and reported that the user was safe from the small fire that started an hour ago and was heading west away from the fire. This can be used by the algorithm an hour later to infer that the individual is likely safe because the individual knew of the danger and was heading away from it.

At block 2204, location information can be used to determine the status of the electronic communications account. A user device can send location information (for example latitude and longitude information) to the electronic communications system such that the electronic communications system can locate and/or track the movements of the user device. The algorithm may not need to send an alert and request a response if the electronic communications account system knows that the user device is not near the location of incident. In some embodiments, location information can be received from various user devices. For example, location information can be received from a mobile phone. If the mobile phone does not currently have the option to send location information, the vehicle location information can be received. If both are received, both can be compared and if the vehicle and mobile device location are the same, then the algorithm can apply a higher likelihood of the location for the individual.

At block 2206, time stamp information can be used. Time stamp can be used in conjunction with other information. For example, location information 2204 can be used with time stamp information 2206 to determine where the individual is likely headed by assessing patterns of movement over time.

At block 2208, the algorithm can use personal information of the user. For example, the algorithm can use demographic data, sex, race, economic status, age, level of education, income level and employment, psychiatric data, medical data, a personality trait, an interest, values, attitudes, lifestyles, opinions, preferences, likes or dislikes, predilections, purchase history, browser history, financial history and data, credit history and data, personal history and data, other activity data, and the like. For example, if the individual can only walk at a slow pace and is determined to be near an area of danger, then the algorithm can infer that the status of the individual is likely not good and is likely in need of help.

At block 2210, responses from other users can be used. For example, if the electronic communications system receives responses from several family members, the electronic communications system can request the family members to report their latest status of other family members (for example are they on vacation out of town? Are they with you and safe?).

At block 2212, use of the user device can be assessed to determine the status of an electronic communications account. The use of data on a user device can indicate that the user is alive and is looking for help. The ack and nack from a user device can indicate whether the user is receiving alerts. The user can be searching for particular information that can indicate his or her current status (for example searching for "finding family members in natural disaster" can indicate that the individual is safe but looking for family members).

At block 2214, the battery level on a user device can be assessed. For example, if the battery level was very low in the last hour and the user device is not responsive to alerts and/or notifications, then the algorithm can determine that it is likely that the user device has turned off from a lack of power.

At block 2216, responses from surrounding members can be used to assess the status of the electronic communications account. For example, if the electronic communications account is found to be among other electronic communications accounts, and about 80% of the other electronic communications accounts in the vicinity of the electronic communications account of interest reported that they are safe and not in need, then the algorithm can determine that it is likely that the electronic communications account of interest is also safe.

At block 2218, the algorithm can assess the incident (for example fire) and/or location of interest (for example particular building) to determine the status of an electronic communications account. If the incident of danger moves from one location to another (for example a gunman drives to another town), then the status of the electronic communications account in the previous area of the gunman can change from potentially in danger to cleared.

The algorithm can make a determination of the status of the electronic communications account. The algorithm can determine a confidence factor of the determination of the status of the electronic communications account. For example, an electronic communications account can have a high confidence factor that the electronic communications account is safe because the individual last connected with the electronic communications system 10 minutes ago and was far away from the incident.

The algorithm can infer a status using a variety of different methods. For example, the algorithm can be a threshold, a lock step, a table look up, machine learning, and/or a combination. The algorithm can include self-learning techniques (for example a neural network trained for a fire, and another neural network trained for a flood).

Prioritize First Responder Resources

The electronic communications system can prioritize resources for first responders. For example, the electronic communications system can look at various factors when deciding how to approach an incident of danger.

FIG. 23 is a diagram depicting an embodiment of prioritizing first responder resources. The electronic communications system can prioritize first responder resources based on a variety of different factors 2300. The electronic communications system can prioritize based on mobility 2302. The electronic communications system can assess traffic information and route information to determine where first responders should go to first. For example, if there are areas of high traffic but low percentage of people in need, whereas another location has low traffic but high percentage of people in need, the electronic communications system can direct more first responders to the latter than the former location.

The electronic communications system can also assess other mobility factors. For example, the electronic communications system can determine that some of the first responders are fast but may not be able to take on patients that need a smooth ride to the hospital. The electronic communications system can also look at the accessibility of the property. If specialized equipment is required and/or if the property is not easily accessible, then the electronic communications system can prioritize accordingly.

In 2304, the location information can be used to prioritize first responders. For example, the system can determine that a first responder should pick up one patient in its near vicinity before picking up another patient far away. The system can determine that there are sufficient first responders in one area and can send supplemental first responders in that one area to another area that is in need of first responders. First responder activity can be tracked for efficiency based on location services being turned-on on their mobile device. Vital signs of first responders can be linked the main database providing timely and live data.

In block 2306, the timestamp information can be used to prioritize first responders. For example, if the time stamp of an urgent request can have a higher priority than another urgent request that was recently just submitted.

In block 2308, the system can assess personal information of a user to prioritize first responders. A person's health or age can be used to determine the fragility of the individual, and can set to attend to these individuals over those that are healthy and in their 20's to 30's.

In block 2310, the system can assess the type and urgency of the assistance required. The system can direct a first responder to an individual that is suffering from a heart attack as compared to an individual with a broken leg, given the urgency of providing care faster to an individual suffering a heart attack. The system can also weight the fact that an electronic communications account individual with an unknown status can be safe, and thus a first responder can be sent to check on an individual with an affirmative help response that is further away, rather than an individual without a response that is closer to the first responder.

In block 2312, the system can allocate a first responder's resources based on other first responder's availability. If the system shows that other first responders can be able to attend to the needs of individuals in areas A and B, then the system can send the first responder to area C.

In block 2314, the location of hospitals and treatment facilities can be assessed. For example, the first responders can be sent to an individual that is on the way to a hospital. The system can prioritize treatment facility locations based on the needs of the individuals. For example, the electronic communications system can inform the treatment facility services to establish a location for treatment in a close vicinity of a cluster of individuals with a high urgency of help.

In block 2316, responses of surrounding members can be used to prioritize first responder resources. For example, if people in one area are helping each other such that the statuses of individuals are changing more to clear for the same type of need, the system can infer that the other individuals with similar help needs can ultimately be clear from the need. Accordingly, responses from surrounding members can be a good indication of what will happen to the individual in the future.

In block 2318, characteristics of the incident (for example fire) and/or location of interest (for example houses made of wood) can be used to prioritize first responders. For example, if a fire occurs and the houses up north are made of wood, the first responders can be sent to those houses as highest priority because those houses can spread the fire faster than the other houses made of stone. If the fire is spreading to areas where houses are made of wood, then first responders can be sent to block the fire from spreading in that direction.

In block 2320, data from the user device can be used to determine first responder resources. For example, if the user device is a medical sensor, the medical sensor can provide update information on the individual which can affect the urgency of the help needed. The individual can be getting better and have a lesser need for help, or vice versa. The user device can be a mobile phone, and the system can receive a video or audio feed of the incident. This information can be used to determine the urgency of the help requested by the individual, and accordingly, prioritize the first responder resources.

Global and Local Marketing Platform

In some embodiments, an entity can use the electronic communications system to initiate a local, national or international marketing campaign. The entity can send an advertisement, an offer for sale, a coupon, a discount, a service, a product, a solicitation, or the like. Marketing can be precise, site specific and targeted to eAddress based on area of interest. The electronic communications system can allow the entity to identify electronic communications accounts and send the advertisement to the identified electronic communications accounts/eAddresses. Traditional marketing lacks the many possibilities and advantages associated with targeted electronic communications system based methodology of marketing. The eAddress of the entity can be transparent to all receivers of the marketing material.

The marketing entities can be vendors (for example local vendors) and/or be in communication with vendors. The marketing campaigns can target visitors with special needs, recommendations, coupons, sites to visit, and the like. The marketing companies can target a specific building, a small and/or large area based on panning, and the like. The marketing campaign can be directed toward a particular category and associated individuals to the category. Accordingly, the marketing campaign can be area specific and based on a client's area of interest.

For example, the user can desire to select a particular area. This selection can be based on area of interest, a percentage of individuals, demographic data, sex, race, economic status, age, level of education, income level and employment, psychiatric data, type of business, medical data, a personality trait, an interest, values, attitudes, lifestyles, opinions, preferences, likes or dislikes, predilections, purchase history, browser history, financial history and data, credit history and data, personal history and data, other activity data, and the like.

In some embodiments, the electronic communications system can allow the entity to filter electronic communications accounts. For example, the electronic communications system can select criteria to be used to filter electronic communications accounts (for example electronic communications accounts associated with households with children). The electronic communications system can allow the entity to filter electronic communications accounts in different stages. For example, the entity can filter electronic communications accounts based on a selection on a map, then select criteria to further filter the electronic communications accounts once chosen.

Figure 24A:
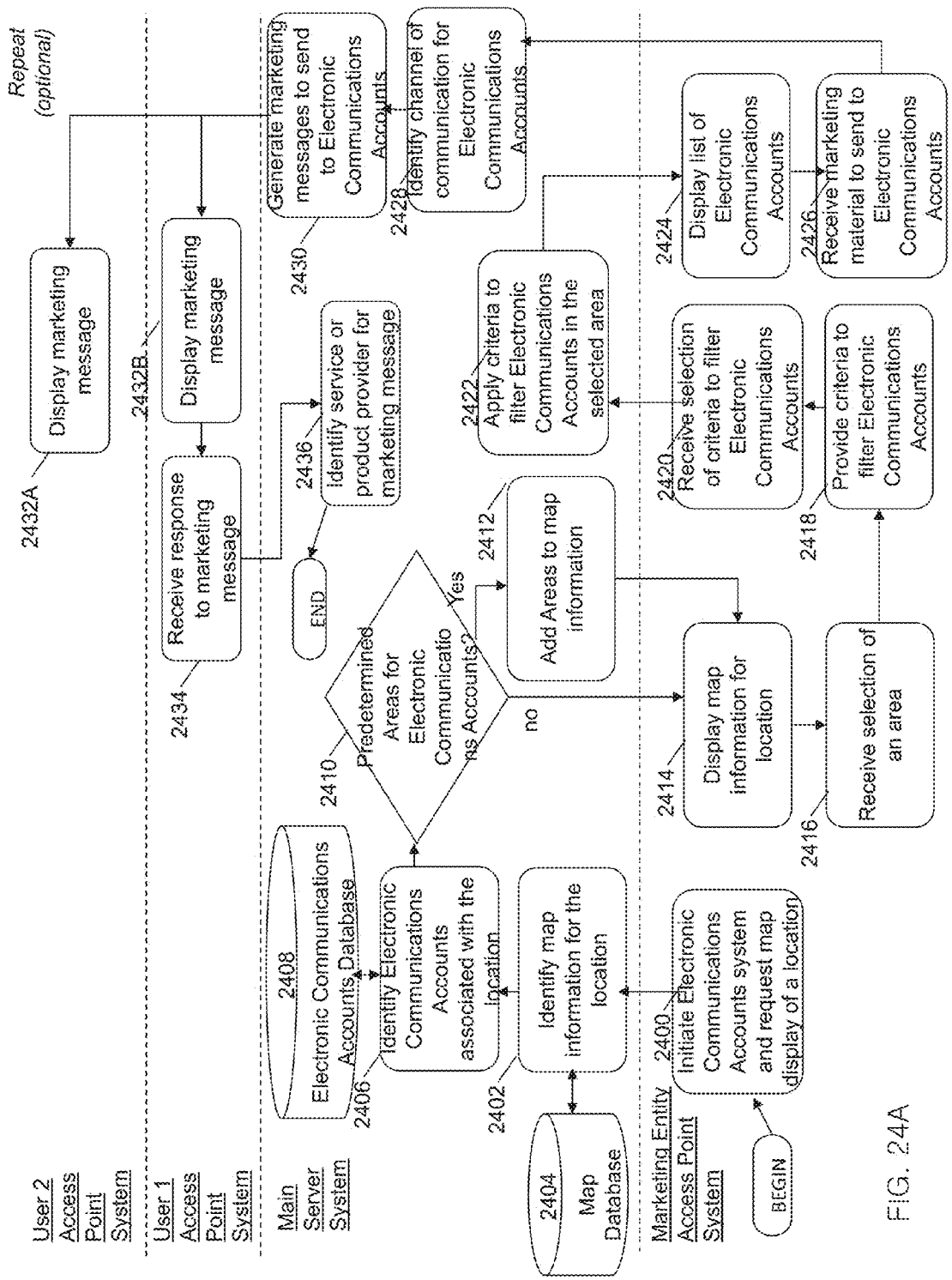
FIG. 24A is a flow diagram depicting an embodiment of an entity initiating a marketing campaign.

FIG. 24A is a flow diagram depicting an embodiment of an entity initiating a marketing campaign. At block 2400, the marketing entity access point system can initiate the electronic communications system. The marketing entity can initiate the electronic communications system my logging into the website. The marketing entity can automatically initiate communication with the electronic communications system by using communication protocols (for example API, push, or pull call function).

The marketing entity access point system can request the electronic communications system to display a map of a location and/or to retrieve location information. The map information can be displayed on a graphical user interface. In some embodiments, the map information can be coordinates. The map information can be of a selected location. The map information can be associated with a location of an electronic communications account, a marketing entity location, the location of a vendor or franchise location, or the like.

At block 2402, the main server system can identify map information for the location. The map information can include topographical information, road information, climate information, political information, economic information, demographic information, physical map information, resource map information, thematic map information, and the like. The map can be displayed in different formats. For example, the map can be projected in cylindrical, azimuthal, conic, polyhedral, retro azimuthal, and the like. The main server system can retrieve map information from a map database 2404.

At block 2406, the main server system can identify eAdresses associated with the location. The main server system can retrieve information on electronic communications accounts in the electronic communications account database 2408. The main server system can identify electronic communications accounts that are associated with the location. The electronic communications accounts can be identified based on a distance from the location. The electronic communications accounts can be identified base on geographical lines, political lines, topographical lines, demographic lines, resource lines, climate lines, and the like. The electronic communications accounts can be identified based on the electronic communications accounts assigned a residence associated with the location (for example the electronic communications accounts that is associated with a residence within a town). The electronic communications accounts can be identified based on the electronic communications accounts currently associated with the location (for example currently within 5 miles of the location).

At block 2410, the main server system can determine whether predetermined areas exist. For example, predetermined areas for certain electronic communications accounts can exist (for example an area of concentrated demographic or size of household). The predetermined areas can be preconfigured (for example preconfigured a particular portion of a town by the marketing entity). The predetermined areas can be areas that users can sign onto (for example a user signs up for a pizza store coupon for a particular area).

If predetermined areas for electronic communications accounts exist, then at block 2412, the areas and/or the electronic communications accounts for the areas are added to the map information. Then, the flow diagram continues to block 2414. If the predetermined areas for electronic communications accounts do not exist, the flow diagram can continue directly to block 2414.

At block 2414, the map information can be displayed on the marketing entity access point system. The map information can display characteristics of the map (for example display political and climate lines, but optionally display economic information).

The map information can include interactive options. At block 2416, the marketing entity can select an area. The area can be selected using a panning tool, drawing a boundary around an area, a selection of a predefined area, and the like. The selection can be of individual electronic communications accounts. The area can be automatically selected based on a criteria. For example, the area with the highest density or number of electronic communications accounts can be automatically selected. The marketing entity can select a single area and/or multiple areas.

At block 2418, the marketing entity access point system can display criteria that can be used to further filter the electronic communications accounts associated with the selected area. The marketing entity can select certain filters to filter in or out the electronic communications accounts. For example, the criteria can include filtering out all households with less than two people. The criteria can include only maintaining (filtering in) electronic communications accounts with a total household income of over $100,000.

At block 2420, the marketing entity access point system can receive the selection of criteria. The criteria can be automatically selected based on a criteria selection algorithm. For example, for one state, the criteria can be geared toward the middle class whereas for another state, the criteria can be selected based on a particular demographic.

At block 2422, the main server system can apply the criteria to the electronic communications accounts in the selected area. The electronic communications accounts that remain after the application of the criteria can be displayed by the marketing entity access point system at block 2424. The electronic communications account can be displayed on the map, as a list, and the like.

At block 2426, the marketing entity access point system can receive marketing material to send to the electronic communications accounts. For example, the marketing material can include an offer for sale, an advertisement, and the like. The marketing material can be part of a prescreen procedure where the offer can be a firm offer for credit or a binding offer.

The marketing material can include a product/service and/or an identifier for the individual. For example, the marketing material can include a car or a loan for the individual. The marketing material can include a social media identifier (for example username) that can be used to market to the user.

The marketing material can be at least partially automatically determined. For example, the marketing material can be determined based on the criteria selected to filter the electronic communications accounts. For example, if the criteria included income of over $100,000, then the marketing material can include luxury goods.

At block 2428, the main server system can identify the channel of communication for the electronic communications account. For example, some electronic communications accounts can be configured to receive marketing material via physical address. Then, the electronic communications system can send the marketing material to the physical address. Other electronic communications accounts can be configured to receive marketing material via text message.

At block 2430, the main server system can generate the marketing messages to send to the electronic communications system. The main server system can generate the marketing messages differently based on the channel of communication for the electronic communications account.

In some embodiments, the channel of communication (for example an email, telephone) is not disclosed to the marketing entity. The marketing entity can only be able to select an electronic communications account. Thus, the electronic communications system provides security by reducing the companies that have access to personal information such as an email address or telephone number. A marketing entity can target a marketing campaign on a subset of individuals based on area and/or characteristics without having the personal information and or addresses the individual. They would have general information of potential clients meeting their criteria.

At block 2432A and 2432B, the main server system transmits the marketing messages to users 1 and 2, and the user 1 access point system and user 2 access point system displays the marketing message.

At block 2434, User 1 access point system receives a response to the marketing message. For example, user 1 can have selected an answer to a question (for example would you like to take out a loan?). User 1 can have selected a hyperlink to provide more information on the marketing information.

At block 2436, the main server system can identify a service or product provider for the marketing message. For example, the main server system can identify several banks that can provide a loan to the user in response to the user selecting the option of taking out a loan.

Figure 24B:
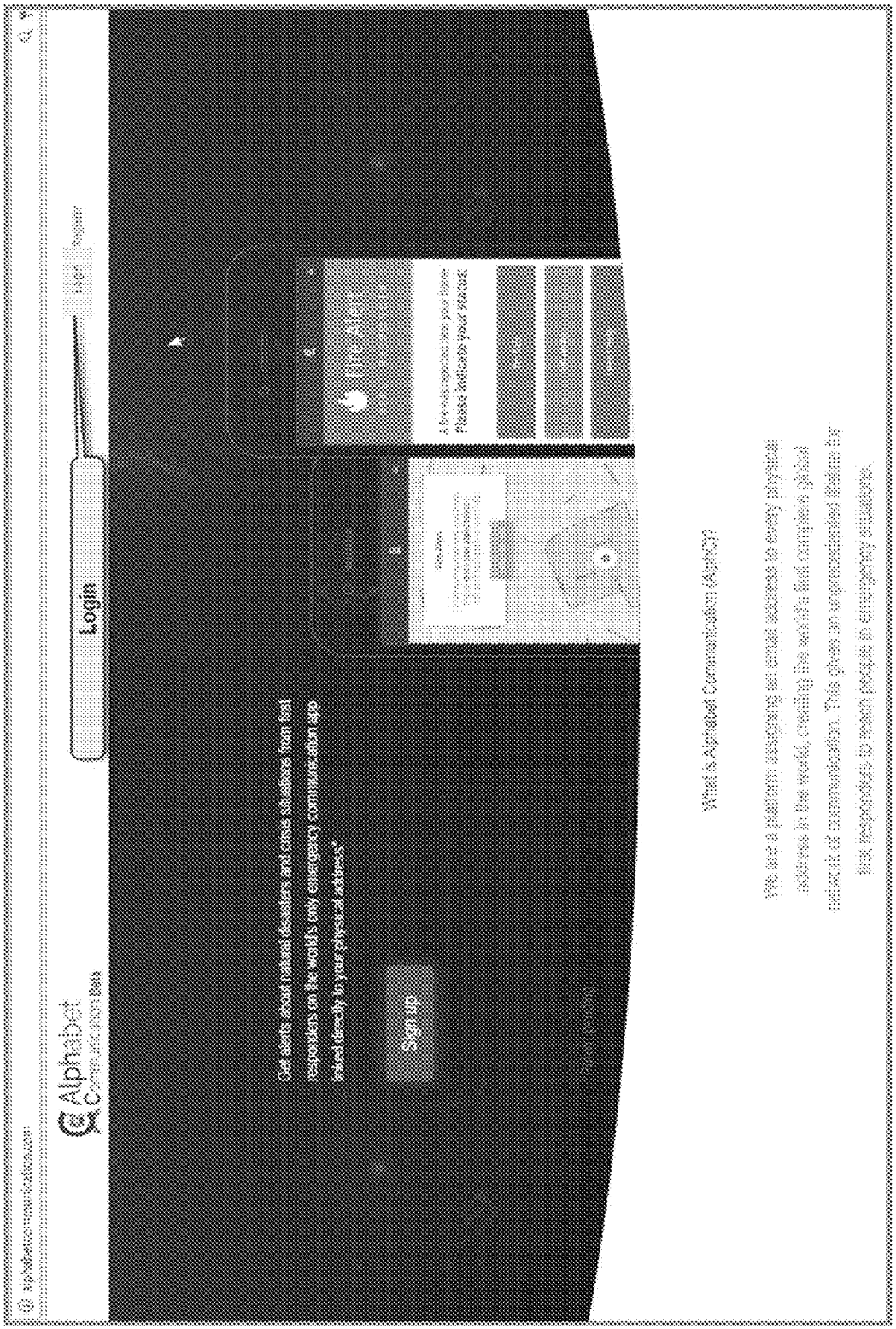
FIG. 24B is a diagram depicting an embodiment of a front page of a website for the electronic communications system.

FIG. 24B is a diagram depicting an embodiment of a front page of a website for the electronic communications system. The website offers the user an option to sign up or to log in. The user can sign up as an individual associated with the electronic communications account, and/or an individual seeking to send messages to electronic communications accounts.

Figure 24C:
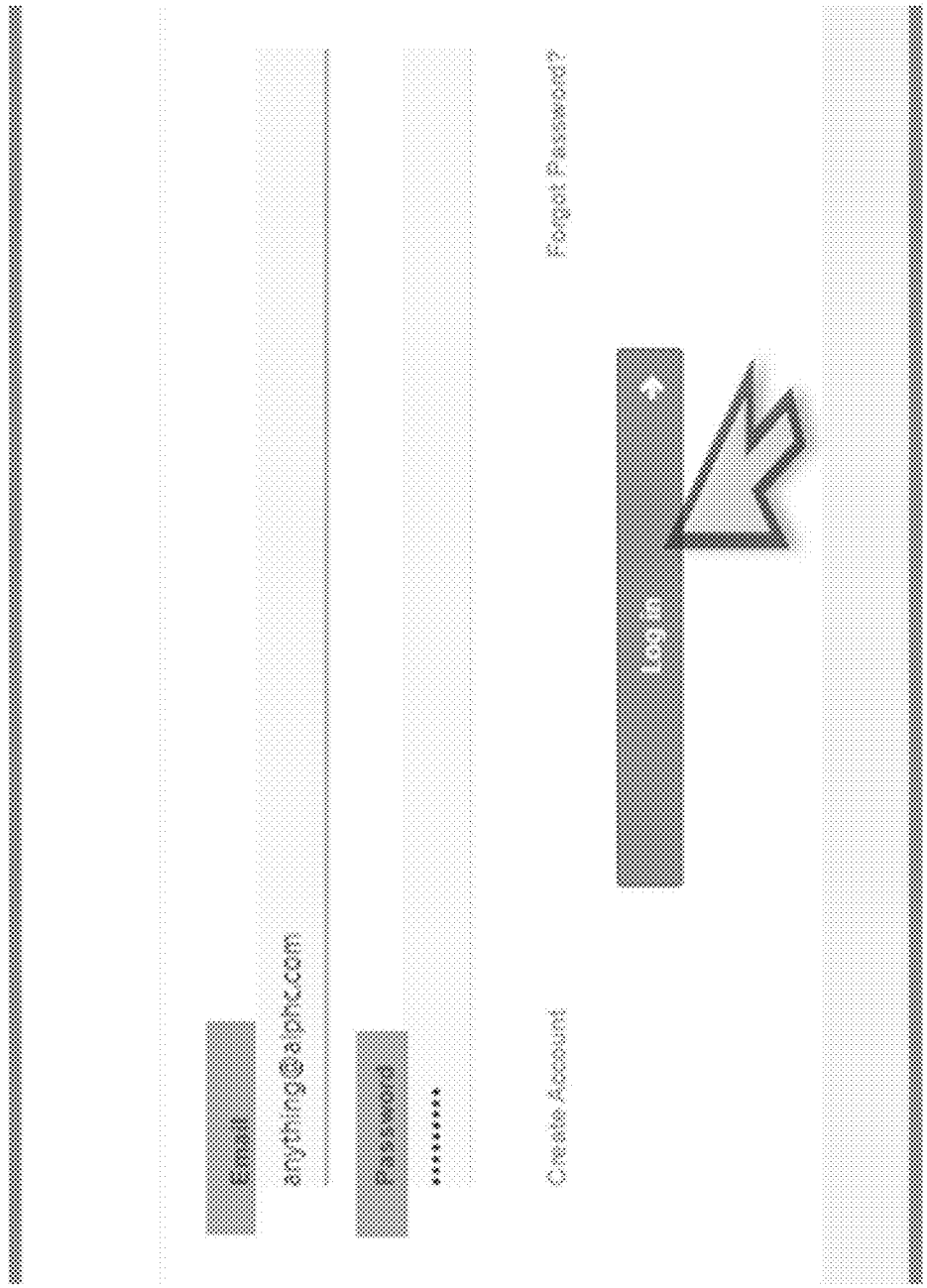
FIG. 24C is a diagram depicting an embodiment of a login page for the electronic communications system.

FIG. 24C is a diagram depicting an embodiment of a login page for the electronic communications system. The login page can include an entry for an email and a password. The email can be the electronic communications account and/or can be other means of identifying an individual (for example social security number, email, phone number). The log in page can have an option to retrieve a forgotten password and/or create an account.

Figure 24D:
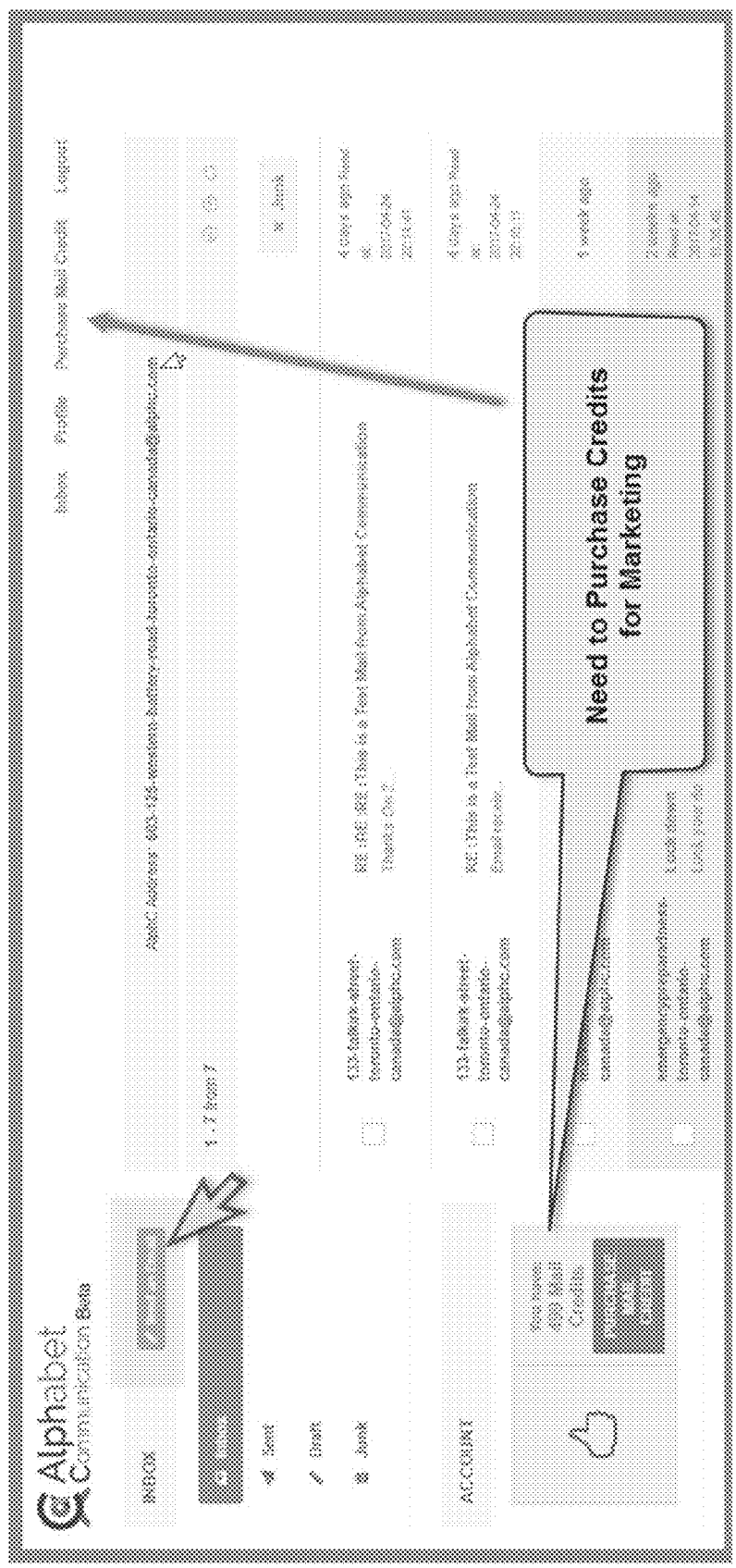
FIG. 24D is a diagram depicting an embodiment of mail credits needed for initiating a marketing campaign.

FIG. 24D is a diagram depicting an embodiment of mail credits needed for initiating a marketing campaign. In some embodiments, the user can purchase mail credits. For example, the user can purchase a 500 mail credits for $5. The mail credits can be used to determine characteristics of the marketing campaign. For example, the mail credits can determine the size of an area to send marketing material to, the number of electronic communications accounts, the types of filters that can be used, the number of areas that can be selected, and the like.

Figure 24E:
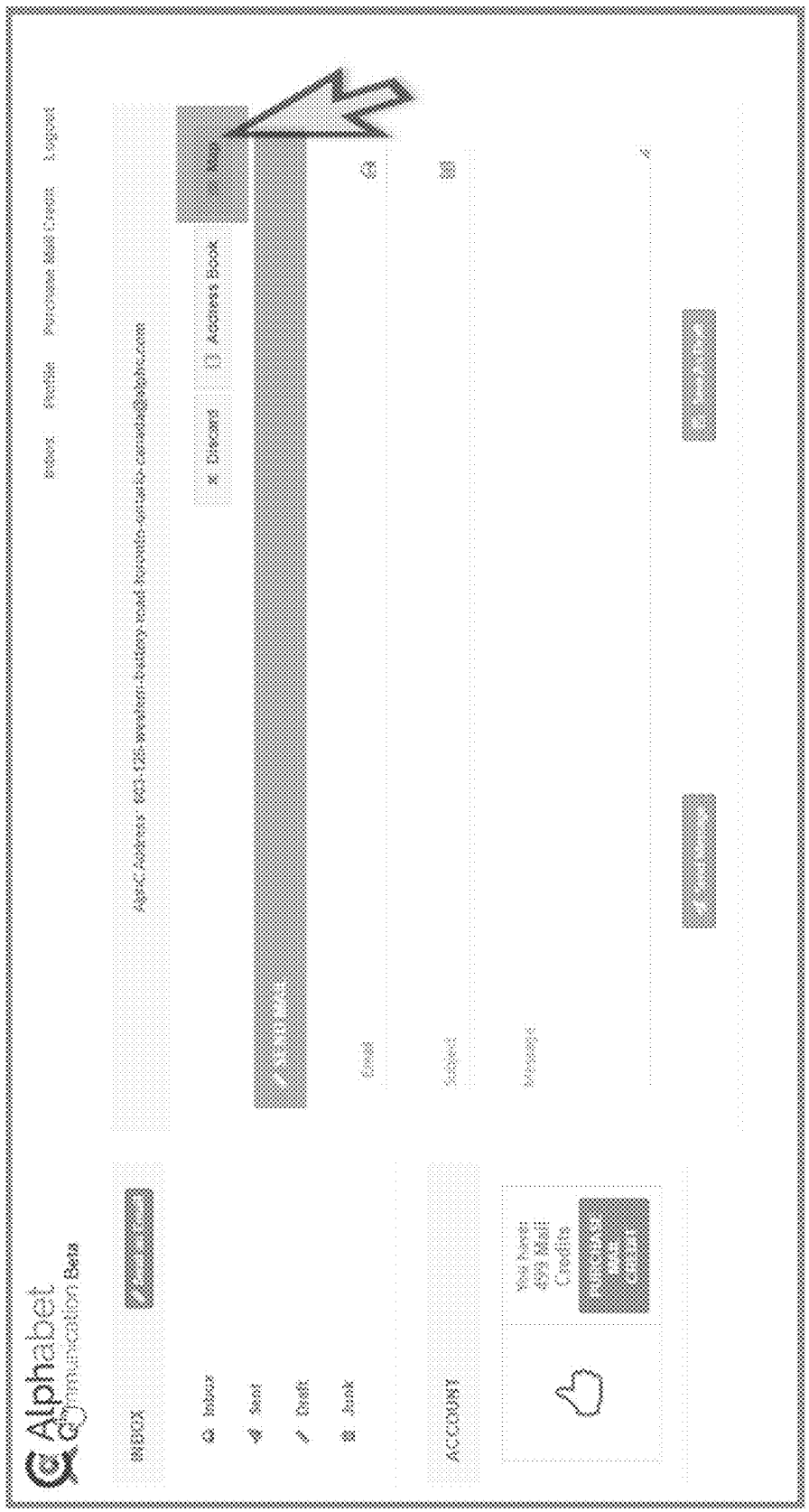
FIG. 24E is a diagram depicting an embodiment of an option to view a map for the marketing campaign.

FIG. 24E is a diagram depicting an embodiment of an option to view a map for the marketing campaign. The individual can have the option to select a map option. The map option can display a map of a desired location. The location can be where the electronic communications account associated with the inbox is located. The map can be of a location that the user has previously inputted. The map can be of a location that automatically determines a location based on an algorithm (for example chooses a certain location for a certain period of time in the day or year). The map can be of a location of another electronic communications account and/or location of interest (for example an electronic communications account in the address book).

Figure 24F:
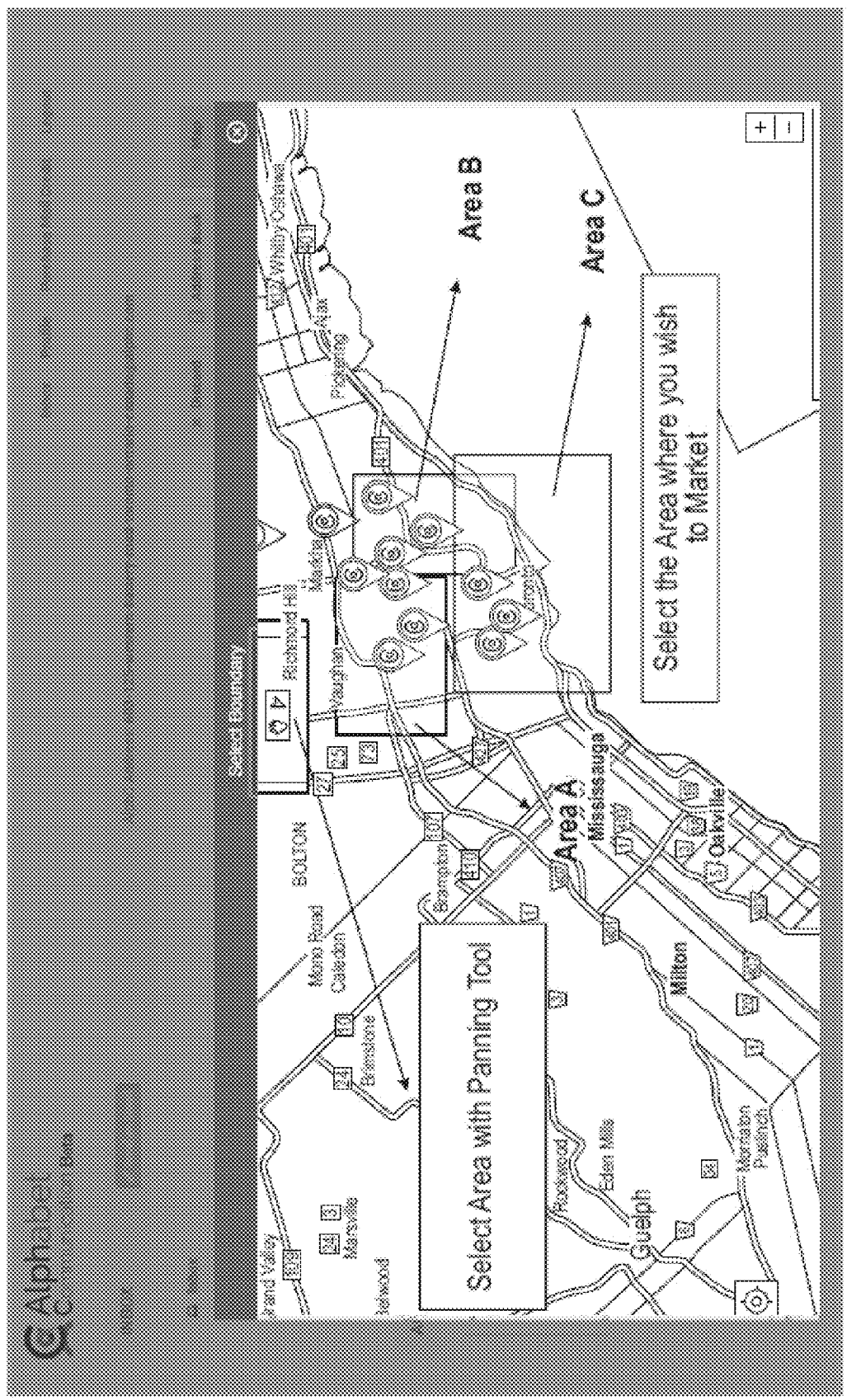
FIG. 24F is a diagram depicting an embodiment of a map view with areas of selection for the marketing campaign.

FIG. 24F is a diagram depicting an embodiment of a map view with areas of selection for the marketing campaign. In some embodiments, the map displays predetermined areas (for example Area A, B, and C). For example, the predetermined areas can be determined based on a location of interest (for example 5 miles around every fast food restaurant). This way, the marketing material can be centered around characteristics of the location of interest (for example coupons for the fast food restaurant chain).

In some embodiments, the individual can select an area. The individual can select an area using a panning tool. The individual can select an area by clicking on the predetermined areas (for example selecting on Area A). The selected area can represent the area that the user would like to market to.

FIG. 24G is a diagram depicting an embodiment of an area selected by the user on a map. The user can select a boundary around an area as a selection of an area. For example, the user can draw a boundary. In some embodiments, the user can select certain points on the map and the points can be connected to form a boundary. For example, in FIG. 24G, three points are selected, and the points are connected by a straight line. This triangle represents the area selected by the user. In this example, the map shows 12 electronic communications accounts. The individual is able to select 9 out of the electronic communications accounts by creating the selected area.

Figure 24H:
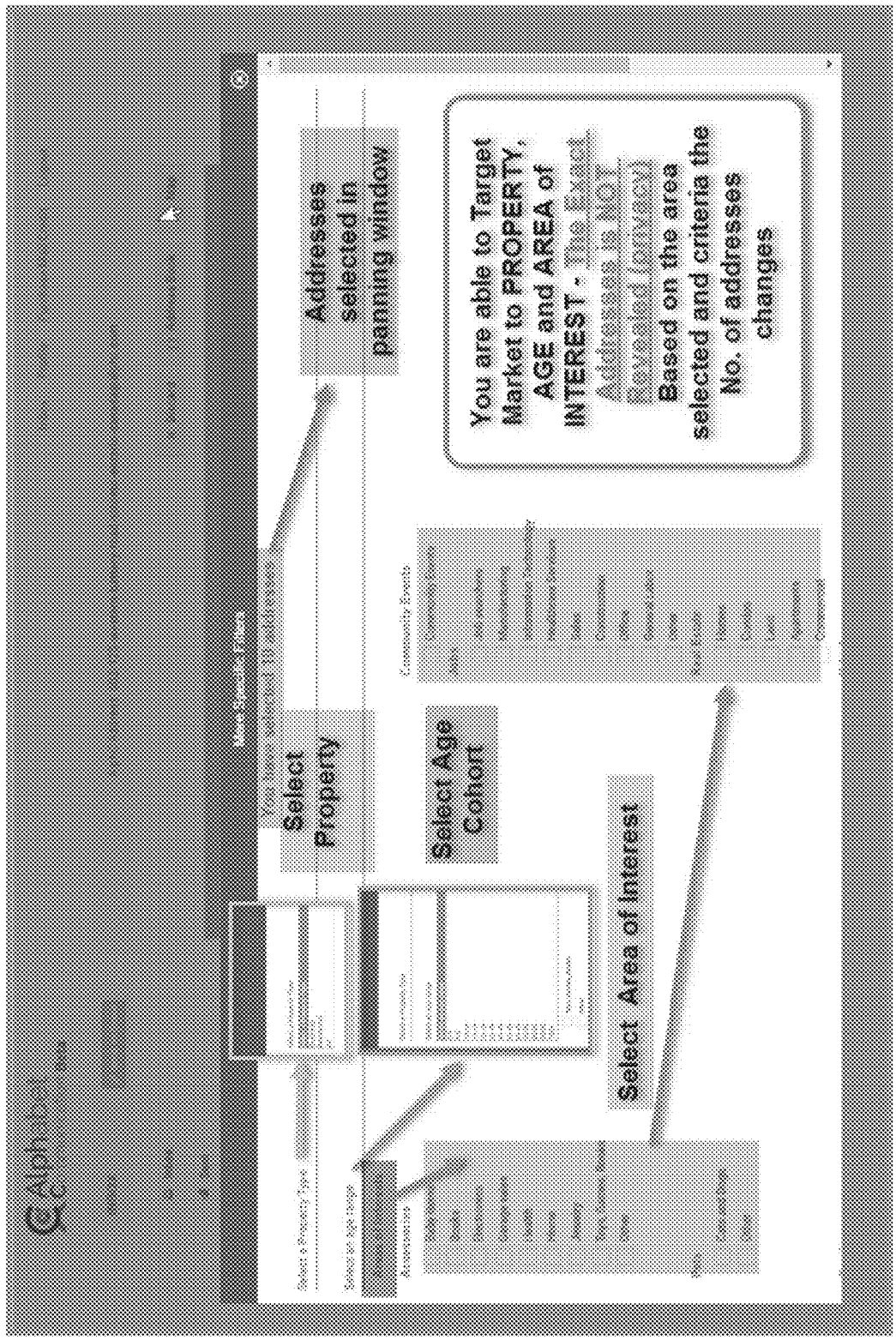
FIG. 24H is a diagram depicting an embodiment of criteria that can be used to filter electronic communications accounts within a selected area.

FIG. 24H is a diagram depicting an embodiment of criteria that can be used to filter electronic communications accounts within a selected area. The electronic communications accounts that were selected within an area can be further filtered via criteria that can be selected. The electronic communications accounts can be filtered before the electronic communications accounts are shown on the map.

The criteria that can be selected can be based on characteristics associated with the electronic communications account. For example, the characteristics can include an area of interest. The Area of interest can include categories such as baby items, books, electronic, garage sales, health, home jewelry, toys, games, books, other, or the like. The characteristics can include an interest or hobby of the individual. The characteristics can be an innate characteristic of the individual (for example green eyes, black hair). The characteristics can include household information, demographic, economic, political, and the like. The characteristics can include an association of the electronic communications account (for example community associations, the type of jobs, real estate or other ownership).

In some embodiments, the individual can select one or more characteristics. In some embodiments, the characteristics selected can be a range, a threshold, a minimum and/or maximum, a yes/no, a dropdown window, or the like. In some embodiments, the characteristics can include a channel of communication. For example, the marketing entity can only want to direct its campaign to individuals they can text message and/or email. By providing this type of criteria filtering, the marketing entity can filter electronic communications accounts without obtaining personal information regarding the individuals associated with the electronic communications account.

Figure 24I:
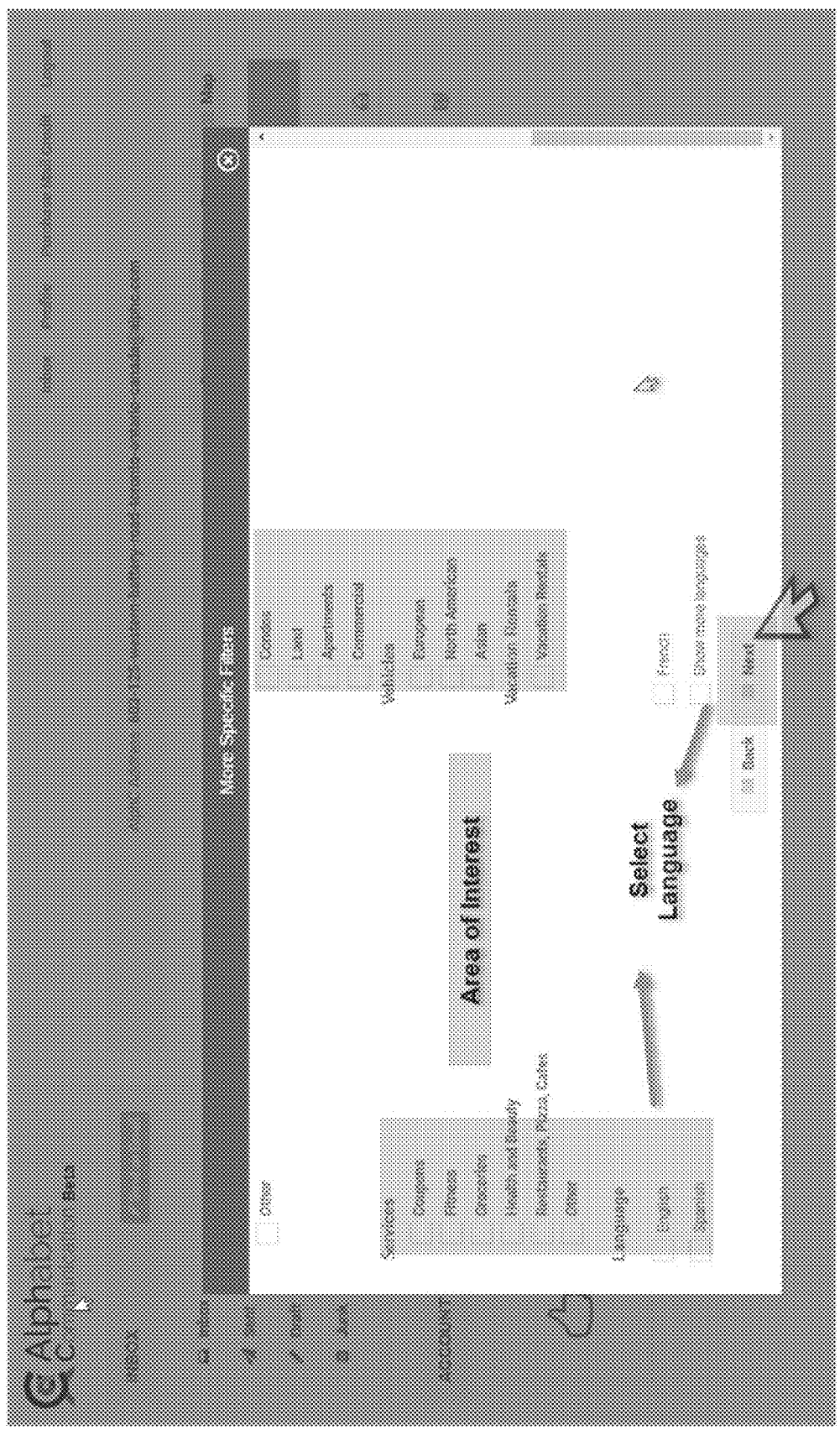
FIG. 24I is a diagram depicting an embodiment of additional criteria that can be used change the marketing campaign.

FIG. 24I is a diagram depicting an embodiment of additional criteria that can be used change the marketing campaign. In some embodiments, a language can be selected. The language and/or other criteria can be used to filter in or out certain electronic communications accounts (for example send messages only to electronic communications accounts that can receive messages in English). Furthermore, the language selection can be used in other ways to modify the marketing campaign. For example, the language selection can be used to determine the language that the marketing message will be sent.

Figure 24J:
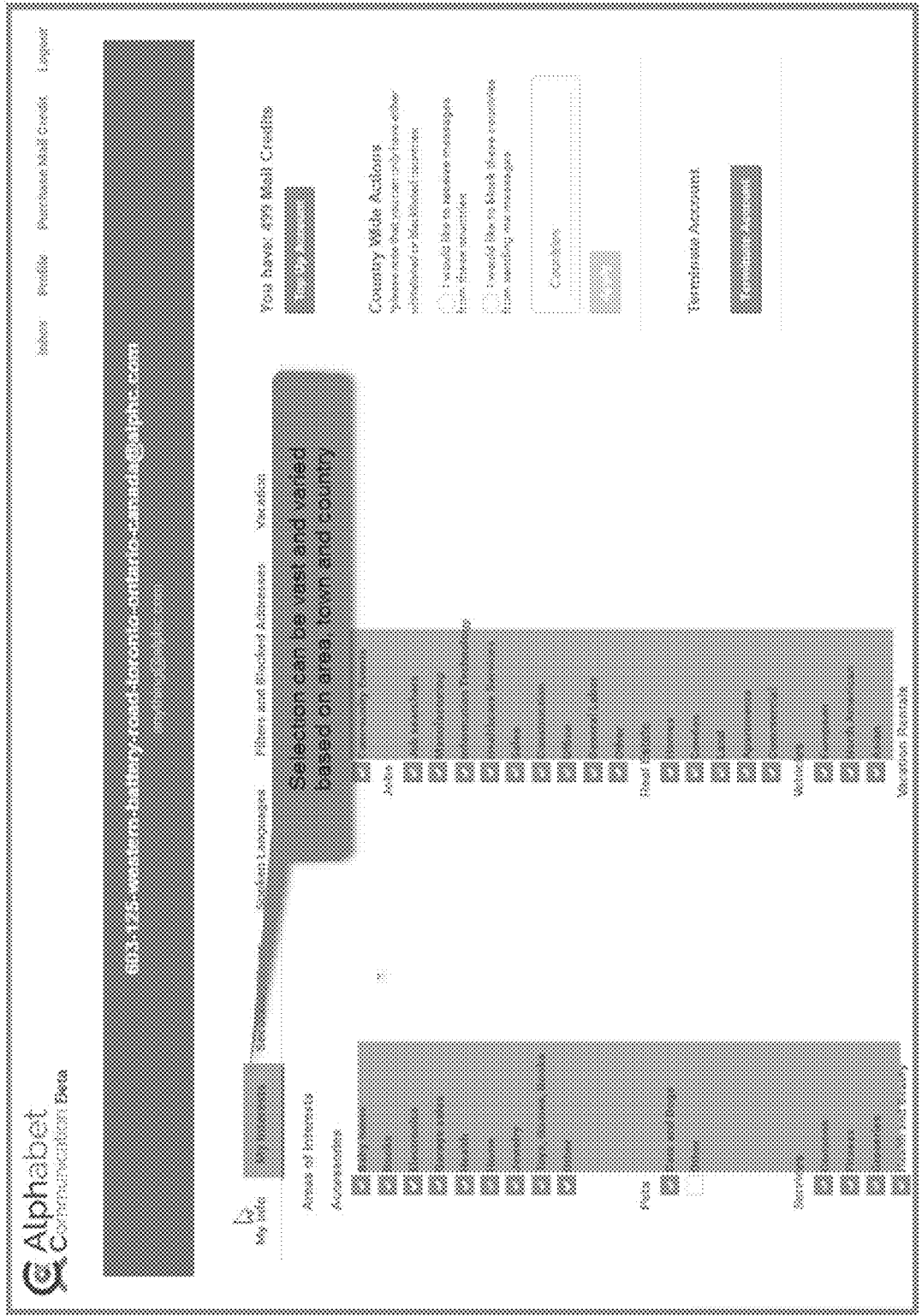
FIG. 24J is a diagram depicting an embodiment of criteria that can be associated with an electronic communications account.

FIG. 24J is a diagram depicting an embodiment of criteria that can be associated with an electronic communications account. The electronic communications account can be associated with certain criteria. The criteria can be set by a user. In some embodiments, the criteria is automatically set and/or set by an algorithm (for example automatically determining that the electronic communications account is associated with a location). The selection can be based on an area, a town, or a country. The electronic communications account can select the option of receiving messages from a particular country and/or block other countries. The electronic communications account interface can have the option of terminating the account.

In some embodiments, the electronic communications account can have selected categories of criteria. For example, the electronic communications account can have a "my info" section to enter in personal information, such as a phone number, an address, and the like. The "My interest" section can include options to enter in preferences and dislikes of an individual. The electronic communications account can have a section to add secondary users. Spoken languages can also be added.

The electronic communications account can block or filter specific entities or addresses, or categories. For example, the electronic communications account system can block all advertisements, or just advertisements related to coffee.

Figure 24K:
FIG. 24K is a diagram depicting an embodiment a marketing campaign directed to a group of electronic communications accounts.

FIG. 24K is a diagram depicting an embodiment a marketing campaign directed to a group of electronic communications accounts. The marketing message can display the number of electronic communications accounts that the marketing campaign message will be sent to. The marketing message can illustrate the electronic communications accounts that the message will be sent to. The user can add more electronic communications accounts using the Address book.

If multiple areas were selected and/or multiple criteria chosen such that there are different groups of electronic communications accounts, the marketing message can show the total number of electronic communications accounts to be sent. This would allow further privacy and anonymity by not showing which electronic communications accounts were filtered or are in certain areas.

In some embodiments, the marketing message can show the different groups separately. The marketing entity can select certain groups to send the marketing message to.

In some embodiments, the marketing entity has the option of selecting from several predefined marketing messages. In some embodiments, the marketing entity can customize the marketing message for the identified electronic communications accounts. In some embodiments, the electronic communications system can automatically determine the marketing messages to be sent to the electronic communications system and automatically populate these messages. In some embodiments, the electronic communications system can retrieve a marketing message from a third party vendor of products or services.

The marketing message can provide a percentage discount or a certain price for a particular service or product. The marketing message can be valid for a time frame. The marketing message can be for a particular good or service, or a category of goods or services (for example all shoes). The marketing message can have an expiration date.

Figure 24L:
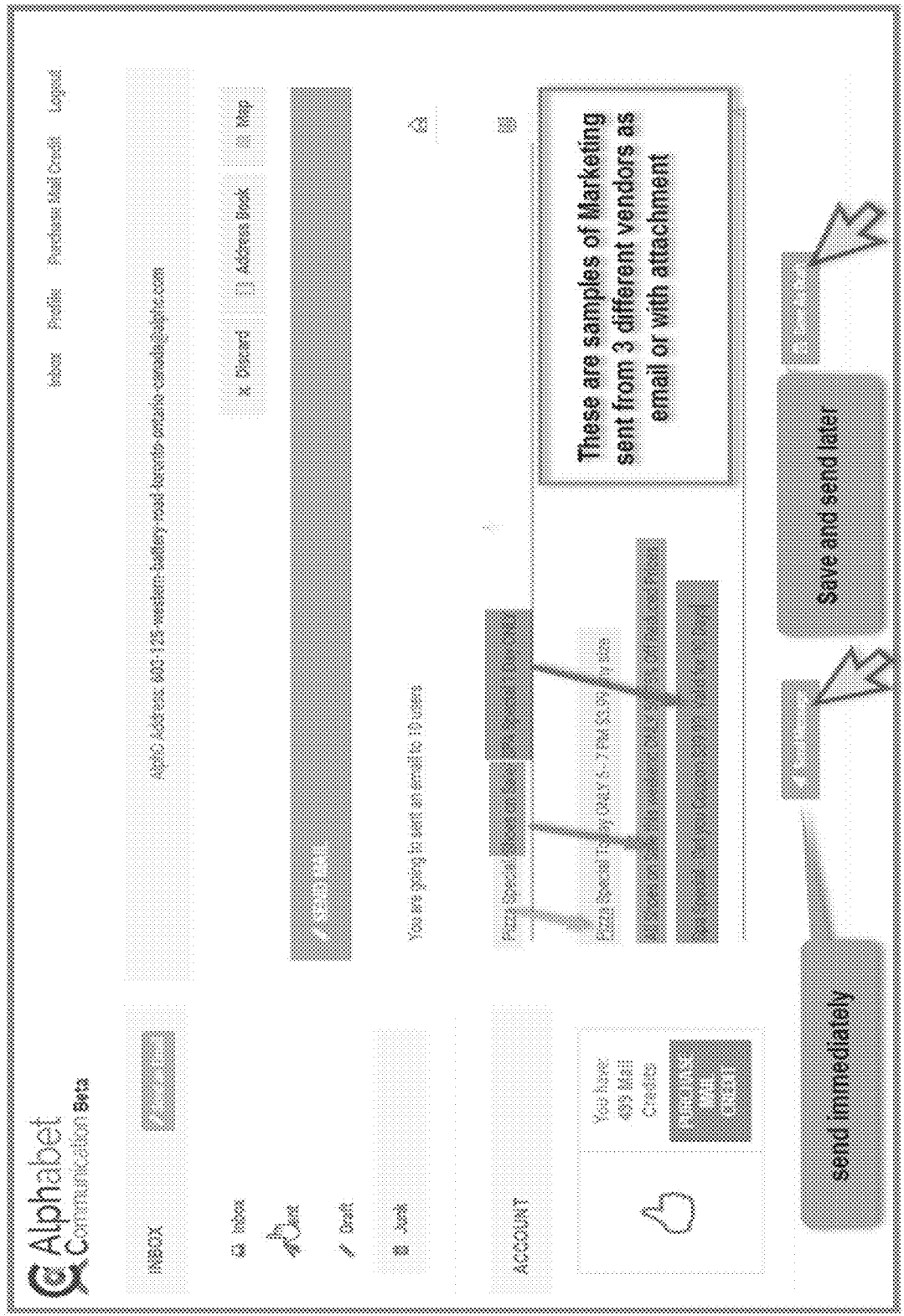
FIG. 24L is a diagram depicting an embodiment several marketing campaign messages.

FIG. 24L is a diagram depicting an embodiment several marketing campaign messages. The marketing message can include a special for a pizza store. For example, the marketing message can be a pizza special only for today from 5-7 PM for $3.99. The marketing message can be for shoes on sale, where the sale is happening on a weekend for 50% to 75% off reduced prices. The marketing message can include a spa special, with a coupon for $39.99 that is valid for the next 90 days. Marketing material can be posted directly on the area map where the user can click the link to activate the coupon. For example, the pizza special can be viewable on the map, where the activated accounts can receive the email for the special.

In some embodiments, the marketing entity can select the messages to send. The marketing entity can customize how the marketing message is sent to the electronic communications account. For example, the marketing entity can send the first marketing message to teenagers, the second marketing message to households with children, and the third marketing message to single ladies.

Figure 25A:
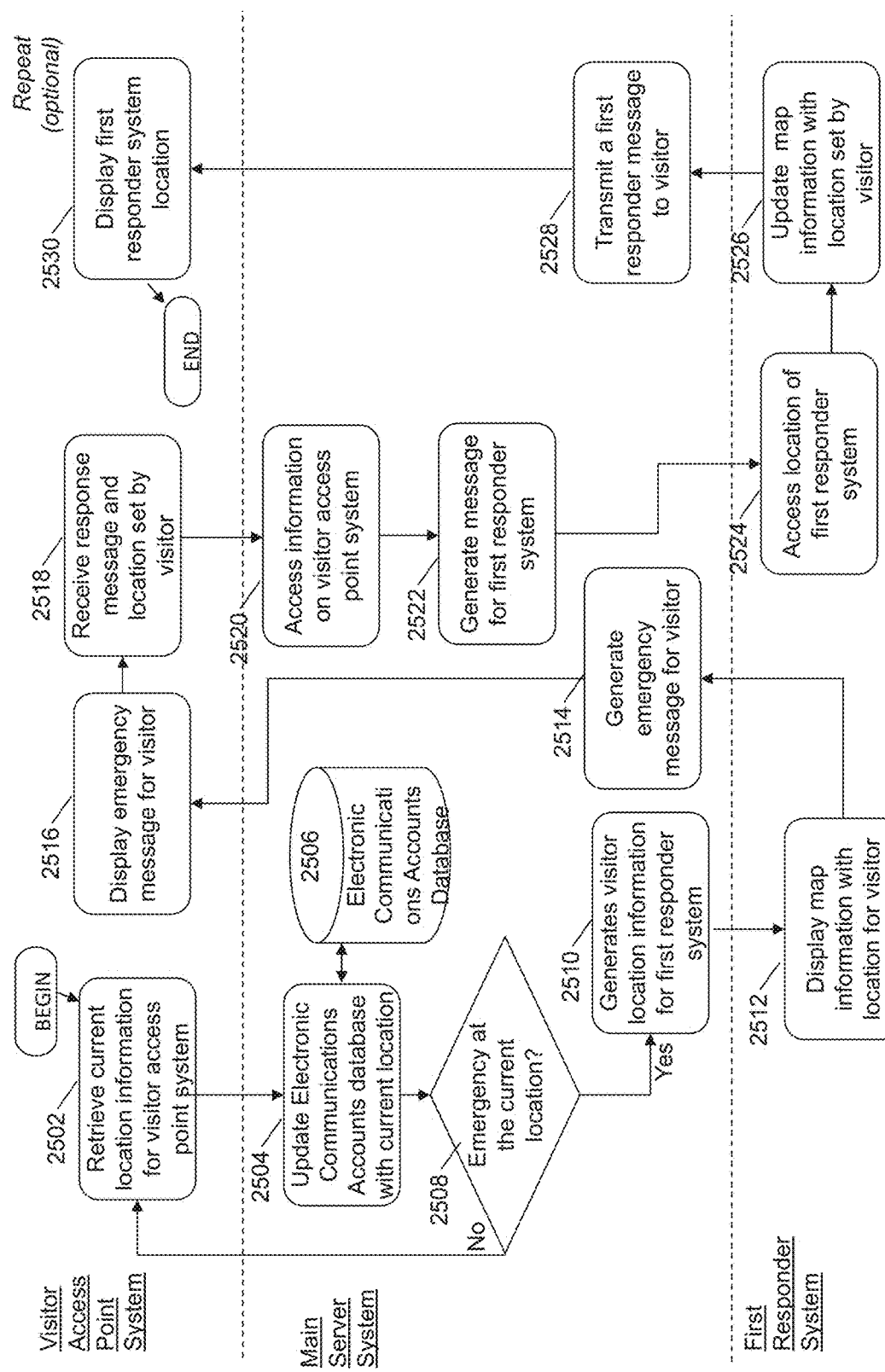
FIG. 25A is a flow diagram depicting an embodiment of a visitor interacting with a local first responder.

In some embodiments, the electronic communications system can identify a visitor for a particular area and provide services to these visitors. For example, a visitor can be visiting an area that is in an emergency situation. The electronic communications system allows for efficient notification to a visitor and a first responder system, and also allows for effective communication between the visitor and first responder. FIG. 25A is a flow diagram depicting an embodiment of a visitor interacting with a local first responder. The flow diagram begins at block 2502, where current location information is retrieved for the visitor access point system.

At block 2504 the main server system updates the electronic communications account database 2506 with the current location for the visitor access point system. The electronic communications account can be tied to multiple addresses (for example a residence location, a current location such as when visiting a new place).

At block 2508, the main server system determines whether an emergency is occurring at the current visitor location. If not, then the flow diagram can return to block 2502, where the current location of the visitor is tracked. If there is an emergency situation (for example tornado watch at the beach where visitor is visiting), then the main server system generates visitor location information for the first responder system.

At block 2512, the first responder system displays map information with the location for the visitor. The map information can include information on the visitor. The map information can be interactive such that the first responder can select the visitor and obtain more information on the visitor. For example, the map information can include the electronic communications accounts (and/or personal information) associated with the group of visitors, the original residence physical address, the type of communication channel, the availability of the visitor, and the like.

At block 2514, the main server system generates the emergency message for the visitor, and at block 2516 the visitor access point system displays the emergency message. For example, the emergency message can display information on the emergency on a map (for example a fire in the town of Irvine, Calif.), the extent of the emergency, recommendations for responding to the emergency (for example locations of safety, safe travel routes away from the emergency, etc.), and the like. The message can display the emergency message for other supplemental users of the electronic communications system (for example informing other family members that one of the family members is visiting an area of an emergency).

At block 2518, the visitor access point system can receive a message from the visitor about a particular location set by the visitor. The visitor can pin a location that is of interest. The visitor can pin a future location that the visitor will travel to. The visitor can pin a location that the visitor sees as a danger (for example pin a location and send a video of the danger).

At block 2520, the main server system can access information on a visitor's access point system. For example, the main server system can access information on a visitor's itinerary for the trip, personal information, any medical conditions that can be relevant to a first responder, and the like. The main server system can generate a message at block 2522 to send to a first responder system.

At block 2524, the first responder system can identify the location of the first responder(s). The first responder system can identify a first responder that is available to attend to the visitor. For example, the first responder system can identify based on a variety of characteristics that a first responder is assigned to the visitor. The characteristics can be based on location (for example relative distance from the visitor), availability, staff and medical equipment, etc.

At block 2526, the first responder system can update map information set by the visitor. For example, the map can show where the first responder is, where the visitor is, and where the location set by the visitor is. This can help a first responder to understand how to react to the circumstances (for example can travel between the visitor and the location set by the visitor if the first responder learns that the visitor is traveling to the location).

At block 2528, the main server system can transmit the first responder message to the visitor and at block 2530, the visitor access point system can display first responder information, such as location, of the first responder assigned to the visitor. In some embodiments, the visitor can see all, or a subset of all, available first responders in the area. The displayed information can show characteristics of the first responder (for example equipment and staff). Thereafter, the visitor can respond to the message by the first responder (for example informing them of a particular need, time urgency of the emergency, and the like).

In some embodiments, the first responder can include a government entity, such as the local embassy. For example, a visitor can be traveling to a country that is in political upheaval. Then, the local embassy can inform the visitor (and/or other visitors associated with the embassy country nationality) to return to the embassy for safe evacuation. The message can include safe travel routes, danger zones, areas of safety, and the like.

Figure 25B:
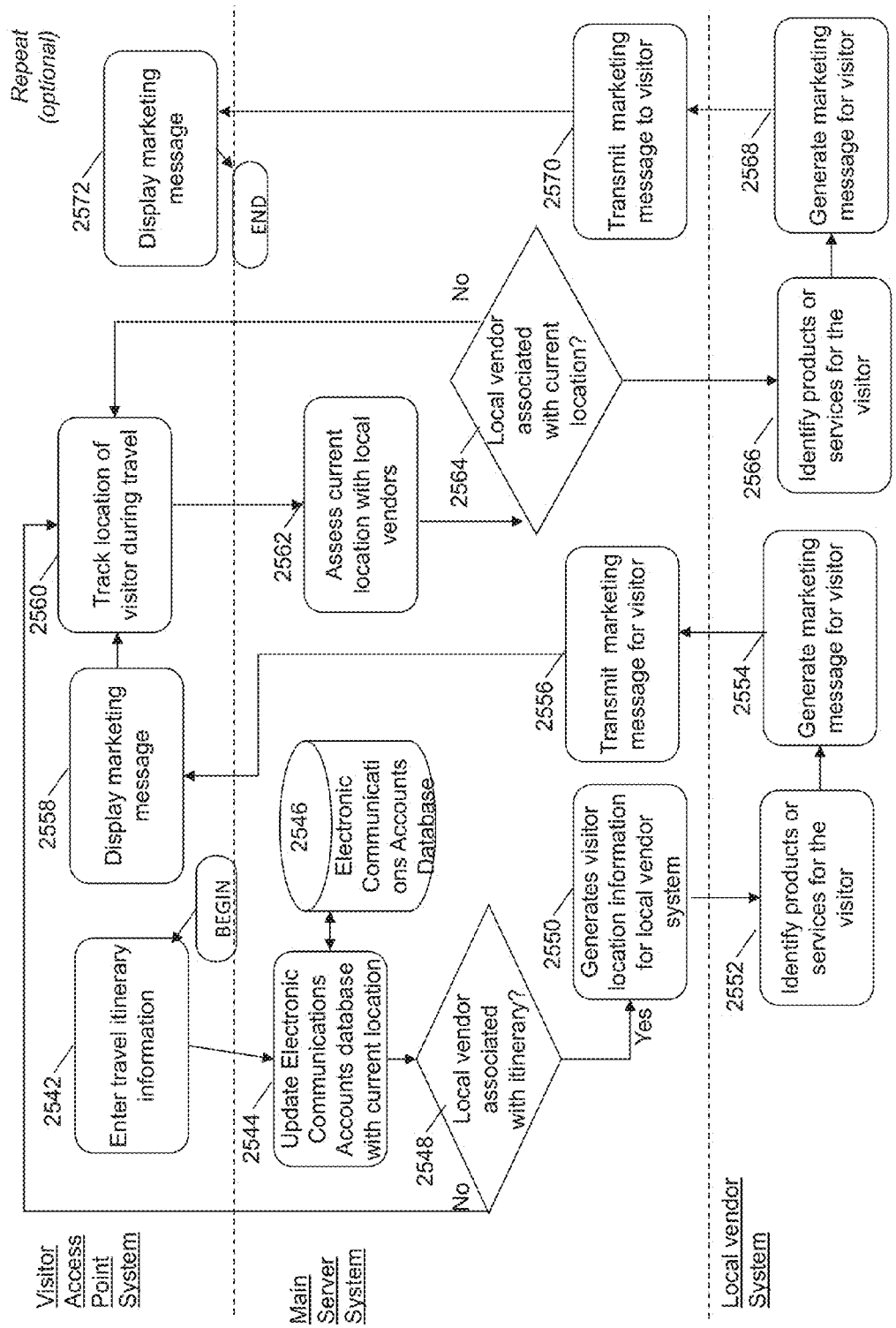
FIG. 25B is a flow diagram depicting an embodiment of a visitor interacting with a local vendors.

In some embodiments, local vendors can have access to an electronic communications account system to market to visitors in the area. FIG. 25B is a flow diagram depicting an embodiment of a visitor interacting with a local vendors. At block 2542, the visitor access point system can enter a travel itinerary to the electronic communications system. The travel itinerary can include a destination location with a time of arrival and a time of departure. The travel itinerary can include details for the trip, such as hotel information, sites to travel, restaurants of interest, times for certain visits, and the like.

The travel itinerary can be updated in the electronic communications account database 2546 by the main server system at block 2544. The database can include the travel itinerary (and/or a subset of the travel itinerary data). At block 2548, the main server system can determine whether local vendors are associated with the itinerary, and if so, can generate visitor information for the local vendor system at block 2550. If not, then, the flow diagram can continue to block 2560.

In some embodiments, the local vendors do not obtain specific information on the visitors. The local vendors can instead set up criteria for the main server system to identify visitors and automatically send marketing messages. For example, the local vendors can indicate that a visitor that includes a travel itinerary where one of the locations is within a 2 mile radius one of the local vendor branches, then a marketing message is automatically sent.

At block 2552, the local vendor system can identify products or services for the itinerary and at block 2554, the local vendor system can generate the marketing message for the vendor. At block 2556, the main server system can transmit the marketing message for the vendor, and at block 2558, the marketing message can be displayed.

A subset of the steps of FIG. 25B can occur at different time periods. For example, the marketing message can be sent when the visitor is entering travel itinerary information to book a hotel. The marketing message can be sent upon setting up the itinerary, such that the marketing message can influence the visitor to change the itinerary.

At block 2560, the current location of the visitor access point system is tracked during travel. At block 2562, the main server system can assess the current location of the visitor with local vendors in the area. If a local vendor is associated with the current location of the visitor access point system at block 2564, then the local vendor system can identify products and/or services that are relevant for the visitor. If the current location is not associated with a local vendor at block 2564, then the flow can continue to 2560 where the location of the visitor is tracked.

At block 2568, the local vendor system can generate a marketing message for the visitor. At block 2570, the main server system transmits the marketing message to the visitor, and at block 2572, the visitor access point system can display marketing messages. In some embodiments, sending a marketing message based on the current location of the visitor can improve the relevancy of the electronic marketing messages sent to the visitor by displaying pertinent messages in real-time (for example coffee coupon for a nearby coffeehouse).

In some embodiments, the marketing message includes coupons, sales, promotions, and the like for nearby local vendors. The marketing message can include events such as concerts or broadway shows. The marketing message can make restaurant or hotel suggestions for the visitor, based on the visitor's information in the electronic communications account database 2546. The marketing message can include travel tips, such as avoiding certain routes during certain parts of the day.

Figure 25C:
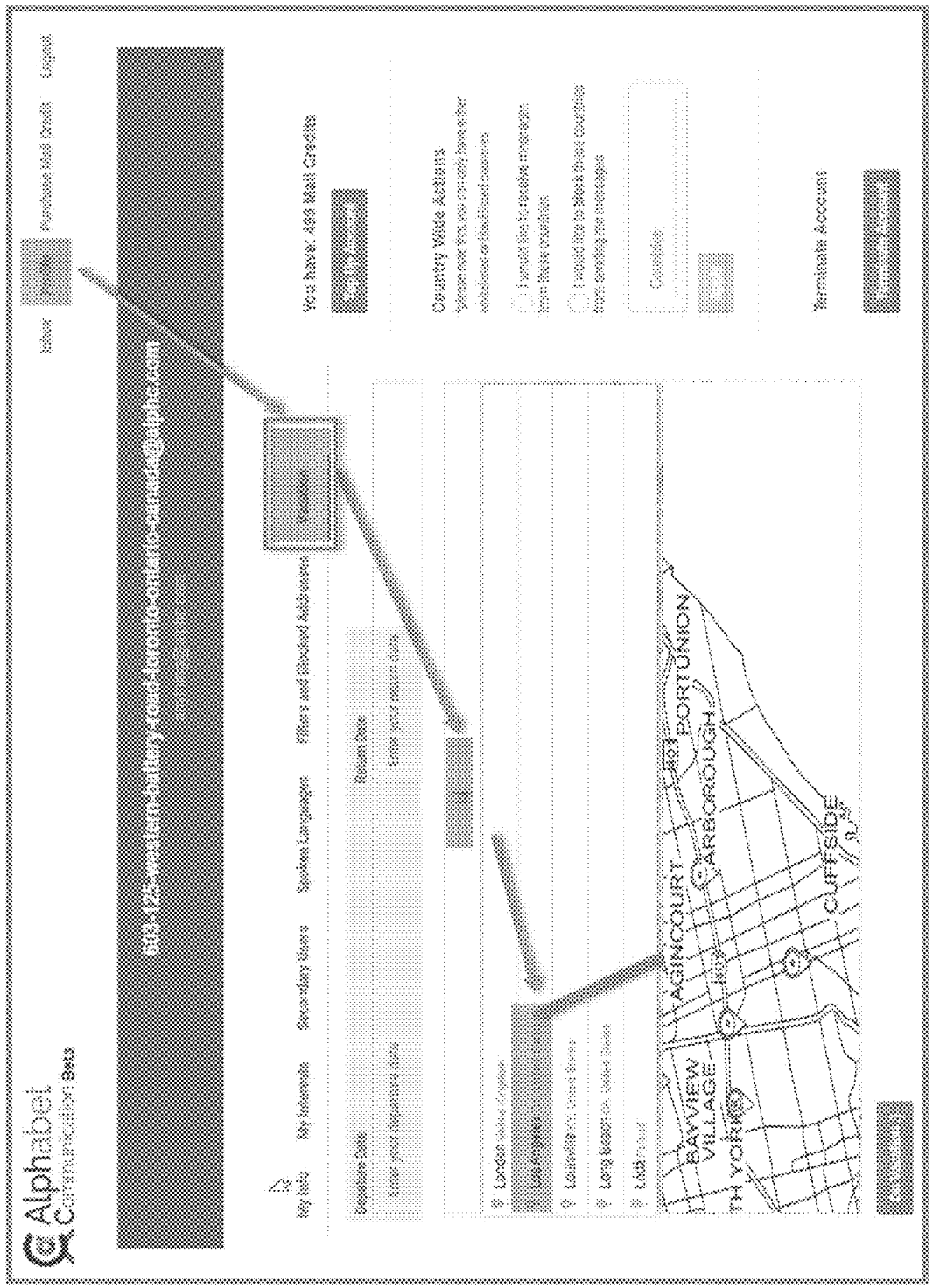
FIG. 25C is a flow diagram depicting an embodiment of a visitor setting up an itinerary.

FIG. 25C is a flow diagram depicting an embodiment of a visitor setting up an itinerary. In this embodiment, the visitor that is associated with an electronic communications account can set up an itinerary for future travel. The visitor can enter a departure and return date. In some embodiments, the visitor can enter in multiple destinations with associated departure and return dates. For example, the visitor enters information for an itinerary visiting Toronto, CA for a week, then to Vancouver, CA the following week.

The visitor can enter a location. The visitor can enter a city name, a zip code, an address, or the like. In some embodiments, the visitor enters a location of interest (for example a park name, a building, an event).

Figure 25D:
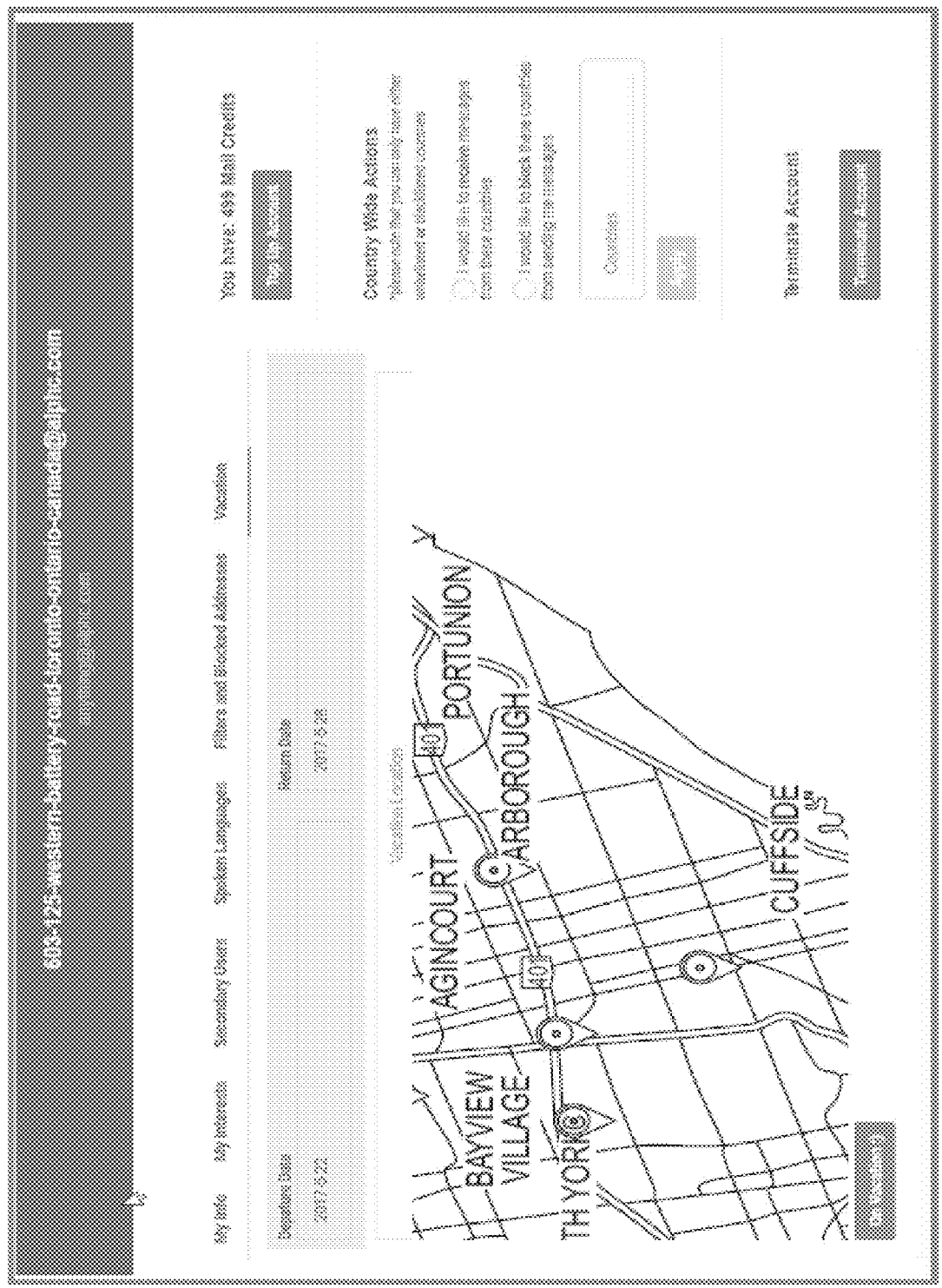
FIG. 25D is a diagram depicting an embodiment of an itinerary with a departure and return date for a particular location.

FIG. 25D is a diagram depicting an embodiment of an itinerary with a departure and return date for a particular location. In this embodiment, the user interface displays a map of the location where the visitor will travel. The departure date is set to 2017-05-22 and the return date is set to 2017-05-28. In some embodiments, the dates can be a time, a day of the week, or other form of time.

In some embodiments, the itinerary can be flexible. For example, the itinerary can have an option for +3/−3 days, such that the departure date can be somewhere between 2017-05-20 to 2017-05-27. This would allow for flexibility on the itinerary. The electronic communications system can suggest to the visitor to stay at certain days based on particular characteristics (for example less traffic, big event happening, predicted emergency during certain times).

Figure 25E:
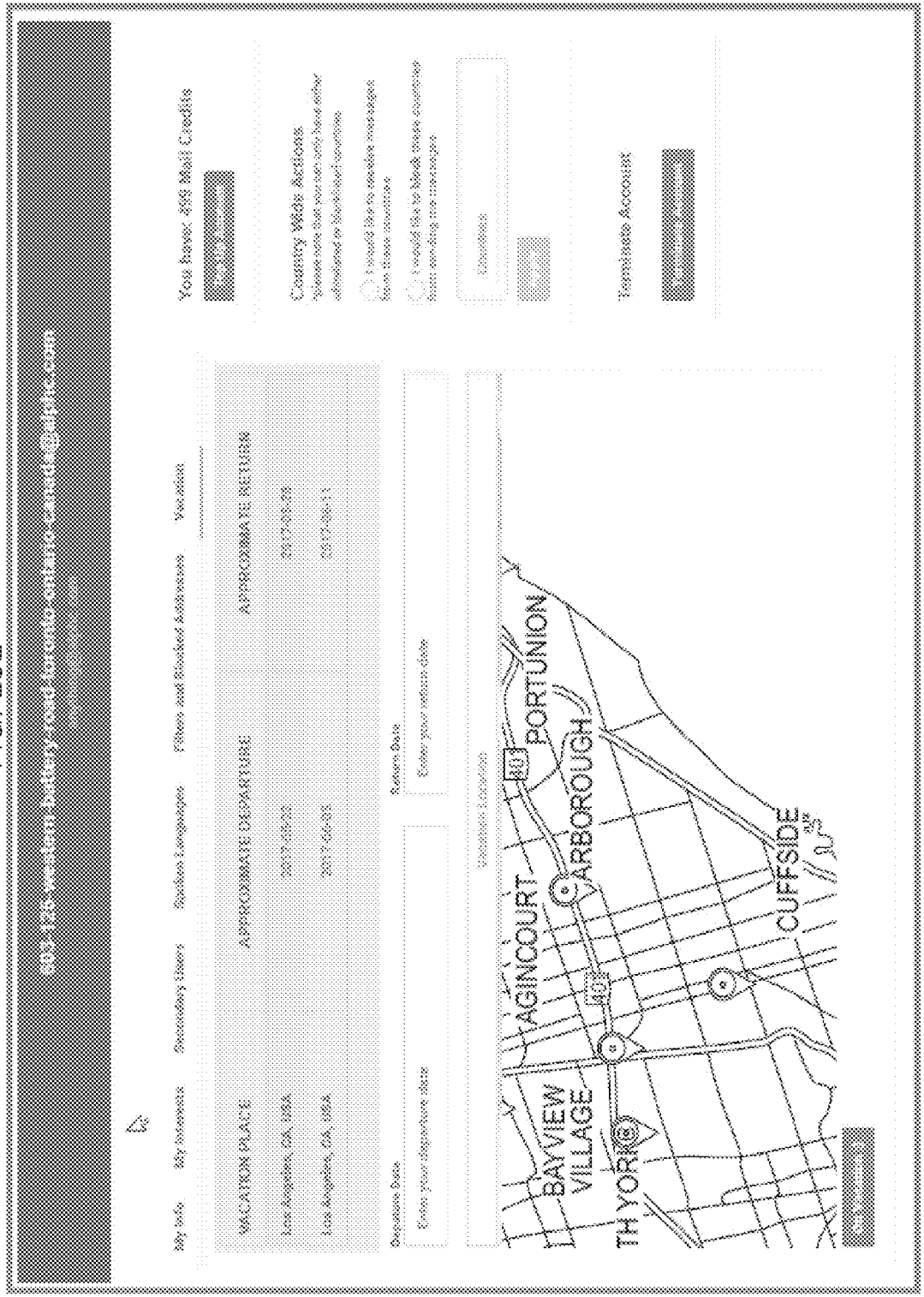
FIG. 25E is a diagram depicting an embodiment of an itinerary for multiple departure and return dates.

FIG. 25E is a diagram depicting an embodiment of an itinerary for multiple departure and return dates. The itinerary can illustrate two separate trips. For example, the visitor can visit Los Angeles, Calif. on 2017-05-22 to 2017-05-28 on a first trip and 2017-06-05 to 2017-06-11 on a second trip. The itinerary can include separate trips that are linked together. For example, between the first and second trip, the visitor can be visiting San Diego from 2017-05-28 to 2017-06-05.

The user interface can allow a user to input multiple potential itineraries. The electronic communications system can recommend the optimal time to a visitor based on characteristics described throughout this disclosure. For example, the recommendation can be based on less traffic, events in the area, predicted emergency during certain times, promotion for local vendors, etc.

Figure 25F:
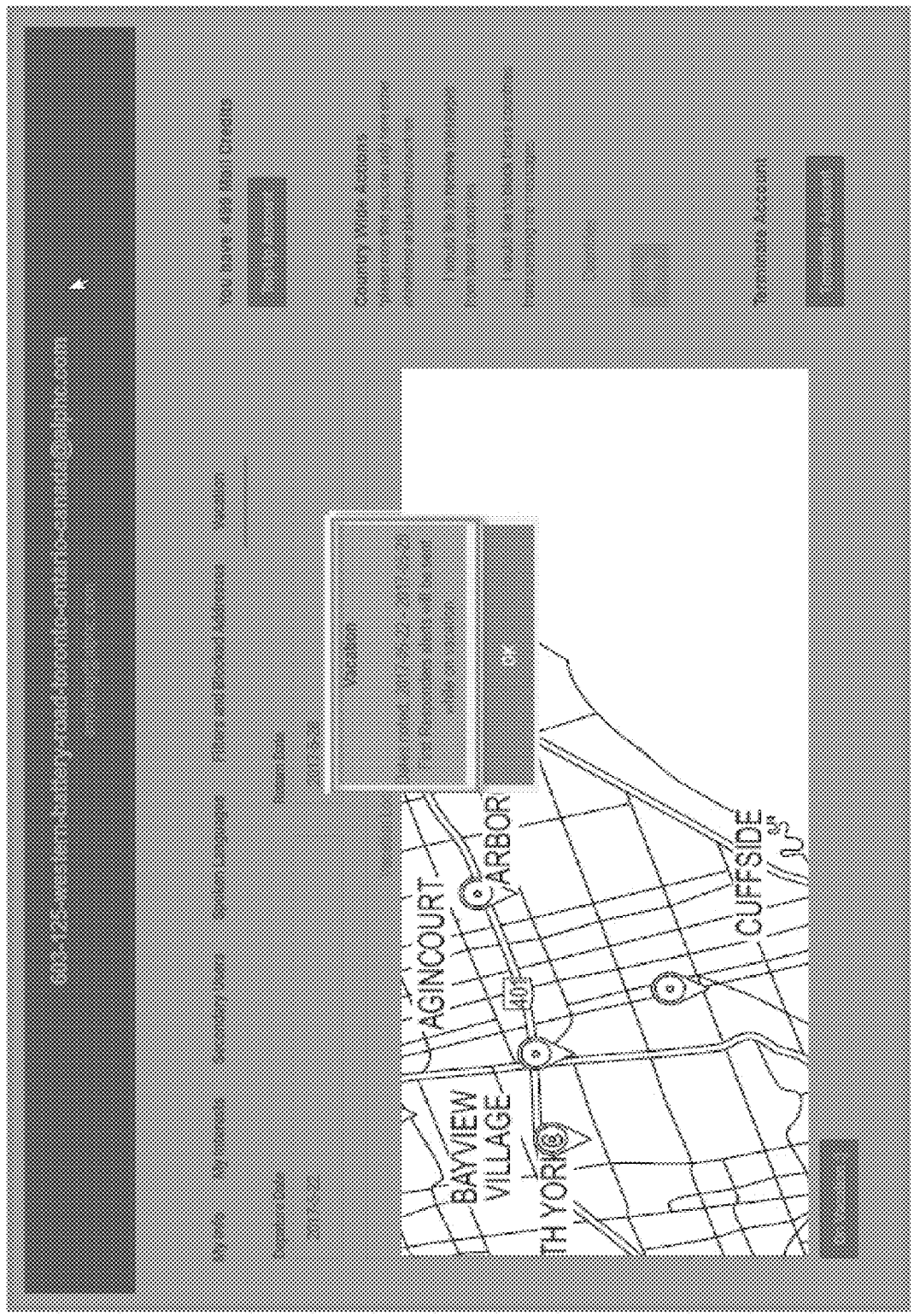
FIG. 25F is a diagram depicting an embodiment of an itinerary set for sending first responders alerts while on vacation.

FIG. 25F is a diagram depicting an embodiment of an itinerary set for sending first responders alerts while on vacation. In this embodiment, the vacation itinerary is linked with first responder systems such that the first responders will be notified that the visitor will be in the area, in any case of an emergency. First responders can be alerted of the visitor's current location, needs, medical condition, other individuals visiting with the visitor, and the like. The electronic communications system can alert the visitor's family members and/or other individuals associated with the electronic communications system while the visitor is on vacation (or traveling otherwise).

Figure 26A:
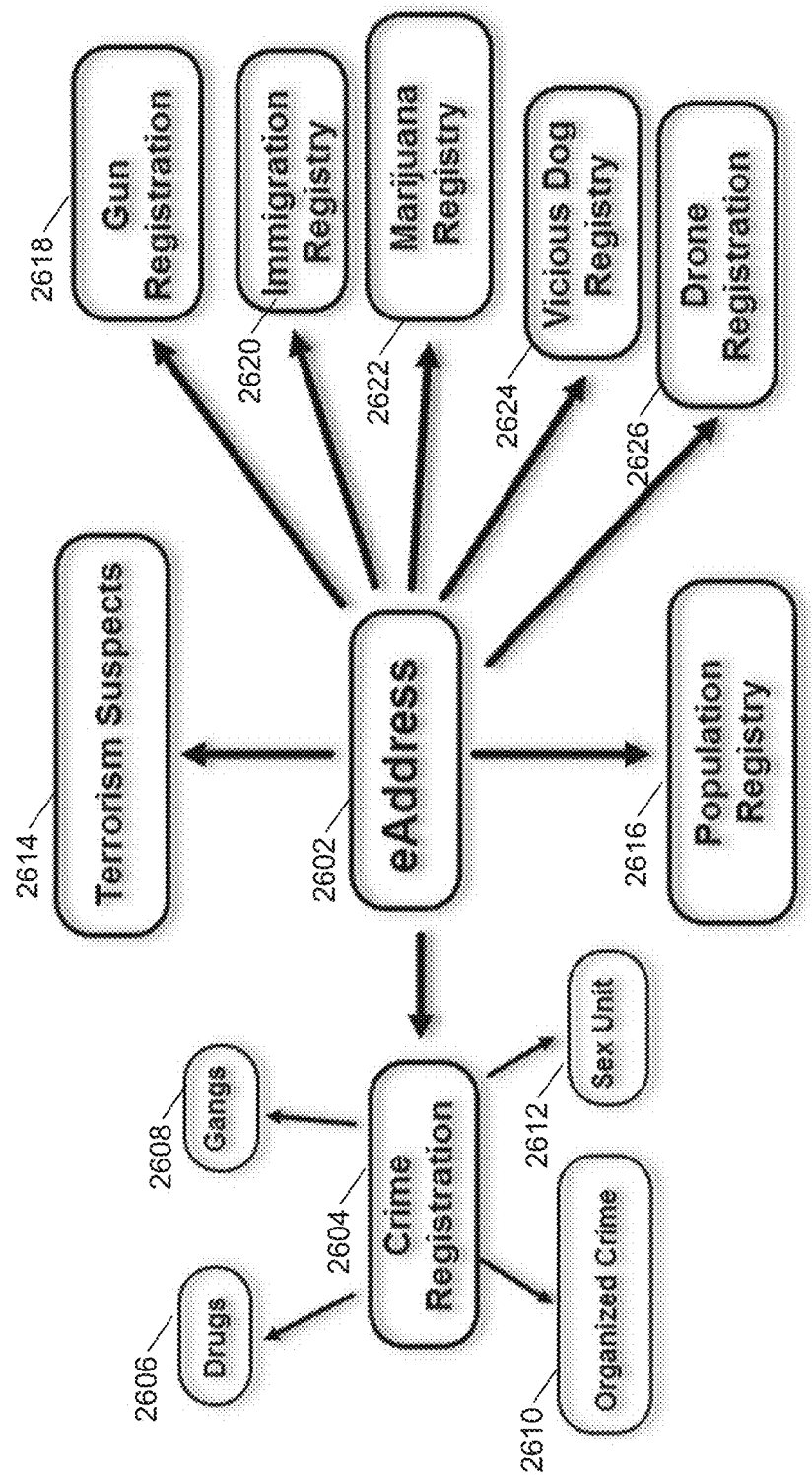

The electronic communications account, eAddress, and/or e-mail address can be associated with registration databases. FIG. 26A is a diagram depicting an embodiment of an example registration databases that the electronic communications account can be associated with. The electronic communications account 2602 can be associated with a crime registration database 2604. For example, an individual associated with the electronic communications account 2602 can have a crime record or can be a suspect to a crime. In some embodiments, the registration database can be tiered and/or categorized. For example, the electronic communications account 2602 can be associated with a drugs department 2606, a gangs department 2608, an organized crime department 2610, and/or a sex unit department 2612. Accordingly, when police are notified of activity on the electronic communications account 2602, then the appropriate department can be notified. Activity on the electronic communications account 2602 can also be evidentiary proof used in the department's assessment of the current crime.

The example in FIG. 26A illustrates an electronic communications account 2602 associated with terrorism suspects 2614. For example, if the activity of the electronic communications account 2602 is a terrorist suspect and in the terrorism suspects registry 2614, the airport check may identify the individual and more cautiously check the individual's belongings. The electronic communications system 2602 can use this information to notify authorities. For example, if terrorism suspects are located in a particular area, other electronic communications account 2602 in the near vicinity may be notified to police authorities. If several terrorism suspects gather in a particular location, police authorities can also be notified.

The electronic communications account 2602 can be associated with other types of registries. For example, the electronic communications account 2602 can be associated with a gun registration 2618, an immigration registry 2620, a marijuana registry 2622, a vicious dog registry 2624, and/or a drone registry 2626.

Figure 26B:
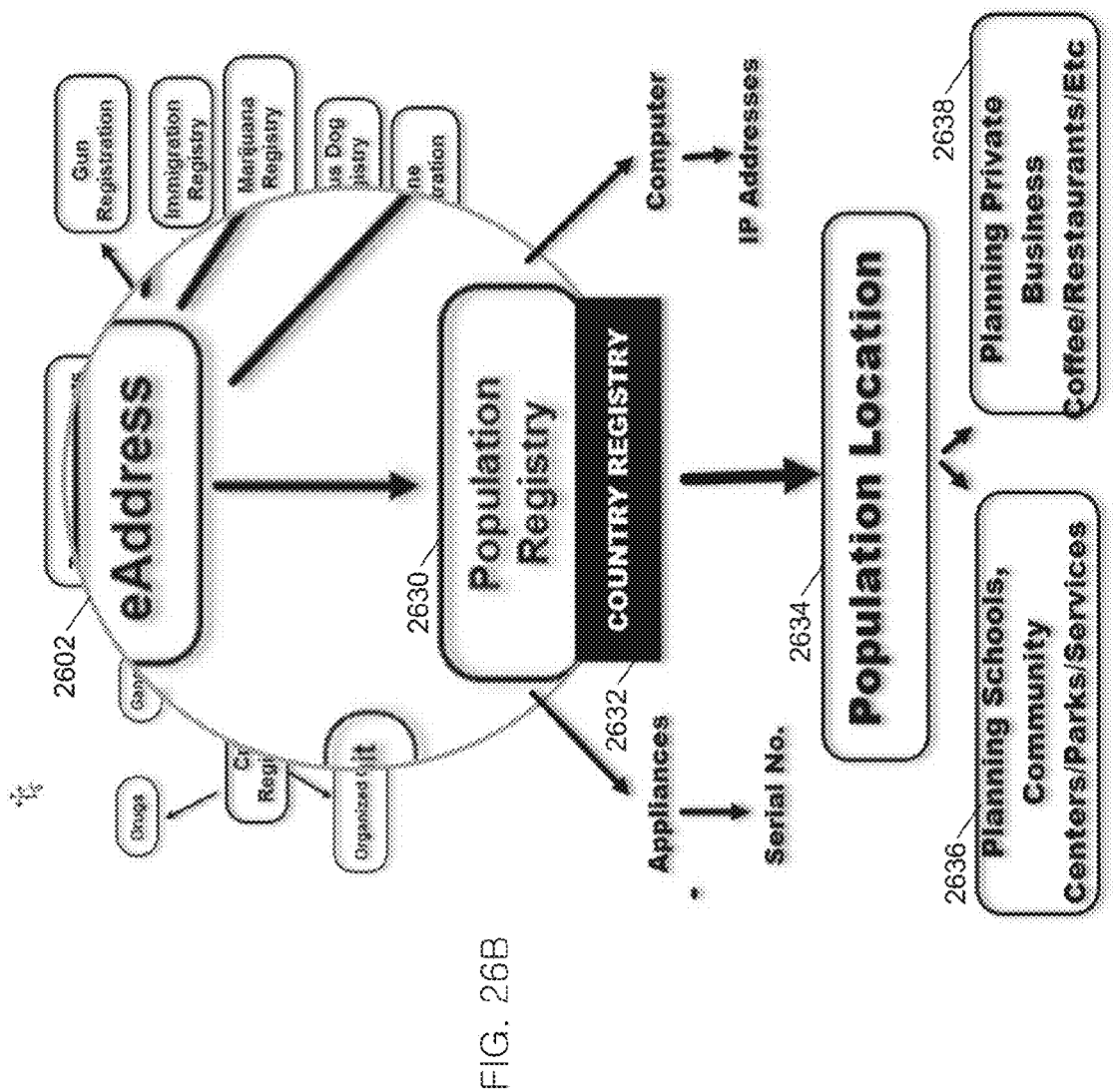
FIG. 26B is a diagram depicting an embodiment of an electronic communications account associated with a population registry.

FIG. 26B is a diagram depicting an embodiment of an electronic communications account associated with a population registry. The electronic communications account 2602 can be associated with a population registry 2630. The country registry 2632 can be associated with a particular population location 2634. For example, the country registry 2632 can be a part of a country registry 2632, a county registry, a state registry, a state registry, and the like.

The population location 2634 can be linked with characteristics of the location. In some embodiments, the population location 2634 can be associated with demographic information, geographical information, political information, road and highway information, traffic information, and the like. For example, the population location 2634 can be associated with planning for schools, community centers, parks, and city services 2636. The population location 2634 can also be associated with planning private businesses such as coffee shops, restaurants, and the like.

The electronic communications account 2602 can be associated with particular devices such as appliances and/or computers, as described in this disclosure herein. The devices can be associated with an identifier. The appliance can be associated with a serial number, and as such, the electronic communications account 2602 can be associated with the serial number. Likewise, a computer may be associated with an IP Address, and the electronic communications account 2602 can be associated with the IP address.

Figure 26C:
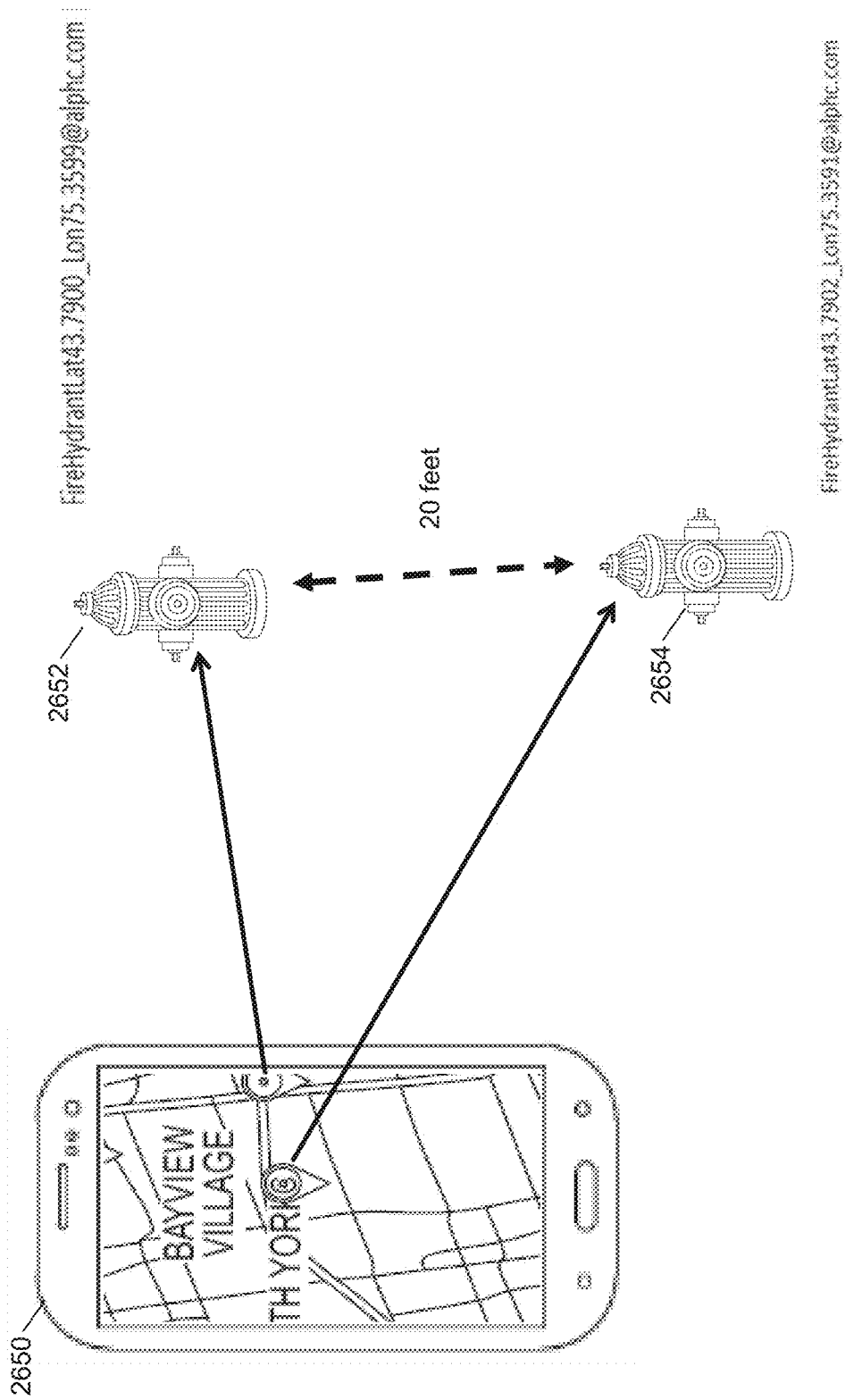
FIG. 26C is a diagram depicting an embodiment of an graphical user interface for two fire hydrants associated with respective electronic communications accounts.

FIG. 26C is a diagram depicting an embodiment of an graphical user interface for two fire hydrants associated with respective electronic communications accounts. The individual can view a map of an area on the graphical user interface. On the map, markers can be associated with areas and/or locations of interest (for example, a fire hydrant). In the example illustrated in FIG. 26C, the graphical user interface includes two fire hydrants 2652 and 2654. The first fire hydrant 2652 is associated with an electronic communications account (for example, FireHydrantLat43.7900 Lon75.3599@alphc.com). The second fire hydrant 2654 is associated with an electronic communications account (for example, FireHydrantLat43.7902 Lon75.3591 @alphc.com). As the user gets closer or further away from the point or area of interest, the graphical user interface may update the map. The graphical user interface 2650 may provide additional information to the individual. For example, the graphical user interface 2650 may provide text on information regarding the two fire hydrants 2652 and 2654. The individual may stand by one of the two fire hydrants 2652 and 2654 and generate an electronic communications account using geocode. For example, the individual may use the latitude and/or longitude information. In some embodiments, the graphical user interface may show distances between two areas or locations of interest. For example, the graphical user interface 2650 may show that two fire hydrants 2652 and 2654 are 20 feet apart. In some embodiments, other points or areas of interest can be used. For example, TV cable and/or internet can be used. In some embodiments, the radius of a transmitter can be shown. For example, the strength of the signal from a Wi-Fi broadcasting router can be shown on the map. Accordingly, an individual can know where the individual can move to get access to the internet using the Wi-Fi signal.

Figure 26D:
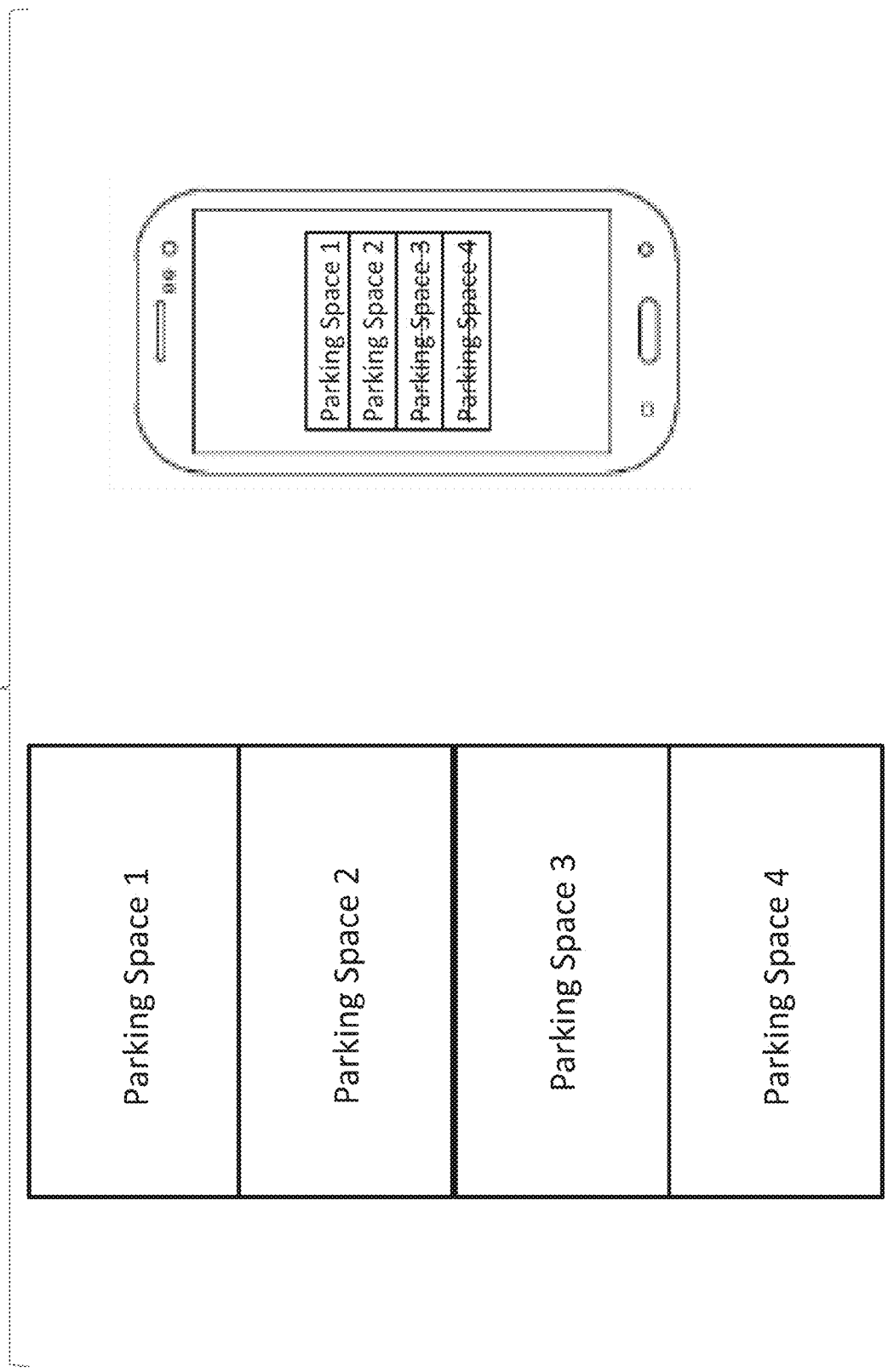
FIG. 26D is a diagram depicting an embodiment of parking spaces associated with electronic communications accounts.

FIG. 26D is a diagram depicting an embodiment of parking spaces associated with electronic communications accounts. For example, a rental car business can have multiple parking spaces (for example, parking space 1, 2, 3, and 4). The individual can identify the parking space associated with the rental car the individual is to rent. The graphical user interface may also display available cars that are available to rent. In this example, the rental process can be automated while directing the user to the parking space. For example, the graphical user interface may display that parking space 1 and 2 are available but not parking space 3 and 4. The parking space 1 may be associated with ParkingSpace1ChambersBlvdToronto@alphc.com. THe parking space 2 may be associated with ParkingSpace2ChambersBlvdToronto@alphc.com.

In some embodiments, the individual may send a message to the owner of the parking space and/or car parked at the parking space. For example, the individual may decide to send a message to the car parked at parking space 1 because the car has been hit by another car.

Figure 26E:
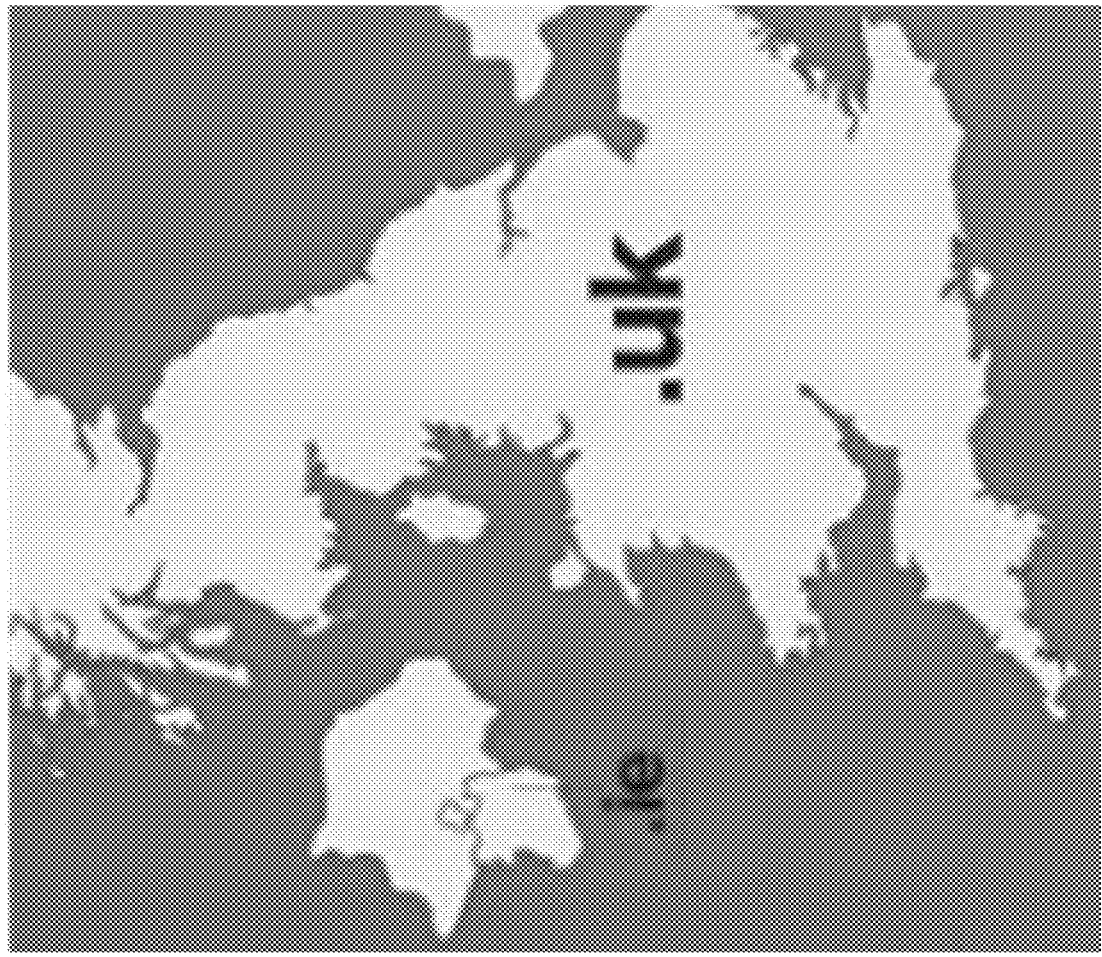
FIG. 26E is a diagram depicting an embodiment of a graphical user interface for two fire hydrants associated with respective electronic communications accounts.

FIG. 26E is a diagram depicting an embodiment of a graphical user interface for two fire hydrants associated with respective electronic communications accounts. In this embodiment, a map of the United Kingdom and Ireland are shown. Domains can be created for the electronic communications accounts. For example, electronic communications accounts in the United Kingdom may have an indication that at least one physical address is associated with the United Kingdom. For example, the electronic communications account address may be 20HunterStreetManheimer.UK@alphc.com. For, electronic communications accounts in Ireland, the electronic communications account address may be 123MainStreetNewDell.ie@alphc.com. Below is a list of example domain names for several countries:

Afghanistan .af
Albania .al
Algeria .dz
American Samoa .as
Andorra .ad
Angola .ao
Anguilla .ai
Antarctica .aq
Antigua and Barbuda .ag
Argentina .ar
Armenia .am
Aruba .aw
Ascension Island .ac
Australia .au
Austria .at
Azerbaijan .az
Bahamas .bs
Bahrain .bh
Bangladesh .bd
Barbados .bb
Basque Country .eus
Belarus .by
Belgium .be
Belize .bz
Benin .bj
Bermuda .bm
Bhutan .bt
Bolivia .bo
Bonaire .bq
Bosnia and Herzegovina .ba
Botswana .bw
Bouvet Island .bv
Brazil .br
British Indian Ocean Territory .io
British Virgin Islands .vg
Brunei .bn
Bulgaria .bg
Burkina Faso .bf
Burma .mm
Burundi .bi
Cambodia .kh
Cameroon .cm
Canada .ca
Cape Verde .cv
Catalonia .cat
Cayman Islands .ky
Central African Republic .cf
Chad .td
Chile .cl
China, People's Republic of .cn
Christmas Island .cx
Cocos Islands .cc
Colombia .co
Comoros .km
Congo, Democratic Republic of the .cd
Congo, Republic of the .cg
Cook Islands .ck
Costa Rica .dr
Côte d'Ivoire .ci
Croatia .hr
Cuba .cu
Curaçao .cw
Cyprus .cy
Czech Republic .cz
Denmark .dk
Djibouti .dj
Dominica .dm
Dominican Republic .do
East Timor .tl
Ecuador .ec Egypt .eg
El Salvador .sv
Equatorial Guinea .gq
Eritrea .er
Estonia .ee
Ethiopia .et
European Union .eu
Falkland Islands .fk
Faeroe Islands .fo
Federated States of Micronesia .fm
Fiji .fj
Finland .fi
France .fr
French Guiana .gf
French Polynesia .pf
French Southern and Antarctic Lands .tf
Gabon .ga
Galicia .gal
Gambia .gm
Gaza Strip .ps
Georgia .ge
Germany .de
Ghana .gh
Gibraltar .gi
Greece .gr
Greenland .gl
Grenada .gd
Guadeloupe .gp
Guam .gu
Guatemala .gt
Guernsey .gg
Guinea .gn
Guinea-Bissau .gw
Guyana .gy
Haiti .ht
Heard Island and McDonald Islands .hm
Honduras .hn
Hong Kong .hk
Hungary .hu
Iceland .is
India .in
Indonesia .id
Iran .ir
Iraq .iq
Ireland .ie
Isle of Man .im
Israel .il
Italy .it
Jamaica .jm
Japan .jp
Jersey .je
Jordan .jo
Kazakhstan .kz
Kenya .ke
Kiribati .ki
Kuwait .kw
Kyrgyzstan .kg
Laos .la
Latvia .lv
Lebanon .lb
Lesotho .ls
Liberia .lr
Libya .ly
Liechtenstein .li
Lithuania .lt
Luxembourg .lu
Macau .mo
Macedonia, Republic of .mk
Madagascar .mg
Malawi .mw
Malaysia .my
Maldives .mv
Mali .ml
Malta .mt
Marshall Islands .mh
Martinique .mq
Mauritania .mr
Mauritius .mu
Mayotte .yt
Mexico .mx
Moldova .md
Monaco .mc
Mongolia .mn
Montenegro .me
Montserrat .ms
Morocco .ma
Mozambique .mz
Myanmar .mm
Namibia .na
Nauru .nr
Nepal .np
Netherlands .nl
New Caledonia .nc
New Zealand .nz
Nicaragua .ni
Niger .ne
Nigeria .ng
Niue .nu
Norfolk Island .nf
North Cyprus .nc.tr
North Korea .kp
Northern Mariana Islands .mp
Norway .no
Oman .om
Pakistan .pk
Palau .pw
Palestine .ps
Panama .pa
Papua New Guinea .pg
Paraguay .py
Peru .pe
Philippines .ph
Pitcairn Islands .pn
Poland .pl
Portugal .pt
Puerto Rico .pr
Qatar .qa
Romania .ro
Russia .ru
Rwanda .rw
Réunion Island .re
Saba .bq
Saint Helena .sh
Saint Kitts and Nevis .kn
Saint Lucia .lc
Saint Martin
Saint-Pierre and Miquelon .pm
Saint Vincent and the Grenadines .vc
Samoa .ws
San Marino .sm
São Tomé and Príncipe .st
Saudi Arabia .sa
Senegal .sn
Serbia .rs Seychelles .sc
Sierra Leone .sl
Singapore .sg
Sint Eustatius .bq
Sint Maarten .sx/.an
Slovakia .sk
Slovenia .si
Solomon Islands .sb
Somalia .so
Somaliland .so
South Africa .za
South Georgia and the South Sandwich Islands .gs
South Korea .kr
South Sudan .ss
Spain .es
Sri Lanka .lk
Sudan .sd
Suriname .sr
Svalbard and Jan Mayen Islands .sj
Swaziland .sz
Sweden .se
Switzerland .ch
Syria .sy
Taiwan .tw
Tajikistan .tj
Tanzania .tz
Thailand .th
Togo .tg
Tokelau .tk
Tonga .to
Trinidad & Tobago .tt
Tunisia .tn
Turkey .tr
Turkmenistan .tm
Turks and Caicos Islands .tc
Tuvalu .tv
Uganda .ug
Ukraine .ua
United Arab Emirates .ae
United Kingdom .uk
United States of America .us
United States Virgin Islands .vi
Uruguay .uy
Uzbekistan .uz
Vanuatu .vu
Vatican City .va
Venezuela .ve
Vietnam .vn
Wallis and Futuna .wf
Western Sahara .eh
Yemen .ye
Zambia .zm
Zimbabwe .zw In some embodiments, the electronic communications system can store a cookie on the web browser indicating information on the electronic communications account. The cookie stored on the web browser can include information relevant to the individual. For example, the cookie can include an individual's name, social security number, email addresses, phone numbers, weight/height, education, occupation, blood type, preferences, sex, likes and dislikes, and the like. The cookie can include information on the electronic communications account and what it is linked to. For example, the cookie can include information on a physical location, a name of a mark (for example a building name), an object, a serial number, an identifier. The cookie can include information to be sent to a third party, such as browser data, access times, location of the individual, and the like. Cookie data may also include third party information. For example, cookie data may include advertisers interested in advertising to the individual and/or the electronic communications account.

For purposes of this application, certain aspects, advantages, and novel features of the invention are described herein. It is to be understood that not necessarily all such advantages can be achieved in accordance with any particular embodiment of the invention. Thus, for example, those skilled in the art will recognize that the invention can be embodied or carried out in a manner that achieves one advantage or group of advantages as taught herein without necessarily achieving other advantages as can be taught or suggested herein.

Although several embodiments, examples, and illustrations are disclosed herein, it will be understood by those of ordinary skill in the art that the inventions described herein extend beyond the specifically disclosed embodiments, examples, and illustrations and includes other uses of the inventions and obvious modifications and equivalents thereof. Embodiments of the inventions are described with reference to the accompanying figures, wherein like numerals refer to like elements throughout. The terminology used in the description presented herein is not intended to be interpreted in any limited or restrictive manner simply because it is being used in conjunction with a detailed description of certain specific embodiments of the inventions. In addition, embodiments of the inventions can comprise several novel features and no single feature is solely responsible for its desirable attributes or is essential to practicing the inventions herein described.

Although this invention has been disclosed in the context of certain embodiments and examples, it will be understood by those skilled in the art that the invention extends beyond the specifically disclosed embodiments to other alternative embodiments and/or uses of the invention and obvious modifications and equivalents thereof. In addition, while several variations of the embodiments of the invention have been shown and described in detail, other modifications, which are within the scope of this invention, will be readily apparent to those of skill in the art based upon this disclosure. It is also contemplated that various combinations or sub-combinations of the specific features and aspects of the embodiments can be made and still fall within the scope of the invention. It should be understood that various features and aspects of the disclosed embodiments can be combined with, or substituted for, one another in order to form varying modes of the embodiments of the disclosed invention. Any methods disclosed herein need not be performed in the order recited. Thus, it is intended that the scope of the invention herein disclosed should not be limited by the particular embodiments described above.

Conditional language, such as, among others, "can," "could," "might," or "can," unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment. The headings used herein are for the convenience of the reader only and are not meant to limit the scope of the inventions or claims.

The term "eAddress" generally refers to the email or electronic email address, electronic address, and/or electronic communications account that is automatically and/or axiomatically created for each global physical address and/or via geo coding coordinates based on latitude and longitude. The term "Area" generally refers to the eAddresses located in a specific location(s) on a map, a single address and or the location where the eAddresses are sent for the use of communication

What is claimed is:

1. A computer-implemented method for generating an electronic communications account based on latitude, longitude, and geo coding associated with a location of a user device, wherein the method comprises:
    receiving, by a computer system, a request to generate a new electronic communications account and authorization to access location services;
    accessing, by the computer system, data related to the location of the user device, wherein the location of the user device is determined by:
        receiving data from a plurality of transmitters;
        triangulating a location based on the received data from the plurality of transmitters; and
        identifying a latitude and longitude for the location;
    determining, by the computer system, whether the location is associated with a pre-existing electronic communications account;
    in response to determining that the location is associated with the pre-existing electronic communications account:
        sending, by the computer system, an electronic message to the pre-existing electronic communications account, wherein the electronic message to the pre-existing electronic communications account indicates that the user device is attempting to generate the new electronic communications account associated with the location;
        requesting, by the computer system, verification information from the user device;
        initiating, by the computer system, a fraud verification procedure to determine whether the request to generate the new electronic communications account is a fraudulent request; and
        determining, by the computer system, whether to generate the new electronic communications account associated with the location based at least in part on the electronic message sent to the pre-existing electronic communications account, the requested verification information, and the fraud verification procedure; and
    in response to determining that the location is not associated with the pre-existing electronic communications account:
        automatically generating, by the computer system, the new electronic communications account for the location;
        associating, by the computer system, the latitude and longitude for the location to the new electronic communications account; and
        transmitting, by the computer system, data associated with the new electronic communications account to the user device, wherein the computer system comprises a computer processor and an electronic storage medium.

2. The computer-implemented method of claim 1, wherein the plurality of transmitters comprise at least one of: a satellite, a Wi-fi base station, mobile Wi-fi base, or a cellular base station.

3. The computer-implemented method of claim 1, further comprising:
    transmitting, by the computer system, a request for identification verification information associated with an identification document;
    receiving, by the computer system, the identification verification information associated with an identification document; and
    verifying, by the computer system, whether the identification verification information associated with an identification document is sufficient to authenticate the user device.

4. The computer-implemented method of claim 3, wherein the identification document comprises at least one of: a passport, a driver's license, or a social security number.

5. The computer-implemented method of claim 1, wherein the automatically generated new electronic communications account for the location of the user device comprises an indication of the latitude and longitude of the location associated with the user device.

6. The computer-implemented method of claim 1, further comprising:
    determining, by the computer system, whether the location of the user device is associated with a location of interest; and
    in response to determining that the location of the user device is associated with the location of interest, associating, by the computer system, the new electronic communications account with the location of interest.

7. The computer-implemented method of claim 6, wherein the location of interest comprises at least one of: a residence, a building, an infrastructure, or a vehicle.

8. The computer-implemented method of claim 1, further comprising:
    receiving, by the computer system, personal information of an individual independent of the individual associated with the user device; and
    associating, by the computer system, the new electronic communications account with the personal information of the individual as a secondary individual.

9. The computer-implemented method of claim 1, further comprising:
    receiving, by the computer system, a selection to share the automatically generated new electronic communications account to a computing device; and
    transmitting, by the computer system, the new electronic communications account to the computing device.

10. The computer-implemented method of claim 1, wherein initiating the fraud verification procedure comprises at least one of: initiating procedures to identify an identify theft, a computer virus, or a credit card fraud.

11. A system for generating an electronic communications account based on a latitude and longitude associated with a location of a user device, wherein the system comprises:
    one or more computer readable storage devices configured to store a plurality of computer executable instructions; and
    one or more hardware computer processors in communication with the one or more computer readable storage devices and configured to execute the plurality of computer executable instructions in order to cause the system to:

receive, from a user device, a request to generate a new electronic communications account;

access a location of the user device, wherein the location of the user device is determined by triangulating a location based on received data from a plurality of transmitters;

determine whether the user device is associated with a pre-existing electronic communications account;

in response to determining that the user device is associated with a pre-existing electronic communications account:

transmit, to a user device, a request identification verification information;

receive identification verification information from the user device;

determine whether the user device is verified based on the identification verification information;

in response to determining that the user device is verified based on the identification verification information:

automatically generate the new electronic communications account for the location of the user device;

associate the user device to the new electronic communications account; and transmit the new electronic communications account to the user device;

in response to determining that the user device is not verified based on the identification verification information:

initiate a fraud verification procedure to determine whether the request to generate the new electronic communications account is a fraudulent request; and in response to determining that the user device is not associated with the pre-existing electronic communications account:

automatically generate the new electronic communications account for the location of the user device;

associate the user device to the new electronic communications account; and transmit the new electronic communications account to the user device.

12. The system of claim 11, wherein in response to determining that the user device is verified based on the identification verification information, the system is further caused to:

transmit, to the user device, a request to select whether the user device is to be associated with the pre-existing electronic communications account or to the generated new electronic communications account for the location of the user device;

receive, from the user device, a selection of an electronic communications account to be associated with the user device; and associate the user device with the selected electronic communications account.

13. The system of claim 11, wherein the automatically generated new electronic communications account for the location of the user device comprises an indication of the location associated with the user device.

14. The system of claim 11, wherein the system is further caused to:

determine whether the location of the user device is associated with a location of interest; and in response to determining that the location of the user device is associated with the location of interest, identify the new electronic communications account associated with the location of interest and transmit the new electronic communications account to the user device.

15. The system of claim 11, wherein the system is further caused to:

receive, from the user device, personal information of an individual; and associate the new electronic communications account with the personal information of an individual as a secondary individual.

16. The system of claim 15, wherein the personal information comprises at least one of: an email address, a phone number, a physical address, a first name, a last name, a phone number, a social security number, or a social media website.

17. The system of claim 11, wherein the system is further caused to:

receive, from the user device, a selection to share the automatically generated new electronic communications account to a computing device; and transmit the new electronic communications account to a computing device.

18. The system of claim 17, wherein the computing device is associated with a different user than the user associated with the user device.

19. The system of claim 11, wherein the automatically generating the new electronic communications account comprises identifying a channel of communication for the new electronic communications account.

20. The system of claim 19, wherein the channel of communication comprises at least one of: an email, an SMS message, or executable code to initiate an alert on the user device.

* * * * *

UNITED STATES PATENT AND TRADEMARK OFFICE
CERTIFICATE OF CORRECTION

PATENT NO. : 9,860,203 B2
APPLICATION NO. : 15/604444
DATED : January 2, 2018
INVENTOR(S) : Shafin Valla It is certified that error appears in the above-identified patent and that said Letters Patent is hereby corrected as shown below:

In the Specification

In Column 5 at Line 48, Change "address" to --address.--.

In Column 10 at Line 29, Change ".com" to --.com.--.

In Column 14 at Line 11 (approx.), Change "and or" to --and/or--.

In Column 16 at Line 57, Change "in" to --In--.

In Column 20 at Line 40, Change "and or" to --and/or--.

In Column 20 at Lines 47-48, Change "and or" to --and/or--.

In Column 21 at Line 11, Change "in on" to --on--.

In Column 21 at Line 33, Change "floor" to --floor.--.

In Column 29 at Line 57, Change "FIG." to --FIGS.--.

In Column 43 at Line 33, Change "and or" to --and/or--.

In Column 43 at Line 38, Change "demographics" to --demographics.--.

In Column 47 at Line 18, Change "FIG. 17E-1" to --17E--.

In Column 50 at Line 35, Change "FIG." to --FIGS.--.

In Column 50 at Line 65, Change "ph903-18" to --ph103-18--.

Signed and Sealed this
First Day of May, 2018

Andrei Iancu
*Director of the United States Patent and Trademark Office*

In Column 52 at Line 49, Change "responders," to --responders.--.

In Column 56 at Line 31, Change "123KingStE_LA_California USA@alphc.com." to --123KingStE_LA_California_USA@alphc.com.--.

In Column 58 at Line 22, Change "and or" to --and/or--.

In Column 59 at Line 12, Change "and or" to --and/or--.

In Column 59 at Line 12, Change "resident." to --resident--.

In Column 59 at Lines 38-39, Change "applicable" to --applicable.--.

In Column 61 at Line 34, Change "safety" to --safety.--.

In Column 69 at Line 28, Change "character" to --character.--.

In Column 73 at Line 54, Change "eAdresses" to --eAddresses--.

In Column 75 at Line 33, Change "and or" to --and/or--.

In Column 83 at Lines 8-9, Change "Lon75.3591 @alphc.com)." to --Lon75.3591@alphc.com).--.

In Column 83 at Line 41, Before "and" insert --3--.

In Column 83 at Line 42, Change "THe" to --The--.

In Column 89 at Line 11, Change "and or" to --and/or--.

In Column 89 at Line 12, Change "communication" to --communication.--.

In the Claims

In Column 90 at Line 55, Change "identify an identify" to --identify an identity--.